US008779718B2

(12) United States Patent
Stone et al.

(10) Patent No.: US 8,779,718 B2
(45) **Date of Patent: *Jul. 15, 2014**

(54) ELECTRICAL SYSTEMS AND BATTERY ASSEMBLIES

(75) Inventors: Lawrence Stone, Austin, TX (US); Joseph Lamoreux, Austin, TX (US); Christopher Darilek, Austin, TX (US); Tage Bjorklund, Cedar Park, TX (US); David St. Angelo, Austin, TX (US)

(73) Assignee: Valence Technology, Inc., Las Vegas, NV (US)

(*) Notice: Subject to any disclaimer, the term of this patent is extended or adjusted under 35 U.S.C. 154(b) by 333 days.

This patent is subject to a terminal disclaimer.

(21) Appl. No.: 13/158,279

(22) Filed: Jun. 10, 2011

(65) Prior Publication Data

US 2011/0254560 A1 Oct. 20, 2011

Related U.S. Application Data

(63) Continuation of application No. 10/947,602, filed on Sep. 21, 2004, now Pat. No. 7,986,124.

(60) Provisional application No. 60/505,125, filed on Sep. 22, 2003, provisional application No. 60/559,171, filed on Mar. 31, 2004.

(51) Int. Cl.
*H02J 7/00* (2006.01)

(52) U.S. Cl.
USPC ............................ 320/106; 320/110; 320/112

(58) Field of Classification Search
USPC ......................................... 320/106, 112, 110
See application file for complete search history.

(56) References Cited

U.S. PATENT DOCUMENTS

| | | | |
|---|---|---|---|
| 3,694,729 | A | 9/1972 | Jones |
| 4,126,288 | A | 11/1978 | De Sisto et al. |

(Continued)

FOREIGN PATENT DOCUMENTS

| | | |
|---|---|---|
| CA | 2225585 | 6/1999 |
| CA | 2348586 | 11/2002 |

(Continued)

OTHER PUBLICATIONS

"Testing of Lithium-Metal-Polymer Batteries in Outside Power Cabinet for Telecommunication System;" Rouillard et al.; INTELEC Conference, Jun. 6-9, 1999; pp. 515-522.

(Continued)

*Primary Examiner* — Samuel Berhanu
(74) *Attorney, Agent, or Firm* — Wells St. John P.S.

(57) ABSTRACT

Electrical systems, power supply apparatuses, and power supply operational methods are described. According to one aspect, an electrical system includes an electrical entity configured to utilize electrical energy, and wherein the electrical entity comprises a communications interface, and a power supply apparatus configured to provide the electrical energy for use by the electrical entity, and wherein the power supply apparatus comprises a support system, a plurality of battery assemblies configured to be removably coupled with and supported by the support system, wherein individual ones of the battery assemblies comprise at least one rechargeable electrochemical device configured to provide the electrical energy, at least one power terminal configured to couple with the electrical entity and to provide the electrical energy from the electrochemical device to the electrical entity, and a communications interface configured to implement communications with the communications interface of the electrical entity, and wherein the electrical entity and the power supply apparatus are configured to implement the communications comprising at least one of status information regarding the power supply apparatus from the power supply apparatus to the electrical entity and a command regarding an operation of the power supply apparatus from the electrical entity to the power supply apparatus.

42 Claims, 122 Drawing Sheets

(56) References Cited

U.S. PATENT DOCUMENTS

| | | | | |
|---|---|---|---|---|
| 4,477,541 | A | 10/1984 | Frraioli | |
| 4,583,034 | A * | 4/1986 | Martin | 320/134 |
| 4,668,595 | A | 5/1987 | Yoshino et al. | |
| 4,715,502 | A | 12/1987 | Salmon | |
| 4,792,504 | A | 12/1988 | Schwab et al. | |
| 4,830,939 | A | 5/1989 | Lee et al. | |
| 4,935,317 | A | 6/1990 | Fauteux et al. | |
| 4,957,829 | A | 9/1990 | Holl | |
| 4,990,413 | A | 2/1991 | Lee et al. | |
| 4,994,940 | A | 2/1991 | Thouvenin et al. | |
| 5,037,712 | A | 8/1991 | Shackle et al. | |
| 5,140,744 | A | 8/1992 | Miller | |
| 5,262,253 | A | 11/1993 | Golovin | |
| 5,300,373 | A | 4/1994 | Shackle et al. | |
| 5,315,228 | A | 5/1994 | Hess et al. | |
| 5,399,447 | A | 3/1995 | Chaloner-Gill et al. | |
| 5,411,820 | A | 5/1995 | Chaloner-Gill et al. | |
| 5,418,091 | A | 5/1995 | Gozdz et al. | |
| 5,435,054 | A | 7/1995 | Tonder et al. | |
| 5,455,499 | A * | 10/1995 | Uskali et al. | 340/636.1 |
| 5,463,179 | A | 10/1995 | Chaloner-Gill et al. | |
| 5,477,130 | A | 12/1995 | Hashimoto et al. | |
| 5,482,795 | A | 1/1996 | Chaloner-Gill | |
| 5,508,130 | A | 4/1996 | Golovin | |
| 5,515,303 | A | 5/1996 | Carging, Jr. et al. | |
| 5,541,020 | A | 7/1996 | Golovin et al. | |
| 5,590,058 | A * | 12/1996 | Foreman et al. | 702/63 |
| 5,610,802 | A | 3/1997 | Eidler et al. | |
| 5,616,436 | A | 4/1997 | Sonobe et al. | |
| 5,620,810 | A | 4/1997 | Golovin et al. | |
| 5,639,571 | A | 6/1997 | Waters et al. | |
| 5,643,695 | A | 7/1997 | Barker et al. | |
| 5,660,948 | A | 8/1997 | Barker | |
| 5,666,006 | A * | 9/1997 | Townsley et al. | 307/66 |
| 5,694,312 | A | 12/1997 | Brand et al. | |
| 5,700,298 | A | 12/1997 | Shi et al. | |
| 5,712,059 | A | 1/1998 | Barker et al. | |
| 5,739,671 | A | 4/1998 | Hamada | |
| 5,811,959 | A | 9/1998 | Kejiha | |
| 5,830,602 | A | 11/1998 | Barker et al. | |
| 5,851,504 | A | 12/1998 | Barker et al. | |
| 5,867,372 | A | 2/1999 | Shie | |
| 5,869,208 | A | 2/1999 | Miyasaka | |
| 5,882,821 | A | 3/1999 | Miyasaka | |
| 5,901,057 | A | 5/1999 | Brand et al. | |
| 5,910,382 | A | 6/1999 | Goodenough et al. | |
| 5,969,436 | A | 10/1999 | Chalasani et al. | |
| 5,975,315 | A | 11/1999 | Jordan | |
| 5,993,241 | A | 11/1999 | Olson et al. | |
| 6,005,367 | A | 12/1999 | Rohde | |
| 6,020,087 | A | 2/2000 | Gao | |
| 6,103,419 | A | 8/2000 | Saidi et al. | |
| 6,104,967 | A | 8/2000 | Hagen et al. | |
| 6,136,472 | A | 10/2000 | Barker et al. | |
| 6,179,133 | B1 | 1/2001 | Reece | |
| 6,190,796 | B1 * | 2/2001 | Chalasani et al. | 429/100 |
| 6,202,570 | B1 | 3/2001 | Kurtsman | |
| 6,220,456 | B1 | 4/2001 | Jensen et al. | |
| 6,255,801 | B1 | 7/2001 | Chalasani | |
| 6,291,966 | B1 | 9/2001 | Wendelrup et al. | |
| 6,291,967 | B1 | 9/2001 | Higuchi | |
| 6,304,059 | B1 | 10/2001 | Chalasani et al. | |
| 6,304,471 | B1 | 10/2001 | Chalasani et al. | |
| 6,306,215 | B1 | 10/2001 | Larkin | |
| 6,359,417 | B1 | 3/2002 | Winkler | |
| 6,361,897 | B1 | 3/2002 | Snyder | |
| 6,387,568 | B1 | 5/2002 | Barker et al. | |
| 6,392,901 | B1 | 5/2002 | Colver et al. | |
| 6,434,469 | B1 | 8/2002 | Shimizu et al. | |
| 6,475,659 | B1 | 11/2002 | Heimer | |
| 6,483,272 | B1 * | 11/2002 | Terada et al. | 320/103 |
| 6,522,100 | B2 | 2/2003 | Hansford | |
| 6,528,033 | B1 | 3/2003 | Barker et al. | |
| 6,532,425 | B1 | 3/2003 | Boost et al. | |
| 6,641,942 | B1 | 11/2003 | Rouillard et al. | |
| 6,650,089 | B1 | 11/2003 | Freeman et al. | |
| 6,667,599 | B2 | 12/2003 | Stone et al. | |
| 6,721,400 | B2 | 4/2004 | Schelberg, Jr. et al. | |
| 6,741,065 | B1 | 5/2004 | Ishii et al. | |
| 2001/0008424 | A1 * | 7/2001 | Higuchi et al. | 348/372 |
| 2002/0117996 | A1 | 8/2002 | Cheng | |
| 2002/0192553 | A1 | 12/2002 | Barker et al. | |
| 2003/0027049 | A1 | 2/2003 | Barker et al. | |
| 2003/0035999 | A1 | 2/2003 | Gao et al. | |
| 2003/0129492 | A1 | 7/2003 | Barker et al. | |
| 2003/0143455 | A1 | 7/2003 | Partington et al. | |
| 2003/0170542 | A1 | 9/2003 | Barker et al. | |
| 2003/0215714 | A1 | 11/2003 | Barker et al. | |
| 2005/0029867 | A1 | 2/2005 | Wood | |
| 2005/0077871 | A1 | 4/2005 | Chalasani et al. | |
| 2005/0077874 | A1 | 4/2005 | Nakao | |

FOREIGN PATENT DOCUMENTS

| | | | |
|---|---|---|---|
| WO | WO 98/12761 | A1 | 3/1998 |
| WO | WO 99/05731 | A1 | 2/1999 |
| WO | WO 99/05746 | A1 | 2/1999 |
| WO | WO 99/05766 | A1 | 2/1999 |
| WO | WO 99/31752 | A1 | 6/1999 |
| WO | WO 00/01024 | A1 | 1/2000 |
| WO | WO 00/31812 | A1 | 6/2000 |
| WO | WO 00/57505 | A1 | 9/2000 |
| WO | WO 01/54212 | A1 | 7/2001 |
| WO | WO 02/44084 | A1 | 6/2002 |
| WO | WO 02/097456 | A2 | 12/2002 |
| WO | WO 02/097456 | A3 | 12/2002 |
| WO | WO 02/097946 | A2 | 12/2002 |
| WO | WO 02/097946 | A3 | 12/2002 |
| WO | WO 03/085757 | A1 | 3/2003 |
| WO | WO 03/085771 | A1 | 10/2003 |
| WO | WO 03/088383 | A1 | 10/2003 |
| WO | PCT/US04/30988 | | 3/2006 |

OTHER PUBLICATIONS

"Progress in Lithium Polymer Battery Development for Telecommunication System;" Rouillard et al.; INTELEC Conference; Oct. 4-8, 1998; pp. 656-662.

* cited by examiner

C81
0.01uF
100V
X7R
R415
100
1%
1
2
C82
.1UF
25V
X7R
+5V
U21
LMV774MT
1
2
3
4
5
6
7
8
9
10
11
12
13
14
R423
100
1%
1
2

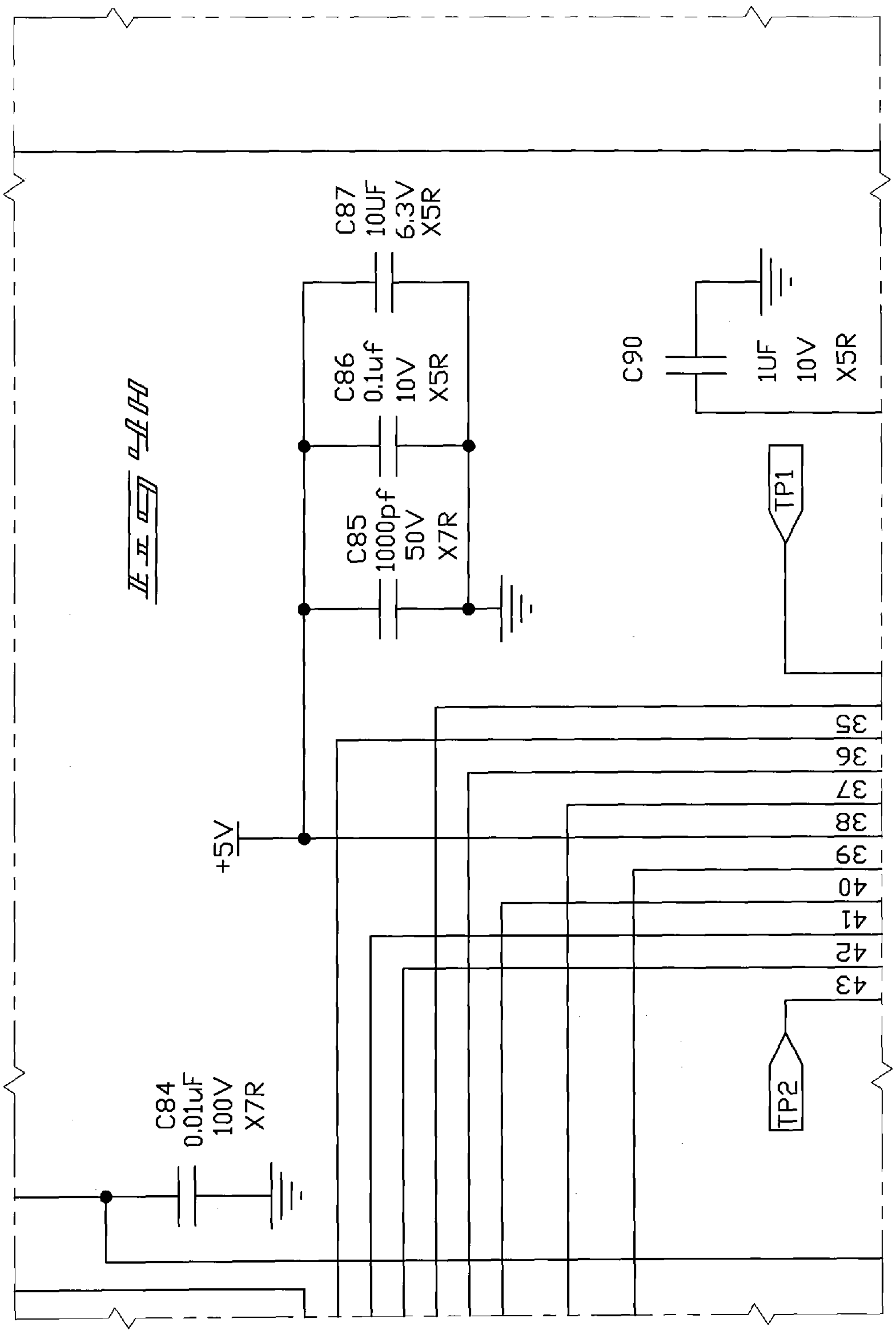
C87
10UF
6.3V
X5R
C86
0.1uf
10V
X5R
C85
1000pf
50V
X7R
C90
1UF
10V
X5R
TP1
TP2
+5V
35
36
37
38
39
40
41
42
43
C84
0.01uF
100V
X7R

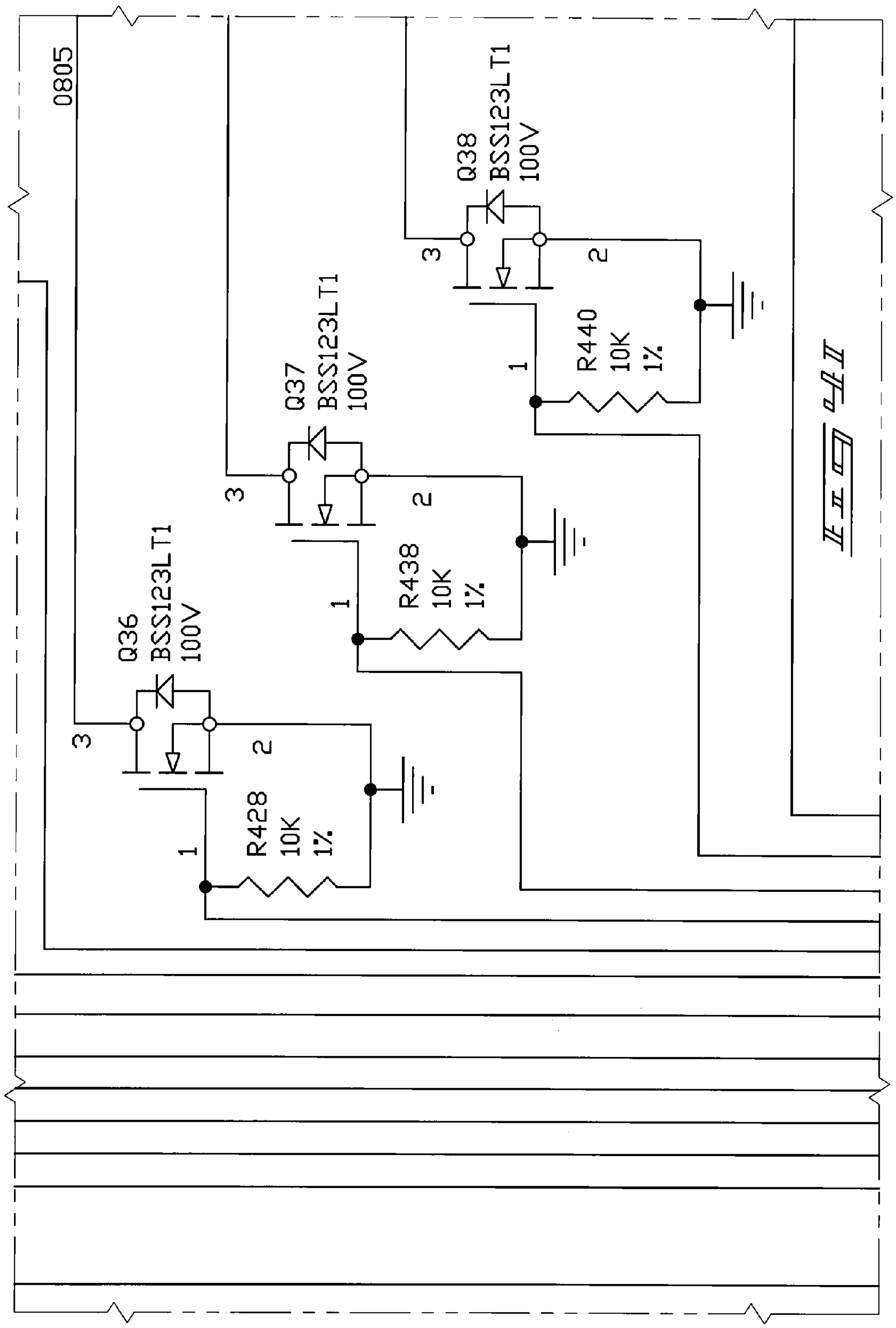
0805
Q36
BSS123LT1
100V
Q37
BSS123LT1
100V
Q38
BSS123LT1
100V
R428
10K
1%
R438
10K
1%
R440
10K
1%
1
2
3

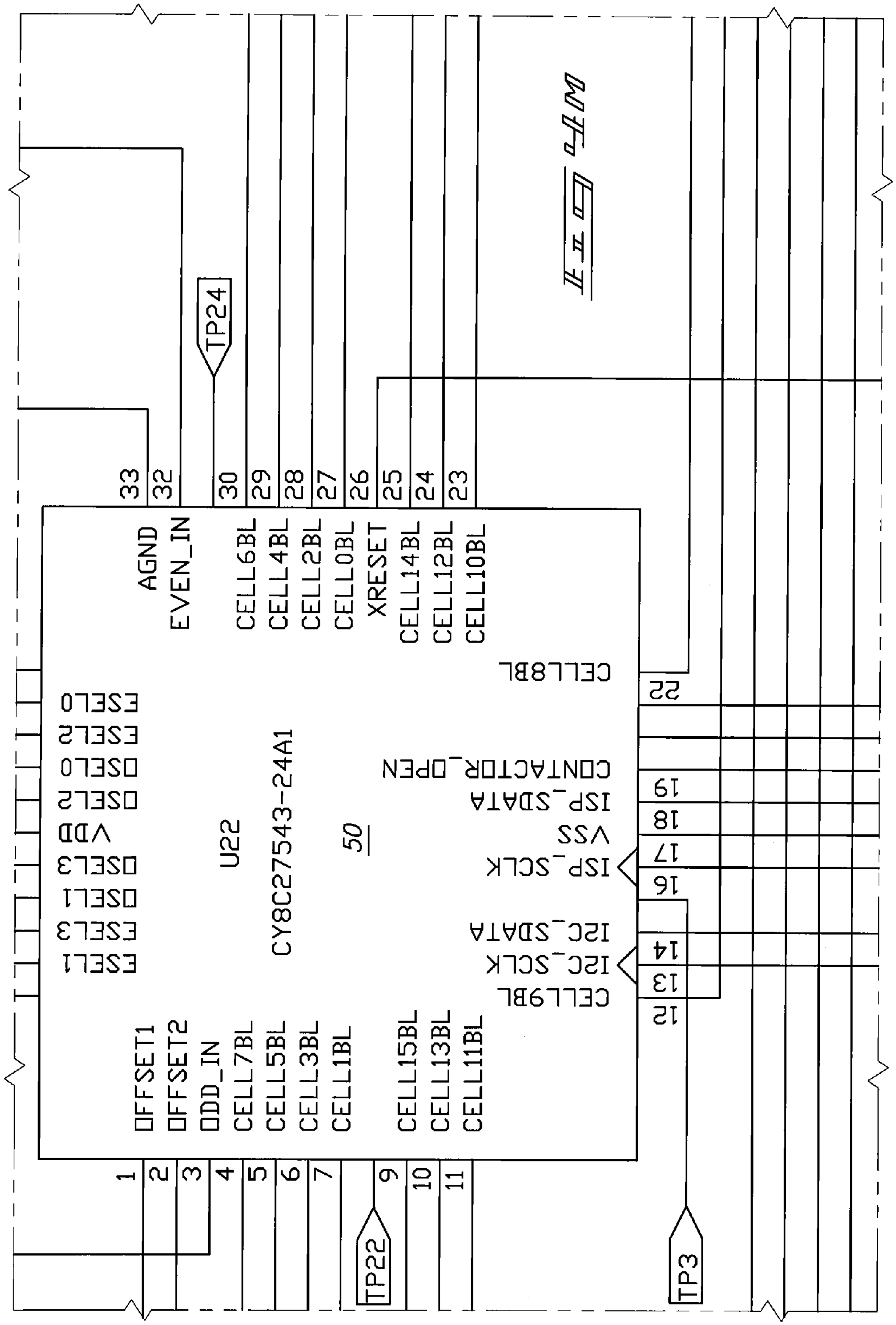
U22
CY8C27543-24A1
50
TP24
TP22
TP3
AGND
EVEN_IN
CELL6BL
CELL4BL
CELL2BL
CELL0BL
XRESET
CELL14BL
CELL12BL
CELL10BL
CELL8BL
CONTACTOR_OPEN
ISP_SDATA
VSS
ISP_SCLK
I2C_SDATA
I2C_SCLK
CELL9BL
ESEL0
ESEL2
DSEL0
DSEL2
VDD
DSEL3
DSEL1
ESEL3
ESEL1
OFFSET1
OFFSET2
ODD_IN
CELL7BL
CELL5BL
CELL3BL
CELL1BL
CELL15BL
CELL13BL
CELL11BL

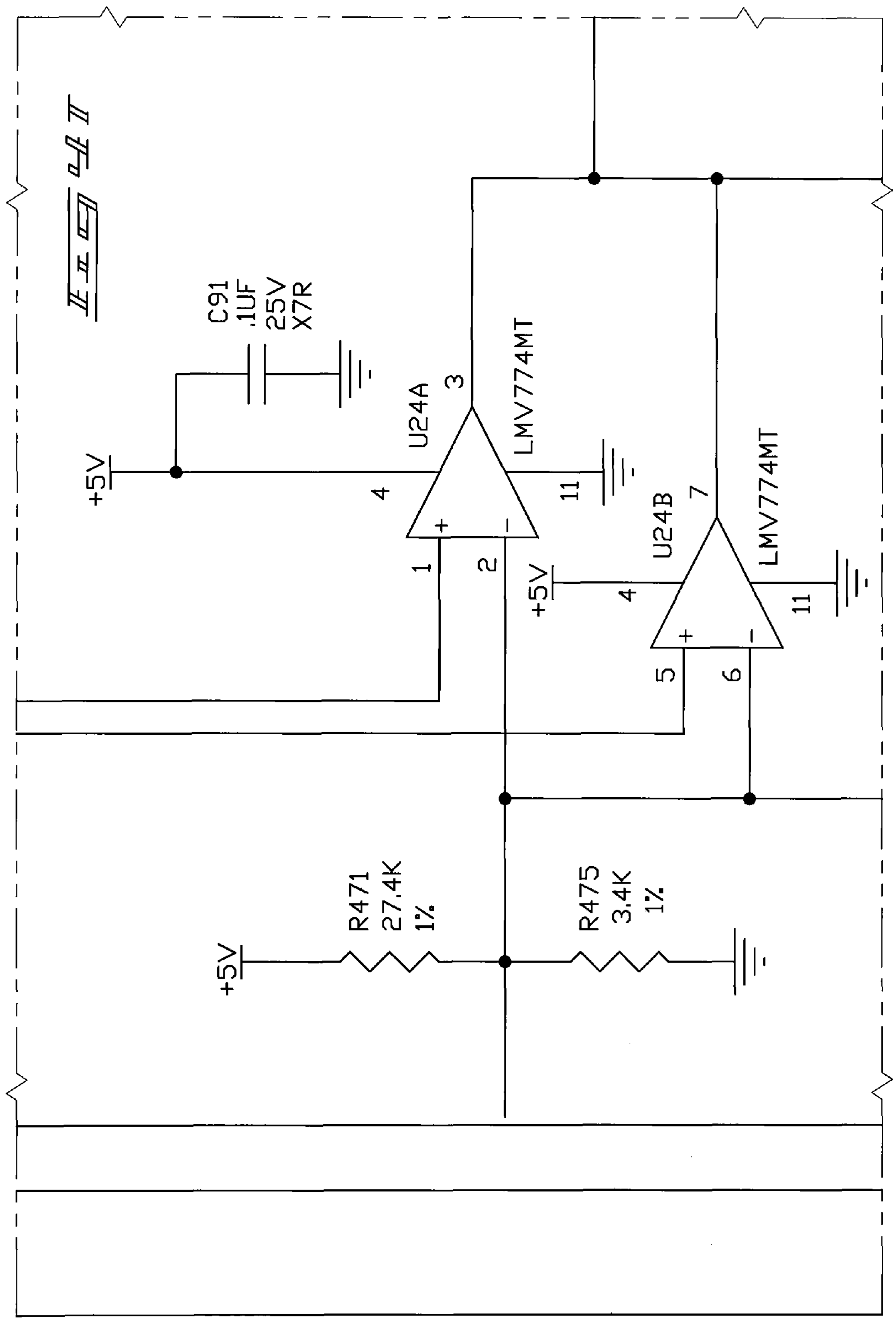
C91
.1UF
25V
X7R
+5V
U24A
LMV774MT
3
4
11
1
2
U24B
LMV774MT
7
+5V
4
11
5
6
R471
27.4K
1%
R475
3.4K
1%
+5V

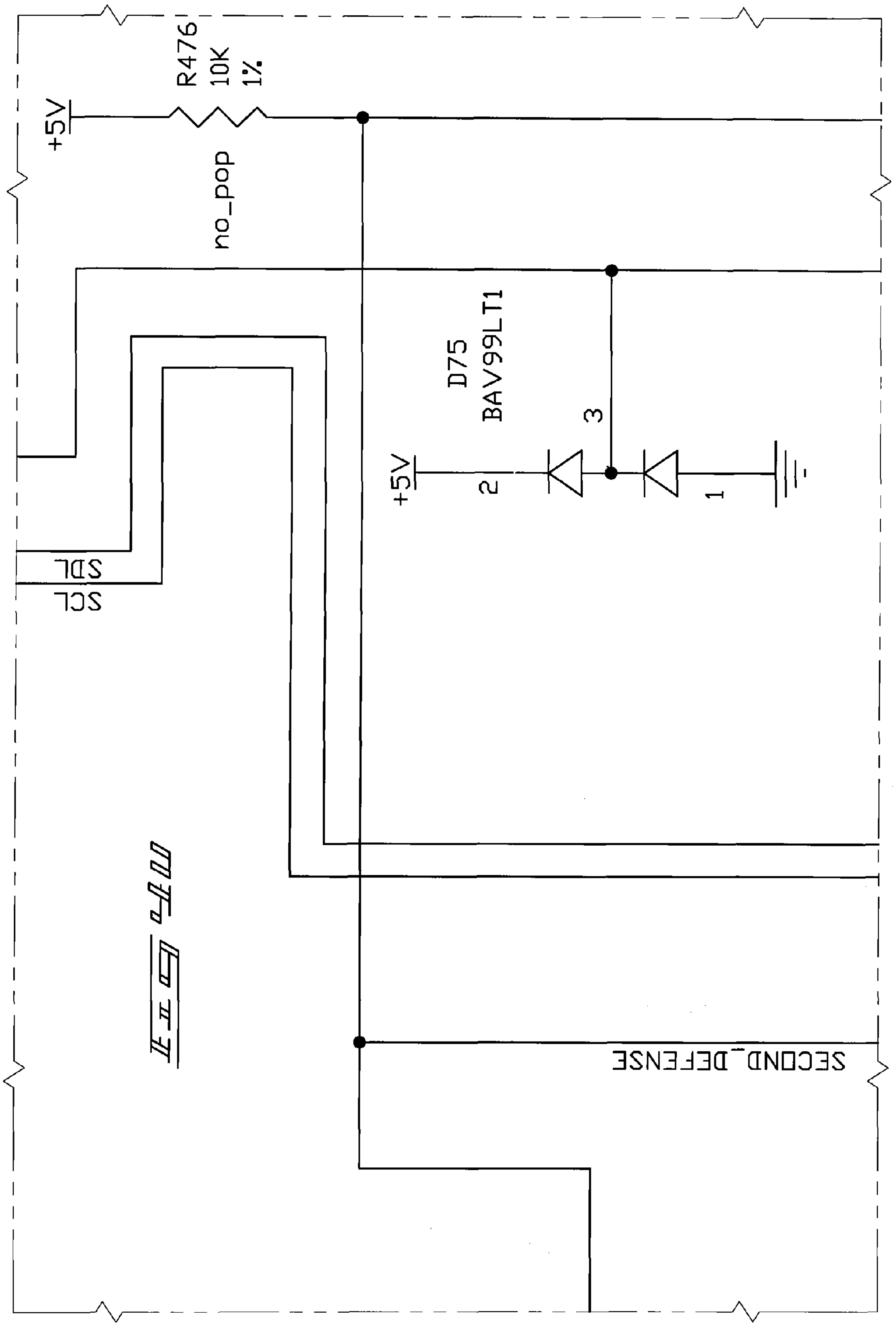
+5V
R476
10K
1%
no_pop
D75
BAV99LT1
+5V
3
2
1
SDL
SCL
SECOND_DEFENSE

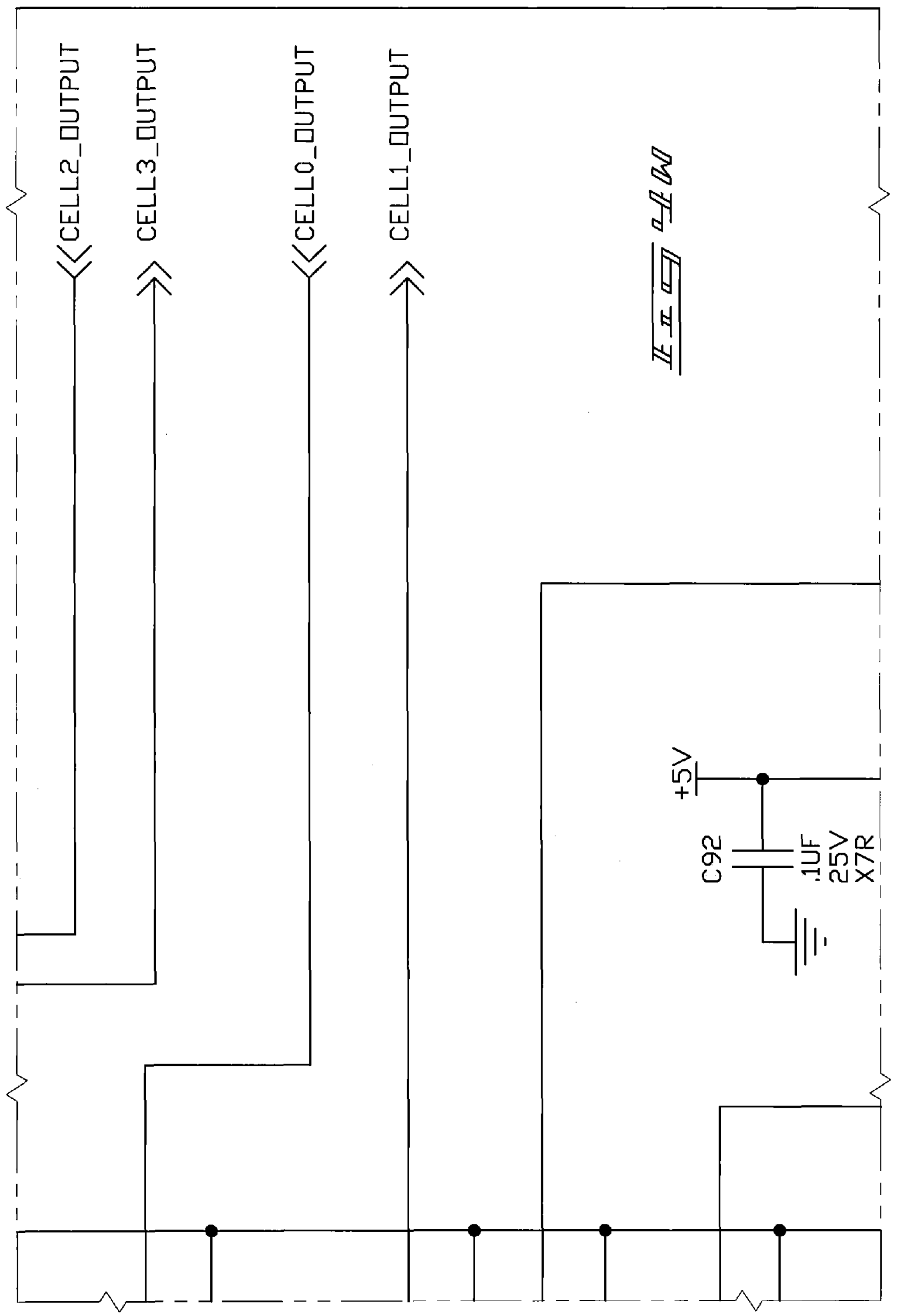
CELL2_OUTPUT
CELL3_OUTPUT
CELL0_OUTPUT
CELL1_OUTPUT
+5V
C92
.1UF
25V
X7R

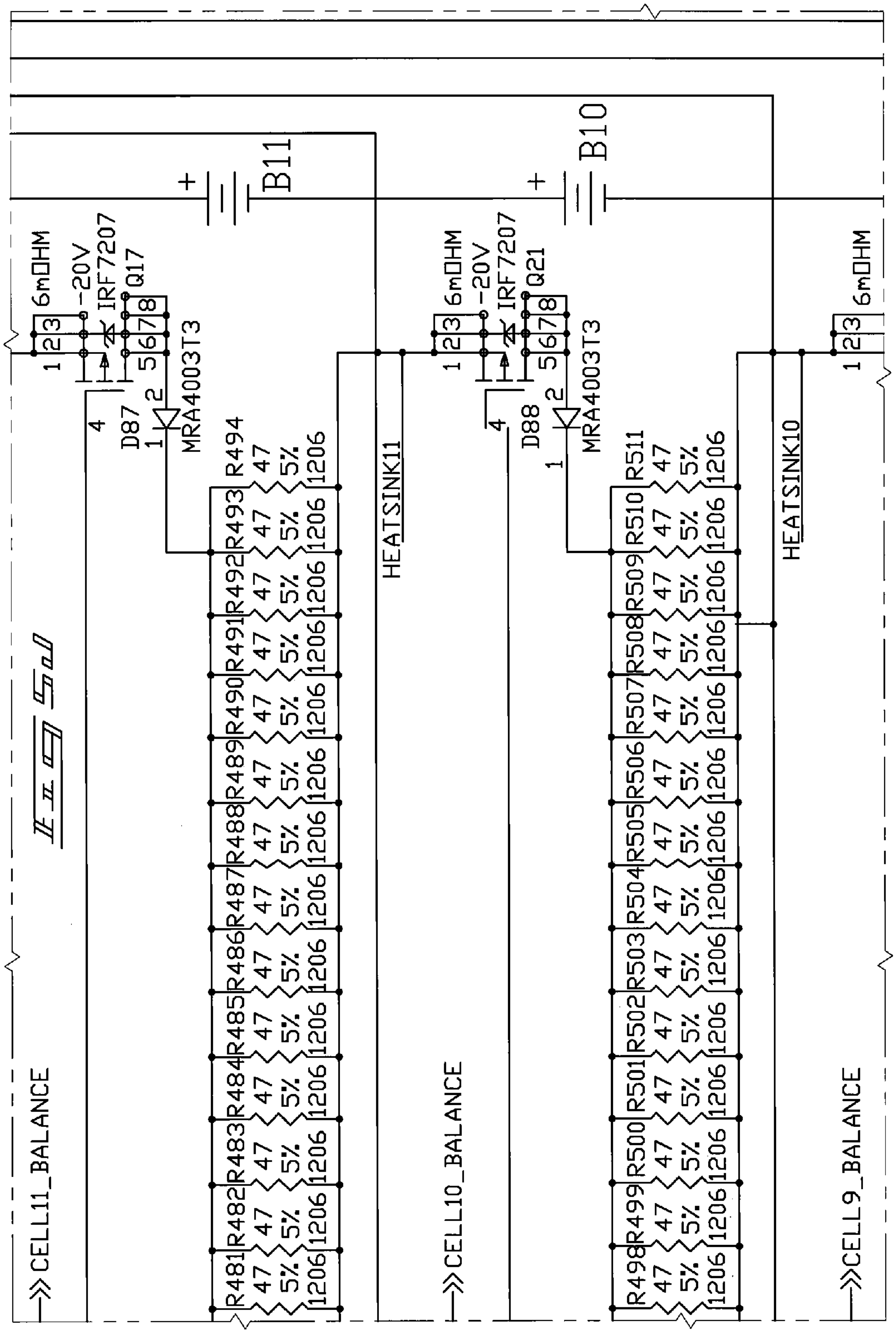
B11
B10
6mOHM
-20V
IRF7207
Q17
Q21
D87
D88
MRA4003T3
HEATSINK11
HEATSINK10
CELL11_BALANCE
CELL10_BALANCE
CELL9_BALANCE
R481
R482
R483
R484
R485
R486
R487
R488
R489
R490
R491
R492
R493
R494
R498
R499
R500
R501
R502
R503
R504
R505
R506
R507
R508
R509
R510
R511
47
5%
1206

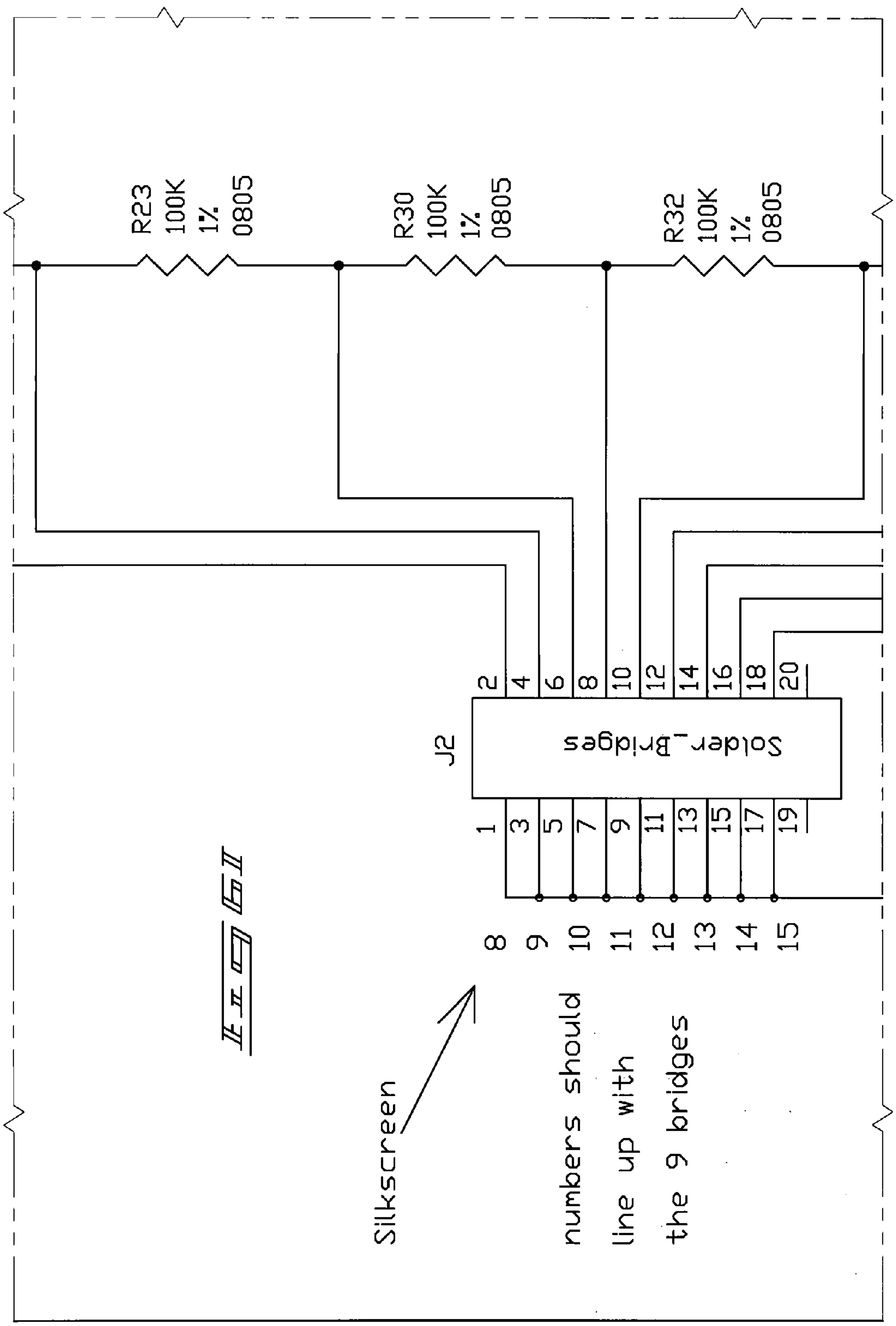
R23
100K
1%
0805
R30
100K
1%
0805
R32
100K
1%
0805
J2
Solder_Bridges
2 4 6 8 10 12 14 16 18 20
1 3 5 7 9 11 13 15 17 19
8 9 10 11 12 13 14 15
Silkscreen
numbers should
line up with
the 9 bridges

D3
BAV99LT1
C4
.1UF
25V
X7R
3
2
1
C5
.47UF
25V
X7R
R2
10K
1%
D10
10MQ100N
1
2

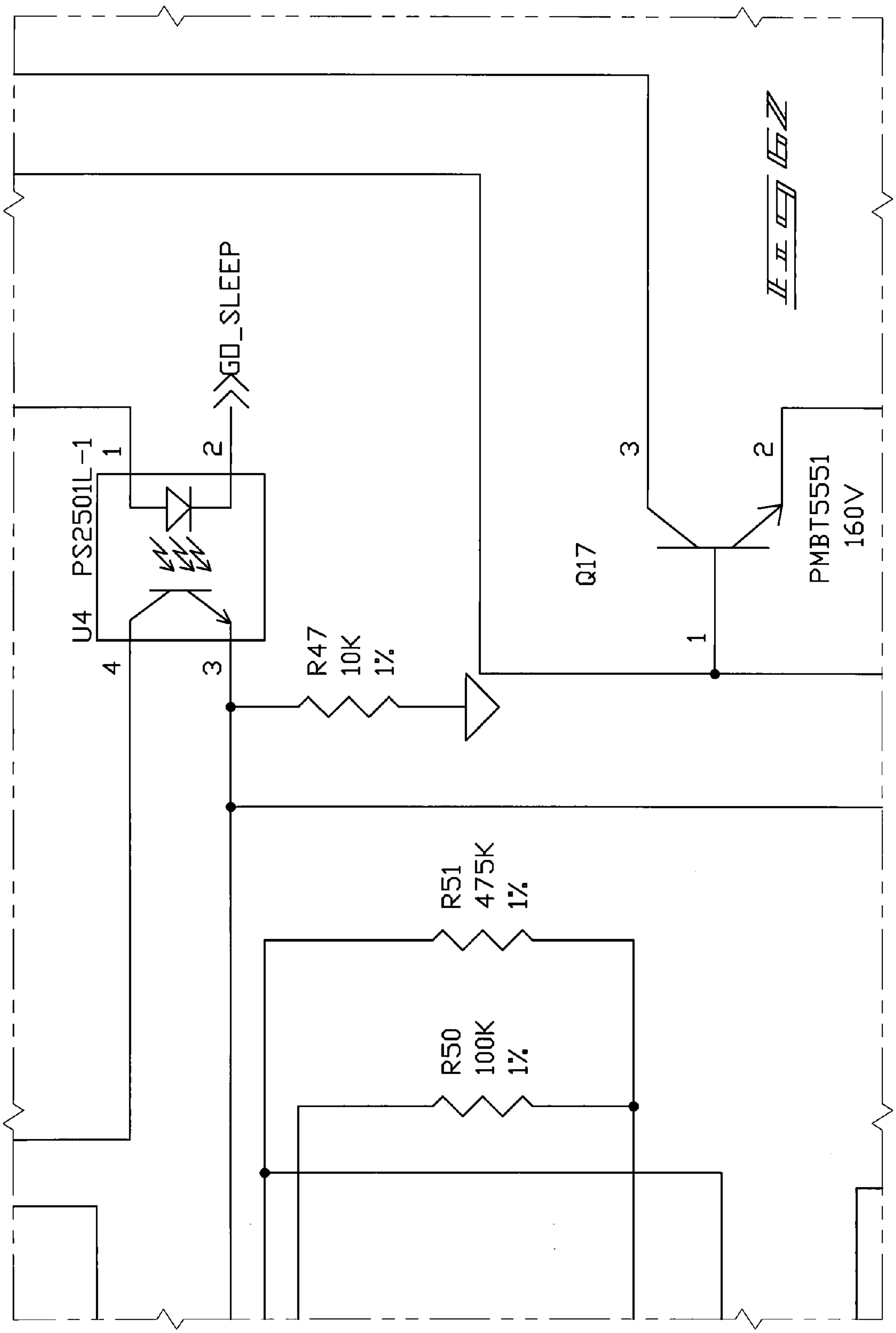
PS2501L-1
U4
GO_SLEEP
R47
10K
1%
Q17
PMBT5551
160V
R51
475K
1%
R50
100K
1%

ELECTRICAL SYSTEMS AND BATTERY ASSEMBLIES

CROSS REFERENCE TO RELATED APPLICATION

This application is a continuation of and claims priority to U.S. patent application Ser. No. 10/947,602, which was filed on Sep. 21, 2004 now U.S. Pat. No. 7,986,124 and claims priority to U.S. Provisional Patent Application Ser. No. 60/505,125, filed Sep. 22, 2003, entitled "Large Format Secondary Battery", and U.S. Provisional Patent Application Ser. No. 60/559,171, filed Mar. 31, 2004, entitled "Electrical Systems, Power Supply Apparatuses, and Power Supply Operations Methods," the disclosures of which are incorporated by reference.

RELATED PATENT DATA

1. Technical Field

This invention relates to electrical systems, power supply apparatuses, and power supply operational methods.

2. Background of the Disclosure

The use and reliance upon electrical devices continue to increase as existing electrical devices are improved and new electrical devices are introduced. For example, computing devices, communications equipment and other devices which utilize electrical energy for proper operation have experienced remarkable improvements in recent decades. Enhanced processing capabilities, bandwidth and other improvements have led to usage of the electrical devices in more diverse applications by more users.

There have also been remarkable improvements with respect to devices utilized to supply electrical energy to the electrical devices. For example, the development and introduction of new compositions have led to batteries of increased capacity, safety and longevity. Rechargeable batteries have also experienced improvements with respect to the number of charge and discharge cycles which may be implemented as well as storage capacities of the batteries themselves. Accordingly, batteries are used in an increasing number of applications to provide operational energy for associated electrical devices.

Some electrical device configurations which utilize batteries may be in remote or relatively inaccessible installations. For example, cell towers for wireless telecommunications may be installed at large distances from service centers, on tops of mountains, or at other locations of relative inconvenience. In some of these applications, it may be desired to provide continuous operability or to minimize downtimes. However, some conventional configurations have a technician service the batteries but service calls at remote or relatively inaccessible installations may be time consuming and/or costly. Accordingly, at least some aspects of the disclosure provide improved apparatus and methods for supplying electrical energy.

BRIEF DESCRIPTION OF THE DRAWINGS

Preferred embodiments of the disclosure are described below with reference to the following accompanying drawings.

FIGS. 5A-5P illustrate additional exemplary circuitry of the power supply apparatus according to one embodiment.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Exemplary embodiments described herein include electrical systems which may include a power supply apparatus which supplies operational electrical energy and an electrical entity which uses operational electrical energy. In some arrangements, the power supply apparatus may operate as a backup source of electrical energy during a failure of another source of electrical energy (e.g., failure of a grid or other power distribution system). Other embodiments or implementations of the electrical systems, electrical entities and power supply apparatuses are possible.

Figure 1:
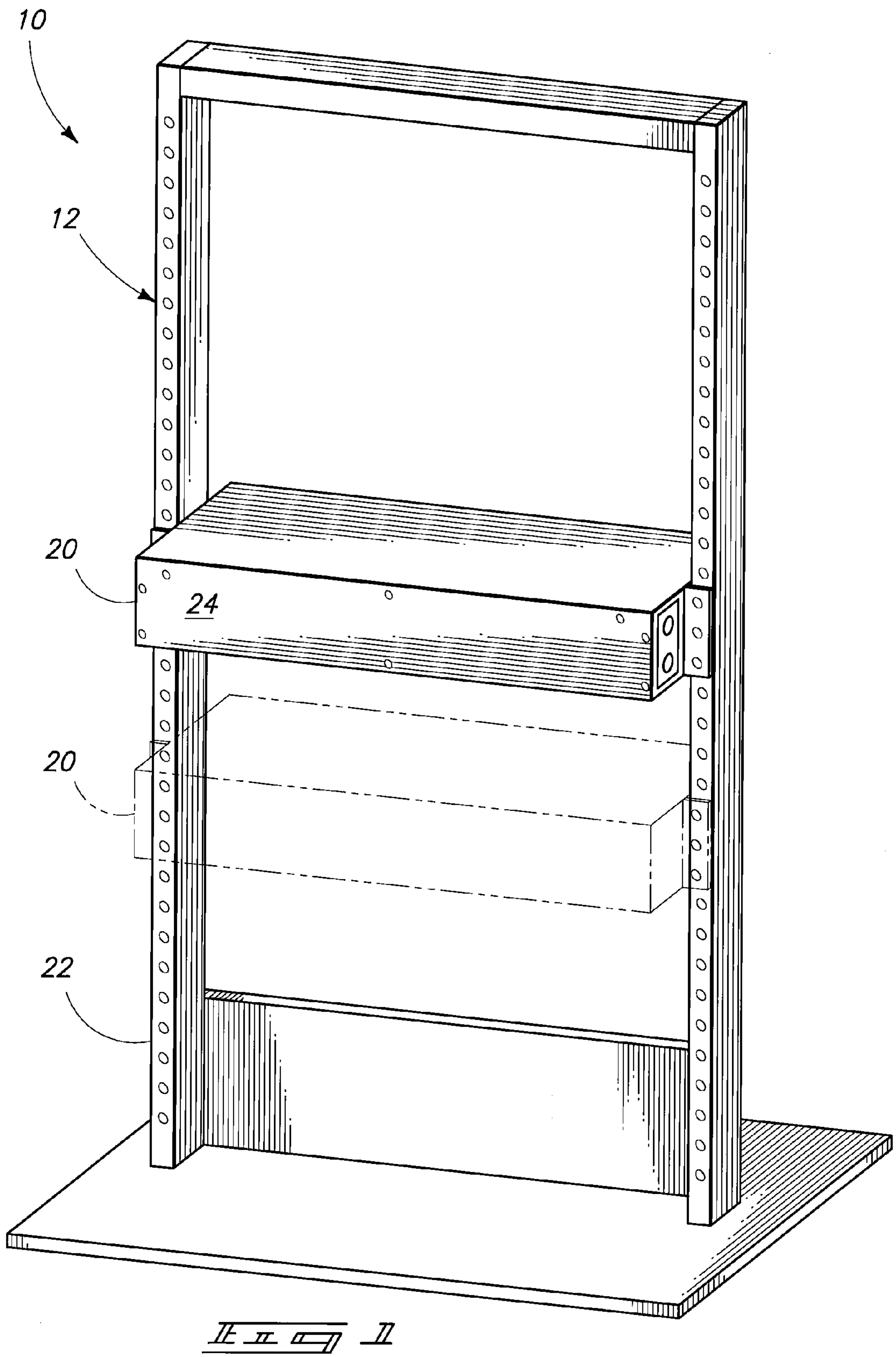
FIG. 1 is an illustrative representation of an exemplary power supply apparatus of an electrical system according to one embodiment.

Referring initially to FIG. 1, a portion of an embodiment of an electrical system 10 comprising an exemplary power supply apparatus 12 is shown. Although not shown in FIG. 1, electrical system 10 may further include an electrical entity 14 and/or a system manager 16 (references 14, 16 are shown in an exemplary configuration in FIG. 2A in accordance with one embodiment). System 10 may comprise a plurality of apparatuses 12 and respective entities 14 in some embodiments. Power supply apparatus 12 may be configured to supply electrical energy and the respective electrical entity 14 may be configured to utilize the electrical energy as operational energy. System manager 16 may monitor operations of apparatus 12 and/or entity 14 and/or may provide control signals to control apparatus 12 and/or entity 14. Other electrical system 10 configurations are possible.

Figure 2A:
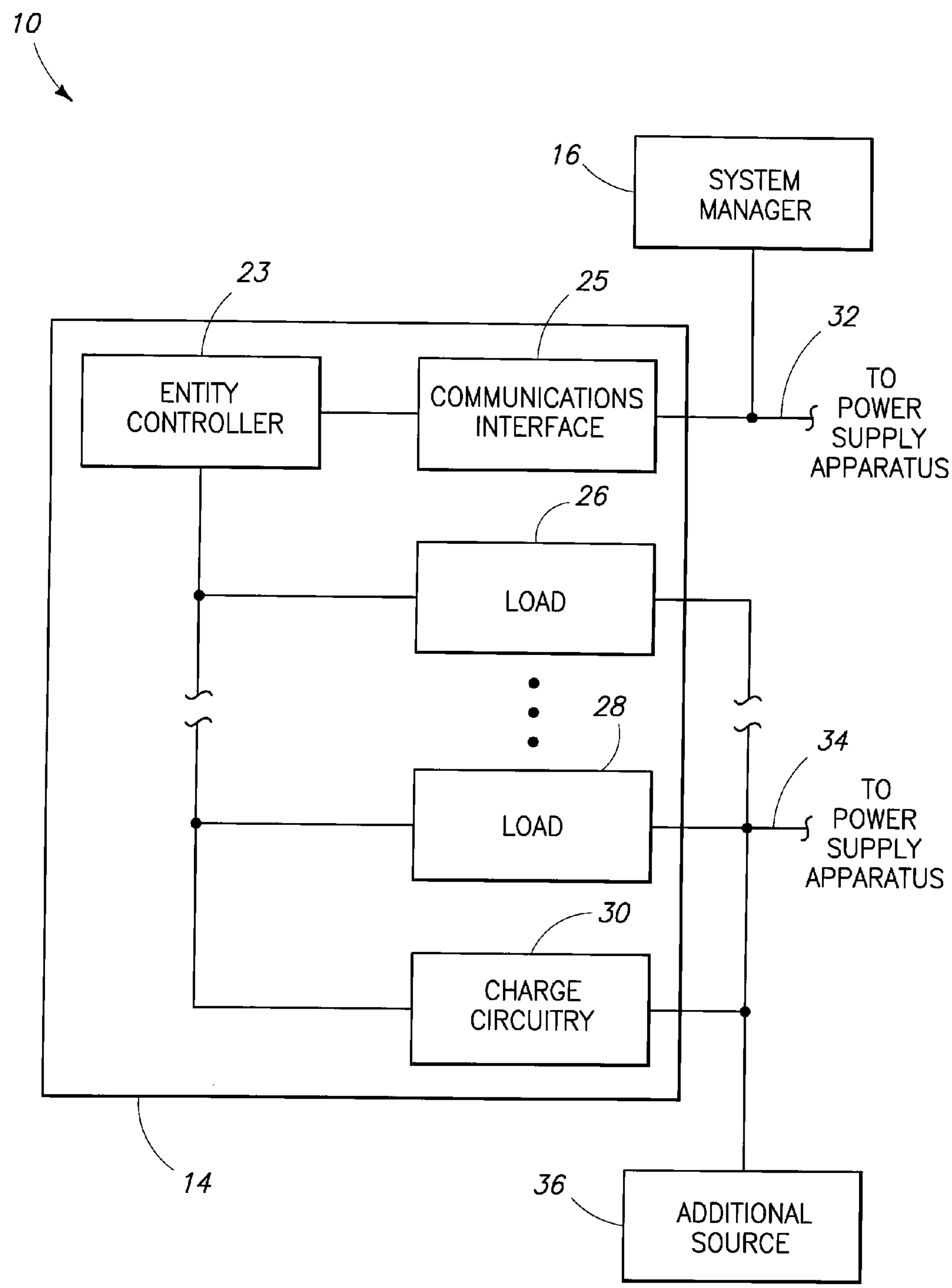
FIG. 2A is a functional block diagram of an exemplary electrical entity of an electrical system according to one embodiment.

In one exemplary configuration, power supply apparatus 12 may be configured as a backup device, such as an uninterruptible power supply, configured to provide electrical energy during an absence of electrical energy from another source of electrical energy, for example source 36 of FIG. 2A which may comprise a primary source of electrical energy. Power supply apparatus 12 and electrical entity 14 may be physically proximately located with respect to one another in one embodiment. Apparatus 12 and entity 14 may be located in the same structure in one implementation. Any other arrangements are possible wherein apparatus 12 may provide electrical energy to entity 14.

In one more specific example, power supply apparatus 12 may supply electrical energy to electrical entity 14 comprising telecommunications equipment, such as a cell station and configured to implement data, voice and/or other communications. According to this example, apparatus 12 and entity 14 may be located at the same cell station. As mentioned above, the examples are provided for illustration and understanding of exemplary aspects of the disclosure and other embodiments or aspects are possible.

An exemplary power supply apparatus 12 may include one or more battery assemblies 20 (e.g., only one assembly 20 is shown in the example of FIG. 1) and a support system 22 configured to support the battery assemblies 20. For example, in one configuration, support system 22 is a rack and battery assemblies 20 may individually include a respective housing 24 configured to at least partially house components of the battery assembly 20 and to removably couple with support system 22.

As discussed further below, individual ones of assemblies 20 may include electrochemical storage circuitry configured to store electrical energy as well as control circuitry configured to control and monitor operations of the respective assembly 20 and communications circuitry configured to implement communications externally of apparatus 12. In another possible embodiment, one control circuit (e.g., within one of assemblies 20, associated with support system 22 or otherwise provided) may control and monitor operations of a plurality of assemblies 20, and accordingly, control circuitry of one or more of assemblies 20 may be omitted. Other configurations of support system 22 and battery assemblies 20 are possible.

If a plurality of battery assemblies 20 are coupled with support system 22, different ones of the battery assemblies 20 may be associated with the same entity 14 or different electrical entities 14. For example, plural battery assemblies 20 may be configured to provide electrical energy in series or in parallel with respect to a common electrical entity 14, or alternatively, two or more of the battery assemblies 20 may be arranged to provide electrical energy to two or more different electrical entities 14 (not shown).

Referring to FIG. 2A, an exemplary configuration of electrical entity 14 includes an entity controller 23, a communications interface 25, one or more loads 26, 28, and charge circuitry 30. Communications interface 25 may be coupled with a communications system 32, and loads 26, 28 and charge circuitry 30 may be coupled with a power bus 34. Other configurations of electrical entity 14 are possible including more, less or alternative components or circuits.

Additional components or circuitry of electrical system 10 may also be provided as shown. For example, in the depicted exemplary embodiment, a system manager 16 and an additional source 36 of electrical energy are shown coupled with the communications system 32 and power bus 34, respectively. System manager 16 may be locally or remotely located with respect to apparatus 12 and/or entity 14. In one arrangement, system manager 16 may be operated by a telecommunications entity and be located remotely from (e.g., at a central office) and configured to monitor operations of a plurality of installations of apparatuses 12 and respective entities 14.

If provided, additional source 36 may be configured to supply operational electrical energy to assemblies 20 of apparatus 12, and/or entity 14. Additional source 36 may supply power from an appropriate grid or other electrical energy distribution system, generator, or any other appropriate source of electrical energy (e.g., solar). Charge circuitry 30 may be configured to use electrical energy from additional source 36 to implement charging of electrochemical devices of one or more assembly 20 of apparatus 12 described below.

Entity controller 23 comprises a control system including circuitry configured to implement desired programming. For example, the controller 23 may be implemented as a processor or other structure configured to execute executable instructions including, for example, software and/or firmware instructions. Other exemplary embodiments of controller include hardware logic, PGA, FPGA, ASIC, state machines, and/or other structures. These examples of entity controller 23 are for illustration and other configurations are possible.

Entity controller 23 may also access storage circuitry configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including controller 23 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. The storage circuitry may be embodied within entity controller 23 or otherwise accessible thereby.

Entity controller 23 may control appropriate operations pertinent to the respective implementation or application of electrical entity 14. For example, if electrical entity 14 comprises telecommunications equipment in one embodiment, entity controller 23 may control routing of calls via appropriate control of switches (not shown). Entity controller 23 may also process and formulate communications communicated using interface 25.

In addition or alternatively, entity controller 23 may effect or control operations with respect to power consumption by electrical entity 14. For example, entity controller 23 may process status information (e.g., regarding electrical energy received from power supply apparatus 12, condition of storage circuitry 60 described below, etc.) and also communicate commands to apparatus 12 as described further below. According to an additional example, entity controller 23 may also control operations of one or more load 26, 28 of the electrical entity 14. In one embodiment, loads 26, 28 may be assigned respective priorities, and if appropriate, entity 14 may selectively disable one or more of loads 26, 28 to reduce a rate of electrical energy used by entity 14. In addition, entity controller 23 may also control charge circuitry 30. Further exemplary operations of control of entity controller 23 are described below.

Communications circuitry of entity 14 including communications interface 25 may provide bi-directional external communications of electrical entity 14 with respect to one or more assembly 20 of power supply apparatus 12, system manager 16 and/or other external devices using communications system 32, for example. Communications interface 25 may implement wired, wireless or any other appropriate form of communications. In one exemplary arrangement, entity 14 is configured to receive status information from apparatus 12 and to communicate commands to apparatus 12 using interface 25. Exemplary status includes electrical characteristics of assembly 20 or electrical energy supplied using assembly

20 (e.g., voltage of one or more of electrochemical devices 62, charge or discharge current with respect to electrochemical devices 62, state of charge, remaining capacity, etc.), temperature conditions of devices 62 of assembly 20, or any other desired information. Exemplary commands communicated from entity 14 to one or more assembly 20 may instruct the respective assembly 20 to go off-line (e.g., open switching device 52 and/or enter sleep mode as described further below) or other desired operations.

Entity 14 comprises a plurality of loads 26, 28 in the illustrated embodiment and may be referred to as entity loads. The other depicted components including entity controller 23, and communications interface 25, may also be referred to as loads. Other possible configurations of entity 14 may include a single load. Loads 26, 28 utilize electrical energy during operations of entity 14. Loads 26, 28 may receive operational electrical energy (e.g., 48 Volts DC) from power bus 34 for example supplied by the power supply apparatus 12. Further, other components including entity controller 23 and communications interface 25 may also receive operational electrical energy from power bus 34 (e.g., at reduced voltages in one embodiment).

In the described telecommunications equipment embodiment, loads 26, 28 may comprise switching or other circuitry configured to enable telecommunications using entity 14. Loads 26, 28 may be assigned priorities and be selectively individually shut down to reduce usage of electrical energy by entity 14. For example, if storage capacity of one or more assembly 20 of apparatus 12 falls, entity controller 23 may individually shut down one or more loads 26, 28 from lowest to highest priorities. In one more specific exemplary implementation, controller 23 may process received status information of one or more assembly 20 of apparatus 12 and effect or adjust an operation of entity 14 responsive to received status information. In one configuration, controller 23 may adjust energy usage of entity 14 responsive to the processing. One exemplary operation includes curtailment of energy usage by one or more of the loads 26, 28 responsive to one or more assembly 20 supplying energy approaching an end of charge, low voltage, excessive temperature, excessive discharge current, or other status, and also perhaps an absence of electrical energy from source 36. Another operation which may be effected responsive to received status information includes turning on or off charge circuitry 30. Other embodiments are possible.

Charge circuitry 30 is coupled with and controlled by entity controller 23 in the illustrated embodiment. Charge circuitry 30 is also coupled with power bus 34 to charge electrochemical devices of one or more assembly 20 of apparatus 12 using electrical energy from source 36 in one embodiment. Entity controller 23 may selectively enable and disable charge circuitry 30, for example, based upon status information received from one or more assembly 20 of apparatus 12.

Communications system 32 may be arranged in any appropriate configuration to communicate data intermediate one or more assembly 20 of power supply apparatus 12, entity 14, system manager 16, and/or any other appropriate device. Communications system 32 may provide bi-directional or uni-directional communications with respect to any device coupled therewith in possible implementations. Further, any appropriate data may be communicated using communications system 32.

Power bus 34 conducts direct current electrical energy intermediate one or more assembly 20 of apparatus 12, entity 14 and source 36 in the described embodiment. In the described exemplary telecommunications embodiment, power bus 34 provides direct current electrical energy at 48 Volts from apparatus 12 to entity 14 although electrical energy having other electrical characteristics is possible in other embodiments.

Figure 2B:
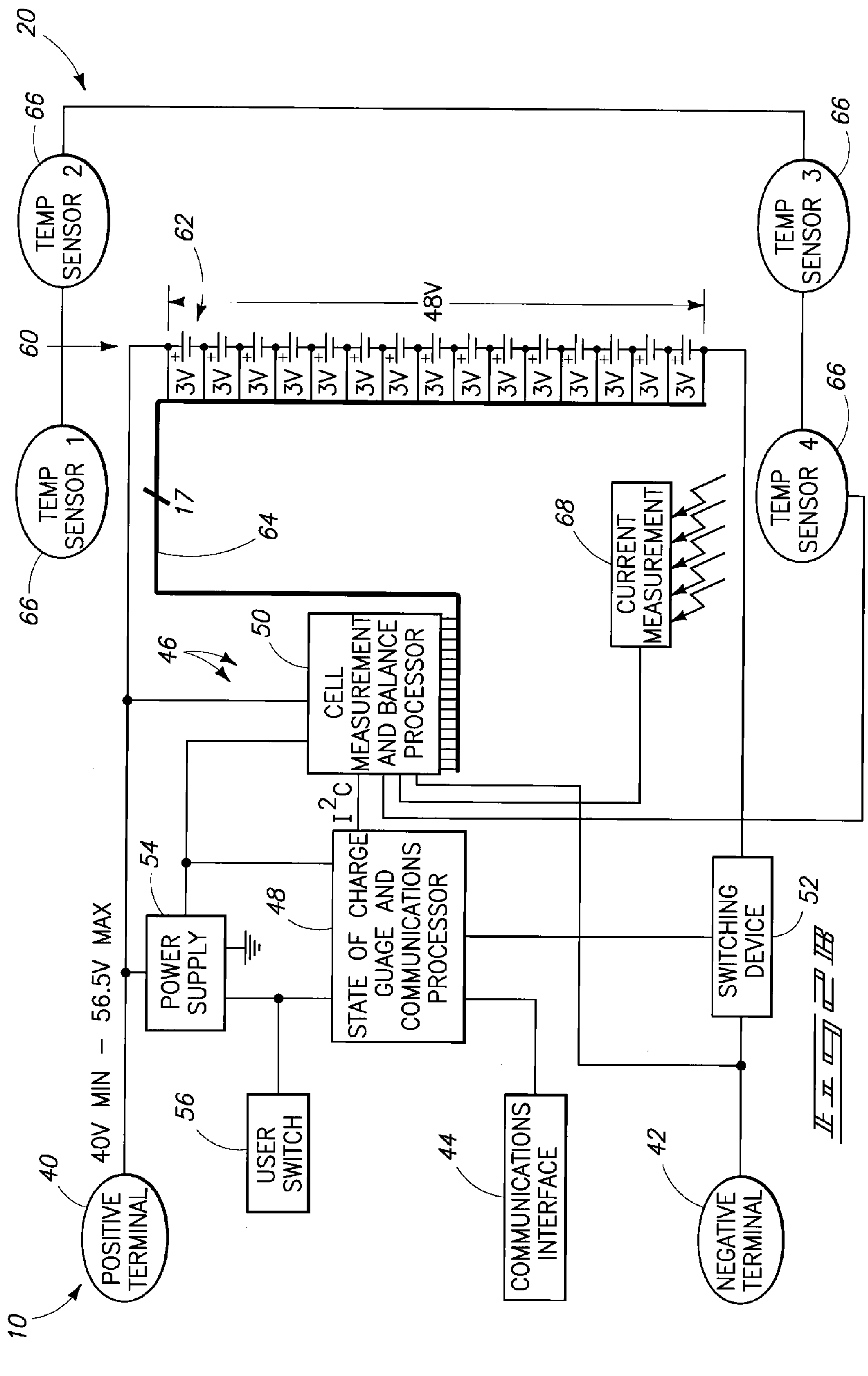
FIG. 2B is a functional block diagram of an exemplary power supply apparatus of an electrical system according to one embodiment.

Referring to FIG. 2B, additional details regarding an exemplary configuration of one embodiment of a battery assembly 20 of power supply apparatus 12 are shown. As mentioned above, plural assemblies 20 may be provided for a single apparatus 12 and have the same configuration. Additional configurations of apparatus 12 are possible, for example, wherein plural assemblies 20 of apparatus 12 are configured differently from one another (e.g., with or without control circuitry, having different numbers or configurations of electrochemical devices, etc.).

The illustrated assembly 20 includes positive and negative power terminals 40, 42, a communications interface 44, control circuitry 46 (including a state of charge gauge and communications processor 48 and a cell measurement and balance processor 50 in the illustrated embodiment), a switching device 52, an auxiliary power supply 54, a user switch 56, electrical energy storage circuitry 60 comprising a plurality of rechargeable electrochemical devices 62, a communications bus 64, one or more temperature sensors 66 and a current measurement device 68. Other configurations of battery assembly 20 are possible including more, less or alternative components or circuits.

Positive and negative power terminals 40, 42 are configured to couple with power bus 34. Electrical energy stored within circuitry 60 may be provided via power terminals 40, 42 and power bus 34 to electrical entity 14. Further, electrical energy for charging storage circuitry 60 may be received by power terminals 40, 42 from power bus 34.

Communications circuitry of assembly 20 includes communications interface 44 which may provide bi-directional communications of assembly 20 with respect to electrical entity 14, system manager 16, other assemblies 20 and/or other external devices using communications system 32, for example. Communications interface 44 may implement wired, wireless or any other appropriate form of communications. In one example, communications interface 44 comprises an RS-485 interface. Interface 44 may output status information compiled by control circuitry 46 for communication to entity 14 and/or system manager 16 and receive commands from entity 14 and/or system manager 16 in one embodiment.

Control circuitry 46 includes plural processors 48, 50 individually configured to execute desired programming and to exchange communications with one another in the depicted embodiment. Portions of control circuitry 46 configured to execute programming may be referred to as processing circuitry. Processors 48, 50 may also comprise internal storage circuitry comprising processor-usable media configured to store data, programming, or other information similar to storage circuitry of entity 14 in one embodiment. Other configurations of control circuitry 46 or additional components of control circuitry 46 are possible including, for example, hardware circuitry (e.g., ASIC, FPGA, analog or logic circuitry) and/or hardware in combination with circuitry configured to execute programming. For example, in the embodiments of FIGS. 3-6 described below, control circuitry in addition to processors 48, 50 is provided. The additional control circuitry may also control and monitor operations of the respective assembly 20.

Appropriate storage circuitry may be utilized to provide a history of operations of assembly 20. For example, processors 48, 50 may be configured to store date and time information for electrical and/or environmental characteristics of the respective assembly 20 (e.g., overvoltage, undervoltage, state of charge, capacity, temperature, etc.) at plural moments in time during plural operational modes of assembly 20 (e.g., normal and sleep modes). A history may be generated comprising electrical and/or environmental characteristics at desired moments in time (e.g., periodic).

In one embodiment, processor 48 is configured to implement external communications via communications interface 44, control switching device 52, control power supply 54, and monitor switch 56. Processor 50 may be configured to monitor status of assembly 20 including characteristics of electrical energy of assembly 20 (e.g., operation of power supply 54, voltage of one or more of electrochemical devices 62, charge or discharge current with respect to electrochemical devices 62, etc.), environmental conditions of assembly 20 (e.g., temperature sensing), state of switching device 52, and/or whether a load and/or charge circuitry is coupled with power terminals 40, 42. Control circuitry 46 may also be configured to control and/or monitor additional operations of the respective assembly and control sleep mode operations according to the exemplary embodiments of FIGS. 3-6. Control circuitry 46 may process commands received from interface 44 and effect at least one operation of assembly 20 responsive to the commands (e.g., open switching device 52, enter sleep mode, etc.).

Switching device 52 is coupled in series with negative power terminal 42 and a negative node of the electrical energy storage circuitry 60. Switching device 52 is controlled by control circuitry 46 to permit selective charging/discharging of electrical energy of storage circuitry 60.

During normal operation of assembly 20, switching device 52 may be closed to permit charging or discharging of storage circuitry 60. Further, switching device 52 may be controlled to reduce or prevent detrimental operation of assembly 20. For example, switching device 52 may be opened during periods of storage or inactivity of assembly 20 to reduce discharge of electrical energy from storage circuitry 60. Switching device 52 may be opened responsive to monitored operation of assembly 20 detecting a triggering event. For example, switching device 52 may be opened if one or more electrochemical devices 62 of storage circuitry 60 enter an over or under voltage condition or if excessive current is being conducted to or from storage circuitry 60. Further, switching device 52 may be opened during a temperature overage condition of assembly 20. Switching device 52 may be opened responsive to external communications received within assembly 20 (e.g., responsive to a command received from electrical entity 14). Additional control of switching device 52 is possible.

Switching device 52 may be embodied as a bistable contactor in one implementation. Only a brief current pulse into a coil of the device 52 is utilized to change the state of the device 52 in the described exemplary implementation. In one embodiment, a positive current pulse closes the device 52 and a negative current pulse opens the device 52 and the device 52 remains in its present condition during an absence of coil current.

Power supply 54 may be referred to as an auxiliary power supply. Power supply 54 is configured to provide operational electrical energy for use by circuitry of assembly 20. For example, power supply 54 may be configured to provide direct current voltages of 3.3 V, 5 V, 6 V, or 75 V and a peak-to-peak alternating current voltage of 12 V in the embodiment of FIGS. 3-6 described below. In one embodiment, power supply 54 converts the voltage of the electrical energy of storage circuitry 60 to +6 Vdc and which is further regulated by respective regulators to 3.3V and 5V (U8, U16 of FIGS. 3A, 3B, respectively).

Power supply 54 may receive operational electrical energy from source 36 and/or storage circuitry 60. Power supply 54 may be selectively deactivated to conserve electrical energy in at least one embodiment and as discussed further below (e.g., in sleep mode).

User switch 56 may be controlled by a user to effect desired operations of assembly 20. For example, if assembly is in sleep mode to conserve electrical energy, user switch 56 may be depressed by the user to awake circuitry of assembly 20 from sleep mode and to enter a higher level of operation. Other operations may be controlled by user switch 56.

Electrical energy storage circuitry 60 comprises one or more rechargeable electrochemical device 62 coupled in any appropriate series and/or parallel configuration corresponding to the electrical entity 14 being powered. In the exemplary telecommunications equipment application, storage circuitry 60 includes sixteen electrochemical devices 62 coupled in series and configured to provide direct current electrical energy of approximately 48 Volts for use by electrical entity 14.

In the depicted exemplary embodiment, individual ones of the electrochemical devices 62 are configured to provide direct current electrical energy having a voltage of 3 Volts. Electrochemical devices 62 may individually comprise a plurality of electrochemical cells coupled in series and/or parallel. Exemplary electrochemical cells (e.g., 18650 format cells) comprise lithium Saphion® cells available from Valence Technology, Inc. In the described embodiment, individual ones of electrochemical devices 62 comprise thirty-five of such cells coupled in parallel. Other embodiments are possible wherein electrochemical cells of other chemistries or configurations may be utilized.

Exemplary cells of devices 62 described above include a positive electrode, a negative electrode, and an electrolyte in ion-transfer relationship with each electrode. As used herein, the word "include," and its variants, is intended to be non-limiting, such that recitation of items in a list is not to the exclusion of other like items that may also be useful in the materials, compositions, devices, and methods described herein. As mentioned above, two or more electrochemical cells may be combined in parallel or series, or "stacked," so as to create a multi-cell device 62. Other embodiments are possible.

Exemplary electrode active materials described herein may be used in the negative electrode, the positive electrode, or both electrodes of a cell. Preferably, the active materials are used in the positive electrode (As used herein, the terms "negative electrode" and "positive electrode" refer to the electrodes at which oxidation and reduction occur, respectively, during discharge; during charging, the sites of oxidation and reduction are reversed). The terms "preferred" and "preferably" as used herein refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments.

Electrochemical cells may include alkali metal-containing electrode active material. In one embodiment, the active material is represented by the nominal general formula (I):

$$[A_a,D_d]M_m(XY_4)_pZ_e, \quad (I)$$

wherein:

(i) A is selected from the group consisting of elements from Group I of the Periodic Table, and mixtures thereof, and $0<a\leq 9$;

(ii) D is at least one element with a valence state of ≥2+, and $0 \leq d \leq 1$;

(iii) M includes at least one redox active element, and $1 \leq m \leq 3$;

(iv) $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of a halogen, S, N, and mixtures thereof; and (d) $0 \leq x \leq 3$, $0 \leq y \leq 2$, $0 \leq z \leq 1$, and $1 \leq p \leq 3$; and (v) Z is OH, a halogen, or mixtures thereof, and $0 \leq e \leq 4$;

wherein A, D, M, X, Y, Z, a, d, x, y, z, p and e are selected so as to maintain electroneutrality of the material.

The term "nominal general formula" refers to the fact that the relative proportion of atomic species may vary slightly on the order of 2 percent to 5 percent, or more typically, 1 percent to 3 percent. The composition of A, D, M, $XY_4$ and Z of general formulas (I) through (V) herein, as well as the stoichiometric values of the elements of the active material, are selected so as to maintain electroneutrality of the electrode active material. The stoichiometric values of one or more elements of the composition may take on non-integer values.

For all embodiments described herein, A is selected from the group consisting of elements from Group I of the Periodic Table, and mixtures thereof (e.g. $A_a = A_{a-a'}A'_{a'}$, wherein A and A' are each selected from the group consisting of elements from Group I of the Periodic Table and are different from one another, and $a' < a$). As referred to herein, "Group" refers to the Group numbers (i.e., columns) of the Periodic Table as defined in the current IUPAC Periodic Table. (See, e.g., U.S. Pat. No. 6,136,472, Barker et al., issued Oct. 24, 2000, incorporated by reference herein.) In addition, the recitation of a genus of elements, materials or other components, from which an individual component or mixture of components can be selected, is intended to include all possible sub-generic combinations of the listed components, and mixtures thereof.

In one embodiment, A is selected from the group consisting of Li (Lithium), Na (Sodium), K (Potassium), and mixtures thereof. A may be mixture of Li with Na, a mixture of Li with K, or a mixture of Li, Na and K. In another embodiment, A is Na, or a mixture of Na with K. In one preferred embodiment, A is Li.

A sufficient quantity (a) of moiety A should be present so as to allow all of the "redox active" elements of the moiety M (as defined herein below) to undergo oxidation/reduction. In one embodiment, $0 < a \leq 9$. In another embodiment, $0 < a \leq 2$. Unless otherwise specified, a variable described herein algebraically as equal to ("="), less than or equal to ("≤"), or greater than or equal to ("≥") a number is intended to subsume values or ranges of values about equal or functionally equivalent to said number.

Removal of an amount of A from the electrode active material is accompanied by a change in oxidation state of at least one of the "redox active" elements in the active material, as defined herein below. The amount of redox active material available for oxidation/reduction in the active material determines the amount (a) of the moiety A that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

In general, the amount (a) of moiety A in the active material varies during charge/discharge. Where the active materials are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (b) of moiety A is removed from the active material as described above. The resulting structure, containing less amount of the moiety A (i.e., a-b) than in the as-prepared state, and at least one of the redox active components having a higher oxidation state than in the as-prepared state, while essentially maintaining the original values of the remaining components (e.g. D, M, X, Y and Z). The active materials of this invention include such materials in their nascent state (i.e., as manufactured prior to inclusion in an electrode) and materials formed during operation of the battery (i.e., by insertion or removal of A).

For all embodiments described herein, D is at least one element having an atomic radius substantially comparable to that of the moiety being substituted (e.g. moiety M and/or moiety A). In one embodiment, D is at least one transition metal. Examples of transition metals useful herein with respect to moiety D include, without limitation, Nb (Niobium), Zr (Zirconium), Ti (Titanium), Ta (Tantalum), Mo (Molybdenum), W (Tungsten), and mixtures thereof. In another embodiment, moiety D is at least one element characterized as having a valence state of ≥2+ and an atomic radius that is substantially comparable to that of the moiety being substituted (e.g. M and/or A). With respect to moiety A, examples of such elements include, without limitation, Nb (Niobium), Mg (Magnesium) and Zr (Zirconium). Preferably, the valence or oxidation state of D ($V^D$) is greater than the valence or oxidation state of the moiety (or sum of oxidation states of the elements consisting of the moiety) being substituted for by moiety D (e.g. moiety M and/or moiety A).

While not wishing to be held to any one theory, with respect to moiety A, it is thought that by incorporating a dopant (D) into the crystal structure of the active material, wherein the amount (a) of moiety A initially present in the active material is substituted by an amount of D, the dopant will occupy sites in the active material normally occupied by A, thus substantially increasing the ionic and electrical conductivity of the active material. Such materials additionally exhibit enhanced electrical conductivity, thus reducing or eliminating the need for electrically conductive material (e.g. carbon) in the electrode. Reduction or elimination of carbonaceous materials in secondary electrochemical cells, including those disclosed herein, is desirable because of the long-term deleterious effects carbonaceous materials produce during the operation of the electrochemical cells (e.g. promotion of gas production within the electrochemical cell). Reduction or elimination of the carbonaceous material also permits insertion of a greater amount of active material, thereby increasing the electrochemical cell's capacity and energy density.

Moiety A may be partially substituted by moiety D by aliovalent or isocharge substitution, in equal or unequal stoichiometric amounts. "Isocharge substitution" refers to a substitution of one element on a given crystallographic site with an element having the same oxidation state (e.g. substitution of $Ca^{2+}$ with $Mg^{2+}$). "Aliovalent substitution" refers to a substitution of one element on a given crystallographic site with an element of a different oxidation state (e.g. substitution of $Li^+$ with $Mg^{2+}$).

For all embodiments described herein where moiety A is partially substituted by moiety D by isocharge substitution, A may be substituted by an equal stoichiometric amount of moiety D, whereby the active material is represented by the nominal general formula (II):

$$[A_{a-f},D_d]M_m(XY_4)_pZ_e, \quad \text{(II)}$$

wherein f=d.

Where moiety A of general formula (II) is partially substituted by moiety D by isocharge substitution and d≠f, then the stoichiometric amount of one or more of the other components (e.g. A, M, $XY_4$ and Z) in the active material is adjusted in order to maintain electroneutrality.

For all embodiments described herein where moiety A is partially substituted by moiety D by aliovalent substitution, moiety A may be substituted by an "oxidatively" equivalent amount of moiety D, whereby the active material is represented by the nominal general formula (III):

$$\left[A_{a-\frac{f}{V^A}}, D_{\frac{d}{V^D}}\right]M_m(XY_4)_pZ_e, \quad \text{(III)}$$

wherein f=d, $V^A$ is the oxidation state of moiety A (or sum of oxidation states of the elements consisting of the moiety A), and $V^D$ is the oxidation state of moiety D.

Where moiety A of general formula (III) is partially substituted by moiety D by aliovalent substitution and d≠f, then the stoichiometric amount of one or more of the other components (e.g. A, M, $XY_4$ and Z) in the active material is adjusted in order to maintain electroneutrality.

In one embodiment, moiety M is partially substituted by moiety D by aliovalent or isocharge substitution, in equal or unequal stoichiometric amounts. In this embodiment, d≥0, wherein moiety A may be substituted by moiety D by aliovalent or isocharge substitution, in equal or unequal stoichiometric amounts. Where moieties M and A are both partially substituted by moiety D, the elements selected for substitution for each moiety may be the same or different from one another.

For all embodiments described herein where moiety M is partially substituted by moiety D by isocharge substitution, M may be substituted by an equal stoichiometric amount of moiety D, whereby $M=[M_{m-u},D_v]$, wherein u=v. Where moiety M is partially substituted by moiety D by isocharge substitution and u≠v, then the stoichiometric amount of one or more of the other components (e.g. A, M, $XY_4$ and Z) in the active material is adjusted in order to maintain electroneutrality.

For all embodiments described herein where moiety M is partially substituted by moiety D by aliovalent substitution, moiety M may be substituted by an "oxidatively" equivalent amount of moiety D, whereby $$\left[M_{m-\frac{u}{V^M}}, D_{\frac{v}{V^D}}\right],$$

wherein u=v, $V^M$ is the oxidation state of moiety M (or sum of oxidation states of the elements consisting of the moiety M), and $V^D$ is the oxidation state of moiety D.

Where moiety M is partially substituted by moiety D by aliovalent substitution and u≠v, then the stoichiometric amount of one or more of the other components (e.g. A, M, $XY_4$ and Z) in the active material is adjusted in order to maintain electroneutrality.

In this embodiment, moiety M and (optionally) moiety A are each partially substituted by aliovalent or isocharge substitution. While not wishing to be held to any one theory, it is thought that by incorporating a dopant (D) into the crystal structure of the active material in this manner, wherein the stoichiometric values M and (optionally) A are dependent on (reduced by) the amount of dopant provided for each crystallographic site, that the dopant will occupy sites in the active material normally occupied by moiety M and (optionally) moiety A. First, where $V^D>V^A$, doping sites normally occupied by A increases the number of available or unoccupied sites for A, thus substantially increasing the ionic and electrical conductivity of the active material. Second, doping the M sites reduces the concentration of available redox active elements, thus ensuring some amount of A remains in the active material upon charge, thereby increasing the structural stability of the active material. Such materials additionally exhibit enhanced electrical conductivity, thus reducing or eliminating the need for electrically conductive material in the electrode.

In all embodiments described herein, moiety M is at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein with respect to moiety M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium) Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. Also, "include," and its variants, is intended to be non-limiting, such that recitation of items in a list is not to the exclusion of other like items that may also be useful in the materials, compositions, devices, and methods of this invention.

In one embodiment, moiety M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, moiety M is a mixture of redox active elements or a mixture of at least one redox active element and at least one non-redox active element. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, $M=MI_nMII_o$, wherein $0<o+n\leq 3$ and each of o and n is greater than zero ($0<o,n$), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts.

For all embodiments described herein where MI is partially substituted by MII by isocharge substitution, MI may be substituted by an equal stoichiometric amount of MII, whereby $M=MI_{n-o}MII_o$. Where MI is partially substituted by MII by isocharge substitution and the stoichiometric amount of MI is not equal to the amount of MII, whereby $M=MI_{n-o}MII_p$ and $o\neq p$, then the stoichiometric amount of one or more of the other components (e.g. A, D, $XY_4$ and Z) in the active material is adjusted in order to maintain electroneutrality.

For all embodiments described herein where MI is partially substituted by MII by aliovalent substitution and an equal amount of MI is substituted by an equal amount of MII, whereby $M=MI_{n-o}MII_o$, then the stoichiometric amount of one or more of the other components (e.g. A, D, $XY_4$ and Z) in the active material is adjusted in order to maintain electroneutrality. However, MI may be partially substituted by MII by aliovalent substitution by substituting an "oxidatively" equivalent amount of MII for MI, whereby $$M = MI_{n-\frac{o}{V^{MI}}} MII_{\frac{o}{V^{MII}}},$$

wherein $V^{MI}$ is the, oxidation state of MI, and $V^{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals, $Cu^{1+}$, $Ag^{1+}$ and mixtures thereof.

In another embodiment, $M=M1_qM2_rM3_s$, wherein:

(a) M1 is a redox active element with a 2+ oxidation state;

(b) M2 is selected from the group consisting of redox and non-redox active elements with a 1+ oxidation state;

(c) M3 is selected from the group consisting of redox and non-redox active elements with a 3+ oxidation state; and (d) at least one of p, q and r is greater than 0, and at least one of M1, M2, and M3 is redox active.

In one subembodiment, M1 is substituted by an equal amount of M2 and/or M3, whereby $q=q-(r+s)$. In this subembodiment, then the stoichiometric amount of one or more of the other components (e.g. A, $XY_4$, Z) in the active material is adjusted in order to maintain electroneutrality.

In another subembodiment, $M^1$ is substituted by an "oxidatively" equivalent amount of $M^2$ and/or $M^3$, whereby $$M = M1_{q-\frac{r}{V^{M1}}-\frac{s}{V^{M1}}} M2_{\frac{r}{V^{M2}}} M3_{\frac{s}{V^{M3}}},$$

wherein $V^{M1}$ is the oxidation state of M1, $V^{M2}$ is the oxidation state of M2, and $V^{M3}$ is the oxidation state of M3.

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; and M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In all embodiments described herein, moiety $XY_4$ is a polyanion selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of a halogen, S, N, and mixtures thereof; and (d) $0 \le x \le 3$, $0 \le y \le 2$, and $0 \le z \le 1$.

In one embodiment, $1 \le p \le 3$. In one subembodiment, p=1. In another subembodiment, p=3.

In one embodiment, $XY_4$ is selected from the group consisting of $X'O_{4-x}Y'_x$, $X'O_{4-y}Y'_{2y}$, and mixtures thereof, and x and y are both 0. Stated otherwise, $XY_4$ is a polyanion selected from the group consisting of $PO_4$, $SiO_4$, $GeO_4$, $VO_4$, $AsO_4$, $SbO_4$, $SO_4$, and mixtures thereof. Preferably, $XY_4$ is $PO_4$ (a phosphate group) or a mixture of $PO_4$ with another anion of the above-noted group (i.e., where X' is not P, Y' is not O, or both, as defined above). In one embodiment, $XY_4$ includes about 80% or more phosphate and up to about 20% of one or more of the above-noted anions.

In another embodiment, $XY_4$ is selected from the group consisting of $X'[O_{4-x}, Y'_x]$, $X'[O_{4-y}, Y'_{2y}]$, and mixtures thereof, and $0 < x \le 3$ and $0 < y \le 2$, wherein a portion of the oxygen (O) in the $XY_4$ moiety is substituted with a halogen, S, N, or a mixture thereof.

In all embodiments described herein, moiety Z (when provided) is selected from the group consisting of OH (Hydroxyl), a halogen, or mixtures thereof. In one embodiment, Z is selected from the group consisting of OH, F (Fluorine), Cl (Chlorine), Br (Bromine), and mixtures thereof. In another embodiment, Z is OH. In another embodiment, Z is F, or a mixture of F with OH, Cl, or Br. Where the moiety Z is incorporated into the active material, the active material may not take on a NASICON or olivine structural where p=3 or d=1, respectively. It is quite normal for the symmetry to be reduced with incorporation of, for example, halogens.

The composition of the electrode active material, as well as the stoichiometric values of the elements of the composition, are selected so as to maintain electroneutrality of the electrode active material. The stoichiometric values of one or more elements of the composition may take on non-integer values. Preferably, the $XY_4$ moiety is, as a unit moiety, an anion having a charge of −2, −3, or −4, depending on the selection of X', X'', X'''Y', and x and y. When $XY_4$ is a mixture of polyanions such as the preferred phosphate/phosphate substitutes discussed above, the net charge on the $XY_4$ anion may take on non-integer values, depending on the charge and composition of the individual groups $XY_4$ in the mixture.

In one particular embodiment, the electrode active material has an orthorhombic-dipyramidal crystal structure and belongs to the space group Pbnm (e.g. an olivine or triphylite material), and is represented by the nominal general formula (II):

$$[A_a, D_d]M_mXY_4Z_e, \quad \text{(IV)}$$

wherein:

(a) the moieties A, D, M, X, Y and Z are as defined herein above;

(b) $0 < a \le 2$, $0 \le d \le 1$, $1 < m \le 2$, and $0 < e \le 1$; and (c) the components of the moieties A, D, M, X, Y, and Z, as well as the values for a, d, m and e, are selected so as to maintain electroneutrality of the compound.

In one particular subembodiment, A of general formula (IV) is Li, $0.5 < a \le 1.5$, $M = MI_{n-p}MII_o$, wherein o=p, $0.5 < n \le 1.5$, $0 < o \le 0.1$, MI is a 2+ oxidation state redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$ (preferably $Fe^{2+}$), MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof (preferably $Mg^{2+}$ or $Ca^{2+}$), $XY_4 = PO_4$, and e=0.

In another particular subembodiment, A of general formula (IV) is Li, $0 < a \le 1$, $M = MI_{n-p}MII_o$, wherein o=p, $0 < o \le 0.5$, MI is $Fe^{2+}$, MII is selected from the group consisting of $Be^{2+}$, $Mg^{2+}$, $Ca^{2+}$, $Sr^{2+}$, $Ba^{2+}$, and mixtures thereof (preferably $Mg^{2+}$ or $Ca^{2+}$), $XY_4 = PO_4$, and d,e=0.

In another particular embodiment, the electrode active material has a rhombohedral (space group R-3) or monoclinic (space group Pbcn) NASICON structure, and is represented by the nominal general formula (V):

$$[A_a, D_d]M_m(XY_4)_3Z_e, \quad \text{(V)}$$

wherein:

(a) the moieties A, D, M, X, Y and Z are as defined herein above;

(b) $0 < a \le 5$, $0 \le d \le 1$; $1 < m \le 3$, and $0 < e \le 4$; and (c) the components of the moieties A, D, M, X, Y, and Z, as well as the values for a, d, m and e, are selected so as to maintain electroneutrality of the compound.

In one particular subembodiment, A of general formula (V) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4 = PO_4$, and e=0. In another particular subembodiment, A of general formula (V) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4 = PO_4$, and d,e=0.

The following applications describe additional details of active materials and method of forming active materials and compounds according to exemplary aspects: International Publication No. WO01/54212, entitled "Lithium-Based Electrochemically Active Materials And Preparation Thereof," published Jul. 26, 2001, listing Jeremy Barker and M. Yazid Saidi as inventors; International Publication No. WO98/12761, entitled "Lithium-Containing, Lithium-Intercalating Phosphates And Their Use As The Positive Or Negative Electrode Material In A Lithium Secondary Battery," published Mar. 26, 1998, listing M. Yazid Saidi and Jeremy Barker as inventors; International Publication No. WO00/01024, entitled "Lithium-Containing Silicon/Phosphates, Method Of Preparation, And Uses Thereof," published Jan. 6, 2000, listing Jeremy Barker and M. Yazid Saidi as inventors; International Publication No. WO00/31812, entitled "Lithium-Based Phosphates For Use In Lithium Ion Batteries And Method Of Preparation," published Jun. 2, 2000, listing Jeremy Barker and M. Yazid Saidi as inventors; International Publication No. WO00/57505, entitled "Lithium-Containing Phosphate Active Materials," published Sep. 28, 2000, listing Jeremy Barker as inventor; International Publication No. WO02/44084, entitled "Methods Of Making Lithium Metal Compounds Useful As Cathode Active Materials," published Jun. 6, 2002, listing Jeremy Barker and M. Yazid Saidi as inventors; International Publication No. WO03/085757, entitled "Batteries Comprising Alkali-Transition Metal Phosphates And Preferred Electrolytes," published Oct. 16, 2003, listing M. Yazid Saidi and Haitao Huang as inventors; International Publication No. WO03/085771, entitled "Alkali-Iron-Cobalt Phosphates And Related Electrode Active Materials," published Oct. 16, 2003, listing M. Yazid Saidi and Haitao Huang as inventors; International Publication No.

WO03/088383, entitled "Alkali-Transition Metal Phosphates Having A+3 Valence Non-Transition Element And Related Electrode Active Materials," published Oct. 23, 2003, listing M. Yazid Saidi and Haitao Huang as inventors; U.S. Pat. No. 6,528,033, issued Mar. 4, 2003, entitled "Method Of Making Lithium Containing Materials," listing Jeremy Barker, M. Yazid Saidi, and Jeffrey Swoyer as inventors; U.S. Pat. No. 6,387,568, issued May 14, 2002, entitled "Lithium Metal Flurophosphate Materials And Preparation Thereof," listing Jeremy Barker, M. Yazid Saidi, and Jeffrey Swoyer as inventors; U.S. Publication No. 2003/0027049, published Feb. 2, 2003, entitled "Alkali/Transition Metal Halo- And Hydroxyl-Phosphates And Related Electrode Materials," listing Jeremy Barker, M. Yazid Saidi, and Jeffrey Swoyer as inventors; U.S. Publication No. 2002/0192553, published Dec. 19, 2002, entitled "Sodium Ion Batteries," listing Jeremy Barker, M. Yazid Saidi, and Jeffrey Swoyer as inventors; U.S. Publication No. 2003/0170542, published Sep. 11, 2003, entitled "Alkali Transition Metal Phosphates And Related Electrode Active Materials," listing Jeremy Barker, M. Yazid Saidi, and Jeffrey Swoyer as inventors; and U.S. patent application Ser. No. 09/484,799, entitled "Lithium-Based Active Materials and Preparation Thereof", listing Jeremy Barker as an inventor, filed Jan. 18, 2000, now U.S. Publication No. 2003/0129492, the teachings of all of which are incorporated herein by reference.

According to one aspect for forming an electrode, the active material may be combined with a polymeric binder (e.g. polyvinylidene difluoride (PVdF) and hexafluoropropylene (HFP)) in order to form a cohesive mixture. The mixture is then placed in electrical communication with a current collector which, in turn, provides electrical communication between the electrode and an external load. The mixture may be formed or laminated onto the current collector, or an electrode film may be formed from the mixture wherein the current collector is embedded in the film. Suitable current collectors include reticulated or foiled metals (e.g. aluminum, copper and the like). An electrically conductive diluent or agent (e.g. a carbon such as carbon black and the like) may be added to the mixture so as to increase the electrical conductivity of the electrode. In one embodiment, the electrode material is pressed onto or about the current collector, thus eliminating the need for the polymeric binder. In one embodiment, the electrode contains 5 to 30% by weight electrically conductive agent, 3 to 20% by weight binder, and the remainder being the electrode active material.

To form an electrochemical cell, a solid electrolyte or an electrolyte-permeable separator is interposed between the electrode and a counter-electrode. In one embodiment, the electrolyte contains a solvent selected from the group consisting of the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof; and 5 to 65% by weight of an alkali metal salt. Preferred solvent combinations include EC/DMC, EC/DEC, EC/DPC and EC/EMC. In one embodiment, the counter-electrode contains an intercalation active material selected from the group consisting of a transition metal oxide, a metal chalcogenide, carbon (e.g. graphite), and mixtures thereof. Counter electrodes, electrolyte compositions, and methods for making the same, among those useful herein, are described in U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Additional details of electrochemical cells composed of electrodes (including polymer-type stacked cells and cylindrical-type cells), electrolytes and other materials; among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill, issued Jan. 9, 1996; U.S. Pat. No. 5,660,948, Barker, issued Sep. 16, 1995; U.S. Pat. No. 5,869,208, Miyasaka, issued Feb. 9, 1999; U.S. Pat. No. 5,882,821, Miyasaka, issued Mar. 16, 1999; U.S. Pat. No. 5,616,436, Sonobe. et al., issued Apr. 1, 1997; and U.S. Pat. No. 6,306,215, Larkin, issued Oct. 23, 2001.

As mentioned above, individual cells of devices 62 may comprise lithium. For a 1400 mA·hr 18650 cell of an individual device 62 containing $LiFe_{0.95}Mg_{0.05}PO_4$ cathode active material, where the $LiFe_{0.95}Mg_{0.05}PO_4$ material has a specific capacity of 126 mA·hr/gr when cycled at a C/5 rate (5 hours to discharge—estimating the perfect capacity of the material), and the cathode is loaded with 11.1 gr. of the $LiFe_{0.95}Mg_{0.05}PO_4$ material, the equivalent lithium content is:

$$\frac{11.1\text{ gr. }(\text{LiFe})_{0.95}\text{Mg}_{0.05}\text{PO}_4}{1}\times\frac{6.941\frac{\text{gr.}}{\text{mol}}\text{Li}}{156.18\frac{\text{gr.}}{\text{mol}}(\text{LiFe})_{0.95}\text{Mg}_{0.05}\text{PO}_4}=$$

$$0.493\text{ grams of equivalent Li}$$

For a 1700 mA·hr 18650 cell containing $Li_3V_2(PO_4)_3$ cathode active material, where the $Li_3V_2(PO_4)_3$ material has a specific capacity of 150 mA·hr/gr when cycled at a C/5 rate, the cathode is loaded with 11.34 gr. of the $Li_3V_2(PO_4)_3$ material, the equivalent lithium content is:

$$\frac{11.34\text{ gr. Li}_3\text{V}_2(\text{PO}_4)_3}{1}\times\frac{6.941\frac{\text{gr.}}{\text{mol}}\text{Li}}{407.61\frac{\text{gr.}}{\text{mol}}\text{Li}_3\text{V}_2(\text{PO}_4)_3}\times 3\text{ Li}=$$

$$0.579\text{ grams of equivalent Li}$$

In one embodiment, individual ones of devices 62 may have an equivalent lithium content defined by the number of cells coupled in parallel with one another to form the respective device 62. In one implementation, devices 62 may individually have an equivalent lithium content of at least 3 grams or more in examples where the respective devices 62 individually have a capacity of approximately 10 Ahr or more (e.g., 3.451 grams for at least seven parallel-coupled 1400 mAhr cells or 3.474 grams for at least six parallel-coupled 1700 mAhr cells to form a respective device 62). Devices 62 individually having other quantities of equivalent lithium content may be provided in configurations using devices 62 of increased capacities. For example, in exemplary configurations described herein, individual ones of devices 62 including thirty-five 1400 mAhr cells coupled in parallel have an equivalent lithium content of approximately 17 grams while thirty-five 1700 mAhr cells yield an equivalent lithium content of approximately 20.265 grams. Other configurations of devices 62 having other values (more or less) of equivalent lithium content are possible.

As described above, a plurality of the above-mentioned cells may be coupled in parallel to form a device 62. Devices 62 using the above-described exemplary cells may provide a capacity in excess of 10 Ahr. In other embodiments, such as the above-described exemplary configurations, devices 62 of additional capacity may be utilized. For example, a capacity of approximately 50 Ahr per device 62 is obtained by thirty-five of the above-mentioned 1400 mAhr cells coupled in parallel to form the device 62. A capacity of approximately 60 Ahr per device 62 is obtained by thirty-five of the above-mentioned 1700 mAhr cells coupled in parallel to form the device 62. Devices 62 of other equivalent lithium content, capacities and/or using other cells are possible in other embodiments.

In some configurations, the above-described lithium Saphion® cells for devices 62 may be subjected to increased temperatures compared with conventional designs without experiencing thermal runaway conditions. For example, configurations of 18650 format lithium Saphion® cells as described above and available from Valence Technology, Inc. have been exposed to temperatures of 220 degrees C. for two hours or more during tests without experiencing thermal runaway conditions. During, tests, the 18650 format lithium Saphion® cells experienced thermal runaway conditions at temperatures of 230 degrees C. or greater. This enhanced resistance to thermal runaway may be compared with conventional designs including lithium cobalt 18650 format cells which were observed to experience thermal runaway after exposure to temperatures of 150 degrees C. for less than two hours and lithium manganese 18650 format cells which were observed to experience thermal runaway after exposure to temperatures of 180 degrees C. for less than two hours.

A communications bus 64 is configured to communicate status information of one or more of devices 62 to control circuitry 46. For example, voltage, state of charge, capacity, current or information regarding other electrical characteristics of devices 62 may be communicated using bus 64. Also, state of health (e.g., capacity) of individual devices 62 may be monitored by control circuitry 46 by counting charge/discharge cycles, temperature exposure, and/or other means.

Although not shown in FIG. 2B, sensing circuitry may be coupled with respective electrochemical devices 62 and communications bus 64 to provide information to processor 50 regarding status of electrical or other characteristics of devices 62. Further, balance circuitry may be provided coupled with respective devices 62 to provide uniform voltages of devices 62 during charging of devices 62. Additional exemplary circuitry for additional aspects of the disclosure including the sensing and balancing circuitry are provided in FIGS. 3-6.

One or more temperature sensors 66 are provided to monitor temperatures of the respective battery assembly 20. In one embodiment, four temperature sensors 66 are positioned within housing 24 of assembly 20 to provide temperature information regarding the operation of the devices 62 or other circuitry of assembly 20.

Current measurement sensor 68 is configured to provide information regarding current flowing into or out of storage circuitry 60. In the depicted exemplary embodiment, current measurement sensor 68 is positioned adjacent to a power bus conductor intermediate the switching device 52 and the negative node of the storage circuitry 60.

In addition, exemplary operations of power supply 54 are described below with respect to the exemplary embodiment of FIGS. 3-6. Other configurations of assembly 20 and the components thereof apart from the exemplary embodiments of FIGS. 3-6 are possible in other embodiments.

Figure 5:
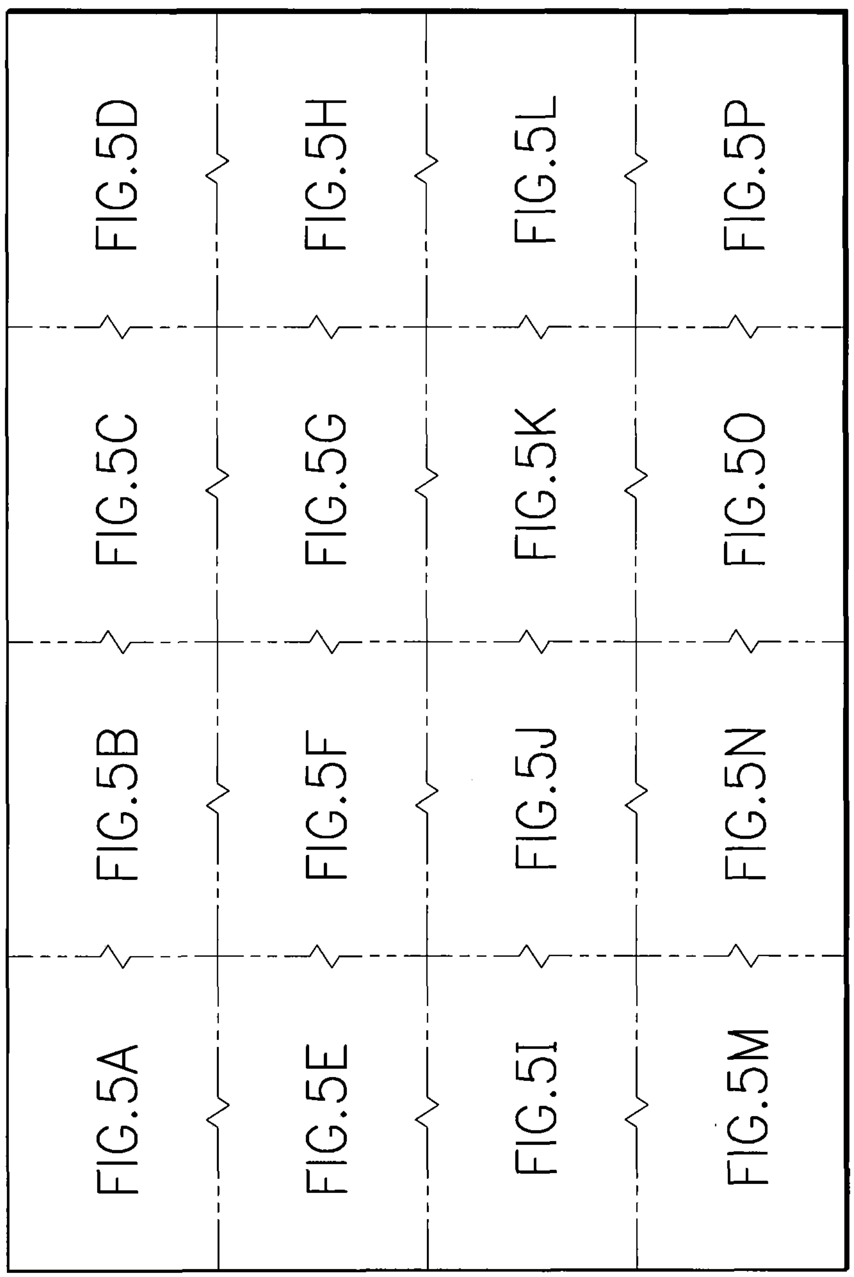
FIG. 5 is a map illustrating how
Figure 5A:
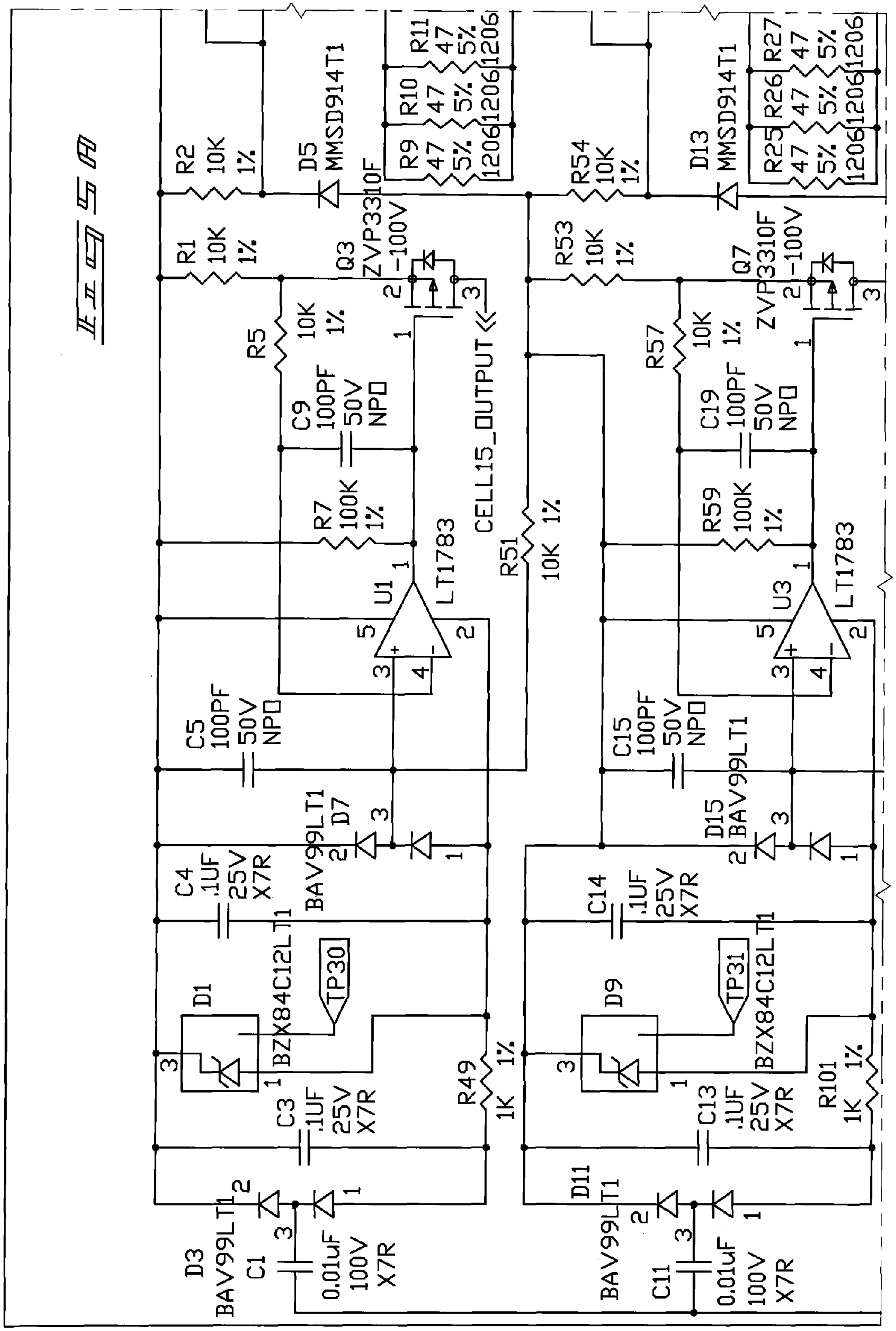
FIGS. 5A-5P are to be assembled, and once assembled.
Figure 5B:
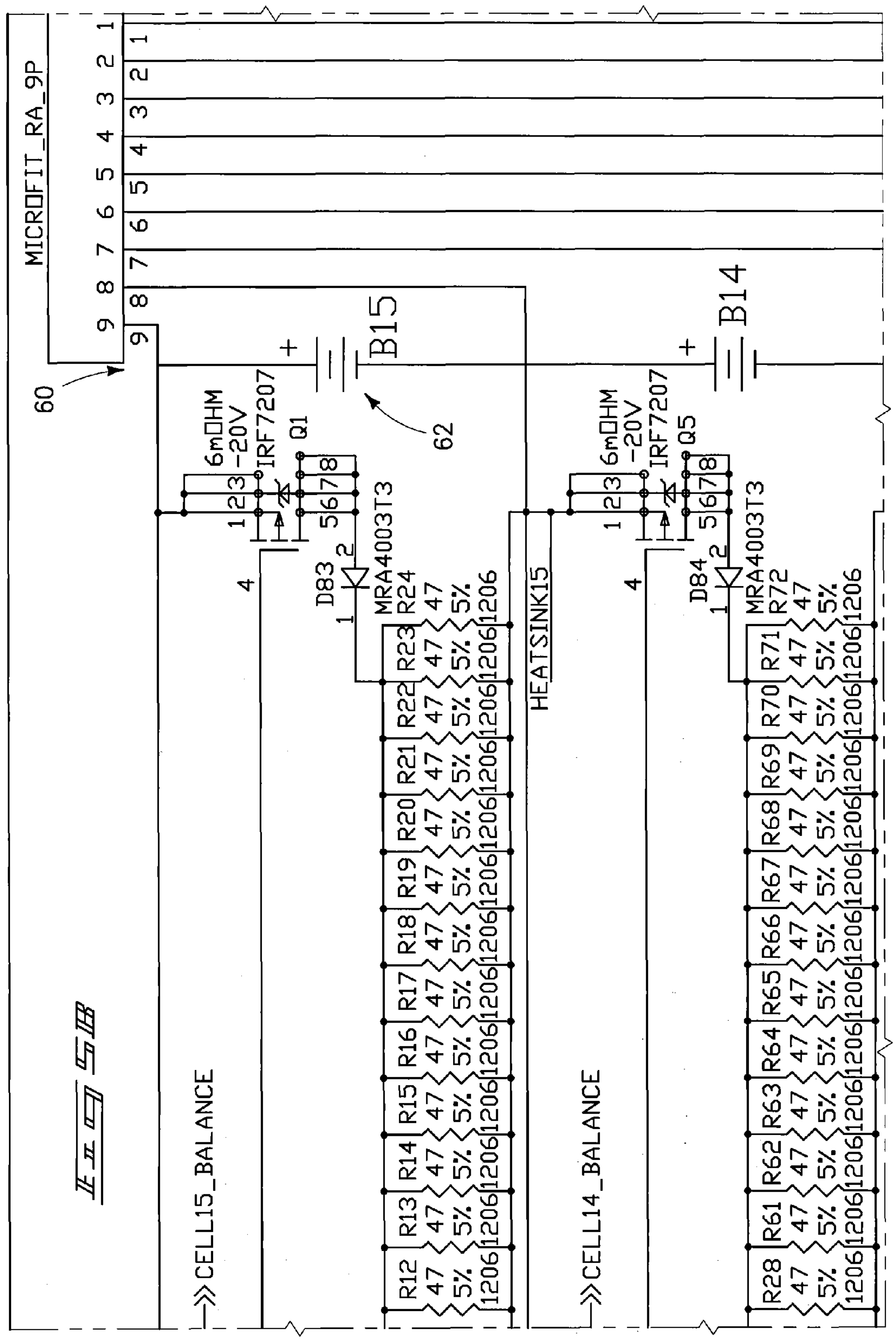
Figure 5C:
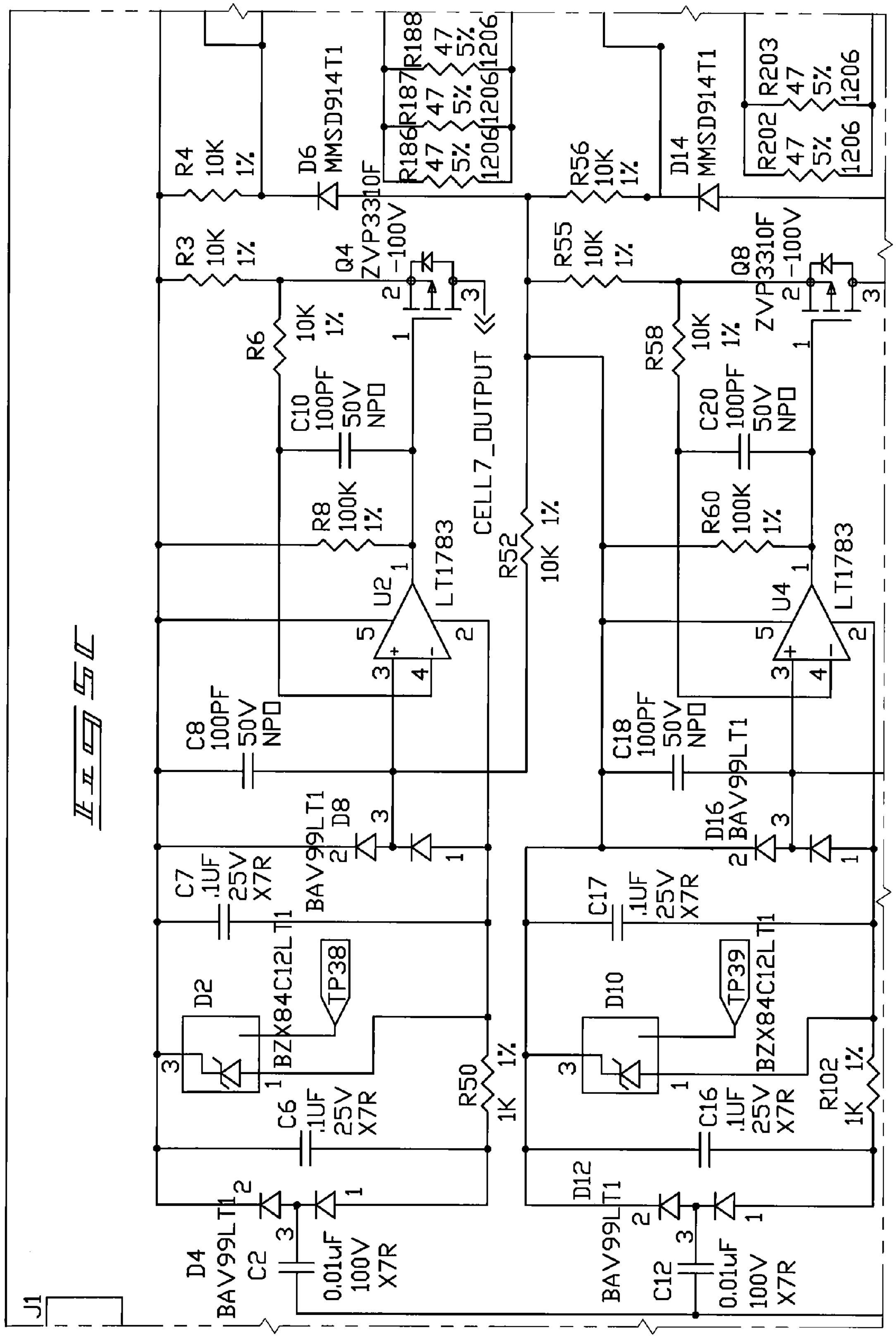
Figure 5D:
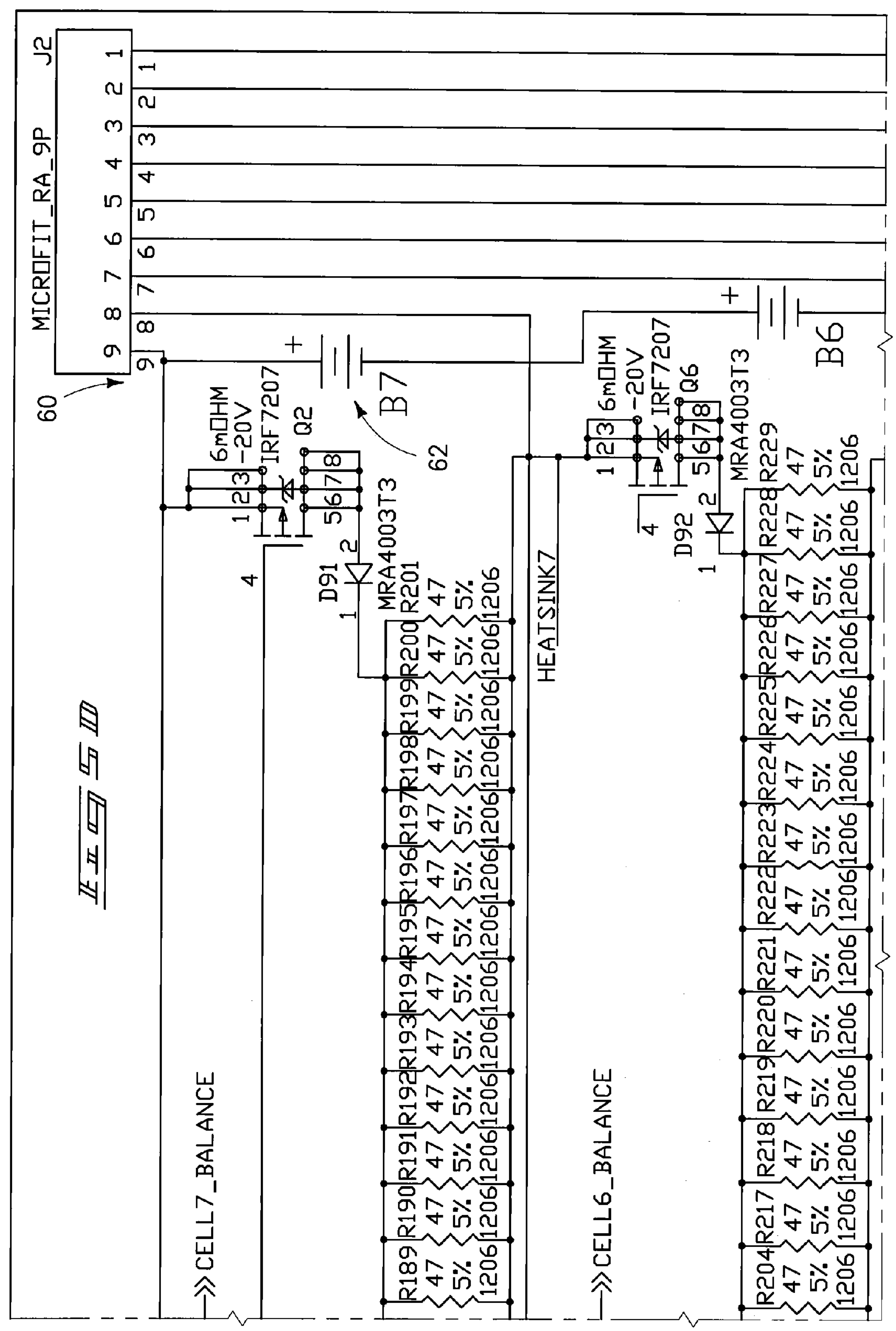
Figure 5E:
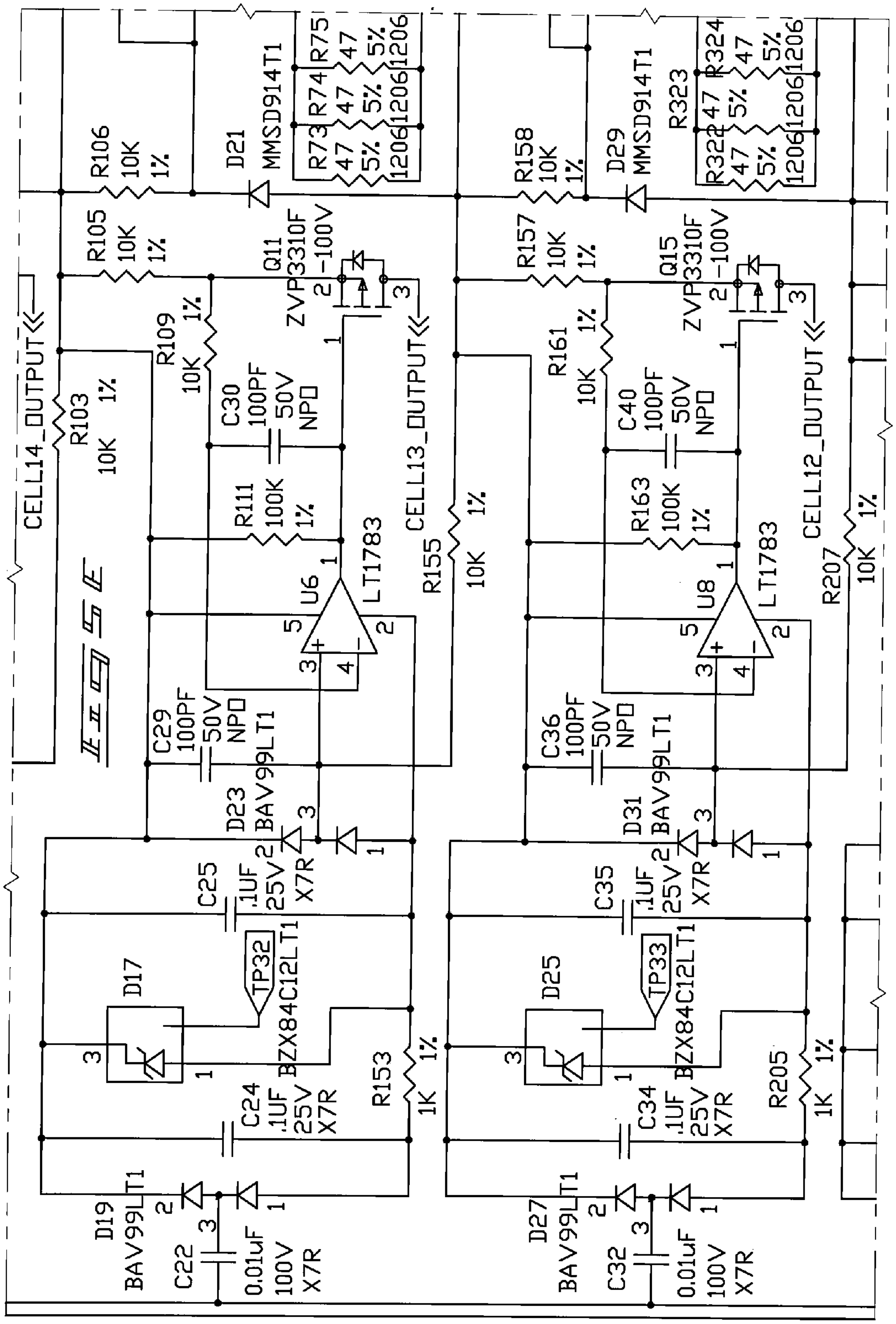
Figure 5F:
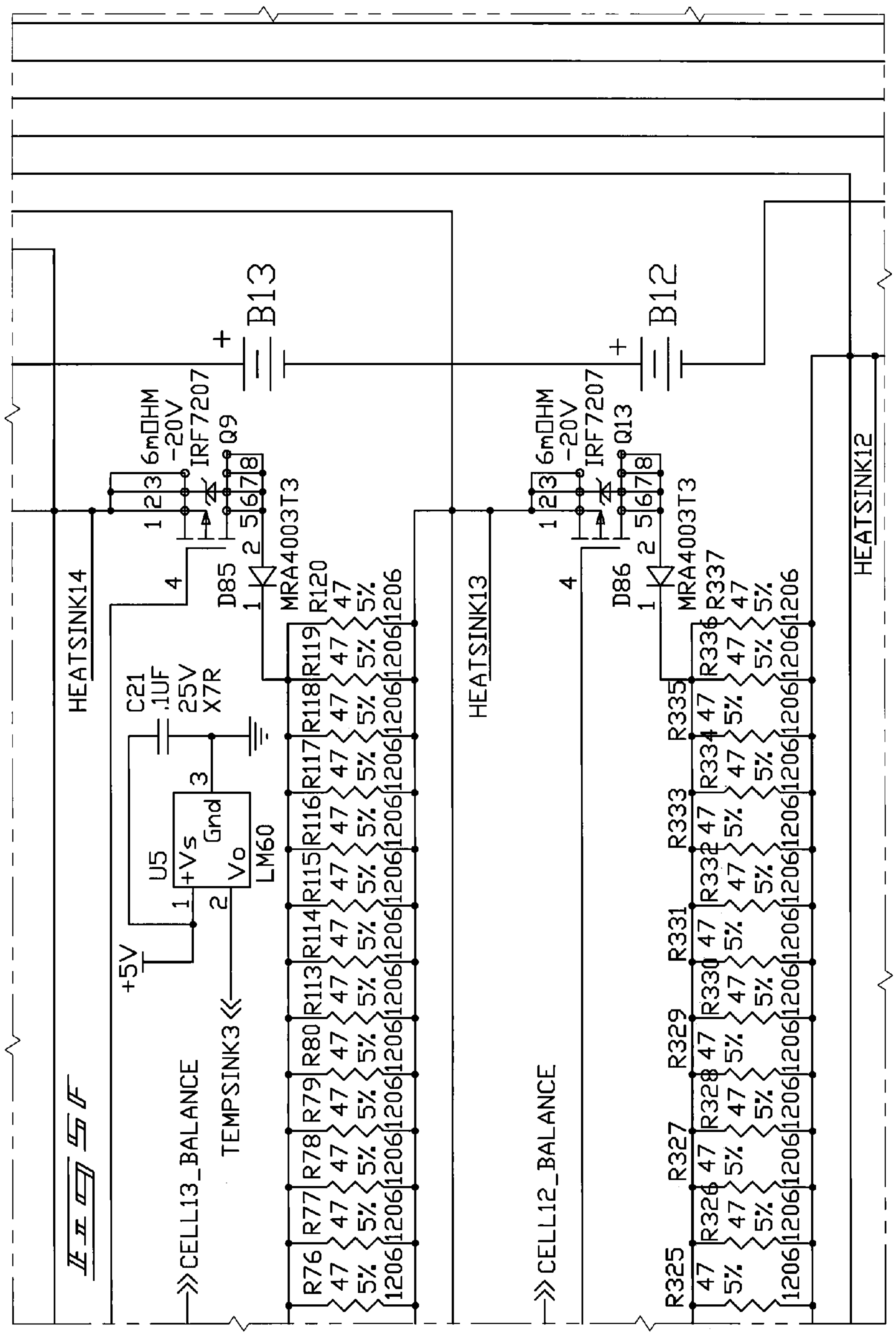
Figure 56:
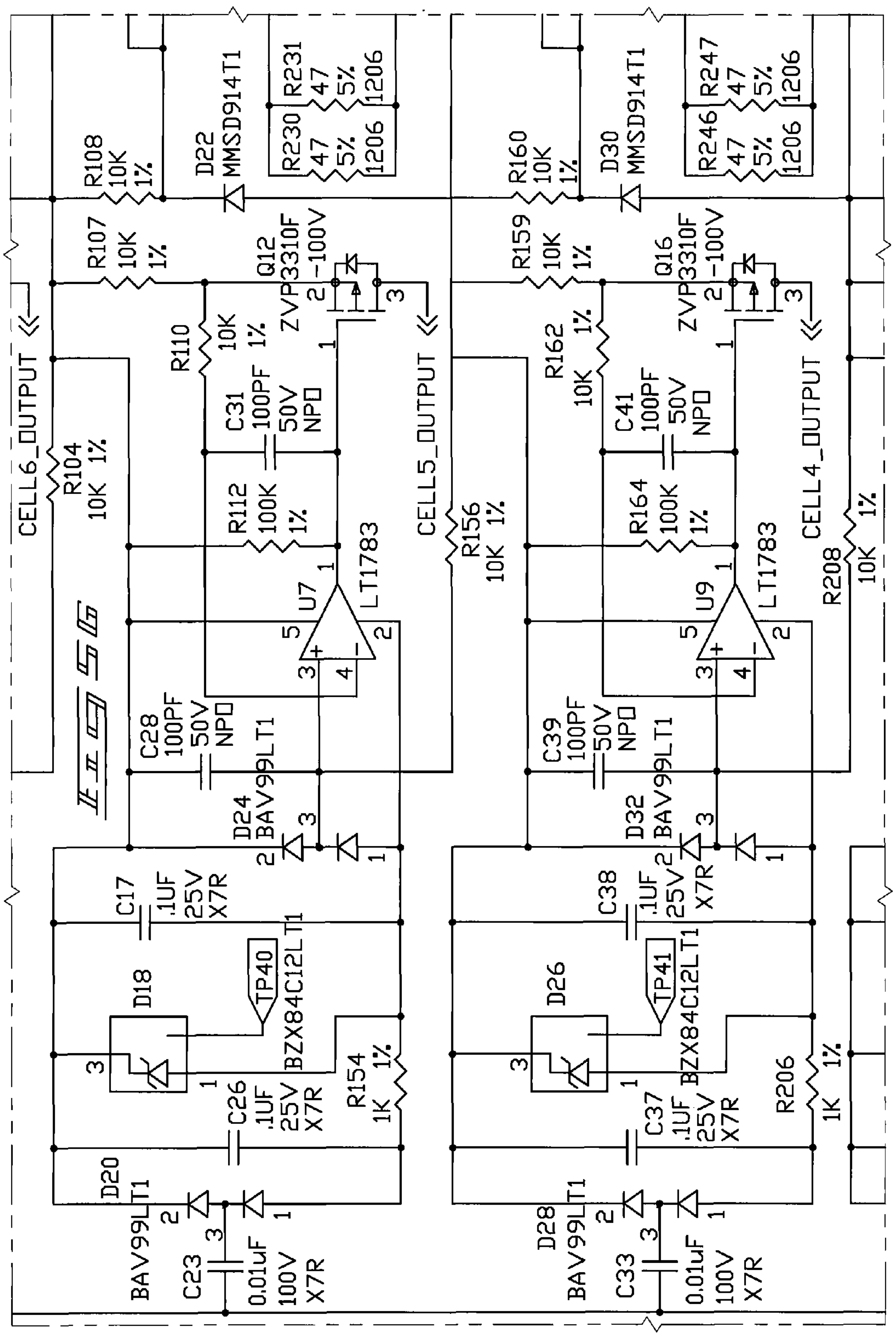
Figure 5H:
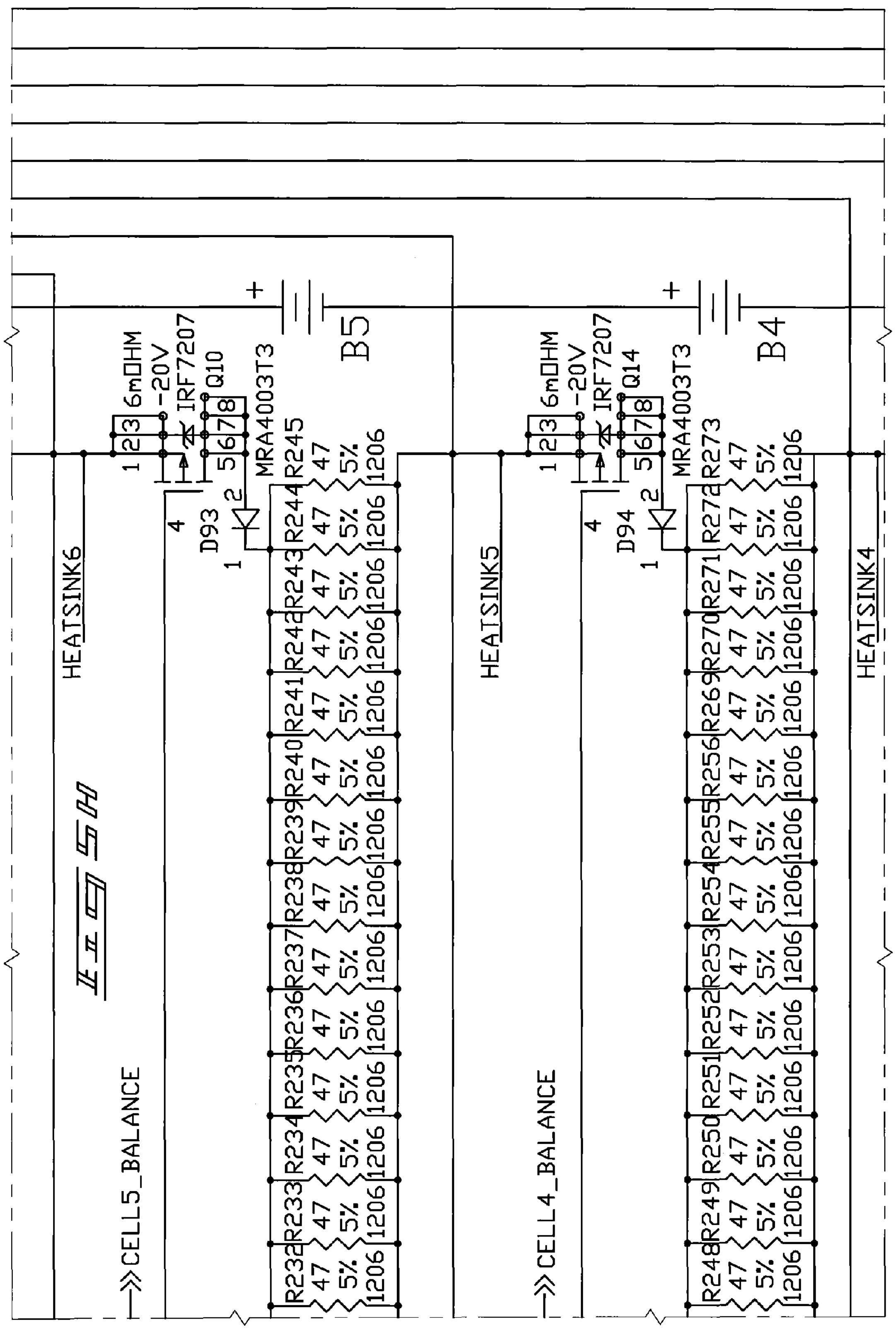
Figure 51:
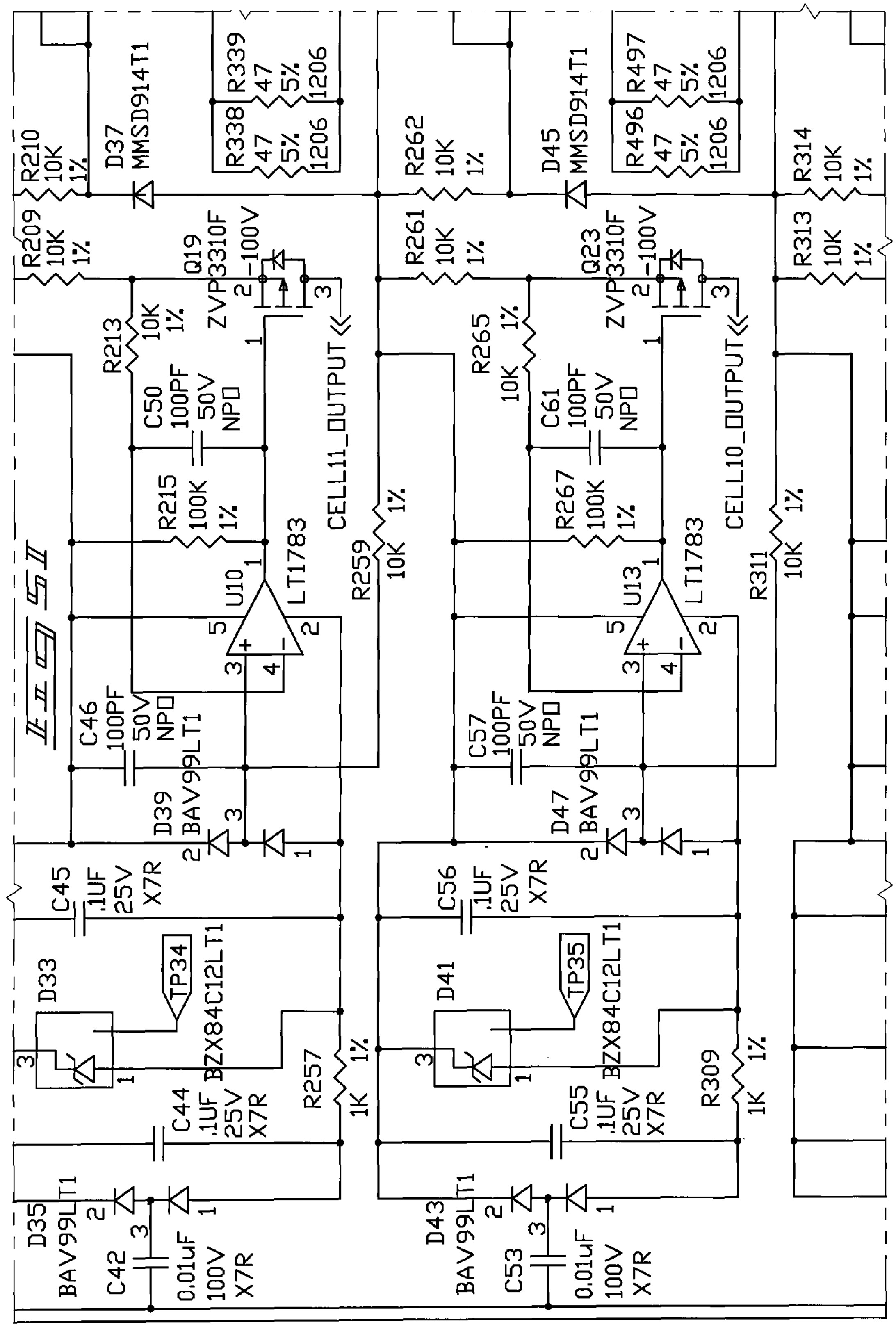
Figure 5K:
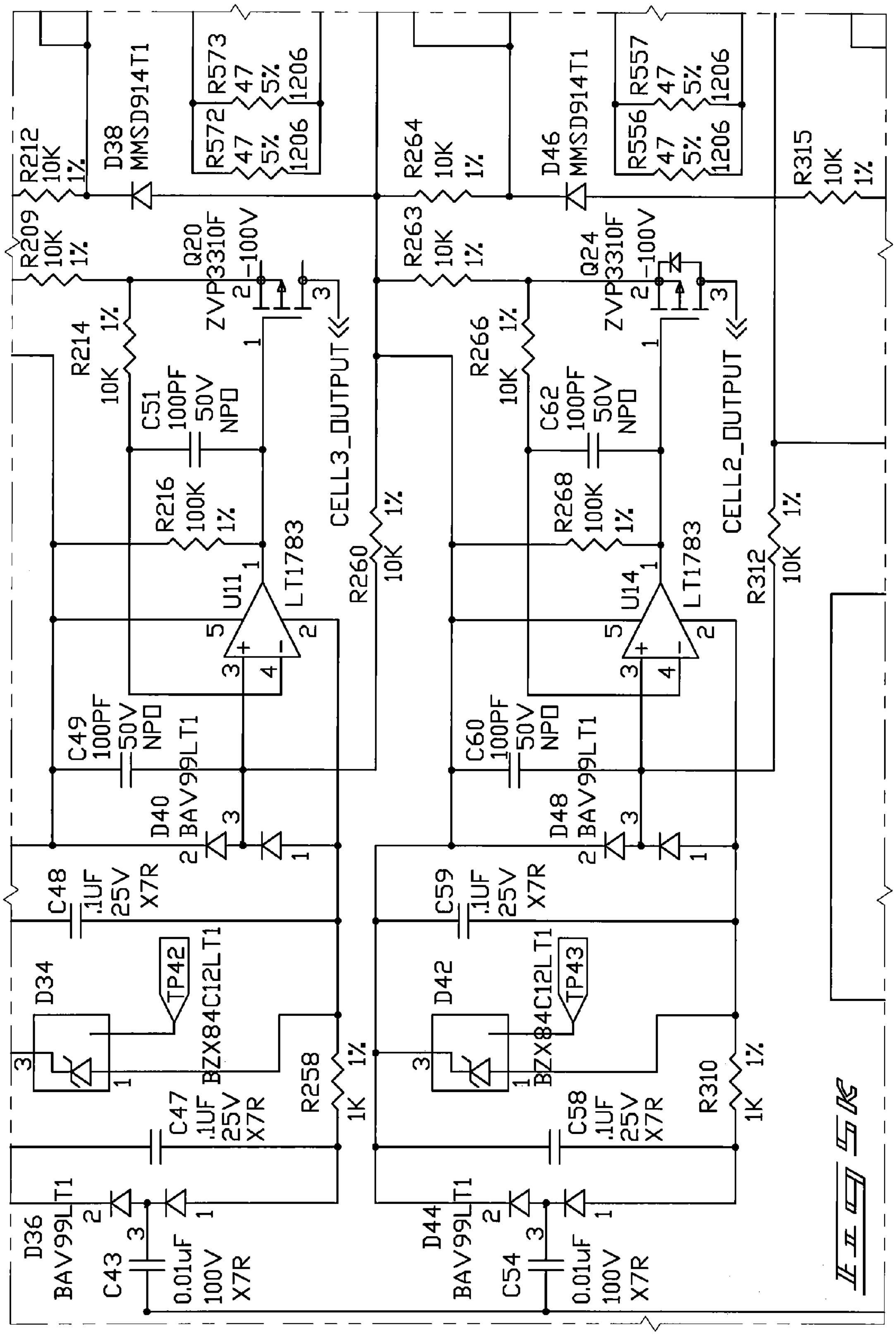
Figure 56:
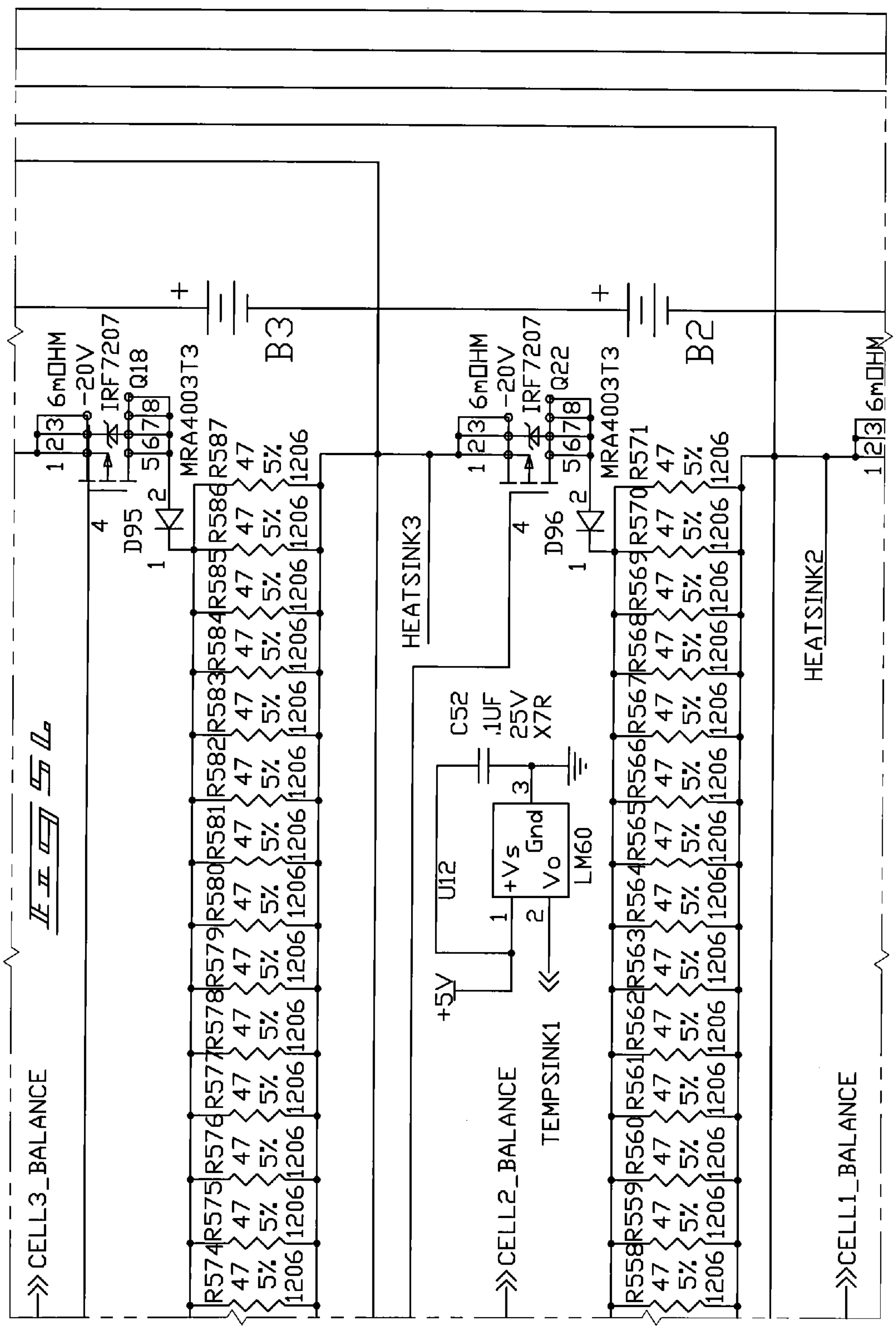
Figure 5M:
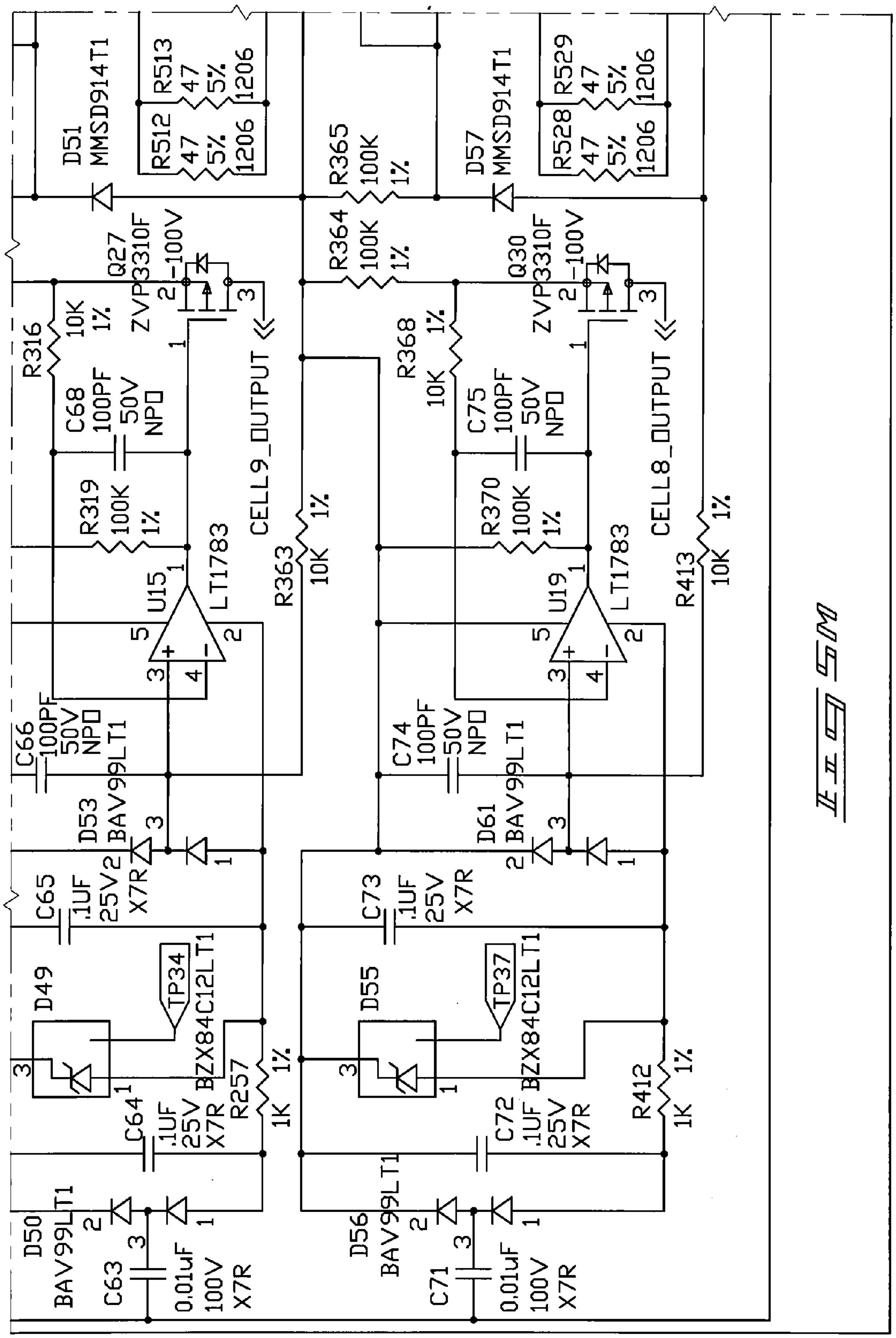
Figure 5N:
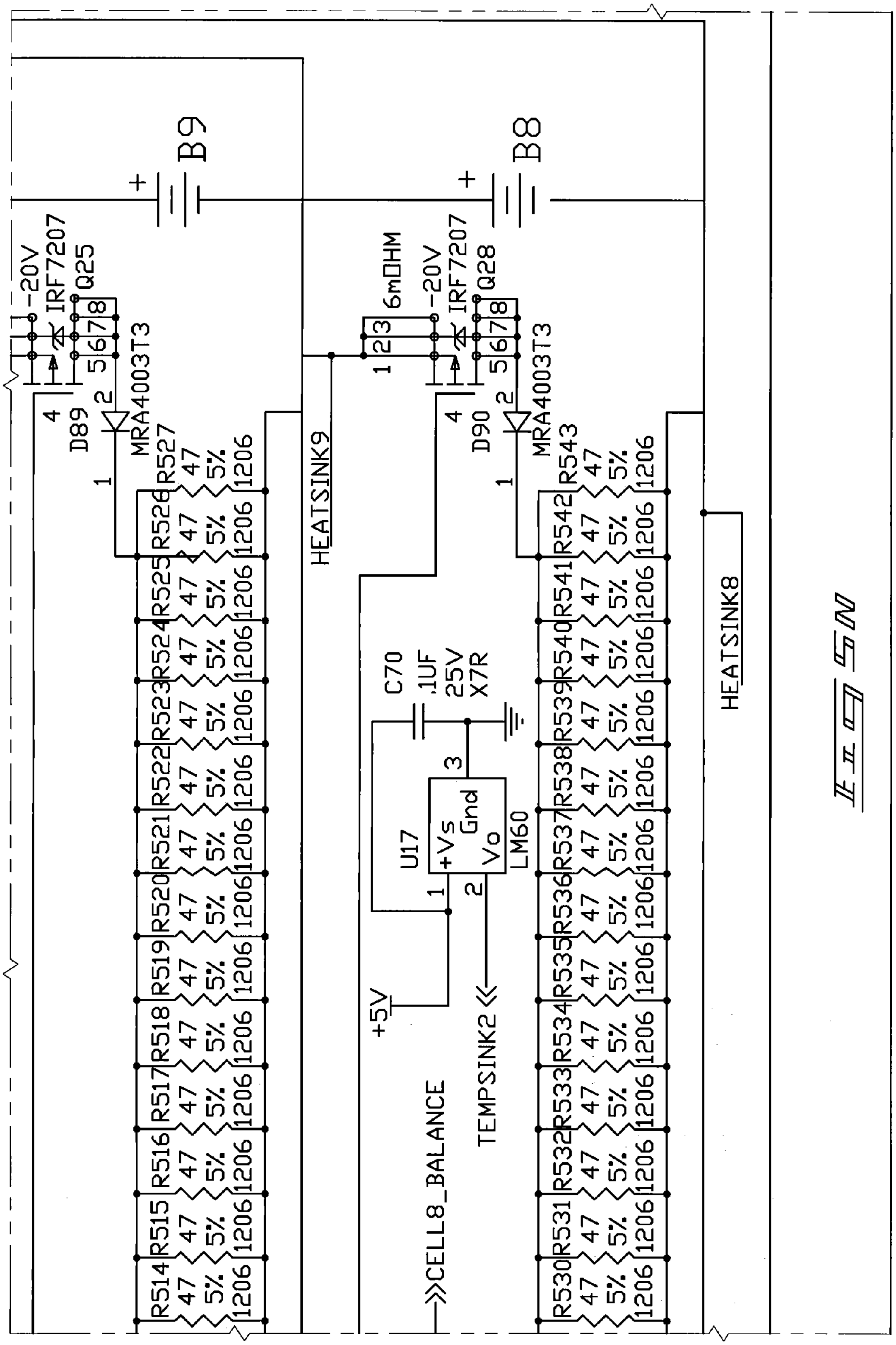
Figure 50:
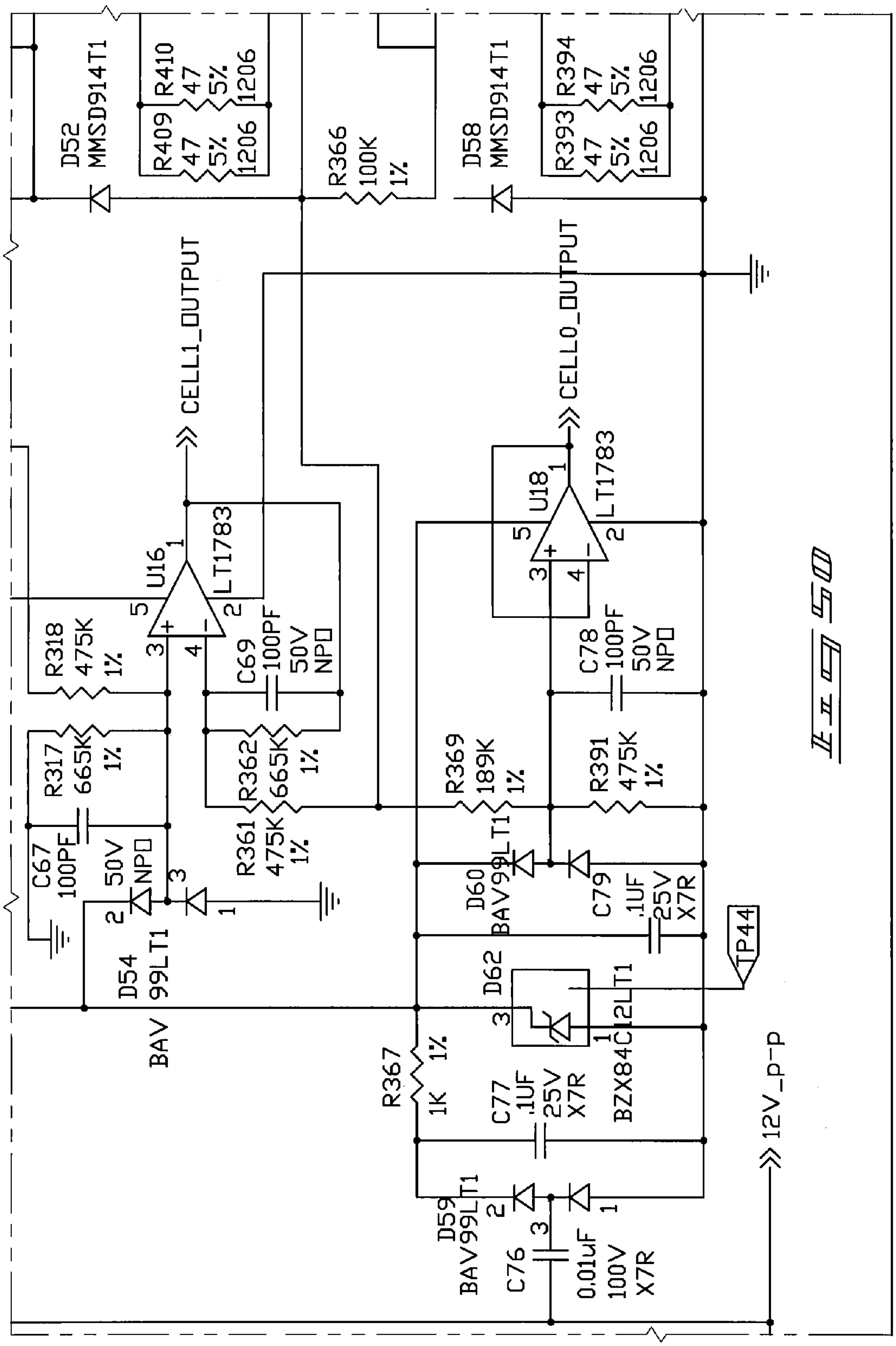
Figure 5P:
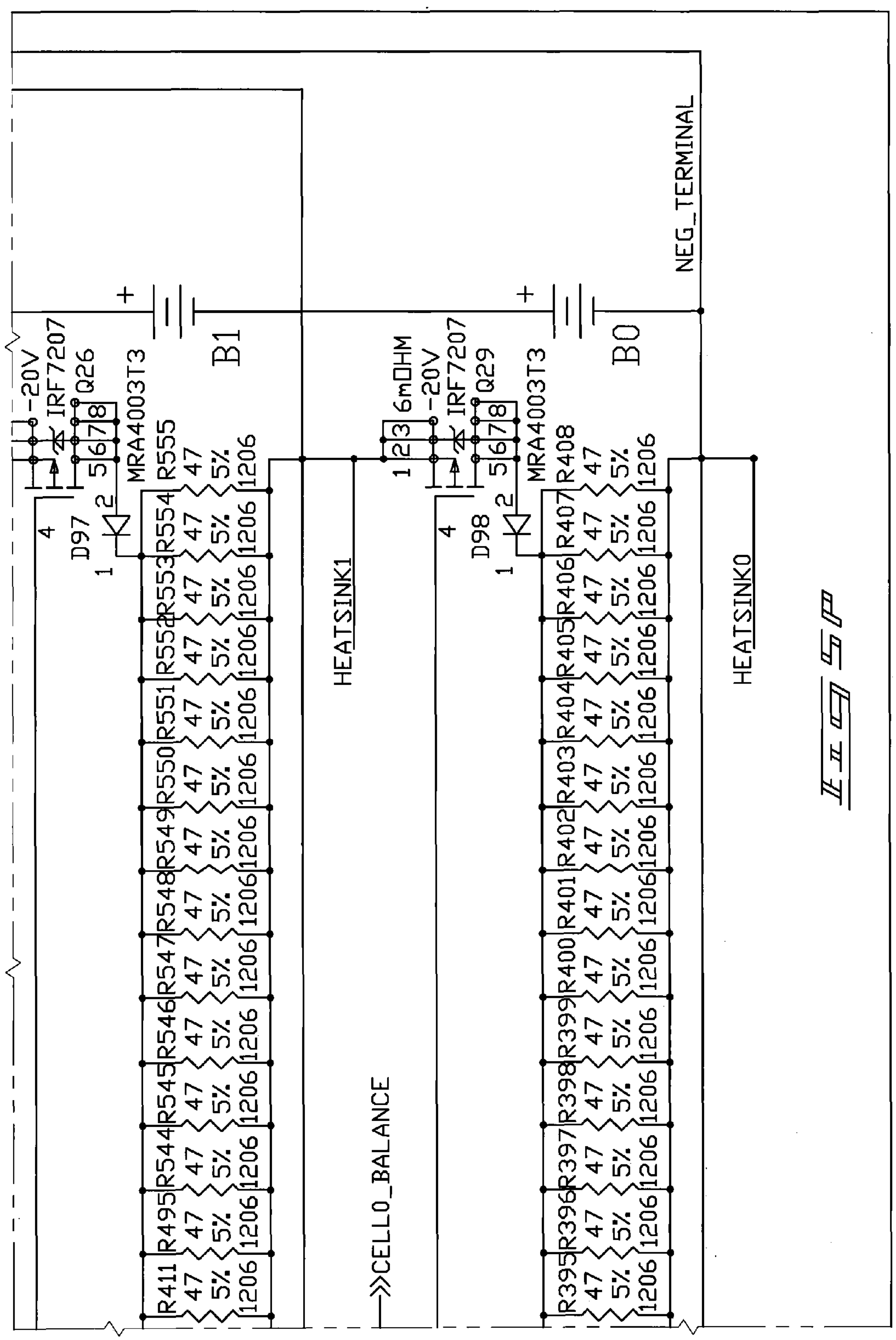

The above-described AC voltage may be used to distribute power to cell voltage sensing circuitry (e.g., shown in FIG. 5A-5P in one embodiment). By distributing power to the sensing circuitry as an AC voltage, it is possible to power the individual ones of the sixteen circuits (e.g., associated with respective ones of the devices 62) through DC blocking capacitors with the same AC signal even if the circuits are at different DC potentials. Accordingly, the sensing circuitry does not draw current directly from devices 62 such that the remaining load upon storage circuitry 60 may be reduced when the power supply 54 is off in one embodiment.

Figure 3:
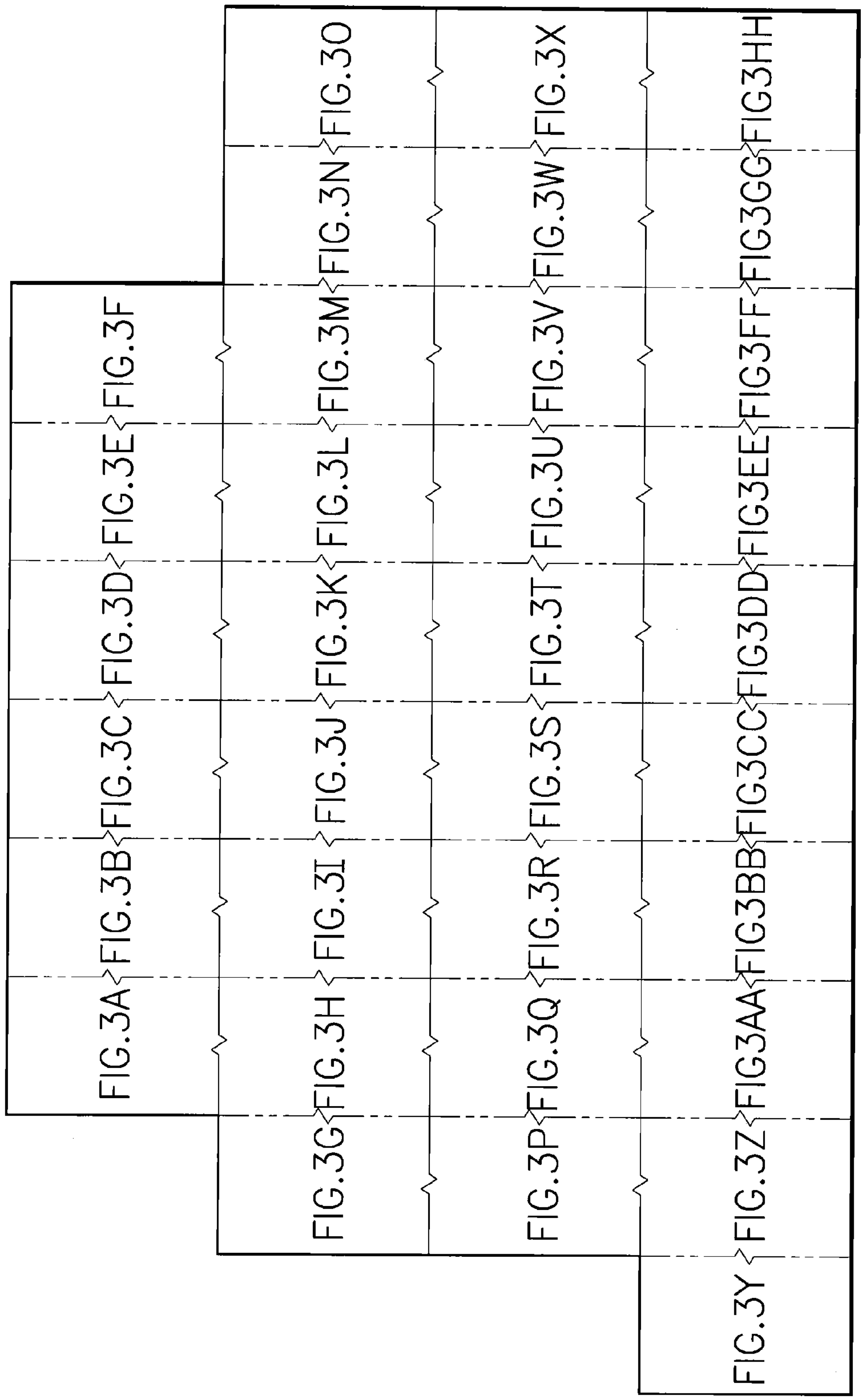
FIG. 3 is a map illustrating how FIGS. 3A-3HH are to be assembled, and once assembled, FIGS. 3A-3HH illustrate exemplary circuitry of a power supply apparatus according to one embodiment.
Figure 3A:
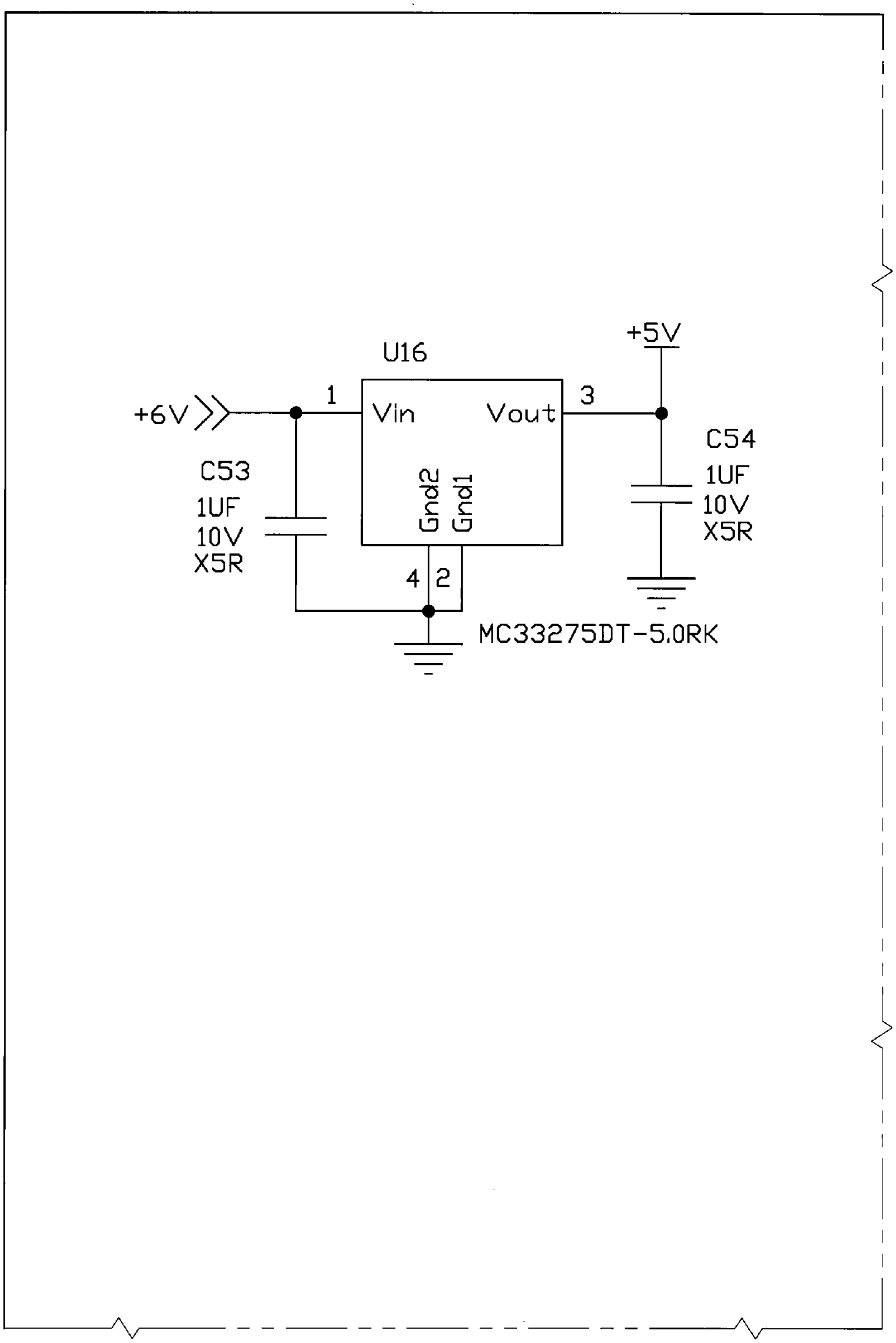
Figure 3B:
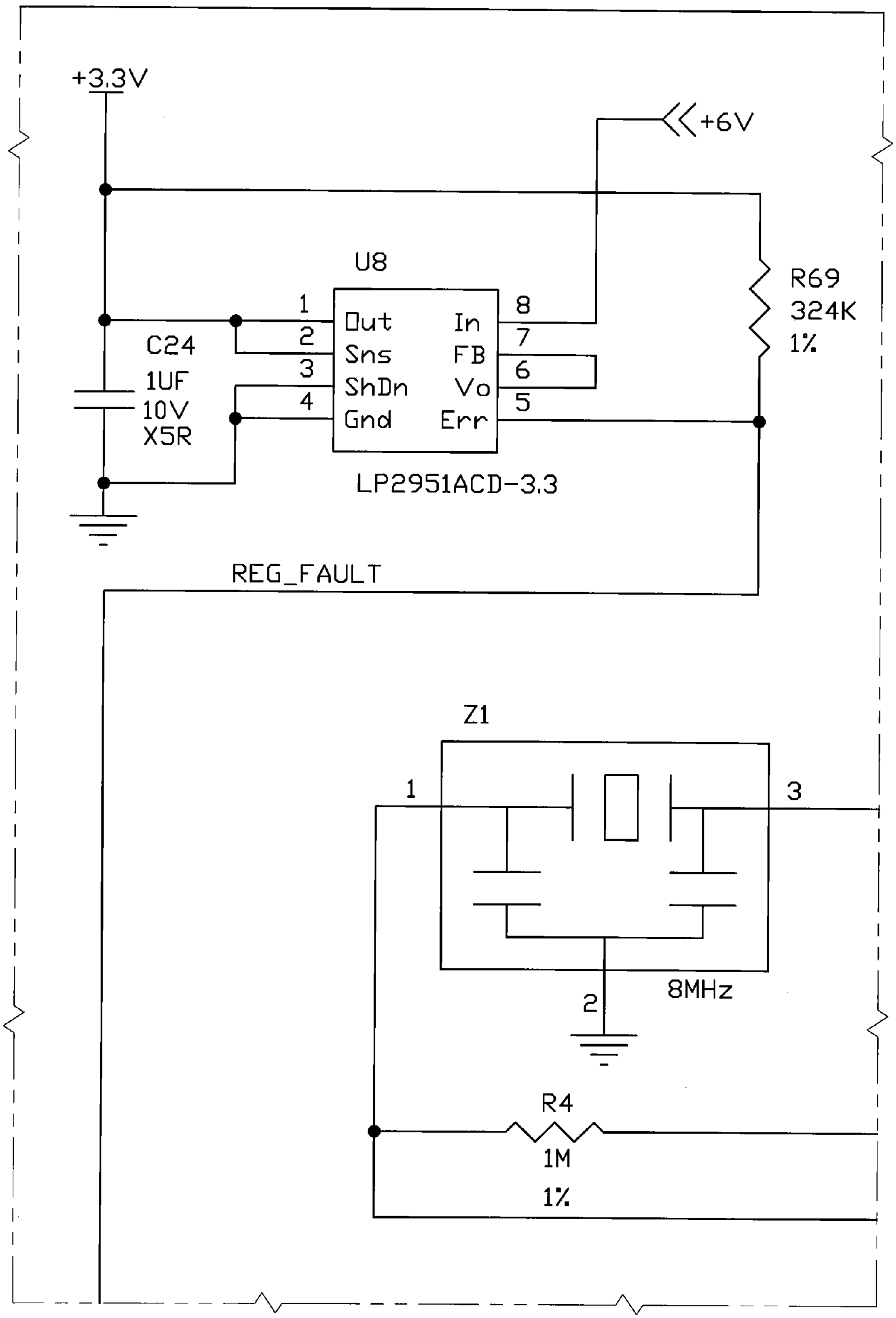
Figure 3C:
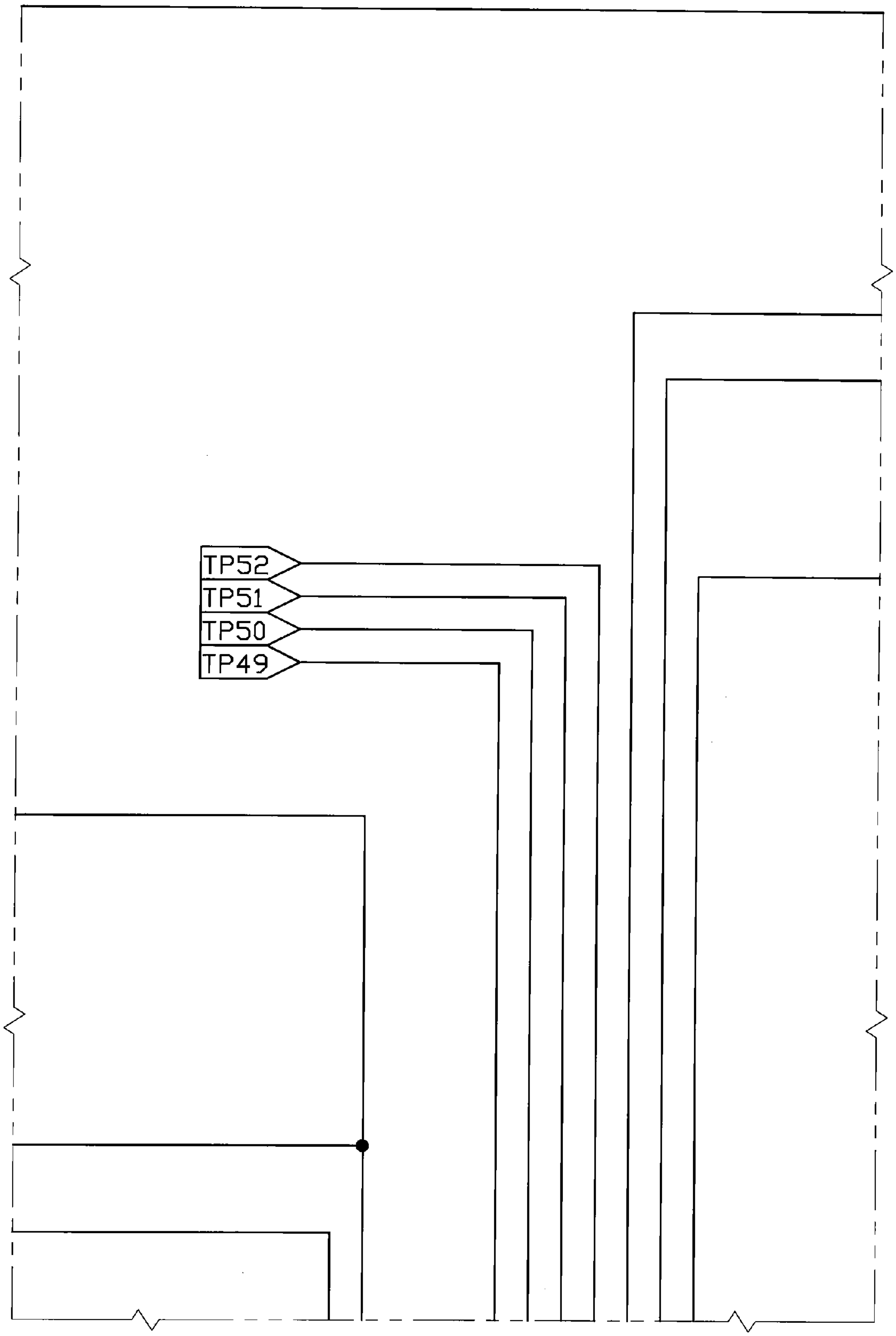
Figure 3D:
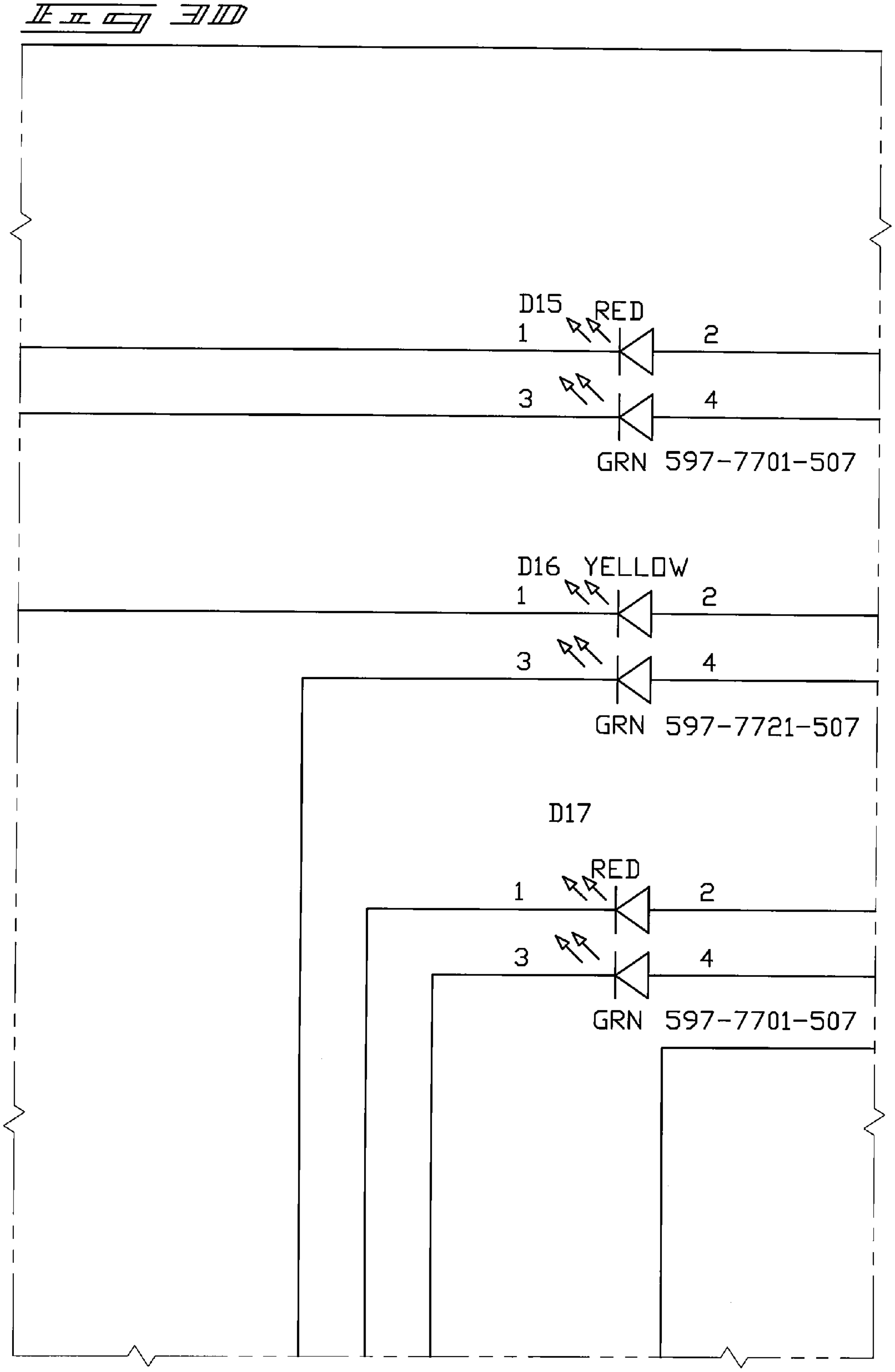
Figure 3E:
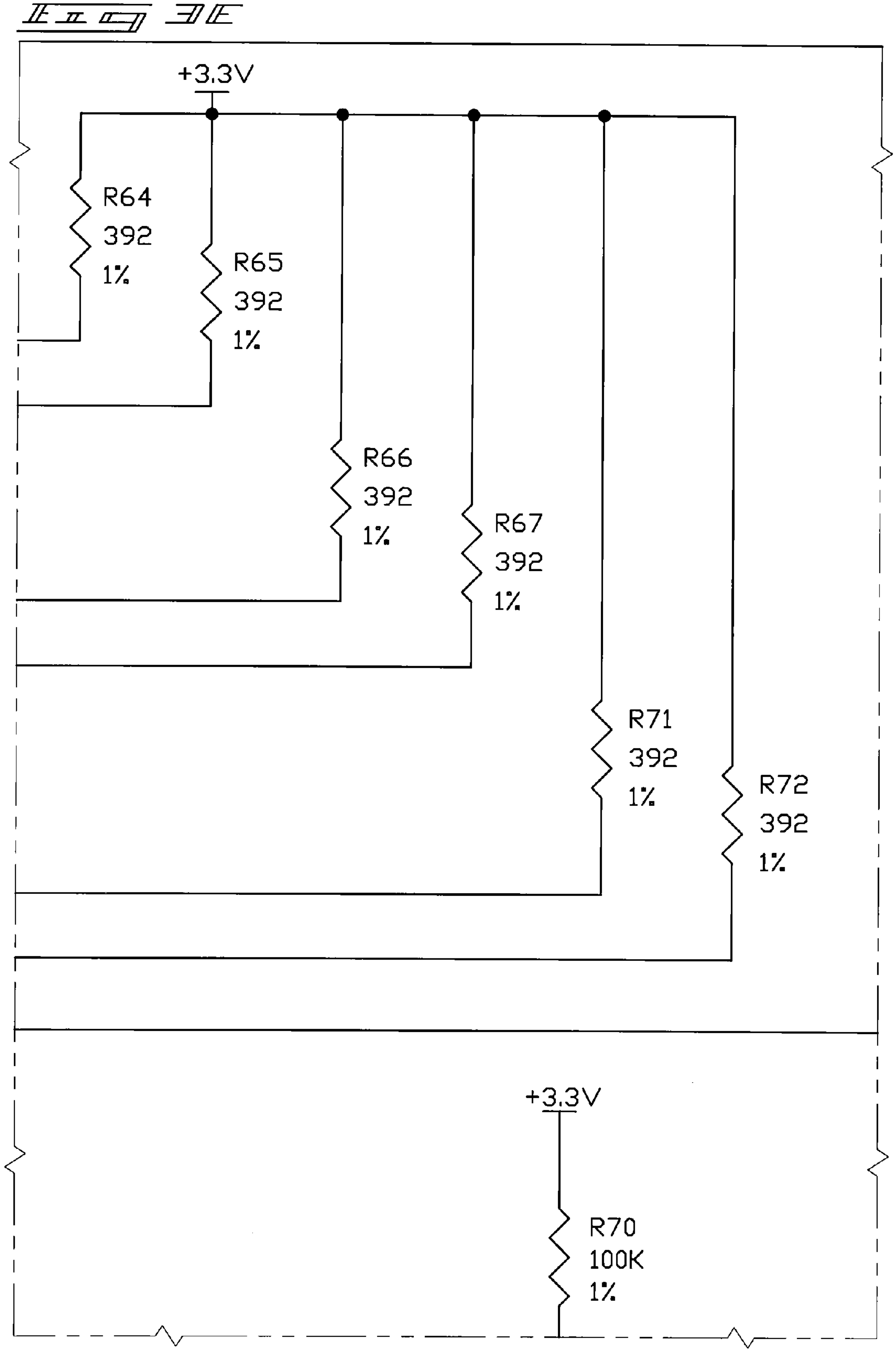
Figure 3F:
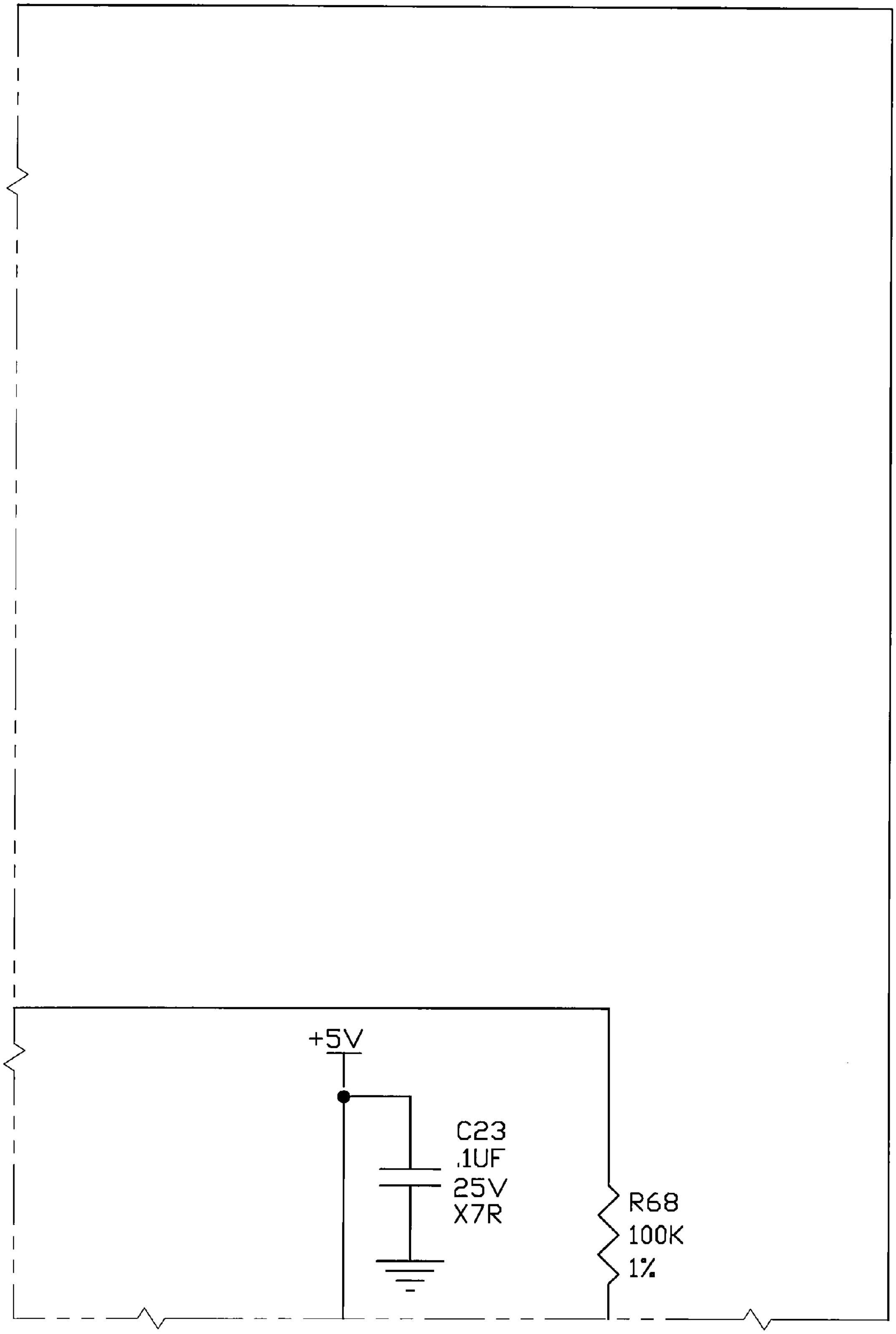
Figure 3G:
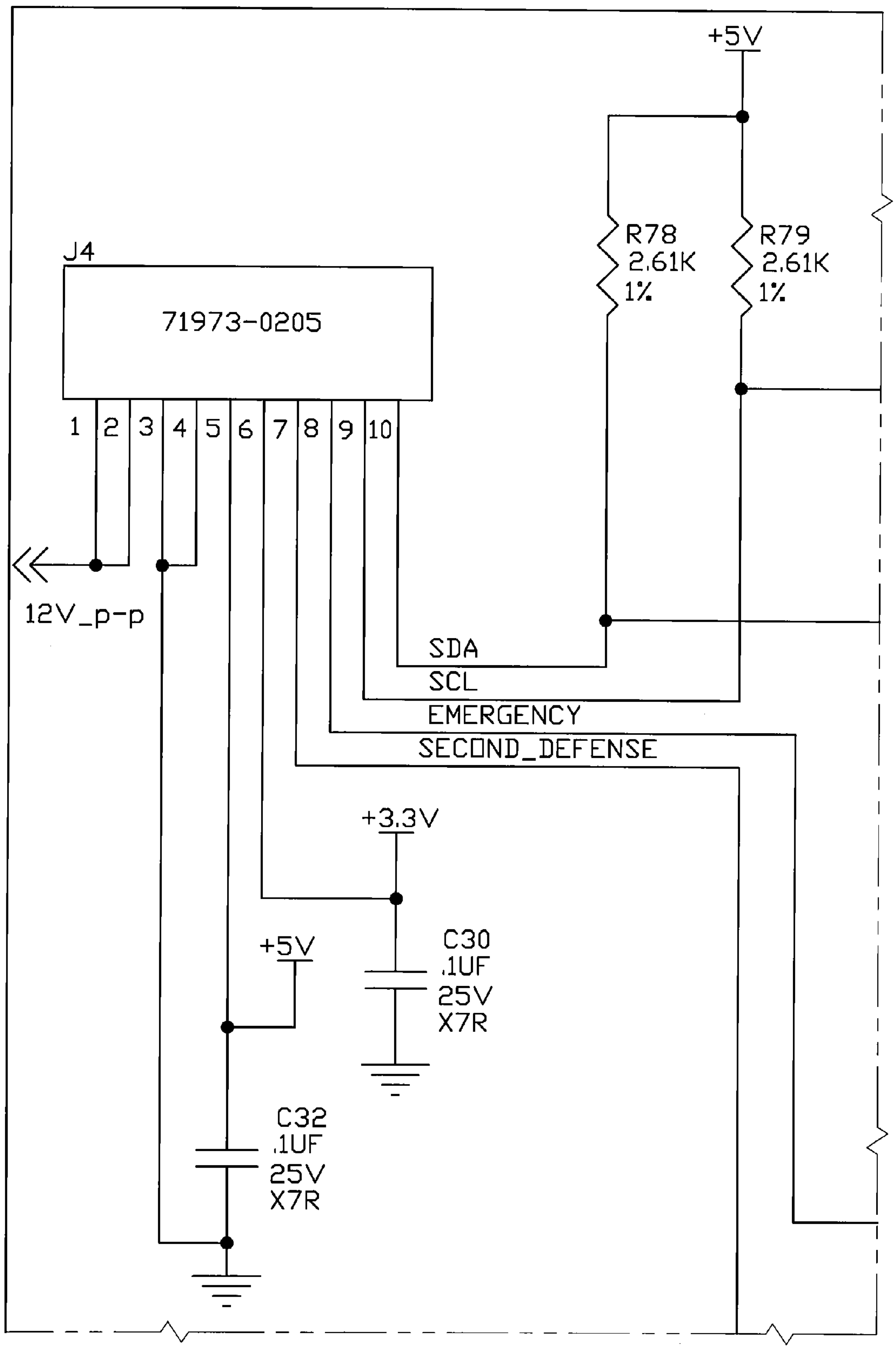
Figure 3H:
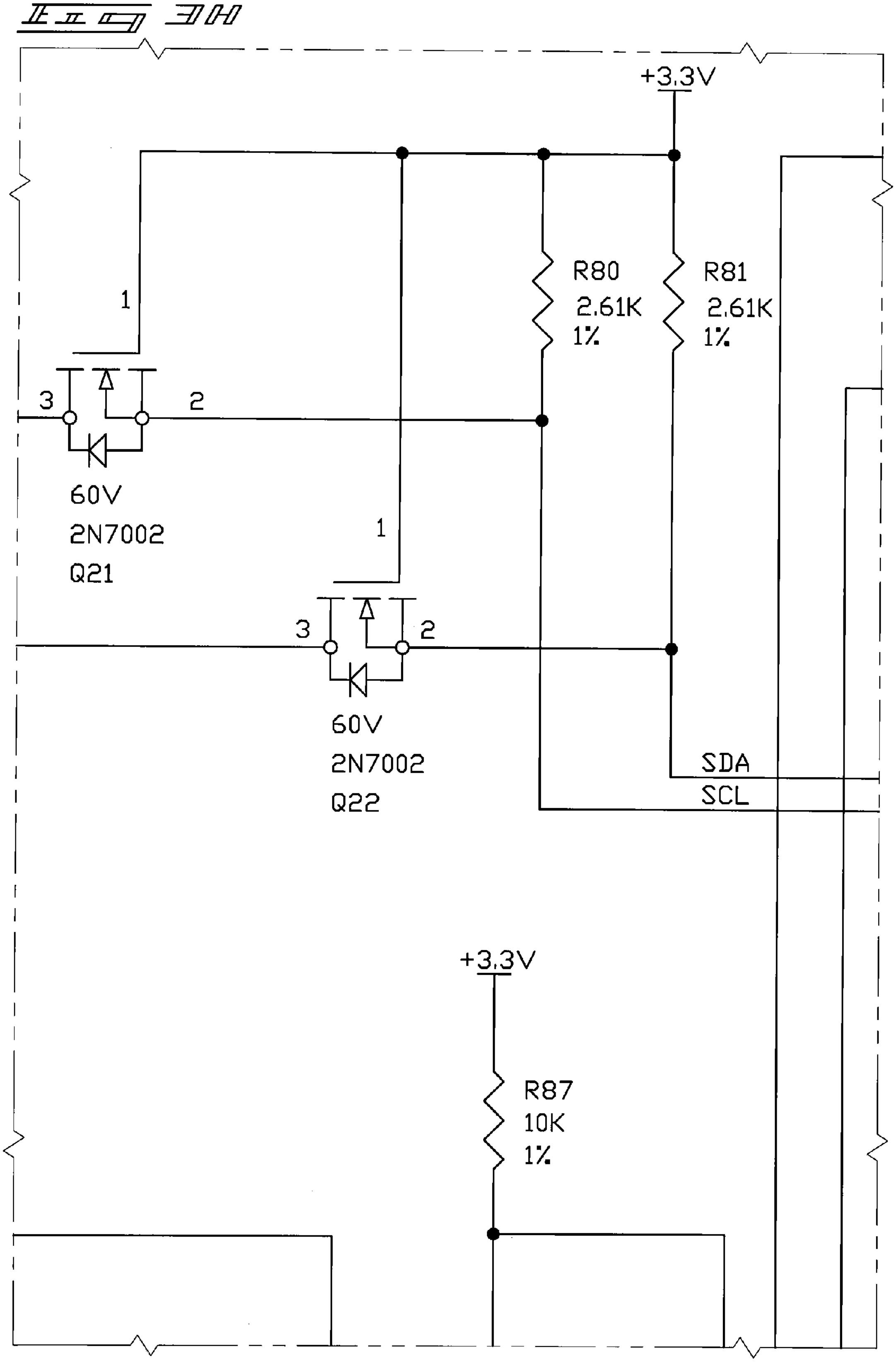
Figure 3I:
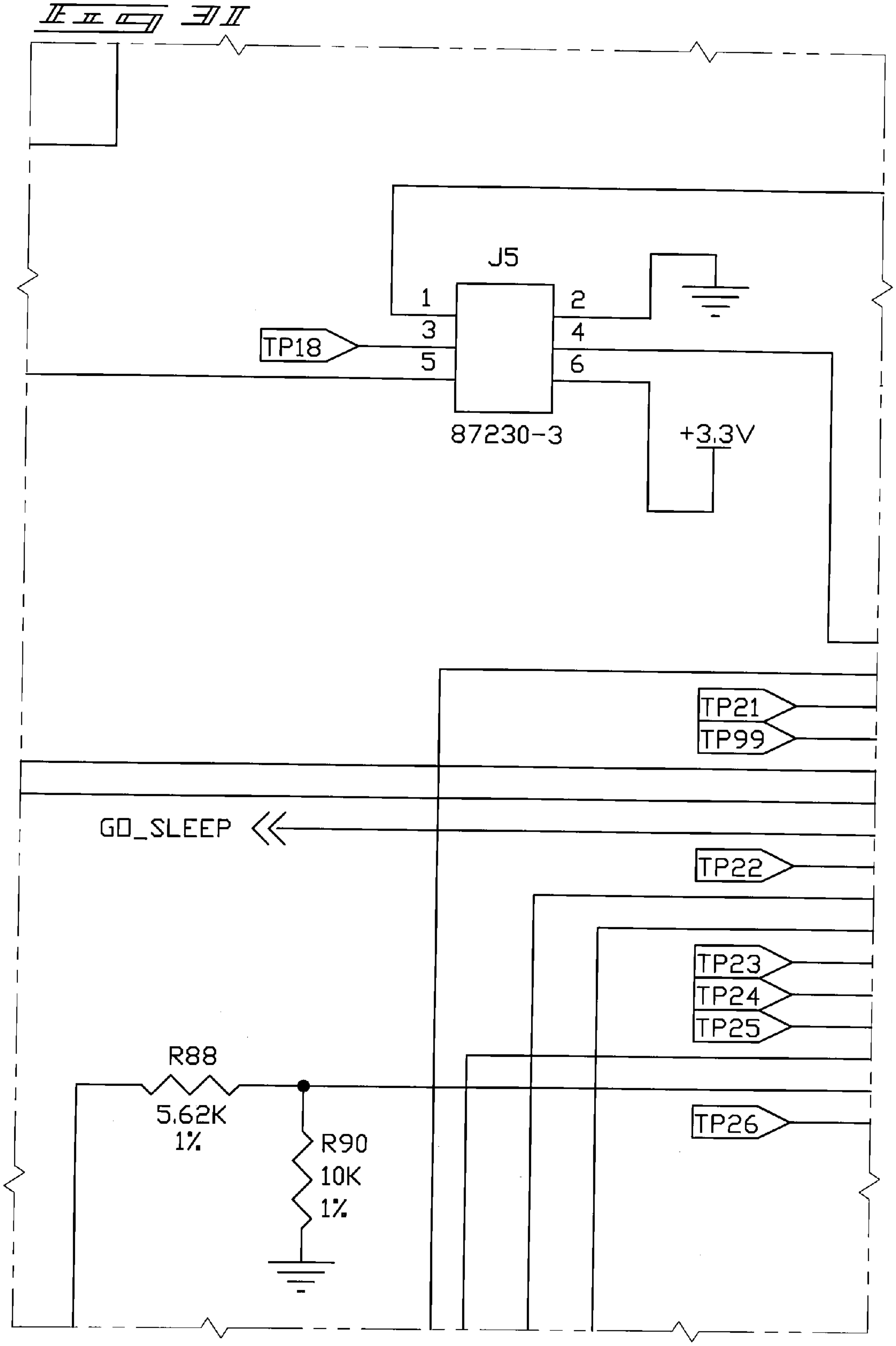
Figure 3D:
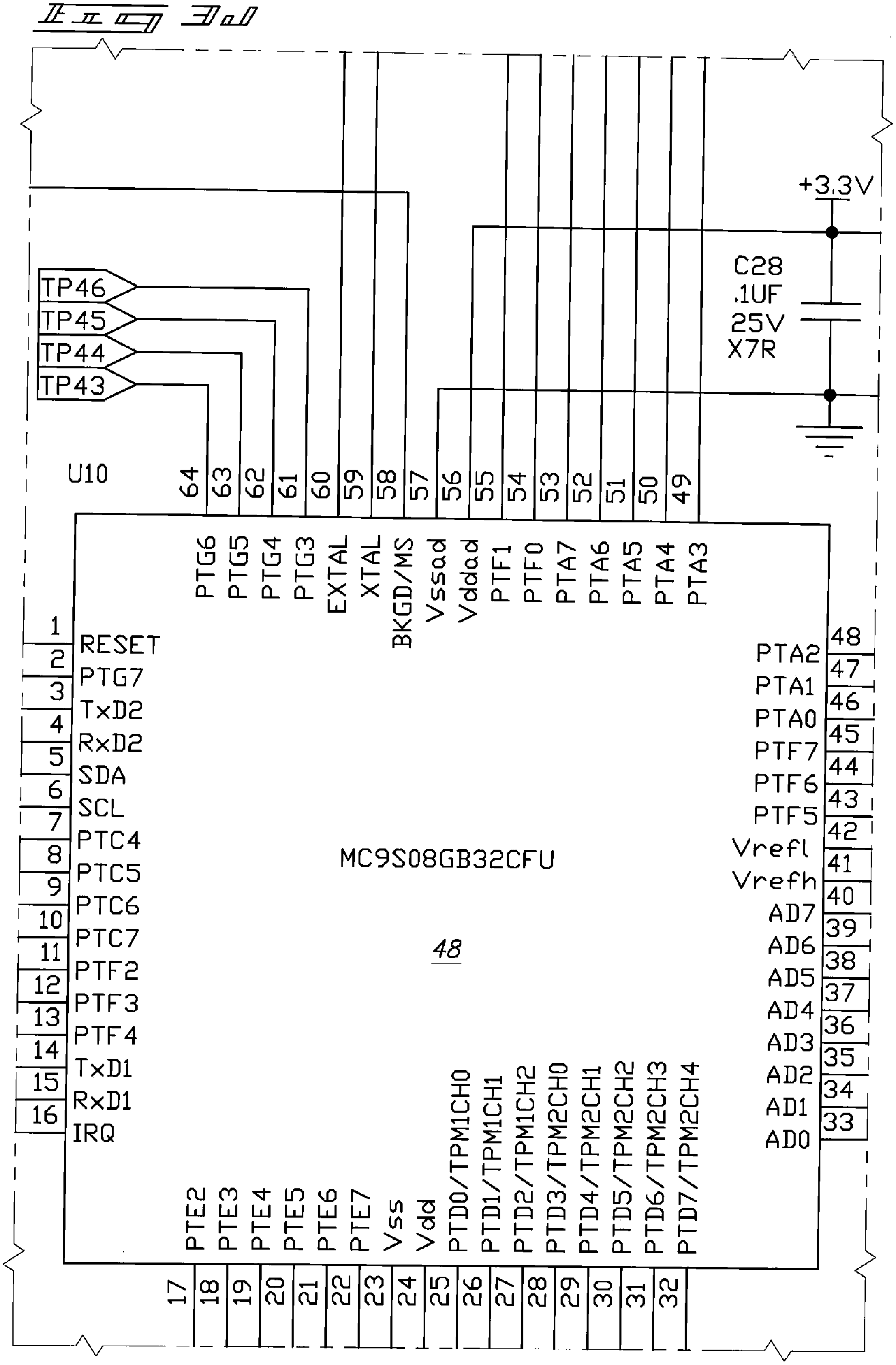
Figure 3K:
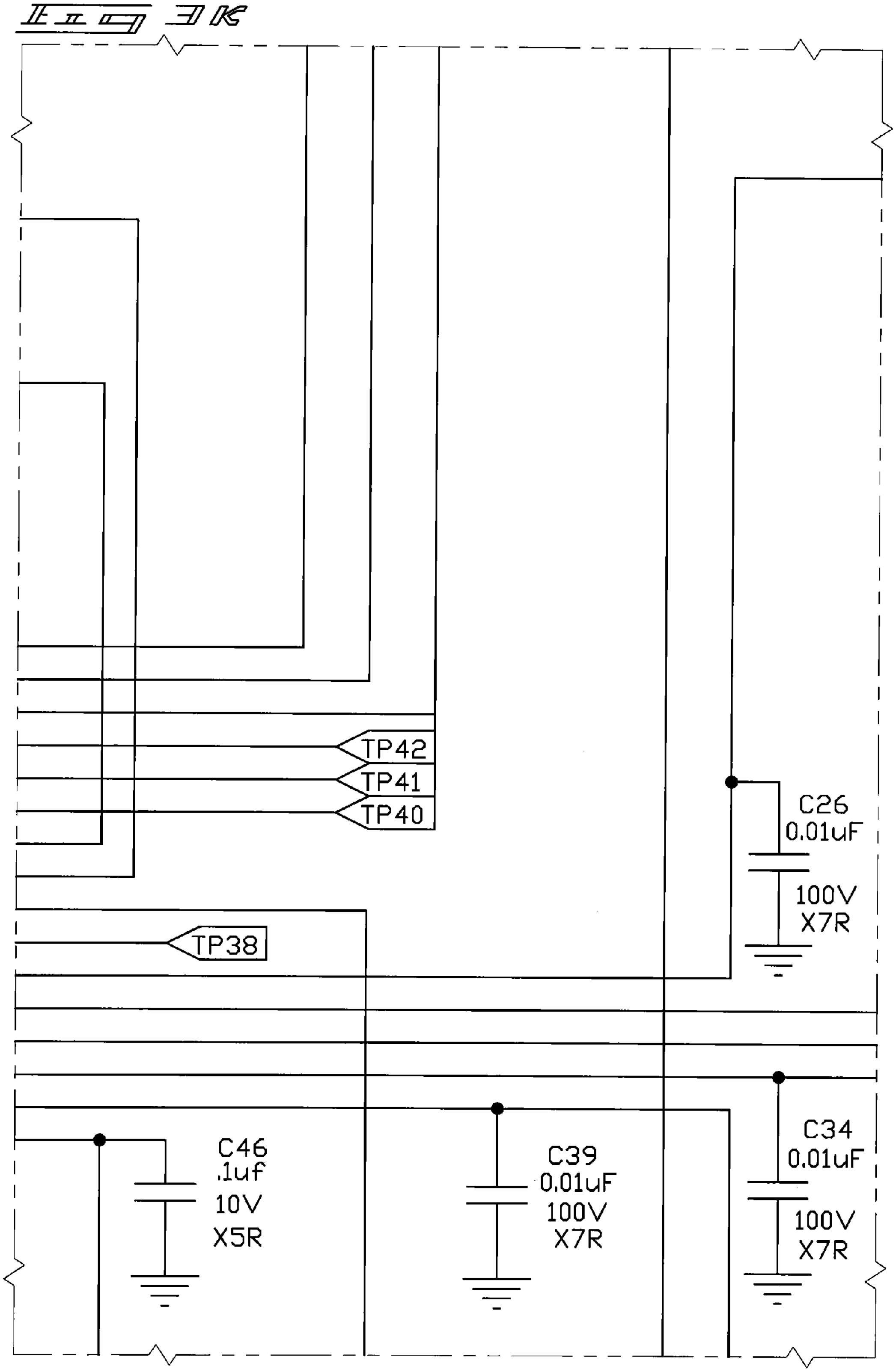
Figure 3L:
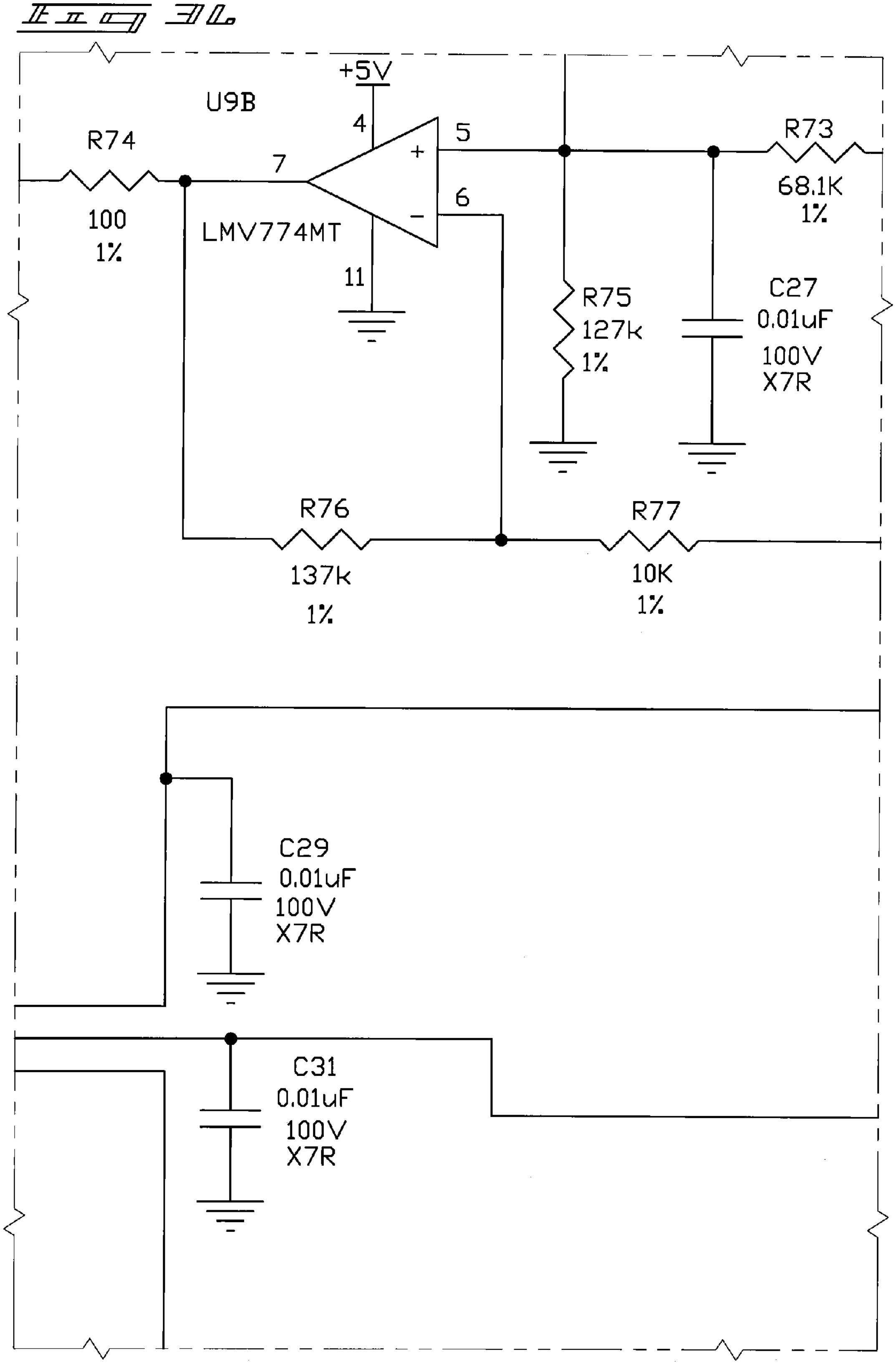
Figure 3M:
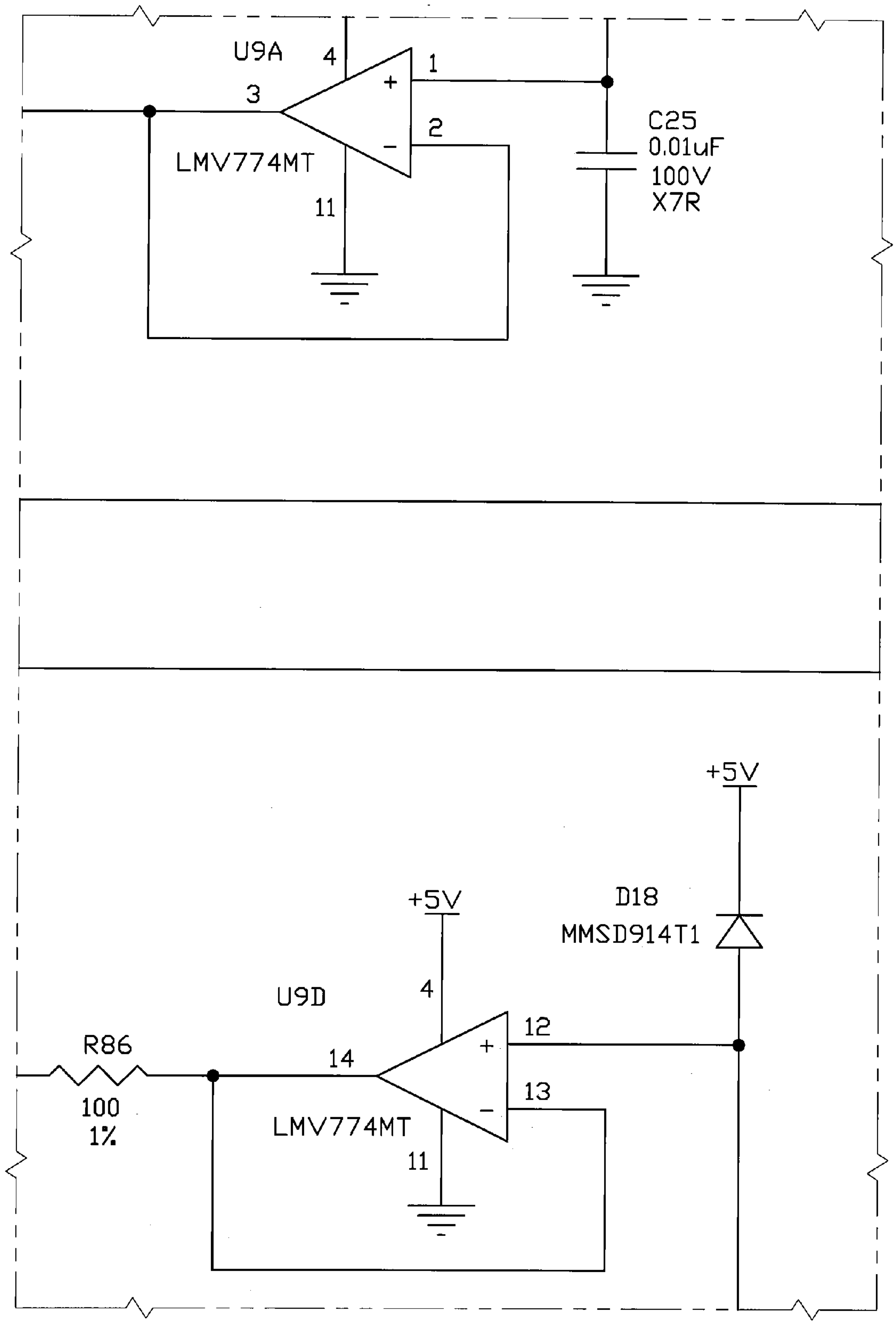
Figure 3N:
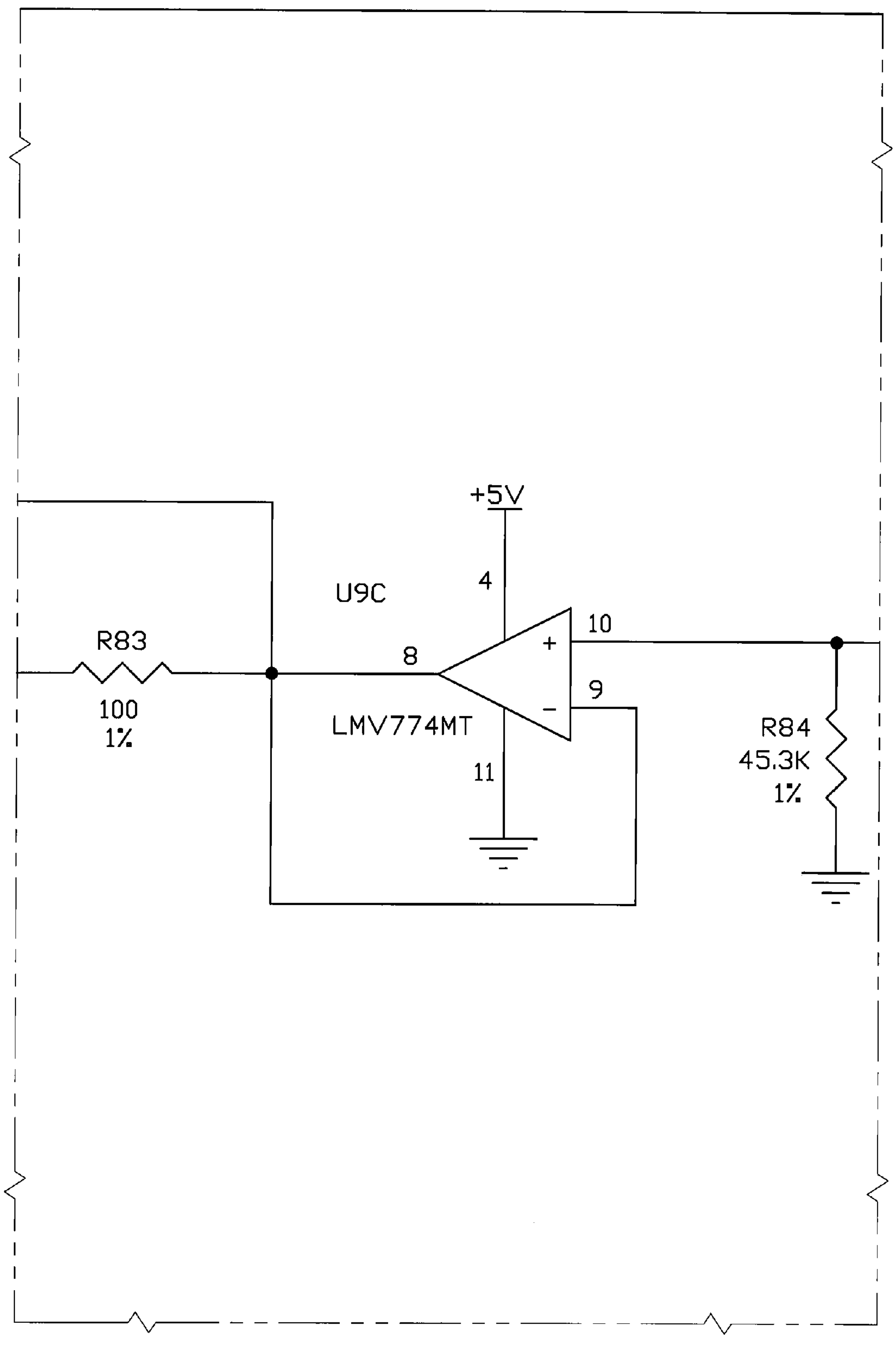
Figure 30:
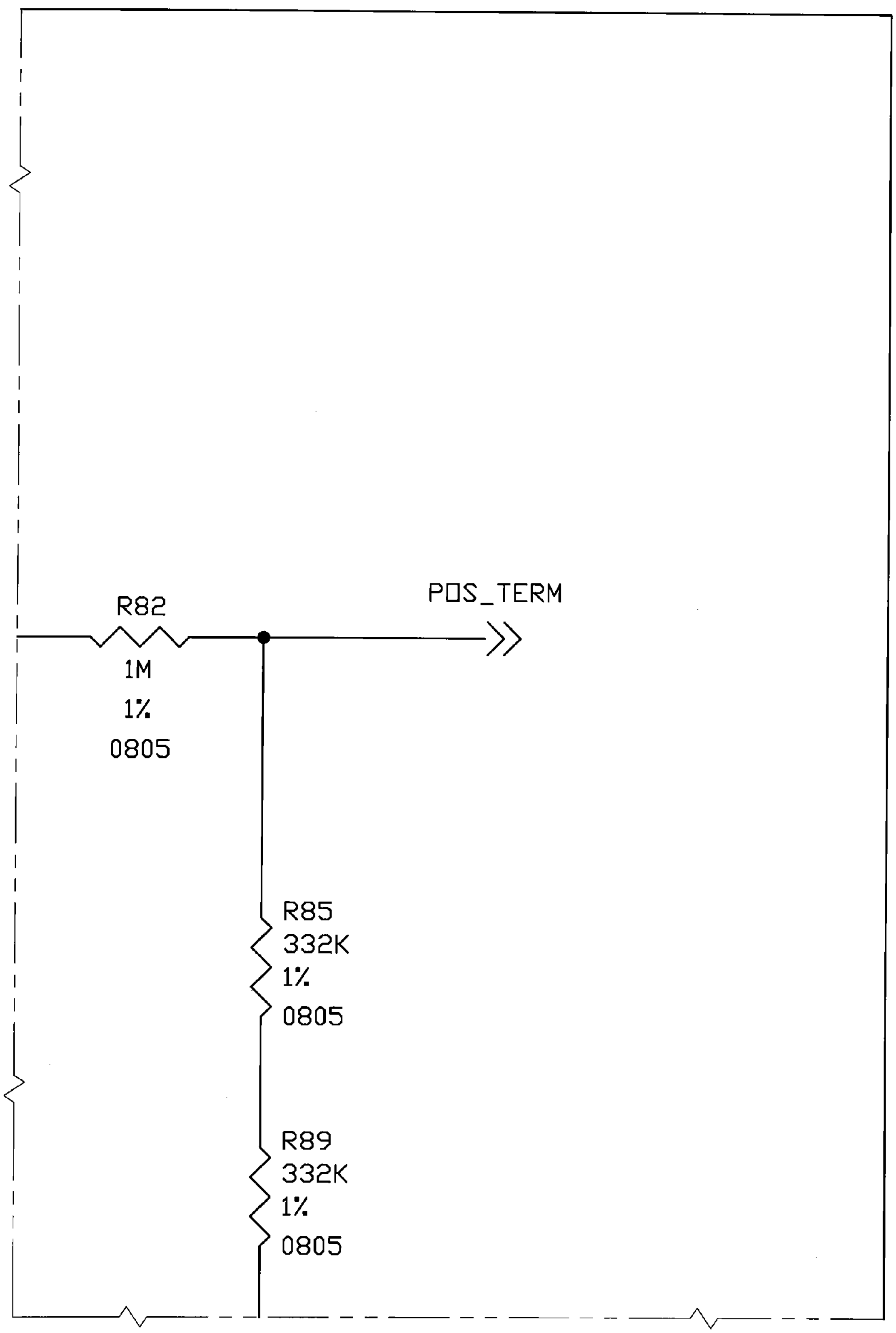
Figure 3P:
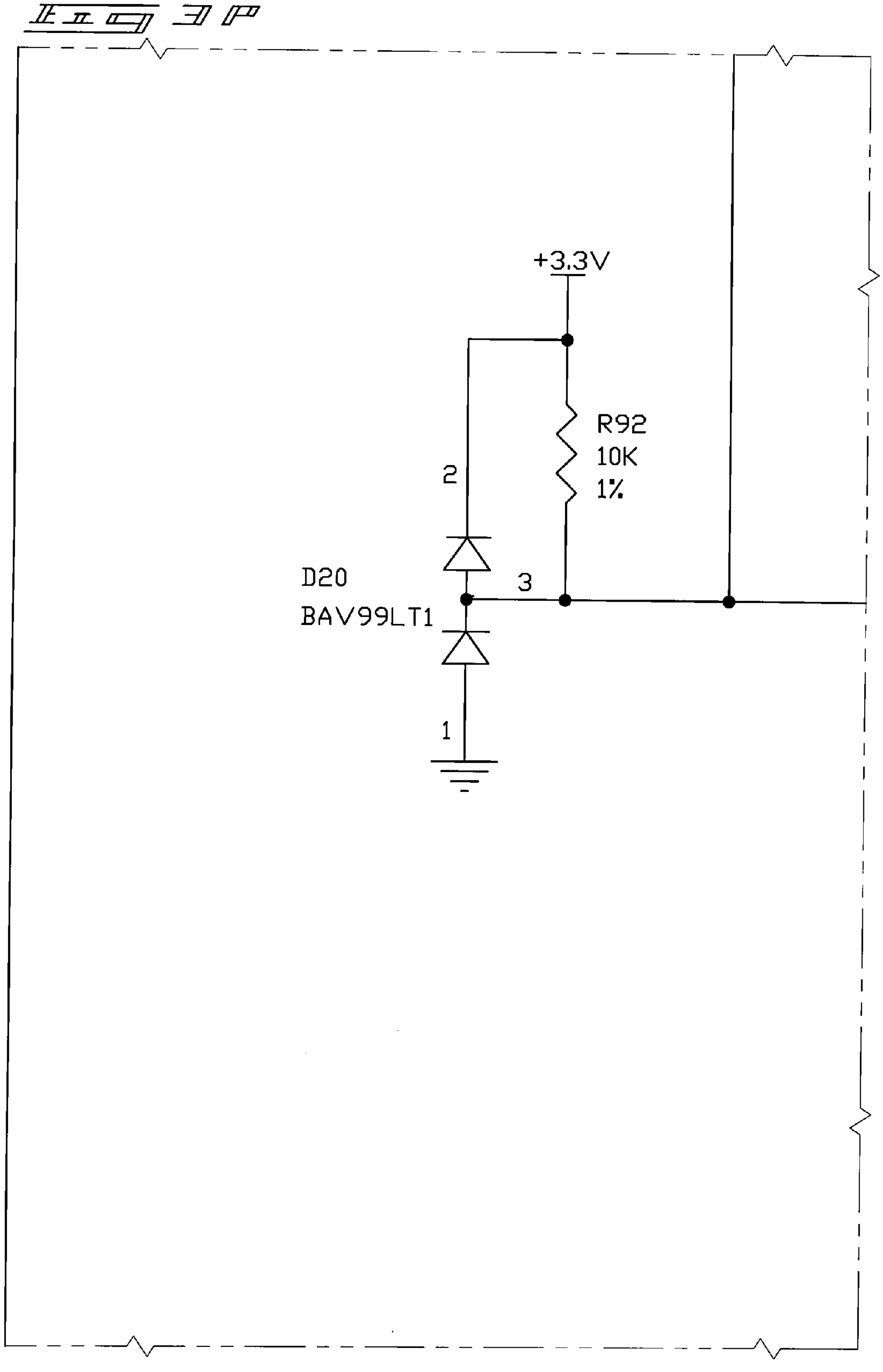
Figure 3Q:
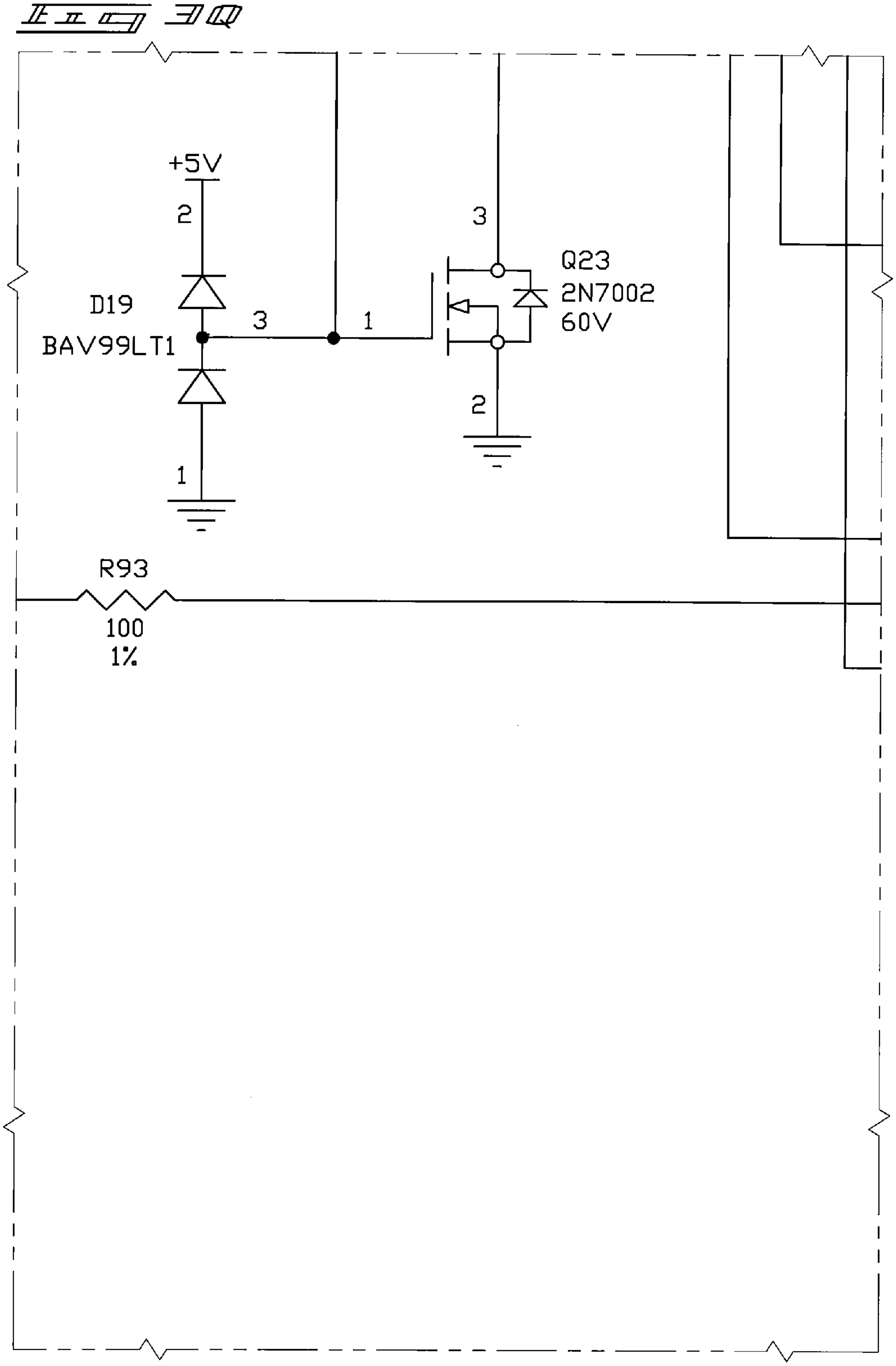
Figure 3R:
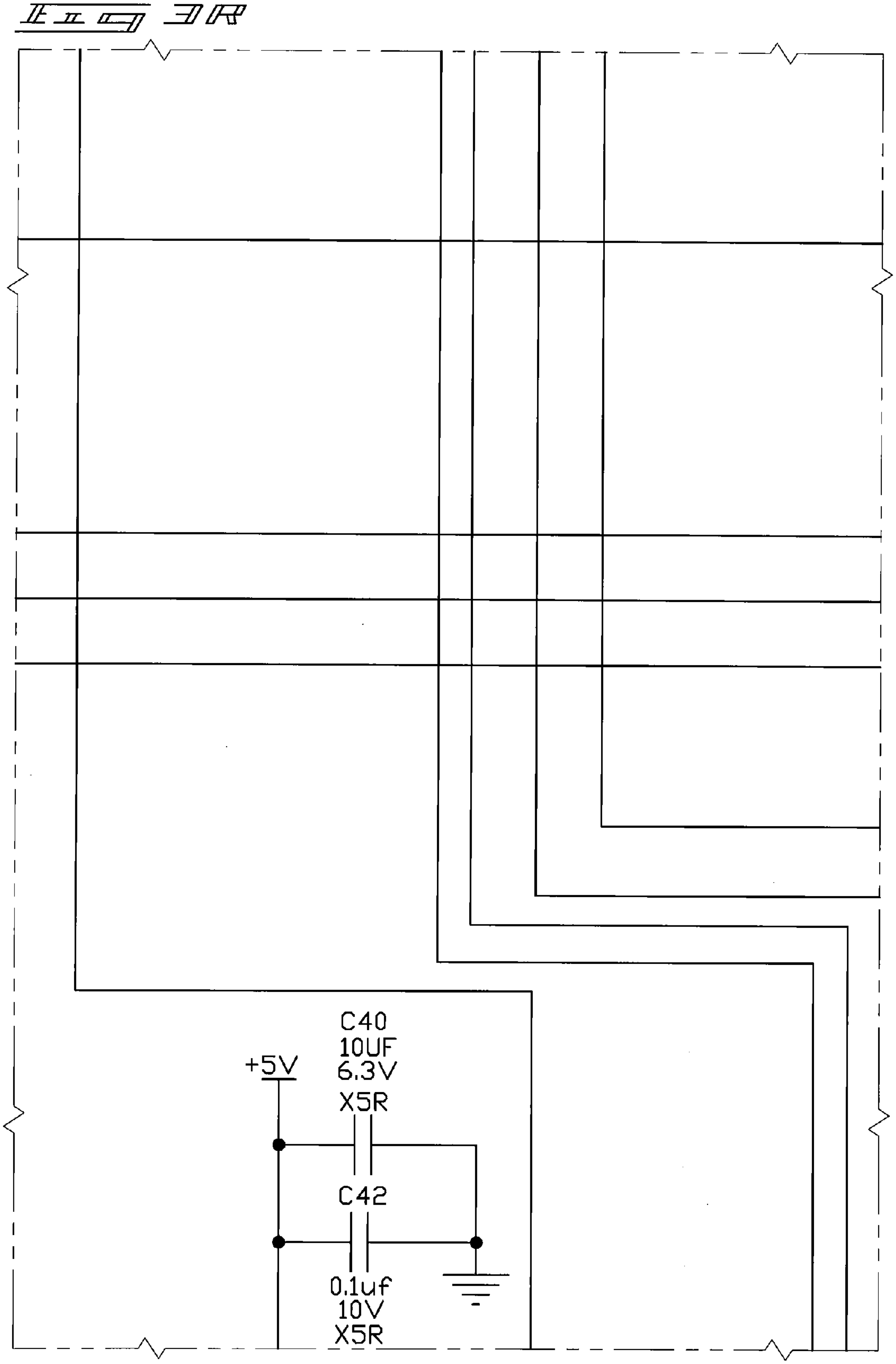
Figure 35:
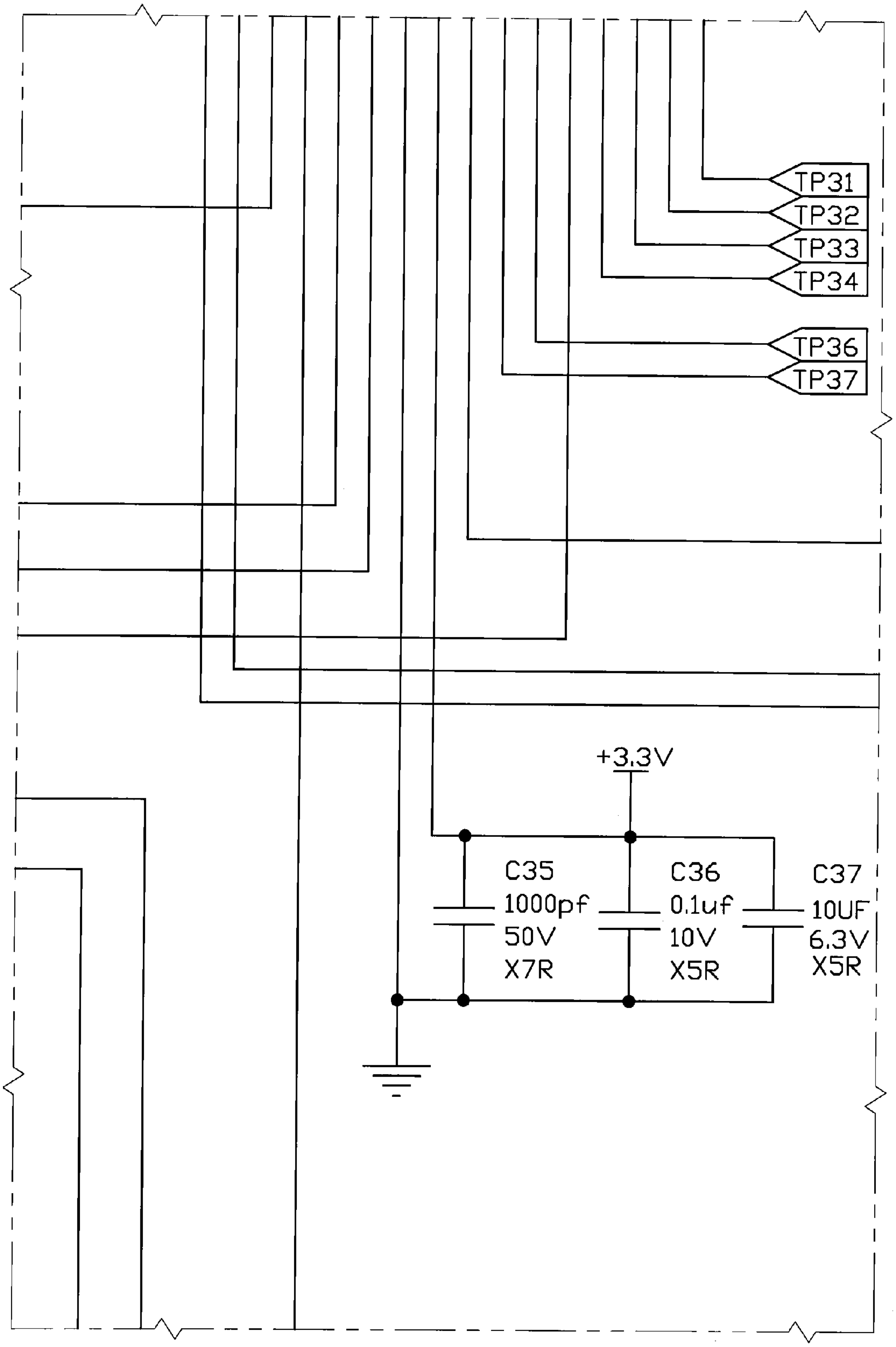
Figure 3T:
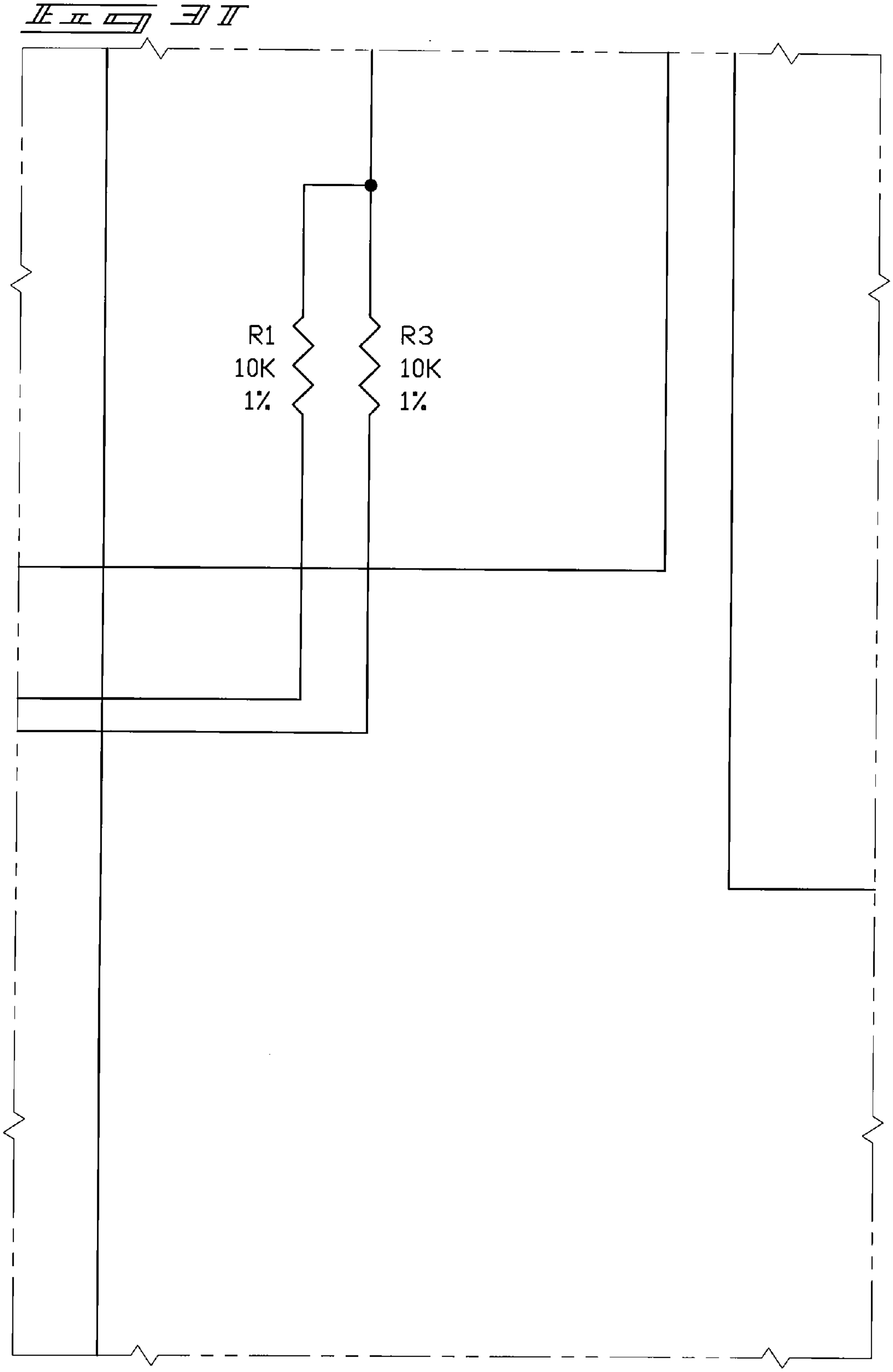
Figure 3W:
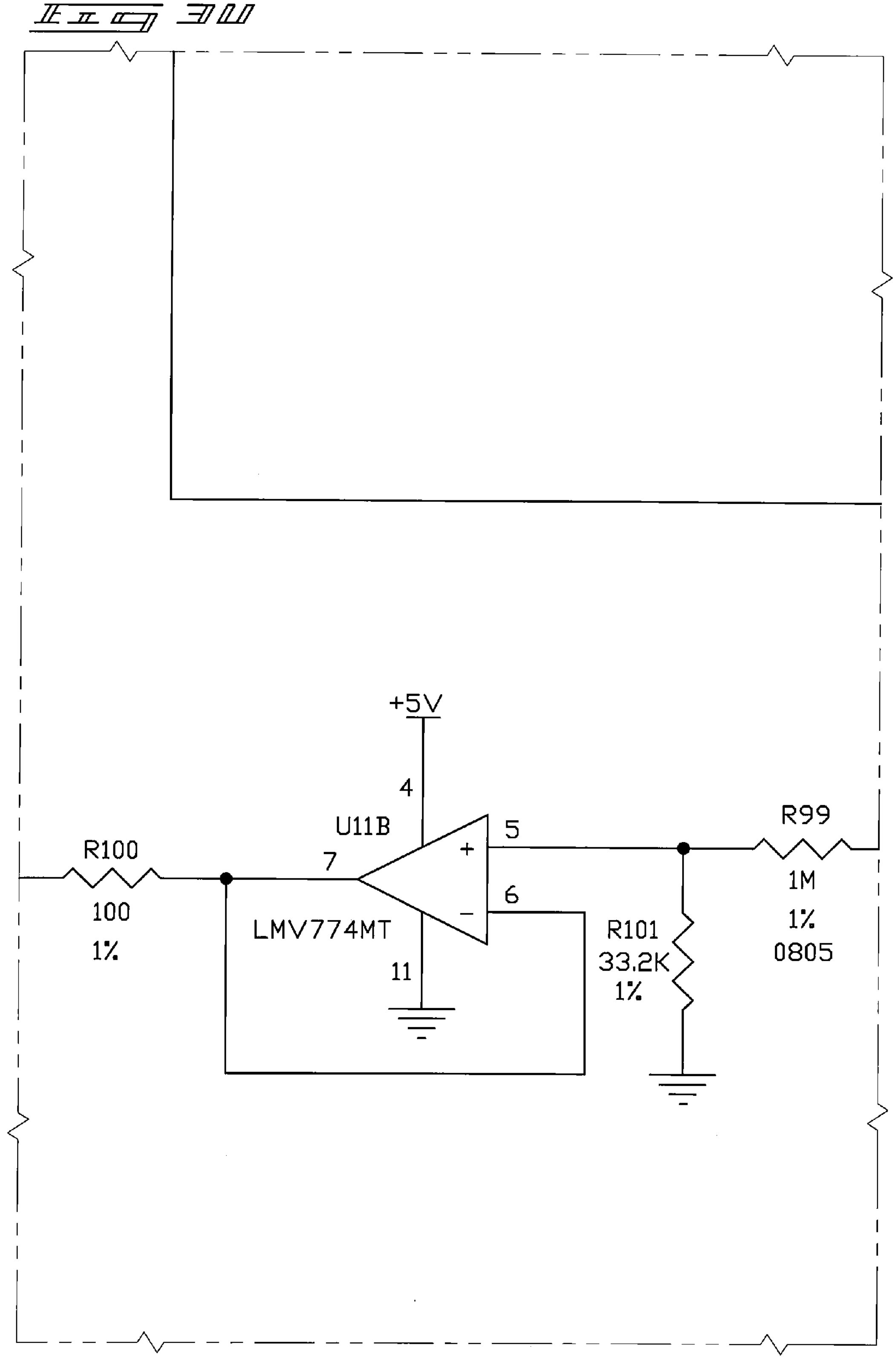

The +75 Vdc electrical energy described above from the power supply 54 may be utilized to charge an electrolytic capacitor C38 of FIG. 3W that is used for energy storage for a coil driver of switching device 52 (e.g., an exemplary coil driver includes Q24, Q25, Q27, Q28 of FIG. 3). Through utilization of voltage from power supply 54, it is further possible to use the same type of switching device 52 for different battery voltages (e.g., 8-16 devices 62).

Figure 3V:
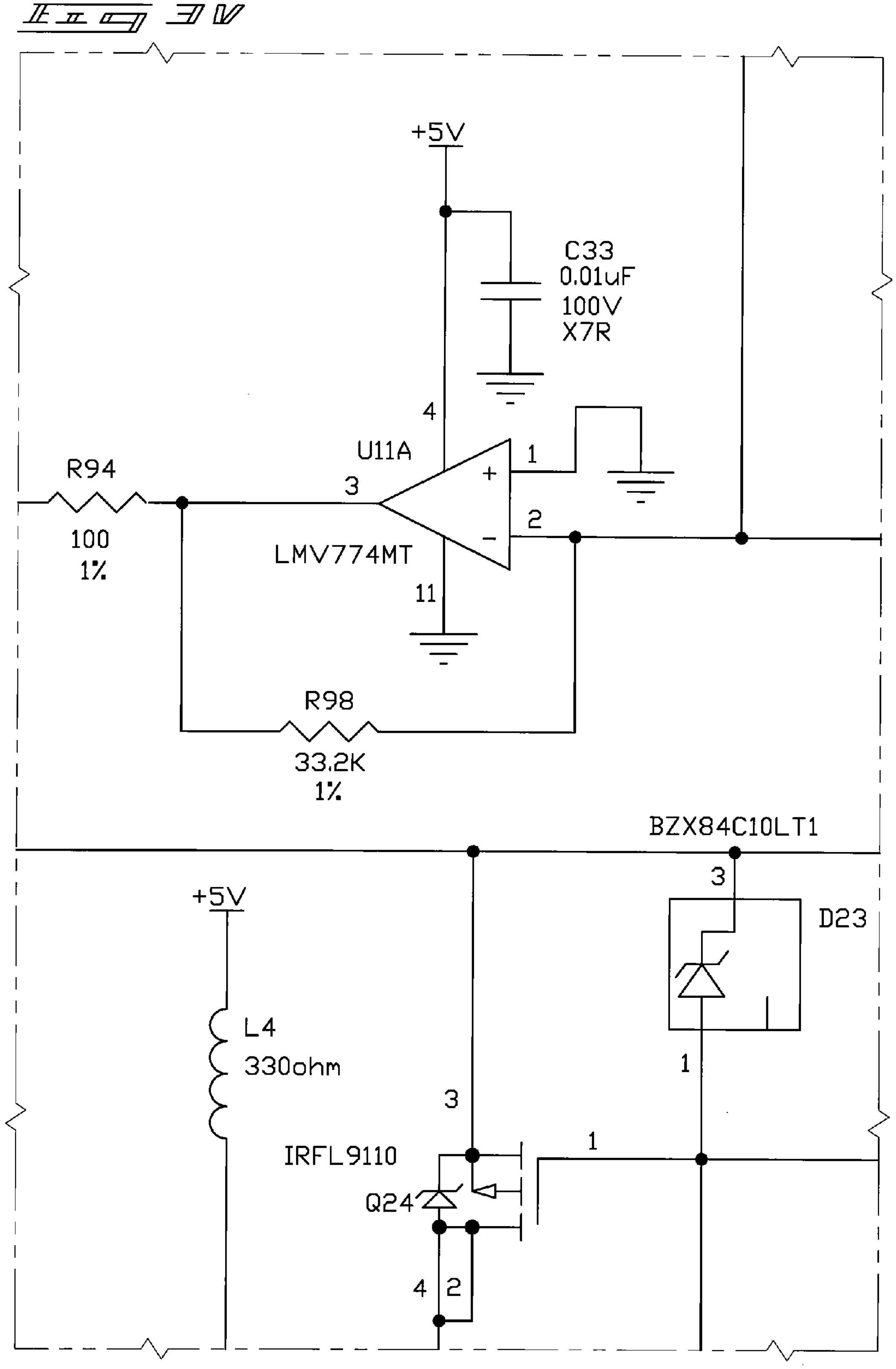
Figure 3W:
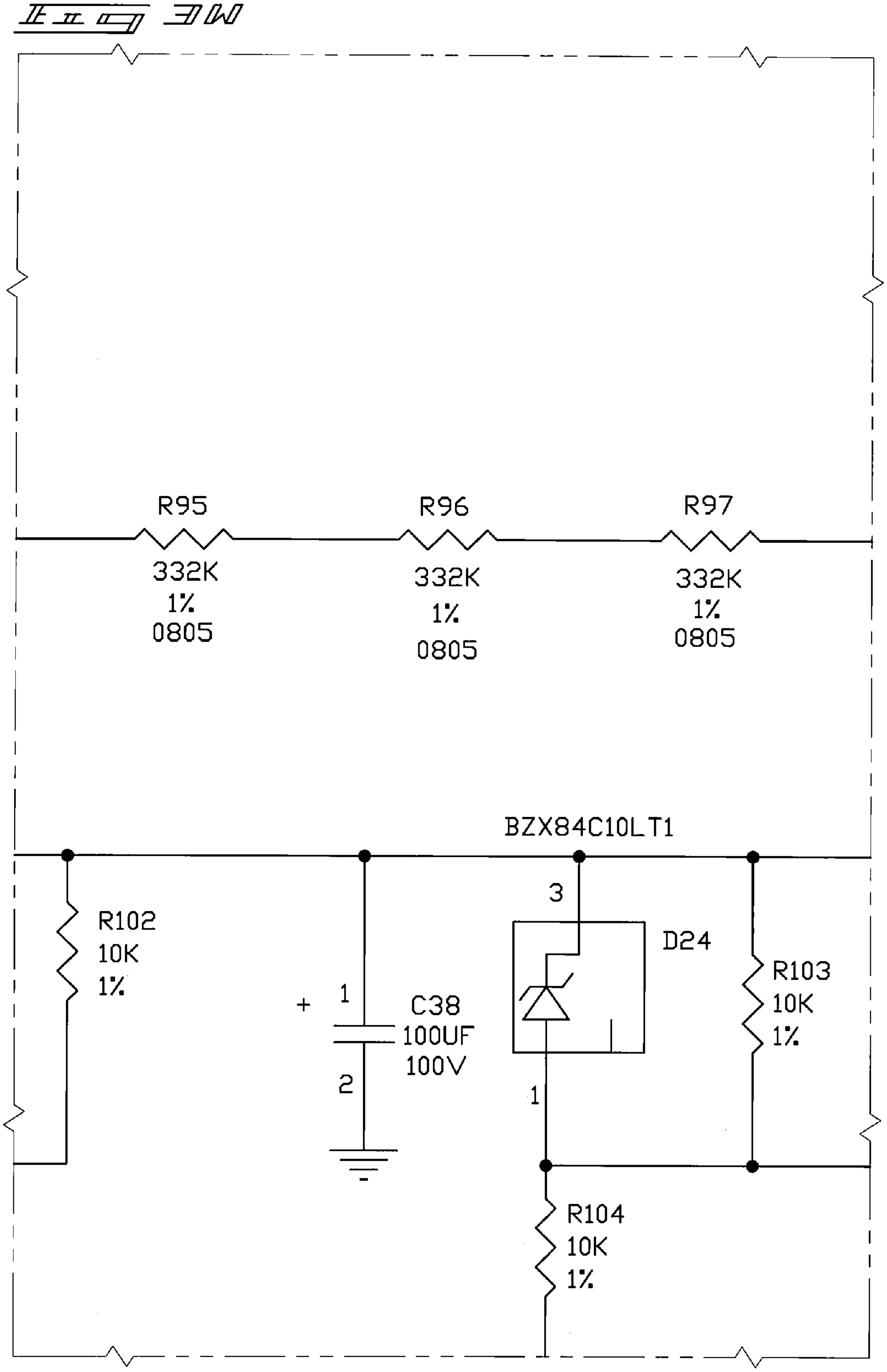
Figure 3X:
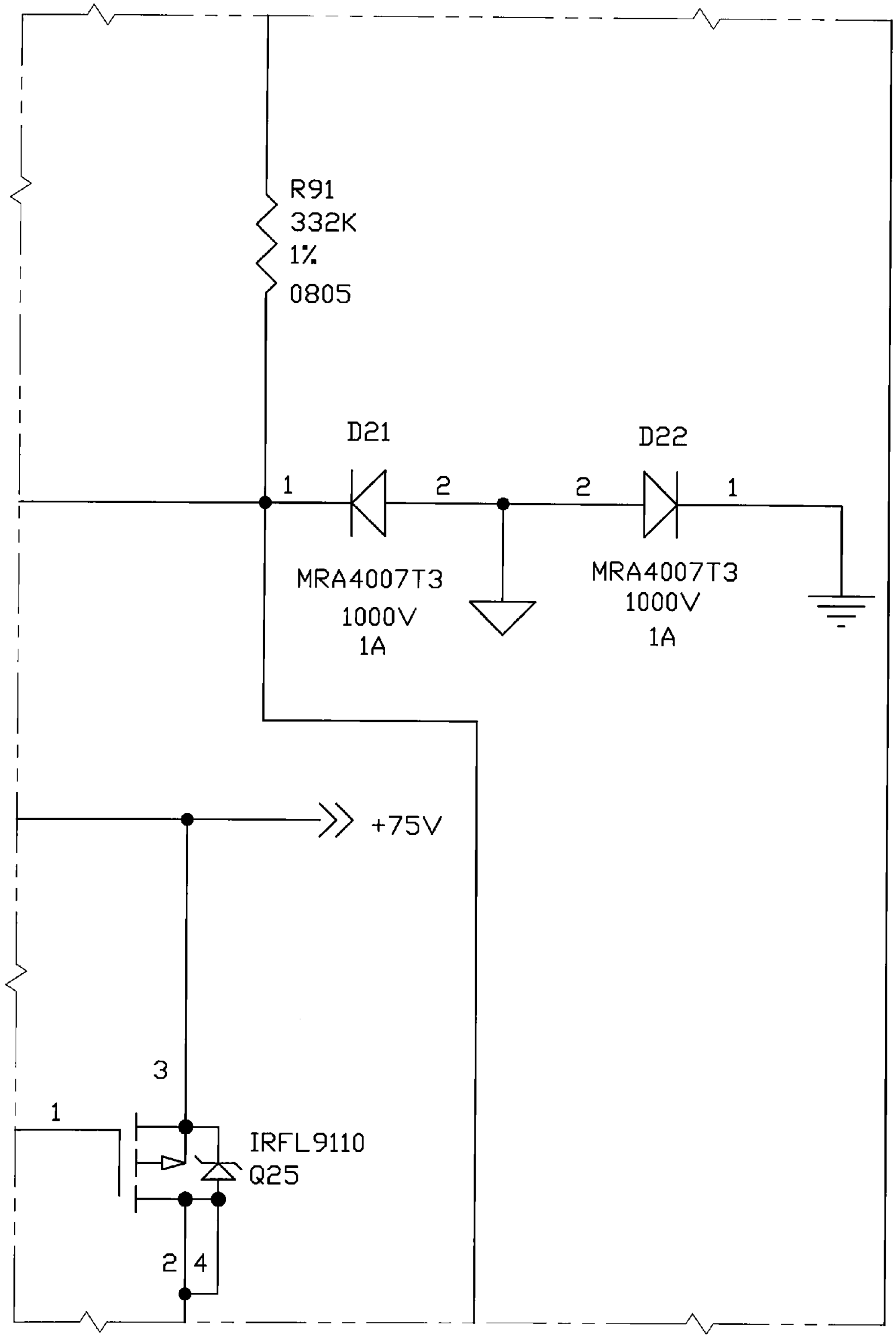

Power supply 54 normally draws power from storage circuitry 60 (e.g., through a diode D22 on FIG. 3X in one embodiment). If the voltage of storage circuitry 60 drops below a set level (e.g., determined by comparator U6 of FIG. 6X), then power supply 54 is turned off by control circuitry 46 wherein the only draw upon the storage circuitry 60 is comparator U6. Also, switching device 52 may be opened. The set level may correspond to a minimal threshold voltage wherein battery assembly 20 provides operational electrical energy for use by electrical entity 14 or other load.

As mentioned above, the switching device 52 may be opened if the voltage of storage circuitry 60 drops below a threshold to avoid or reduce additional discharge of storage circuitry 60. Control circuitry 46 of assembly 20 may detect the presence of charging energy and close switching device 52 to enable charging of storage circuitry 60 in one embodiment. For example, in one embodiment, an output voltage of charge circuitry 30 is provided to an input of power supply 54 through diode D21 of FIG. 3X according to one exemplary embodiment. The charge energy of a sufficient voltage (e.g., greater than the threshold of comparator U6) while result in enablement of power supply 54 and control circuitry 46. Further, while switching device 52 remains open, power supply 54 draws current from the charge circuitry 30 and not storage circuitry 60. Thereafter, processor 48 may go through a start-up routine and detect that the charge voltage is present on power terminals 40, 42 and switching device 52 may be closed so charge current may flow into storage circuitry 60.

In one embodiment, processor 48 may sense available charge voltage (e.g., using U11A and U9D of respective FIGS. 3V and 3M in the described embodiment). Processor 48 may measure the two analog signals and with switching device 52 open, determine if there is charge voltage upon terminals 40, 42, if there is only a load and no charge voltage, or if there is nothing attached to the power terminals 40, 42.

As mentioned above, individual ones of assemblies 20 may be selectively provided into a sleep mode of operation wherein power consumption of the respective battery assembly 20 is reduced compared with higher modes of operation. While in sleep mode, the average current drawn from storage circuitry 60 is reduced to reduce the chances of control circuitry 46 completely discharging storage circuitry 60 (e.g., while in storage, energy from source 36 is absent, or otherwise not used for extended periods of time).

Figure 3Y:
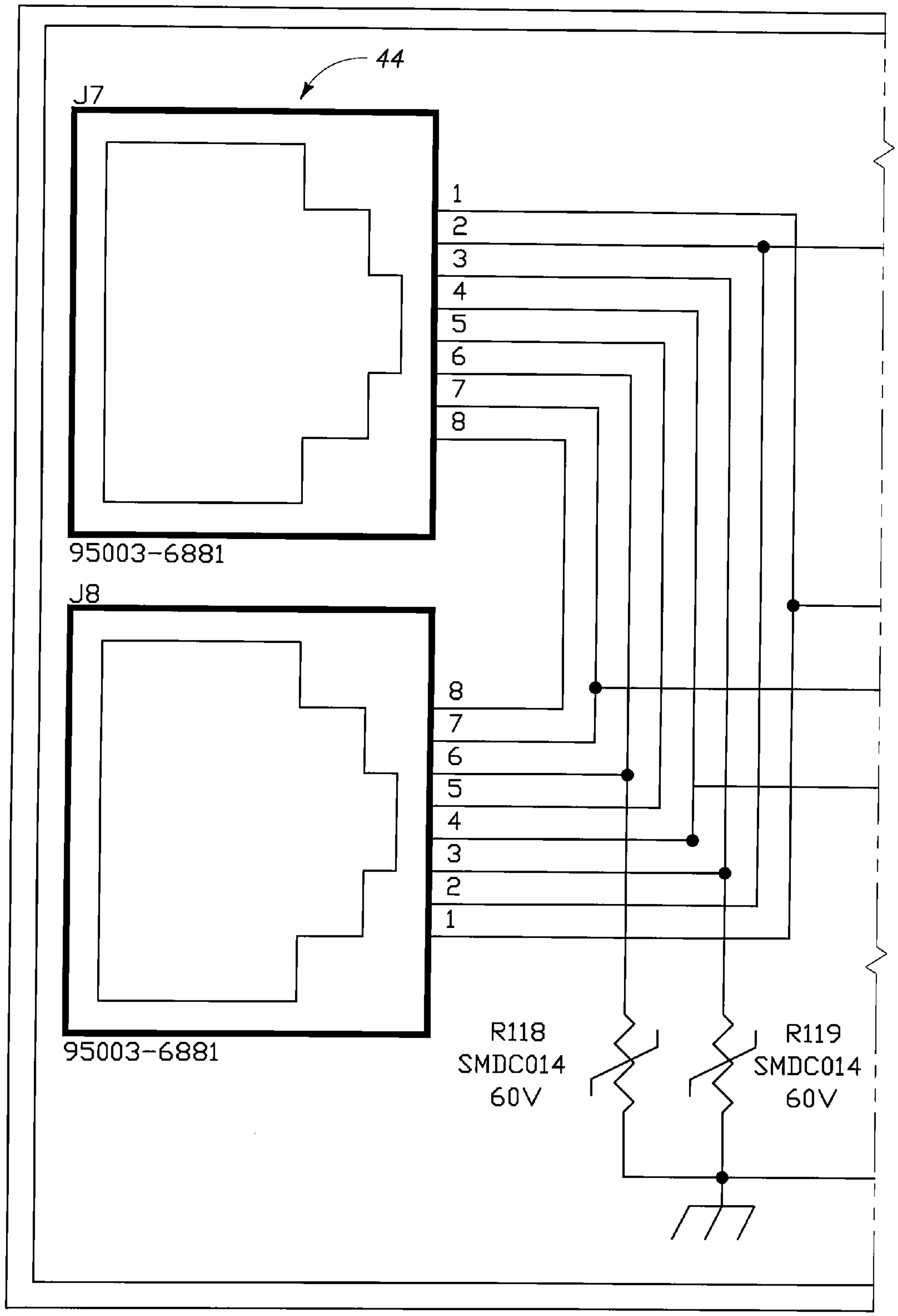
Figure 3Z:
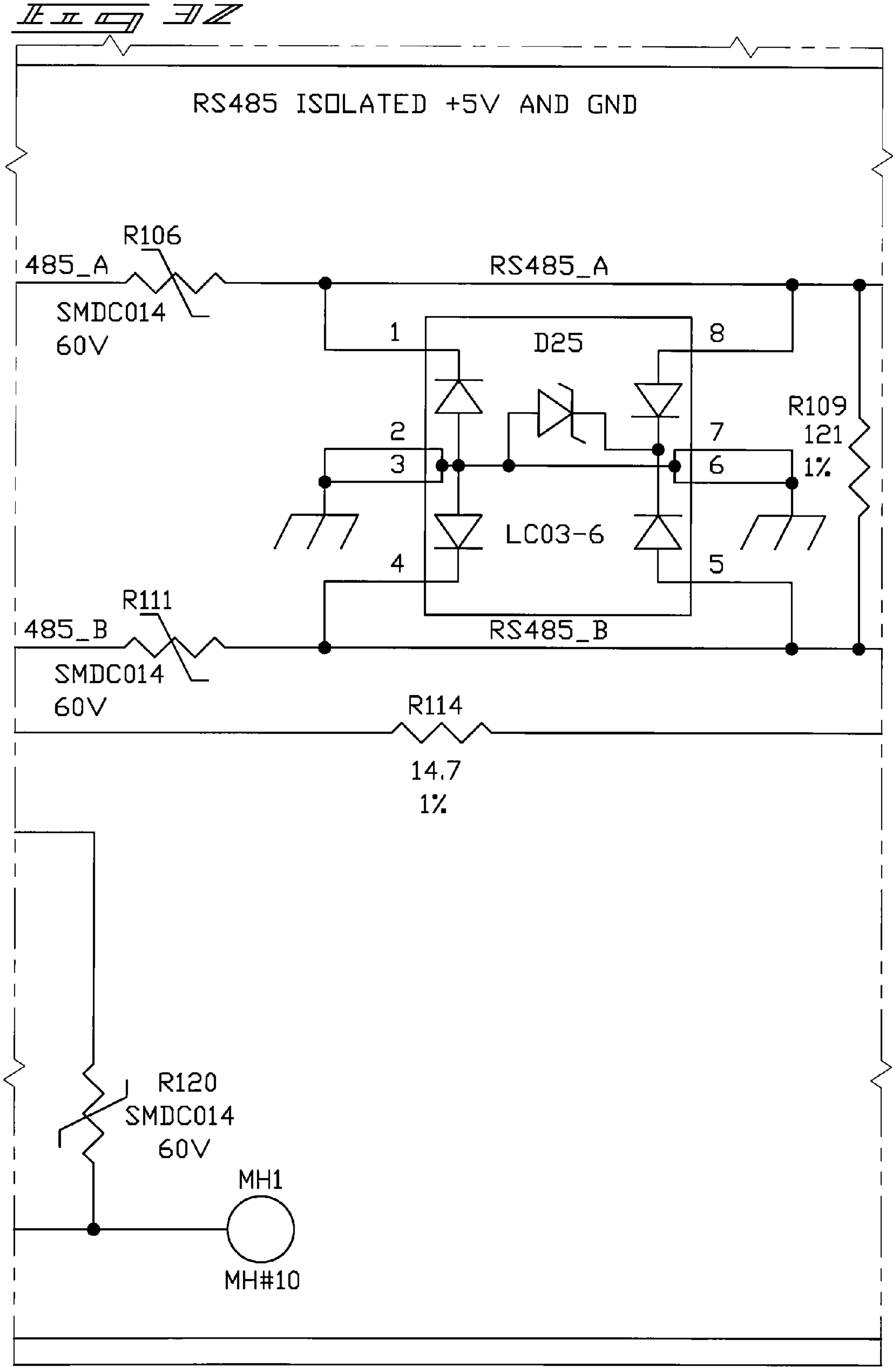
Figure 3A:
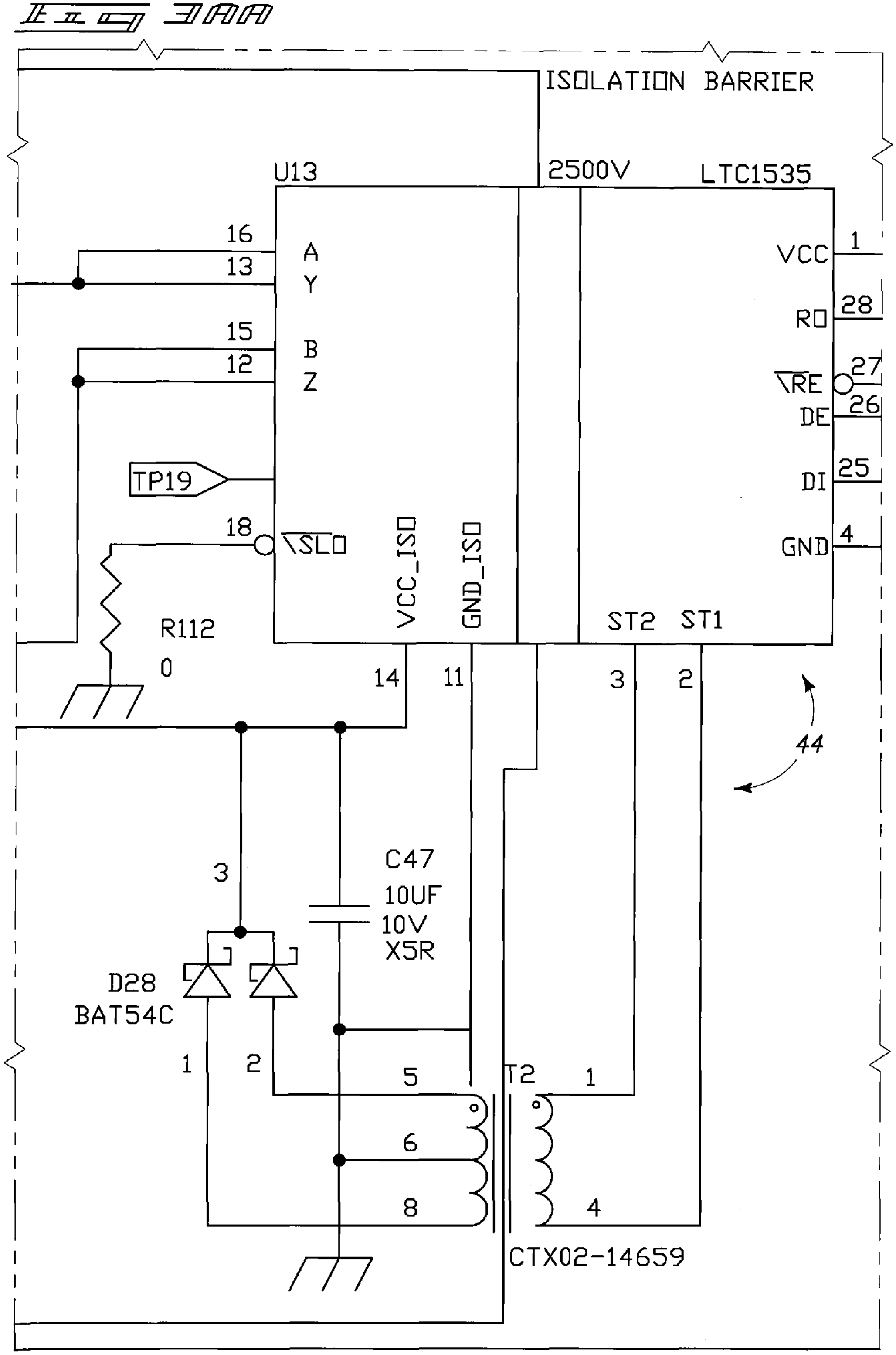
Figure 38B:
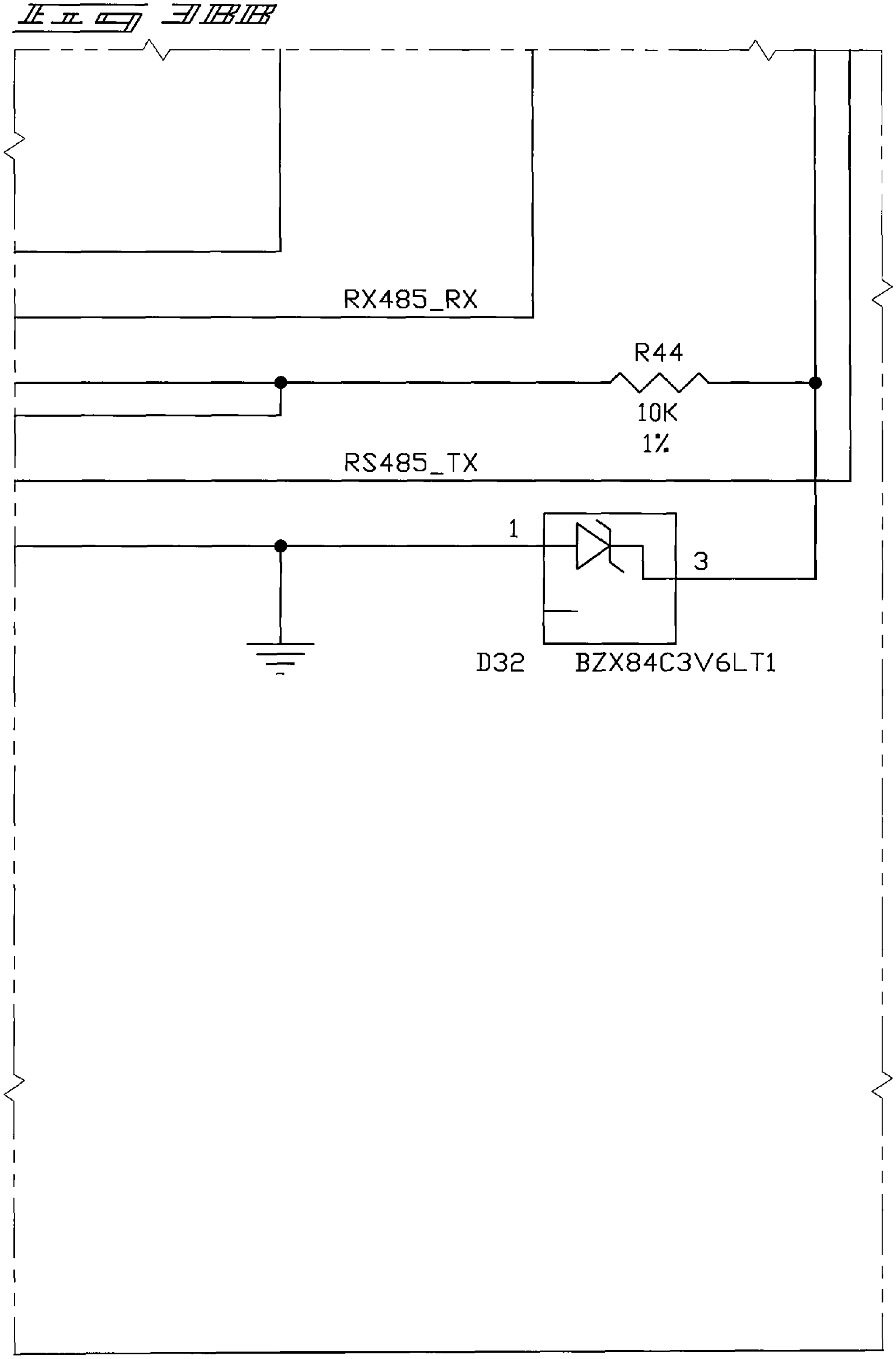
Figure 3C:
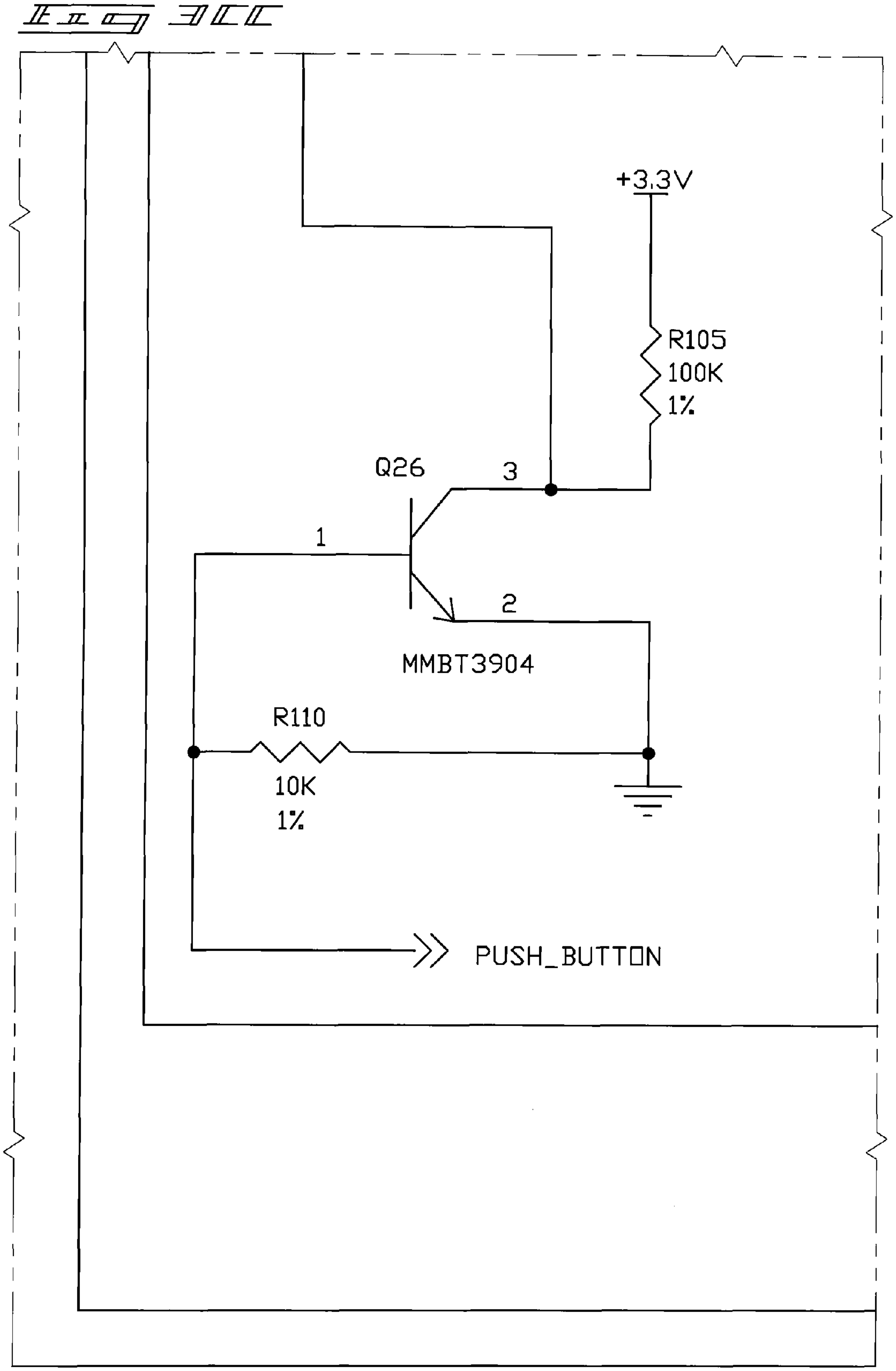
Figure 3D:
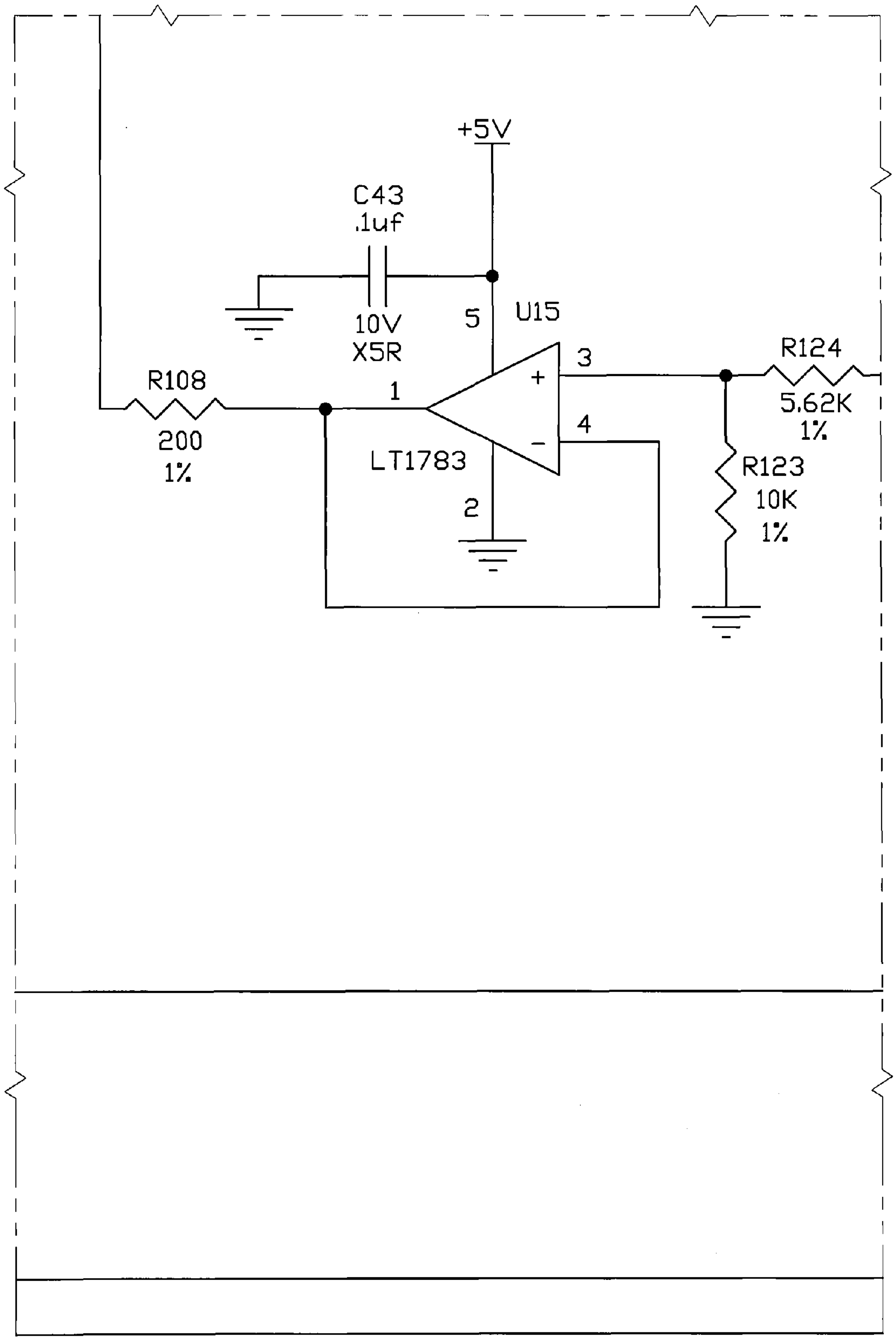
Figure 3E:
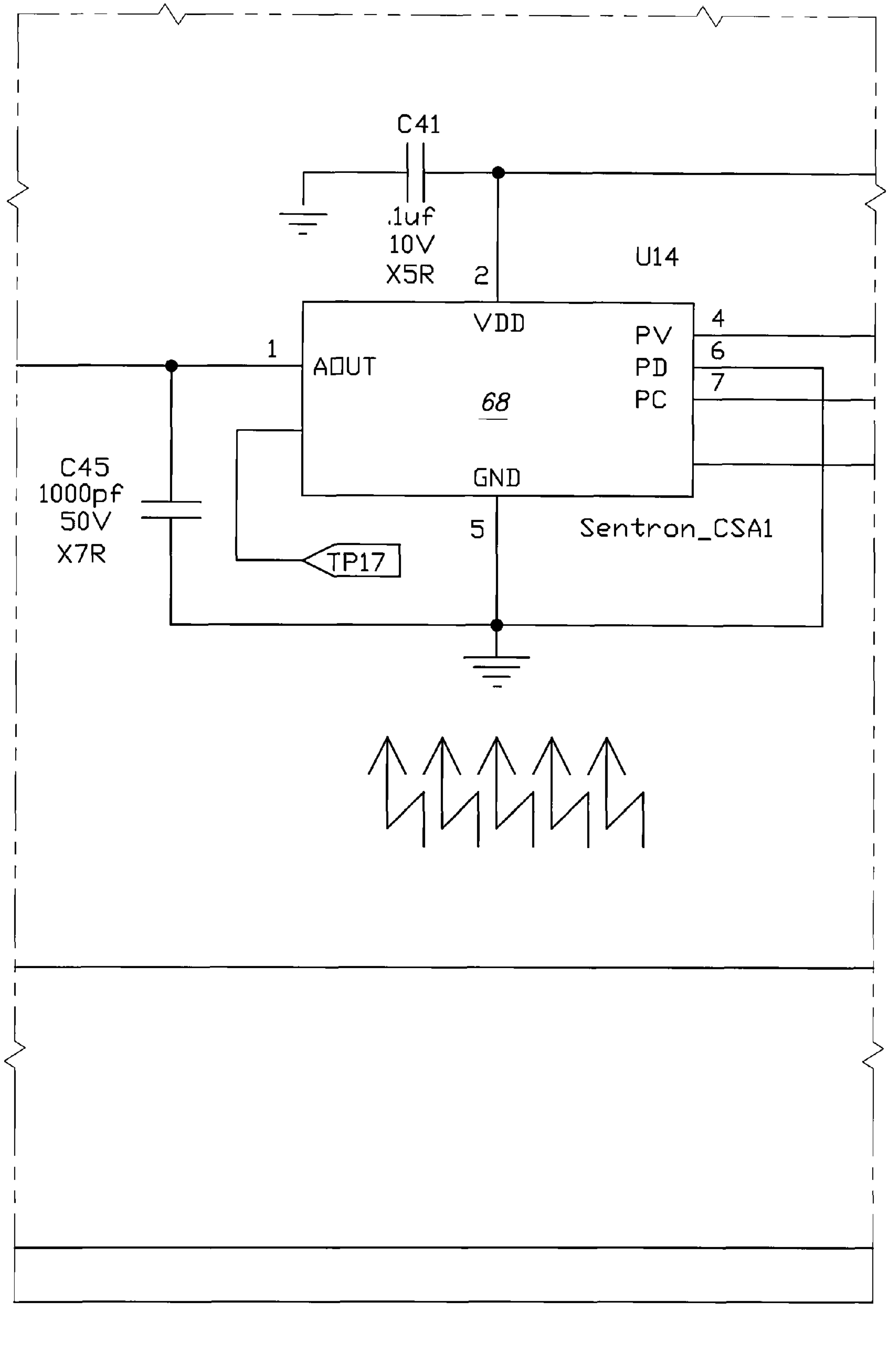
Figure 3F:
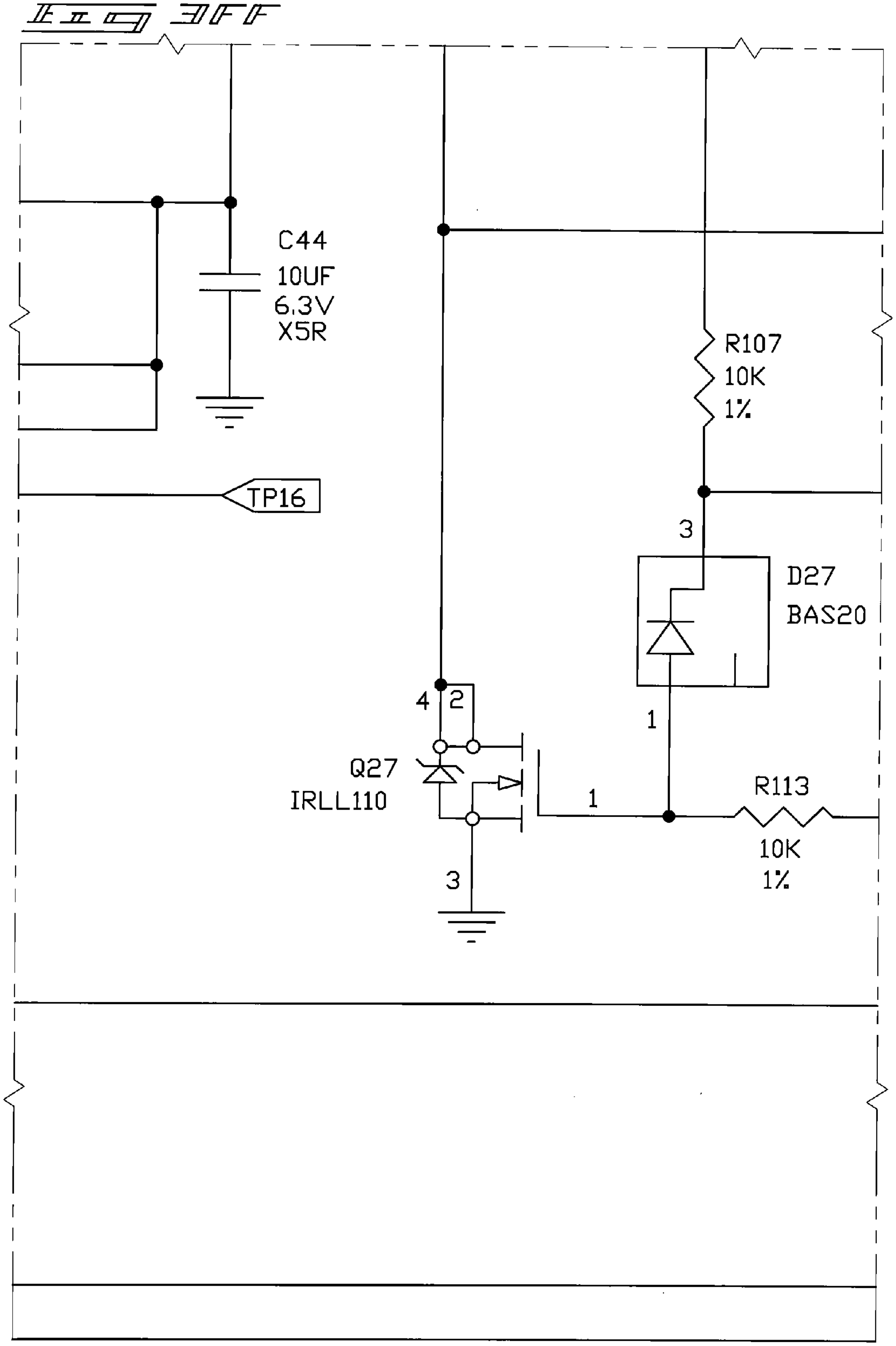
Figure 36G:
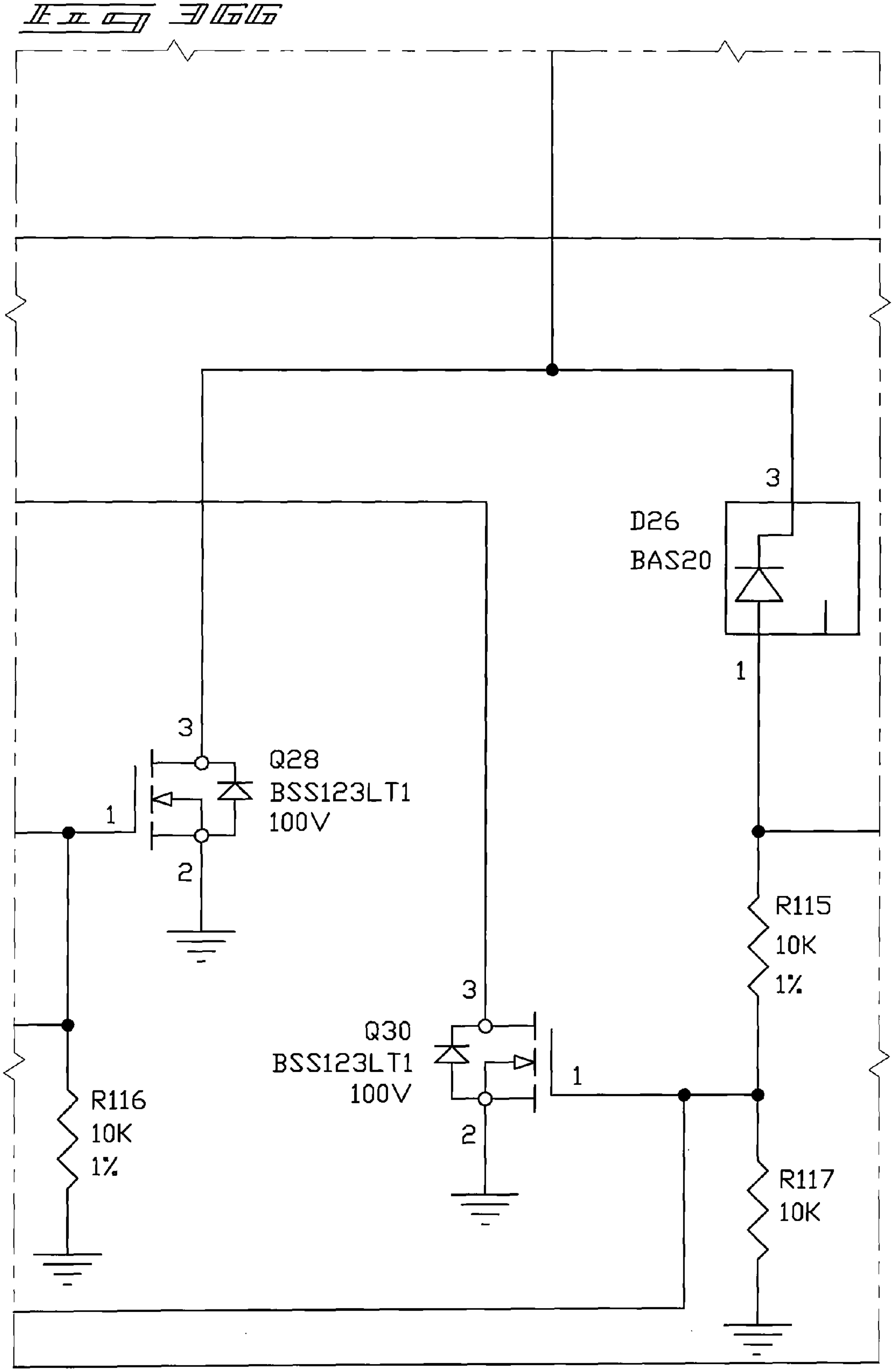
Figure 3H:
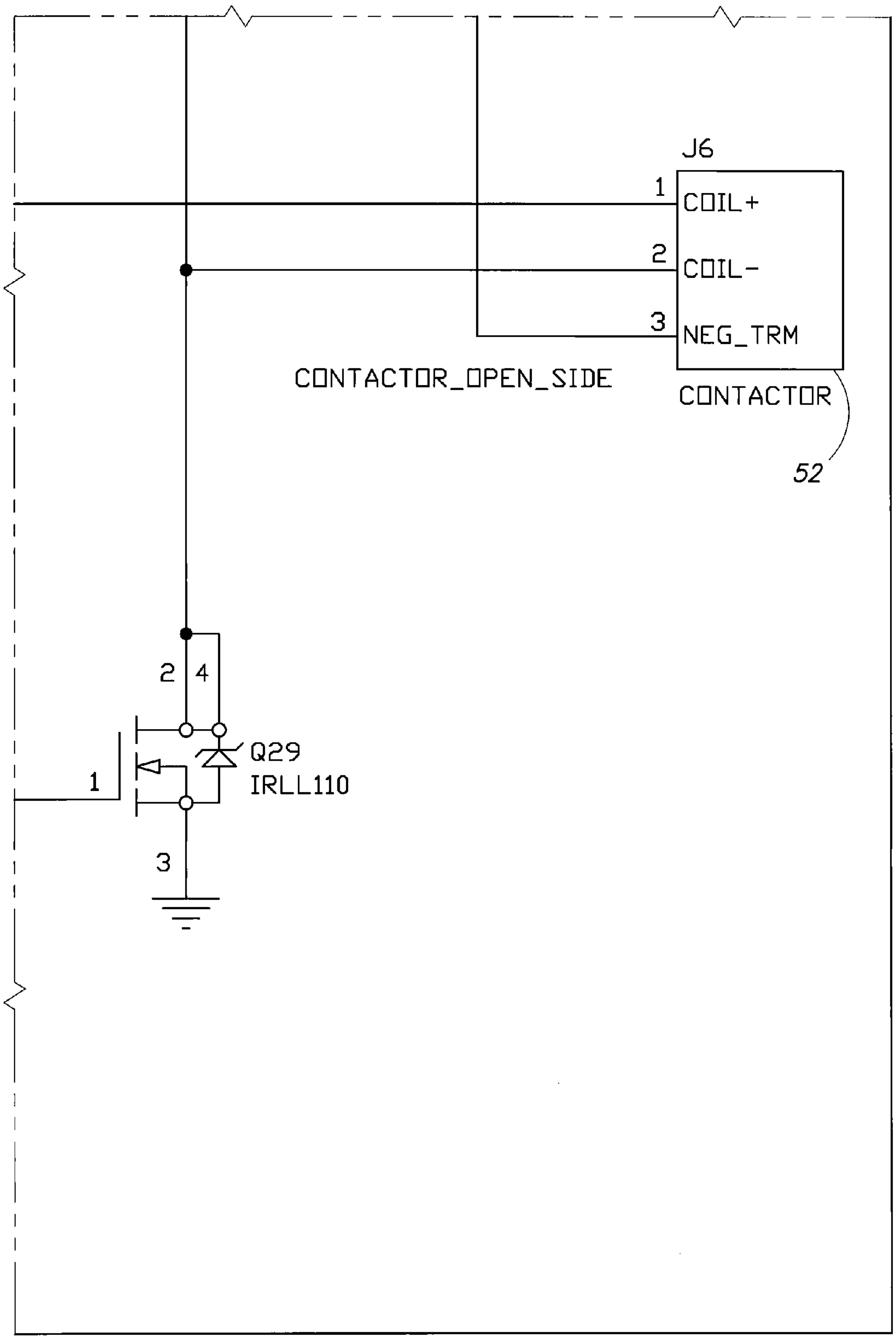
Figure 40:
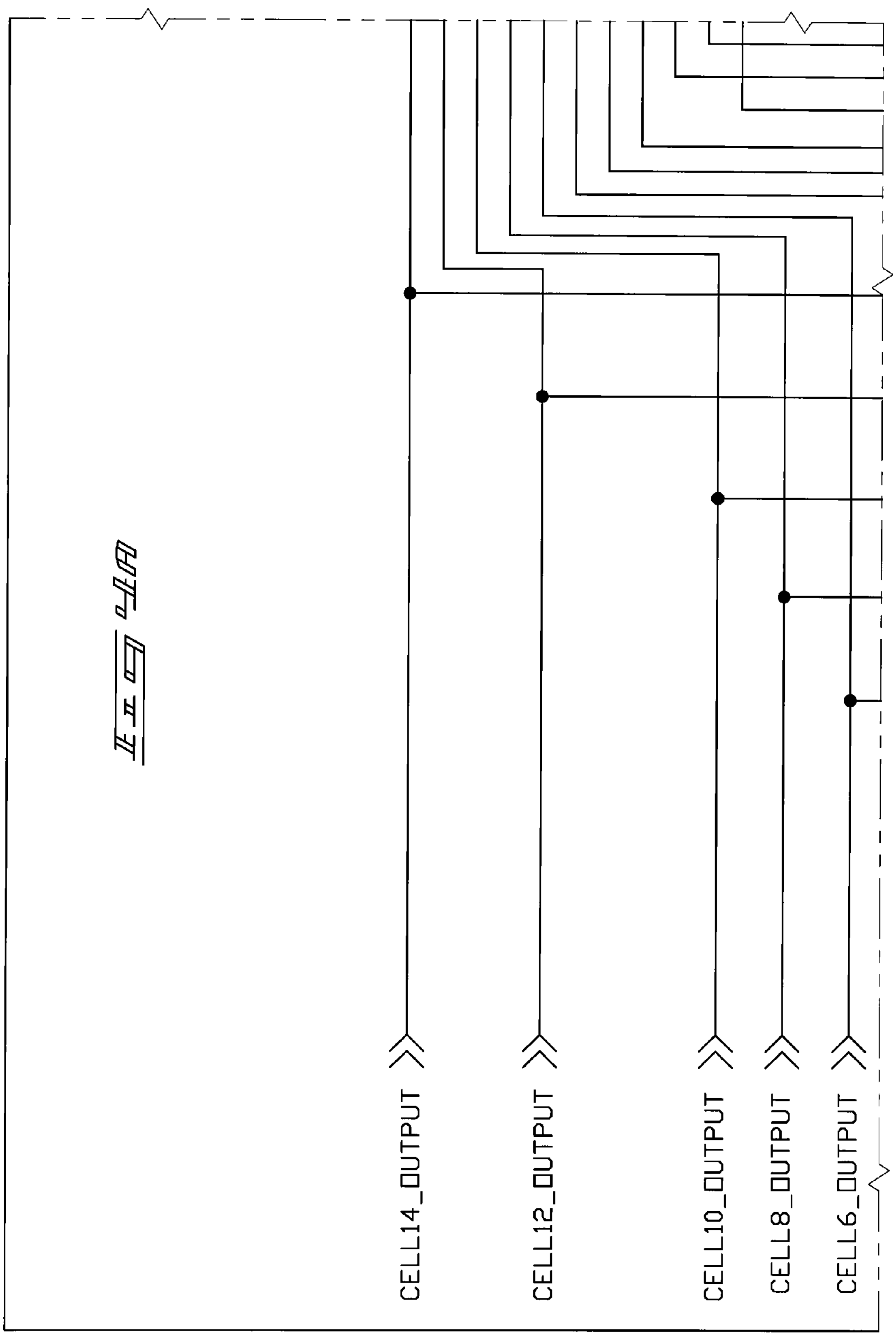

Different triggering events may be utilized to provide assembly 20 into the sleep mode of operation. For example, if it is known that assembly 20 will not be used for an extended period of time and/or there is an absence of electrical energy from source 36 (e.g., in storage or coupled to a system not being used) a user may provide assembly 20 into the sleep mode. In one embodiment, a user may use a sleep indication to place assembly 20 into sleep mode. One exemplary user sleep indication comprises a user-operable switch including a short circuit plug which is placed into communications interface 44 while the assembly 20 is desired to be in sleep mode. The above-described user sleep indication or other mechanisms (e.g., other hardware or other mechanism) may be utilized by a user to place assembly 20 into sleep mode. Processor 48 may sense the presence of the exemplary plug coupled with the communications interface 44 (e.g., J7, J8 of FIG. 3Y) and implement a shut down procedure to place assembly 20 into the sleep mode. Further, communications may be disabled if the above-described user sleep indication is coupled with interface 44 in one embodiment. The user sleep indication reduces the self discharge rate of storage circuitry 60 in one embodiment. When normal use is desired, the plug may be removed.

In another embodiment, additional or alternative stimulus or triggering events may be utilized to provide assembly 20 into sleep mode. For example, in one embodiment, control circuitry 46 may be configured to initiate sleep mode responsive to switching device 52 being changed from a closed state to an open state, monitoring of an electrical characteristic of one or more devices 62 of storage circuitry 60 (e.g., state of charge and/or voltage indicating a low remaining capacity, etc.), or other triggering event. In one embodiment, if switching device 52 is closed when sleep is initiated responsive to a monitored electrical characteristic or other condition, control circuitry 46 may switch device 52 to an open state to isolate storage circuitry 60 from electrical entity 14.

During the sleep mode of operation, draws upon storage circuitry 60 are reduced or minimized. For example, power supply 54 and at least a portion of control circuitry 46 (e.g., processors 48, 50) may be powered down. Further, switching device 52 may be opened if in a closed state when sleep mode of operation is initiated as mentioned above.

Figure 6:
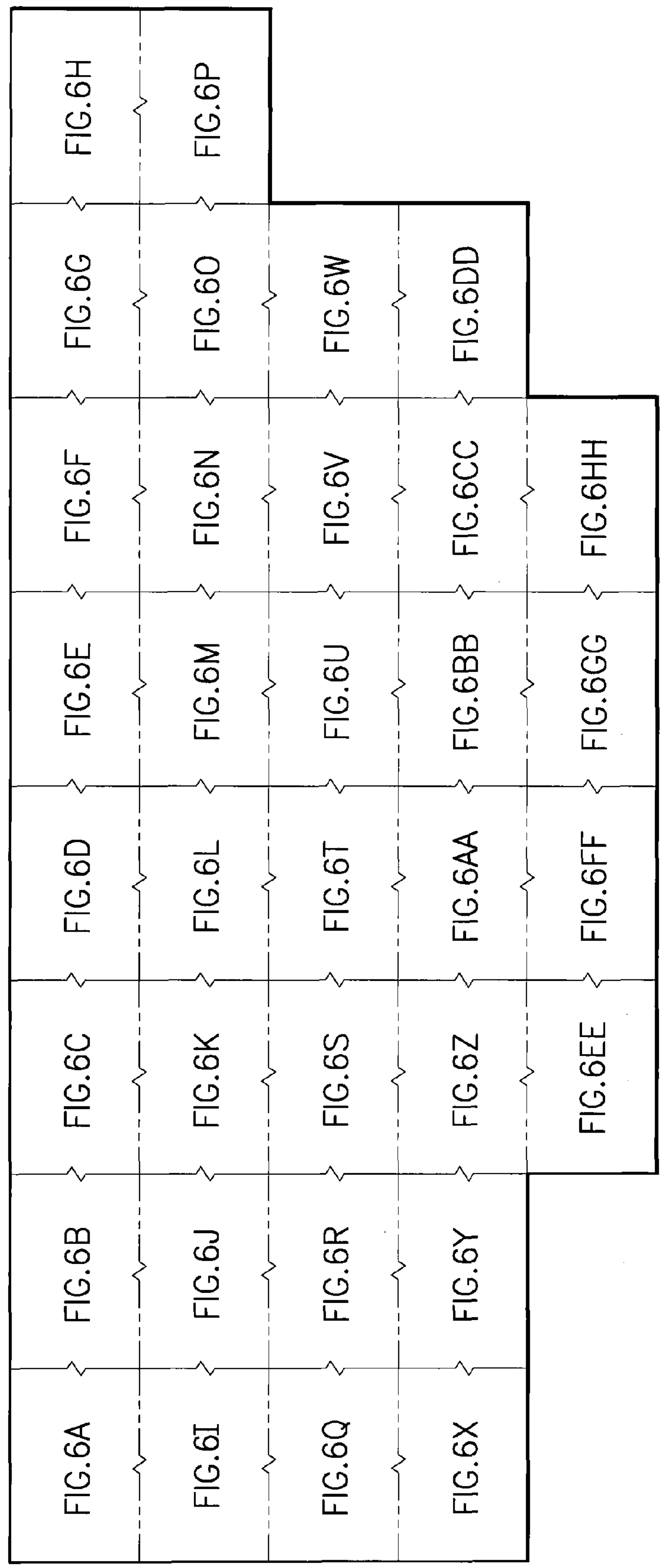
FIG. 6 is a map illustrating how FIGS. 6A-6HH are to be assembled, and once assembled, FIGS. 6A-6HH illustrate additional exemplary circuitry of the power supply apparatus according to one embodiment.
Figure 6A:
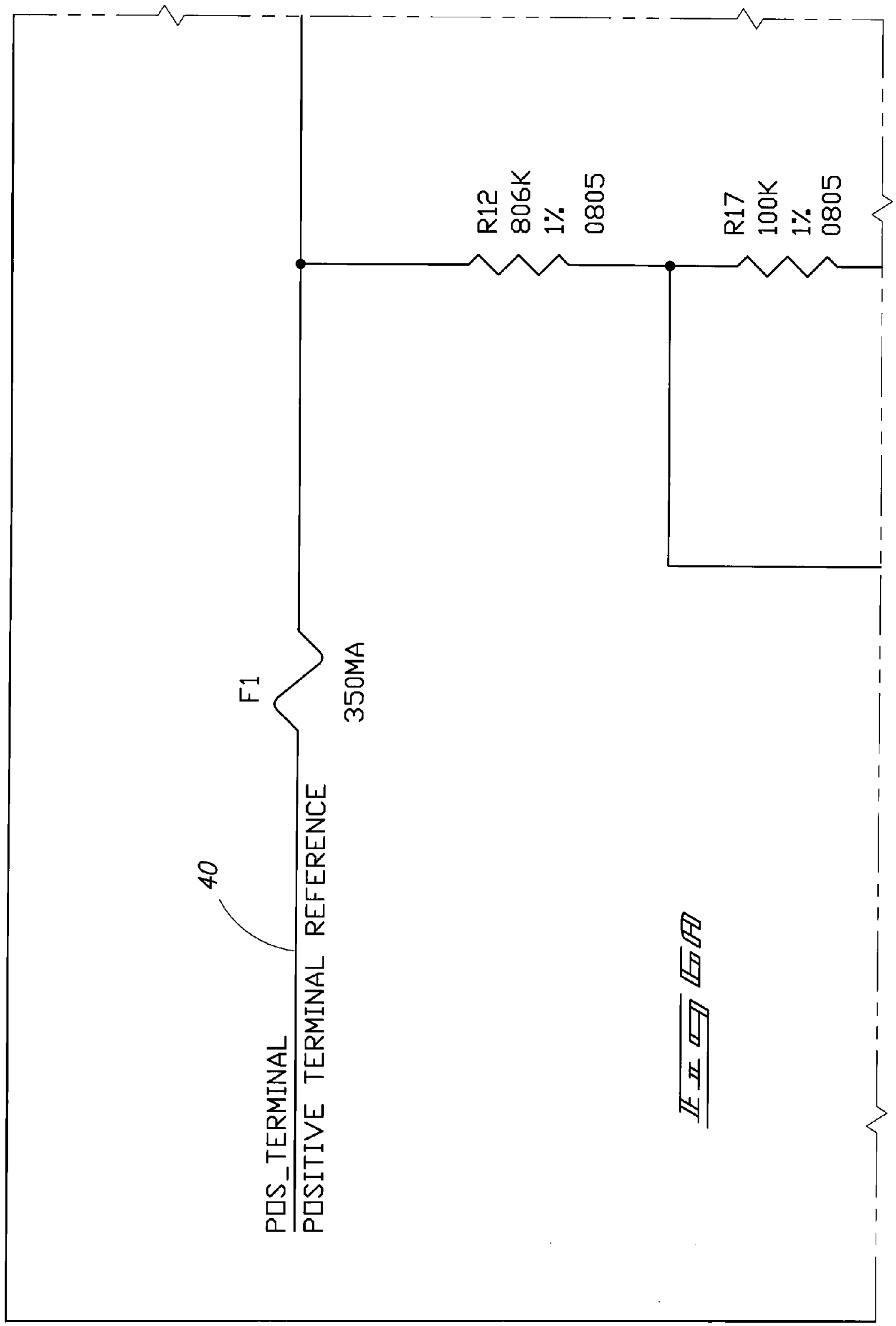
Figure 6B:
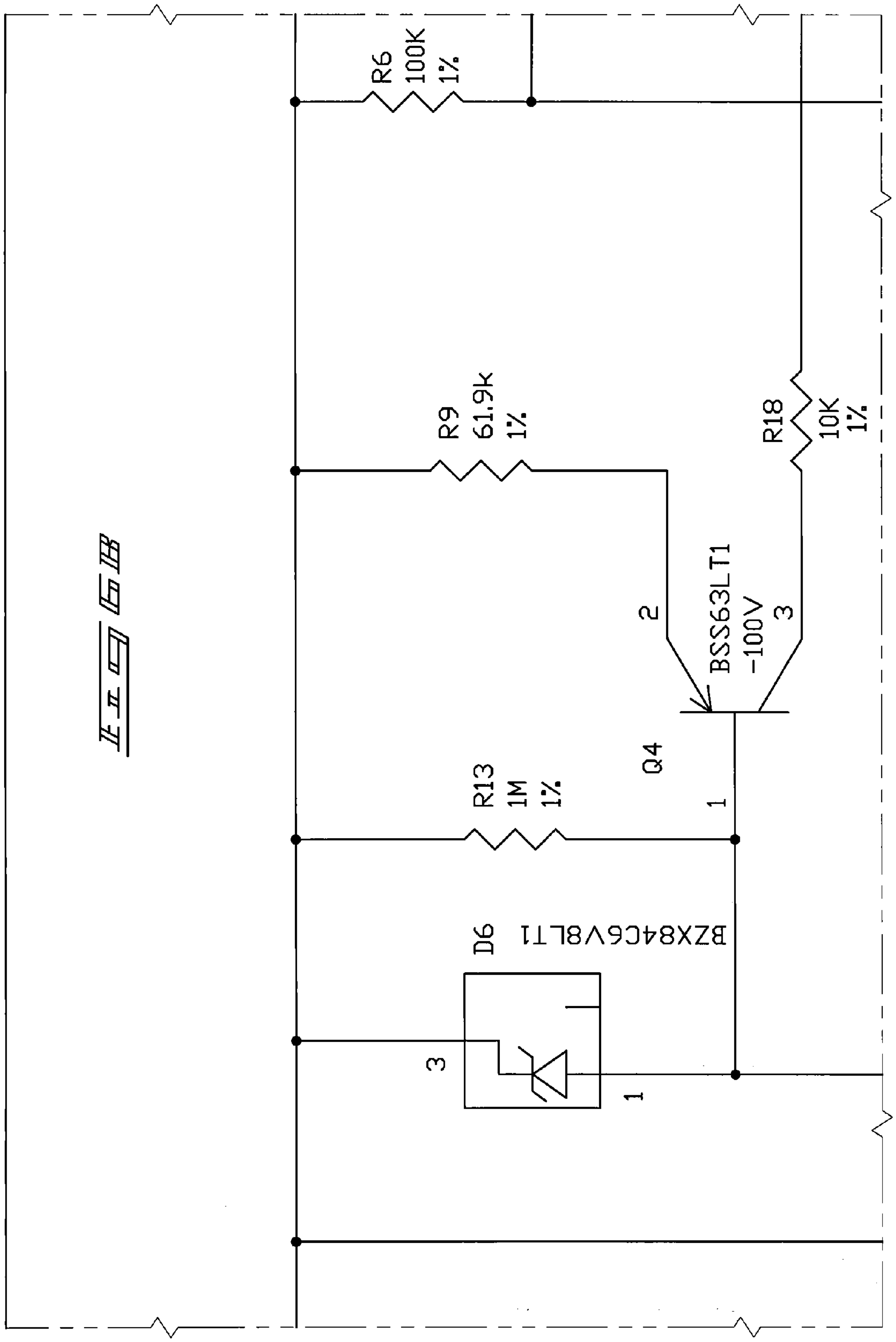
Figure 6C:
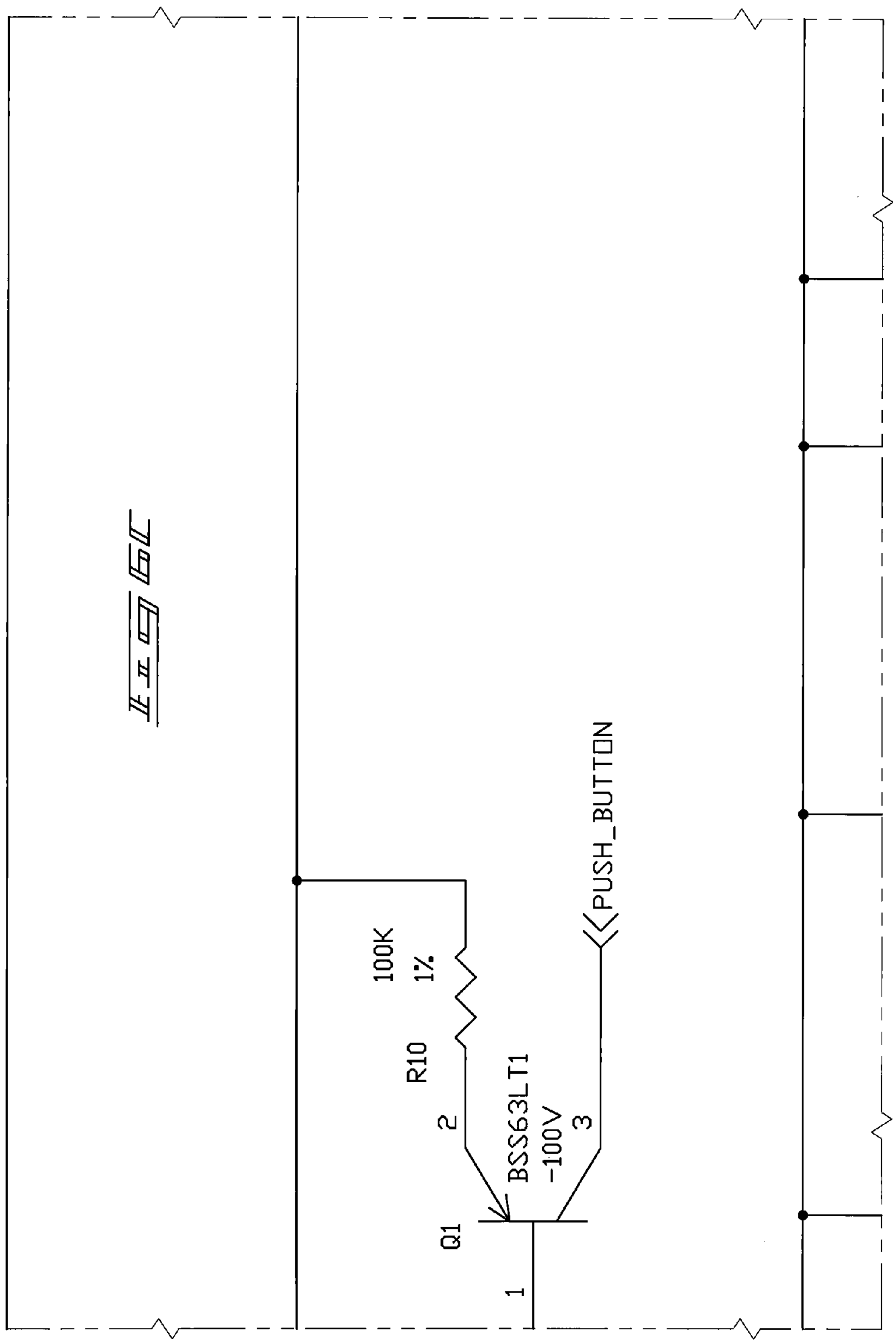
Figure 6D:
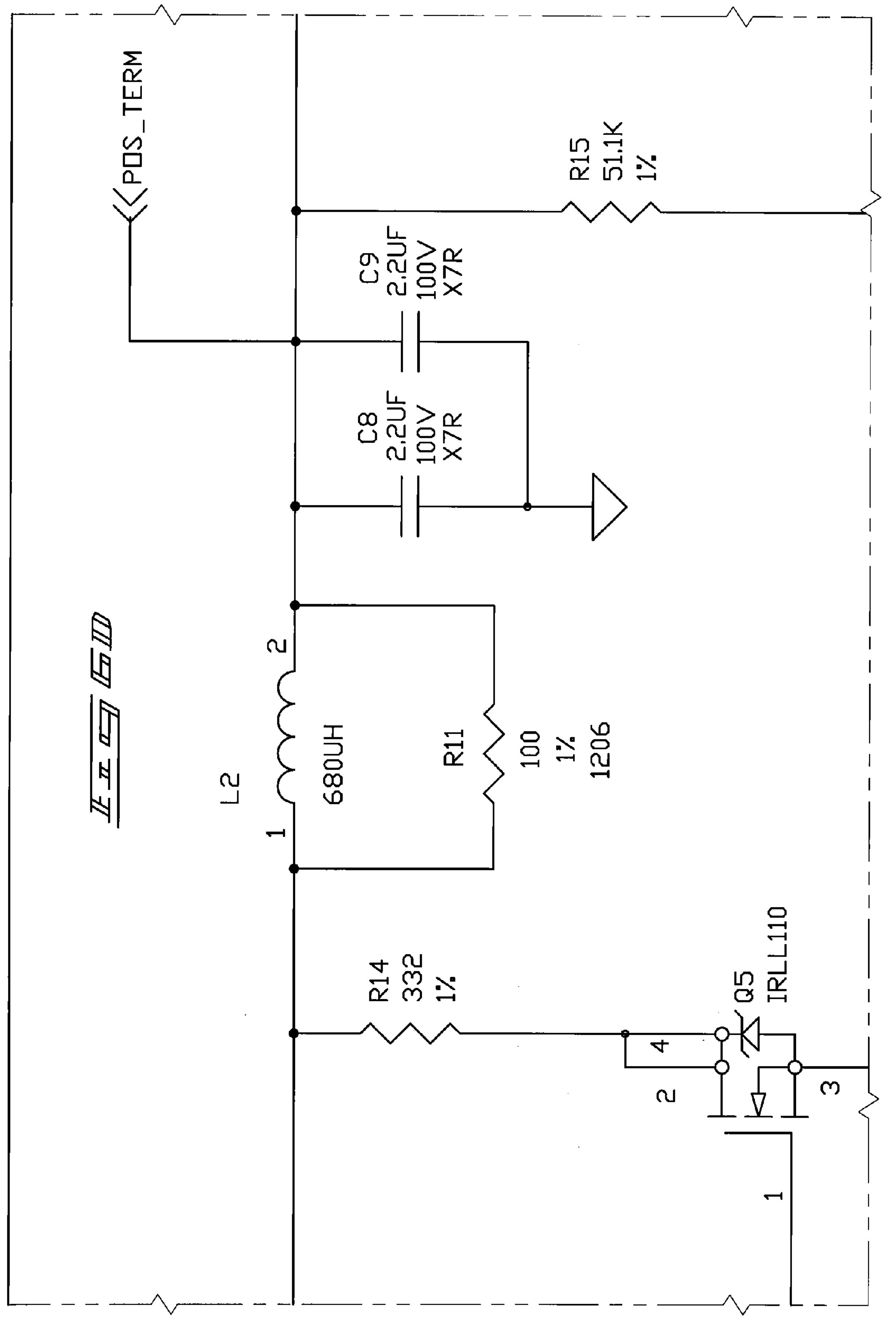
Figure 6E:
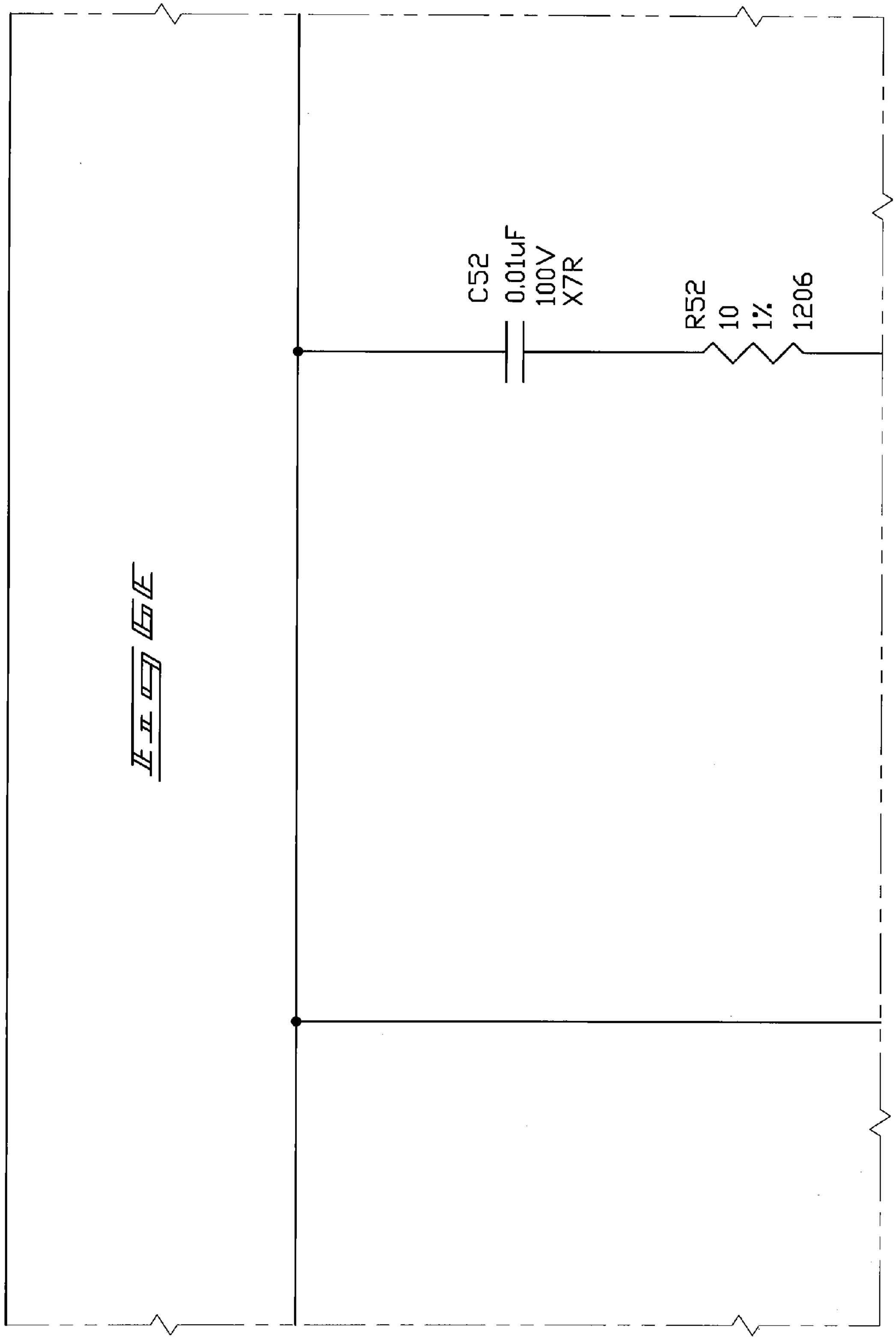
Figure 6F:
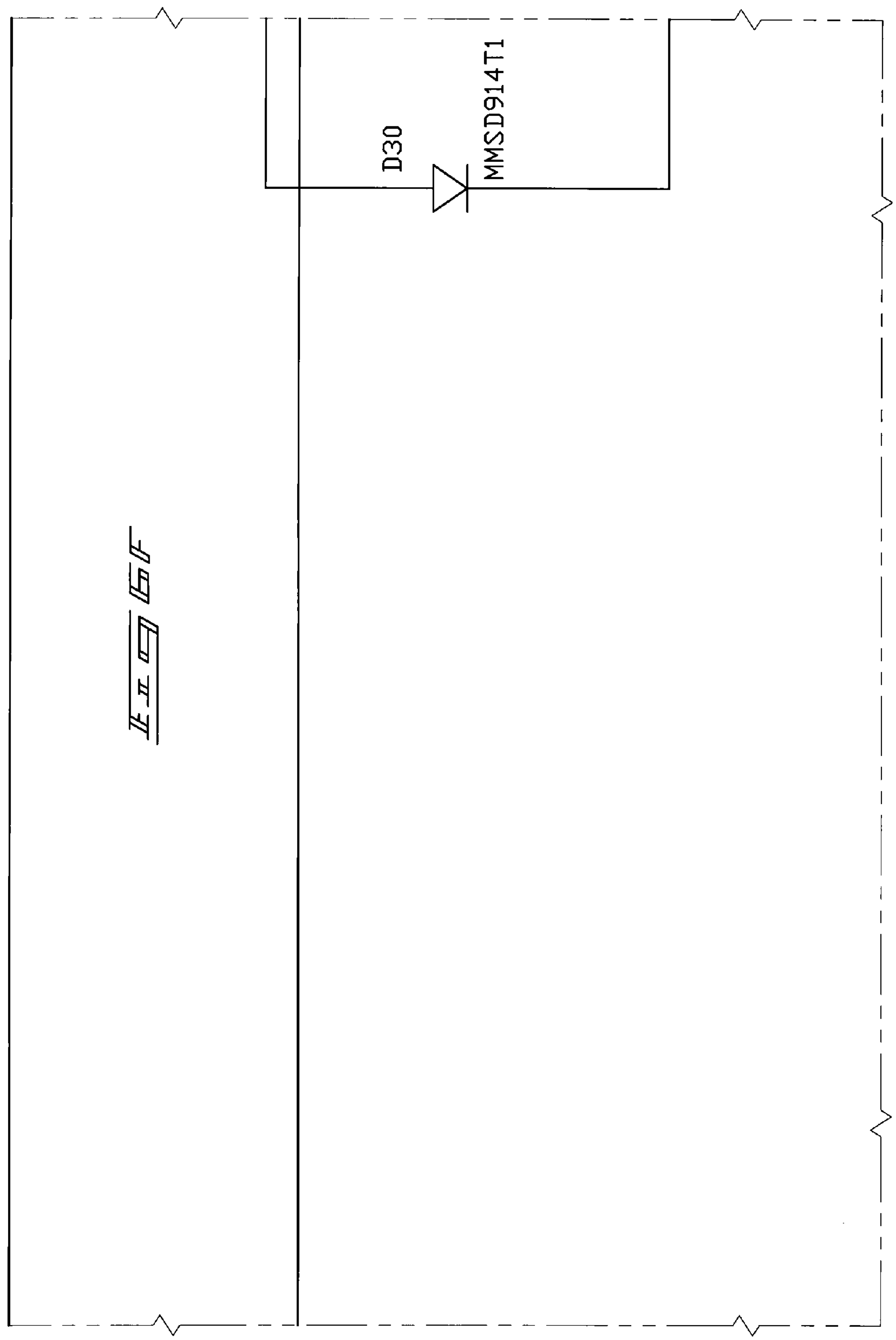
Figure 66:
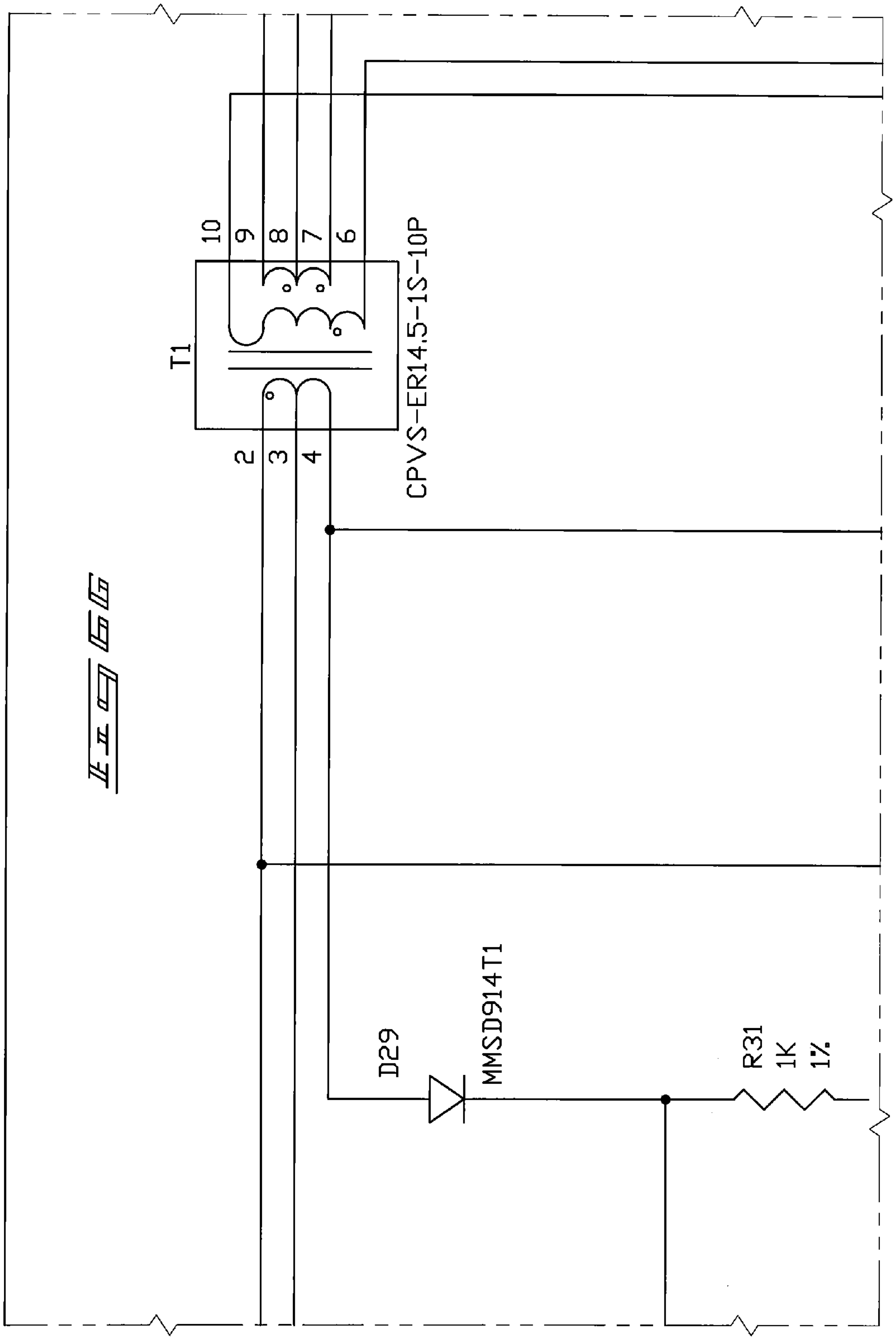
Figure 6H:
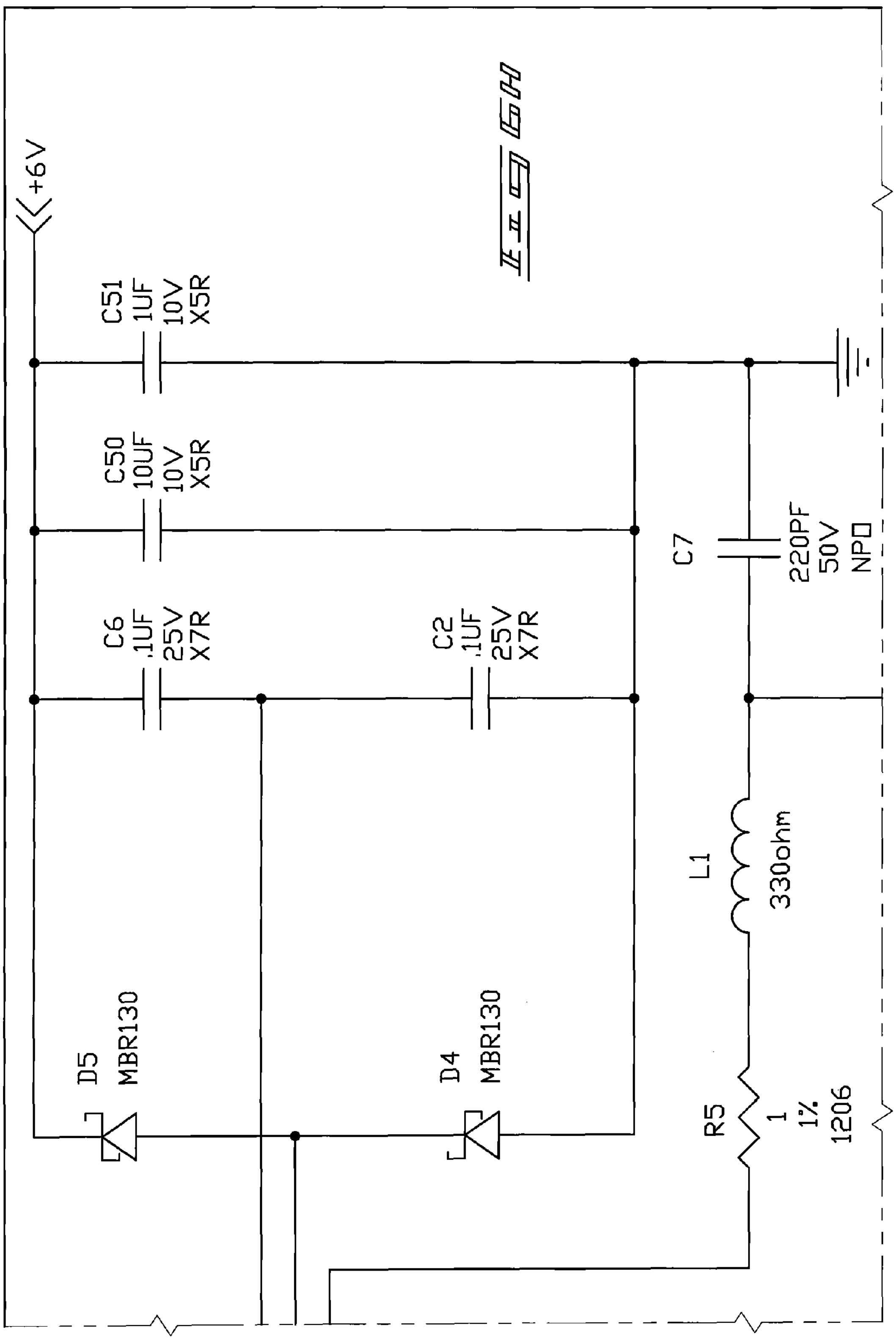
Figure 6J:
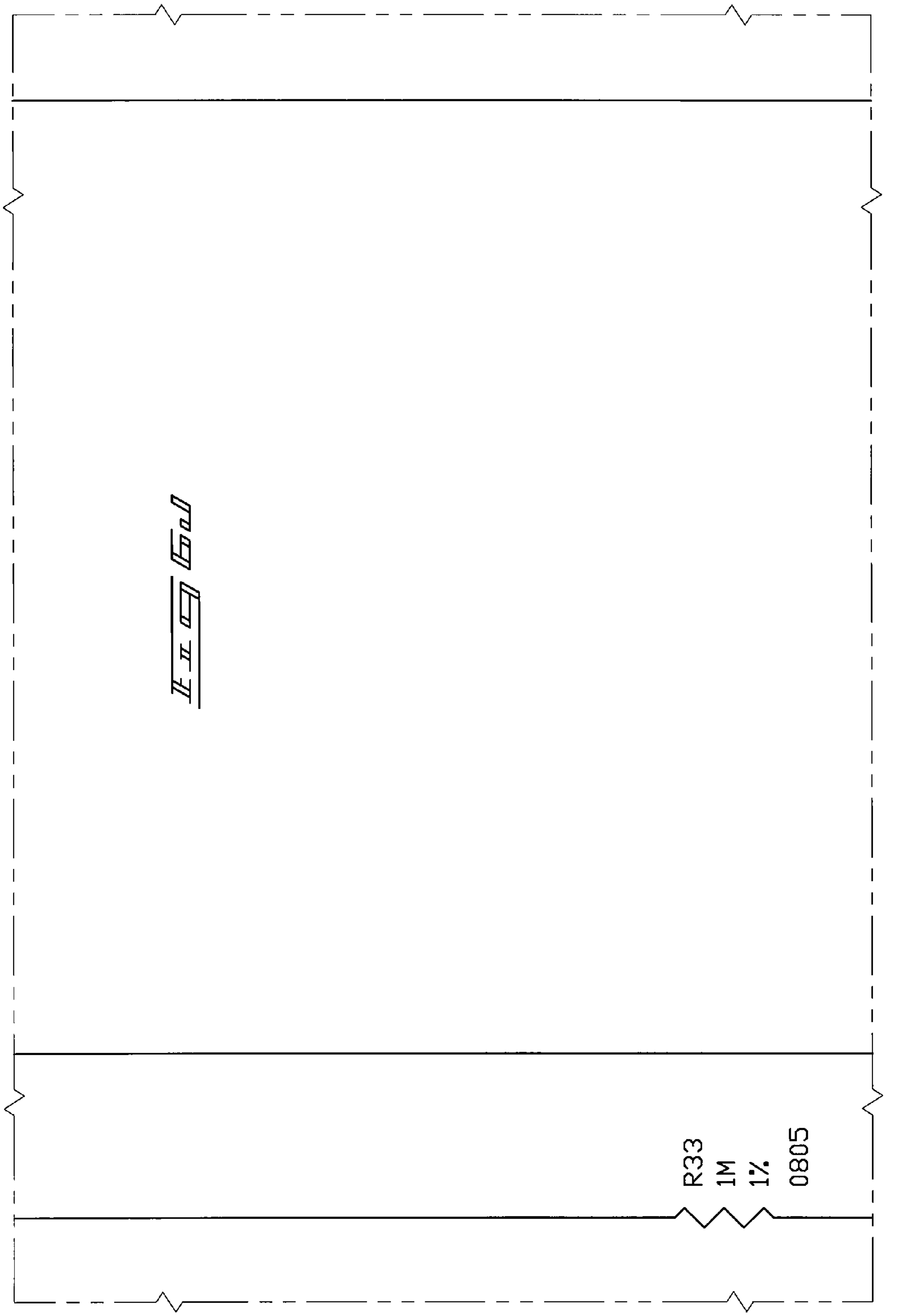
Figure 6K:
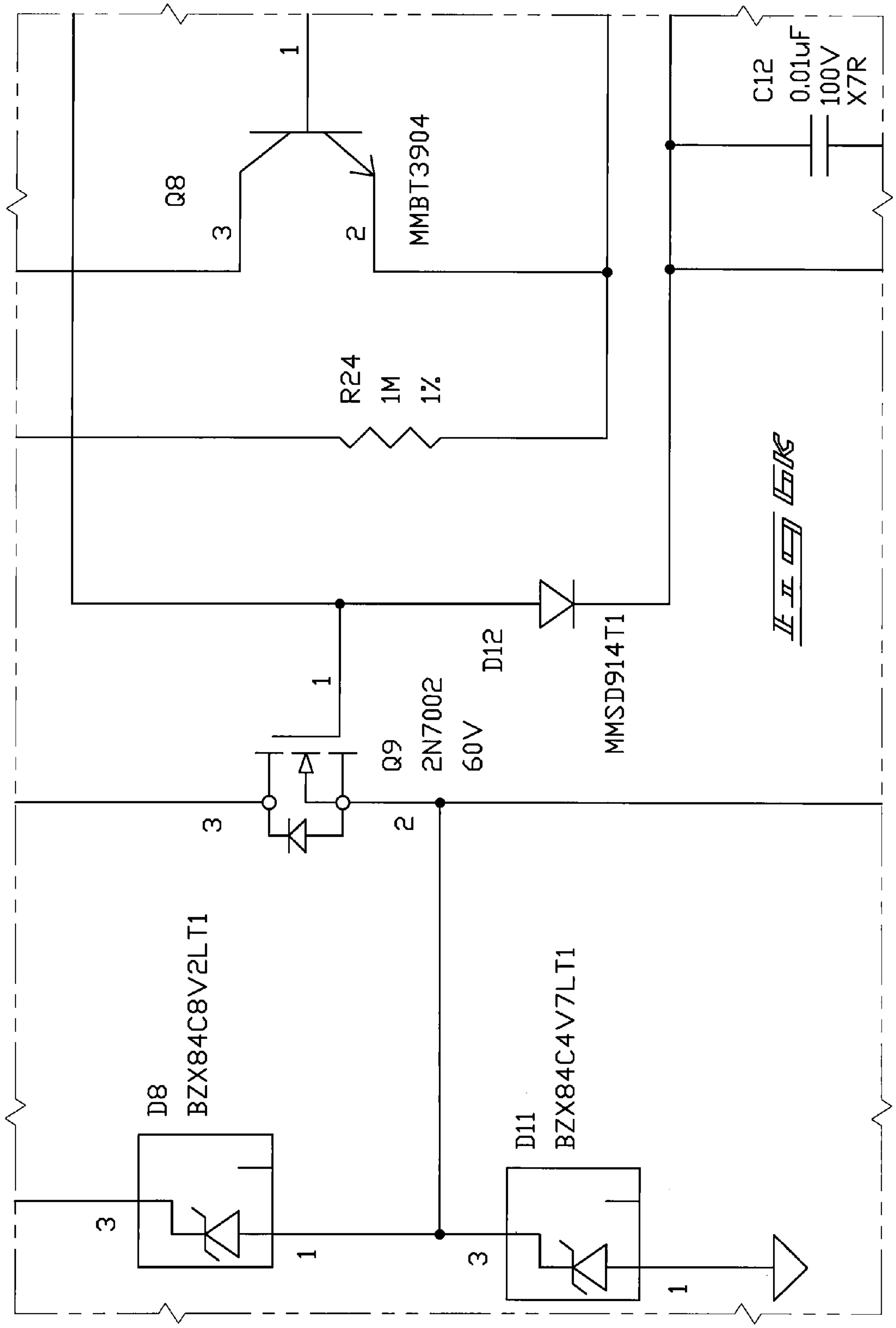
Figure 6L:
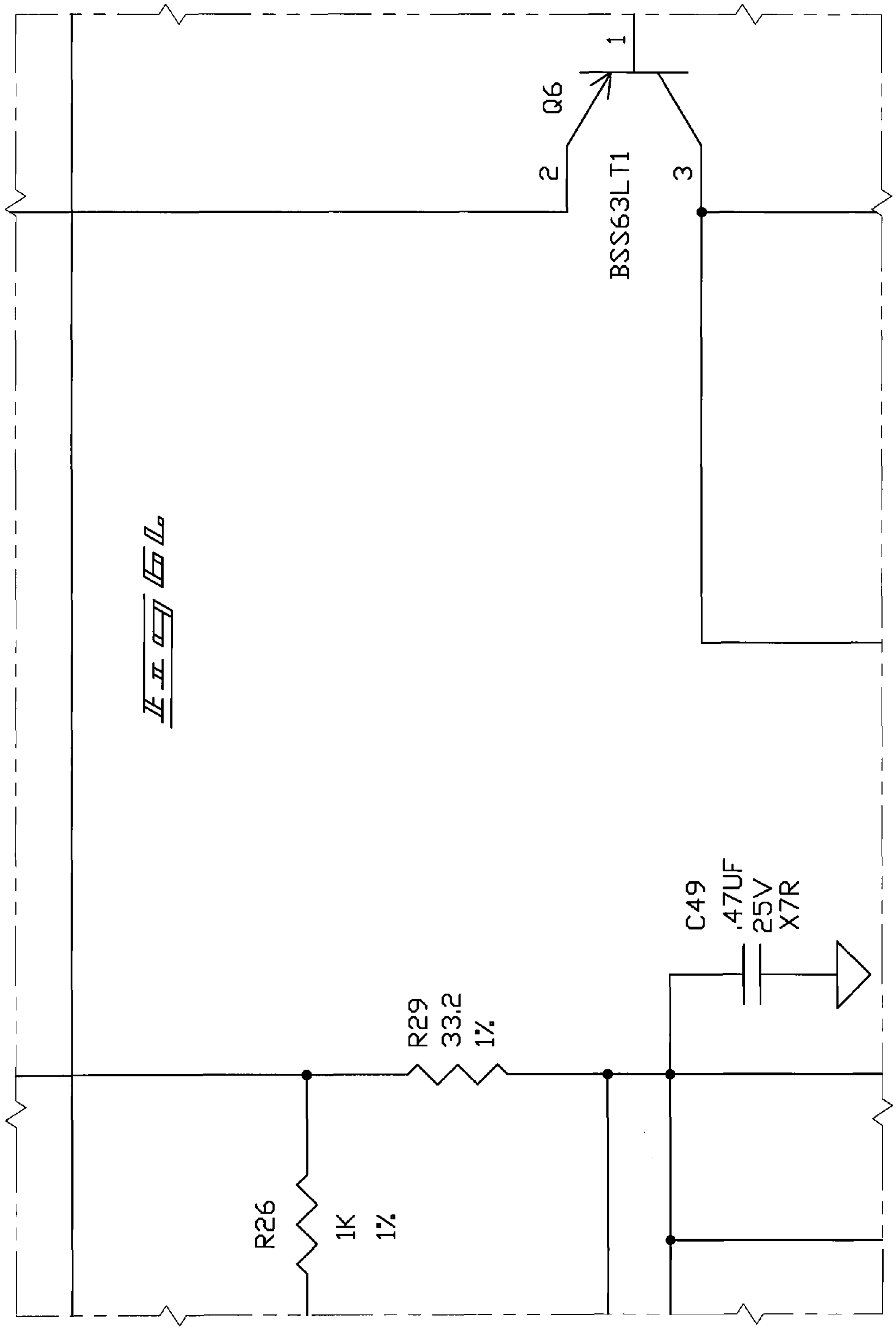

According to one embodiment, power supply 54 when started remains on unless an undervoltage condition of storage circuitry 60 is detected by comparator U6 or processor 48 provides a signal to shut down power supply 54. In one sleep implementation, processor 48 may issue a control signal to shut down power supply 54 and enter the sleep mode of operation. In the example of FIGS. 3-6, processor 48 may provide a shutdown signal (e.g., GOSLEEP) to an optoisolator U4 of FIG. 6Z which will reset a wakeup timer U3 of FIG. 6Y. Thereafter, Q14 and Q19 will both turn off which shuts off Q11 causing the power supply 54 to shut off (e.g., Q11, Q14, and Q19 are shown in FIGS. 6T, 6R and 6FF respectively). In this example, Q11 may disconnect the bias voltage to a buck-regulator control circuit U2 of FIG. 6T which shuts down power supply 54 in one embodiment (e.g., power supply 54 is off if Q11 does not have a gate voltage).

Exemplary shut down signals originating from processor 48 may be generated responsive to a received external communication, an undervoltage or other electrical condition of circuitry 60 or one of devices 62, presence of the user sleep indication, opening of switching device 52 or other desired stimulus or triggering event.

In one embodiment, at plural moments in time during sleep mode, control circuitry 46 may monitor to determine whether assembly should remain in sleep mode or enter a higher level or mode of operation. For example, control circuitry 46 may perform relatively fast measurements to determine the status of assembly 20 and depending on the results, decide if it should return to sleep mode or enter a higher mode of operation wherein electrical energy is consumed at a rate larger than while in sleep mode. Control circuitry 46 may also monitor for the presence of the above-described user sleep indication and return to sleep mode if present.

Figure 6M:
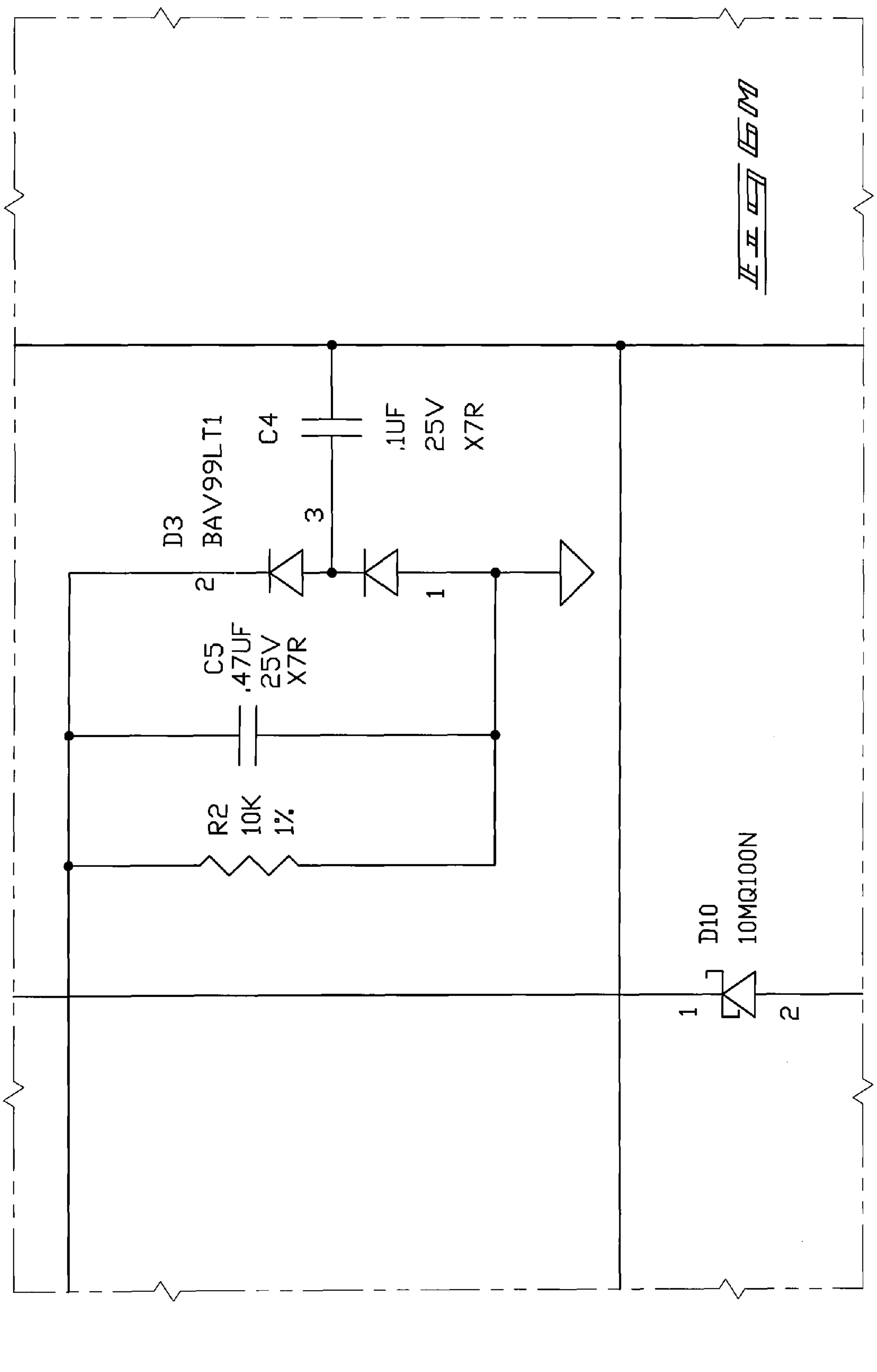
Figure 6N:
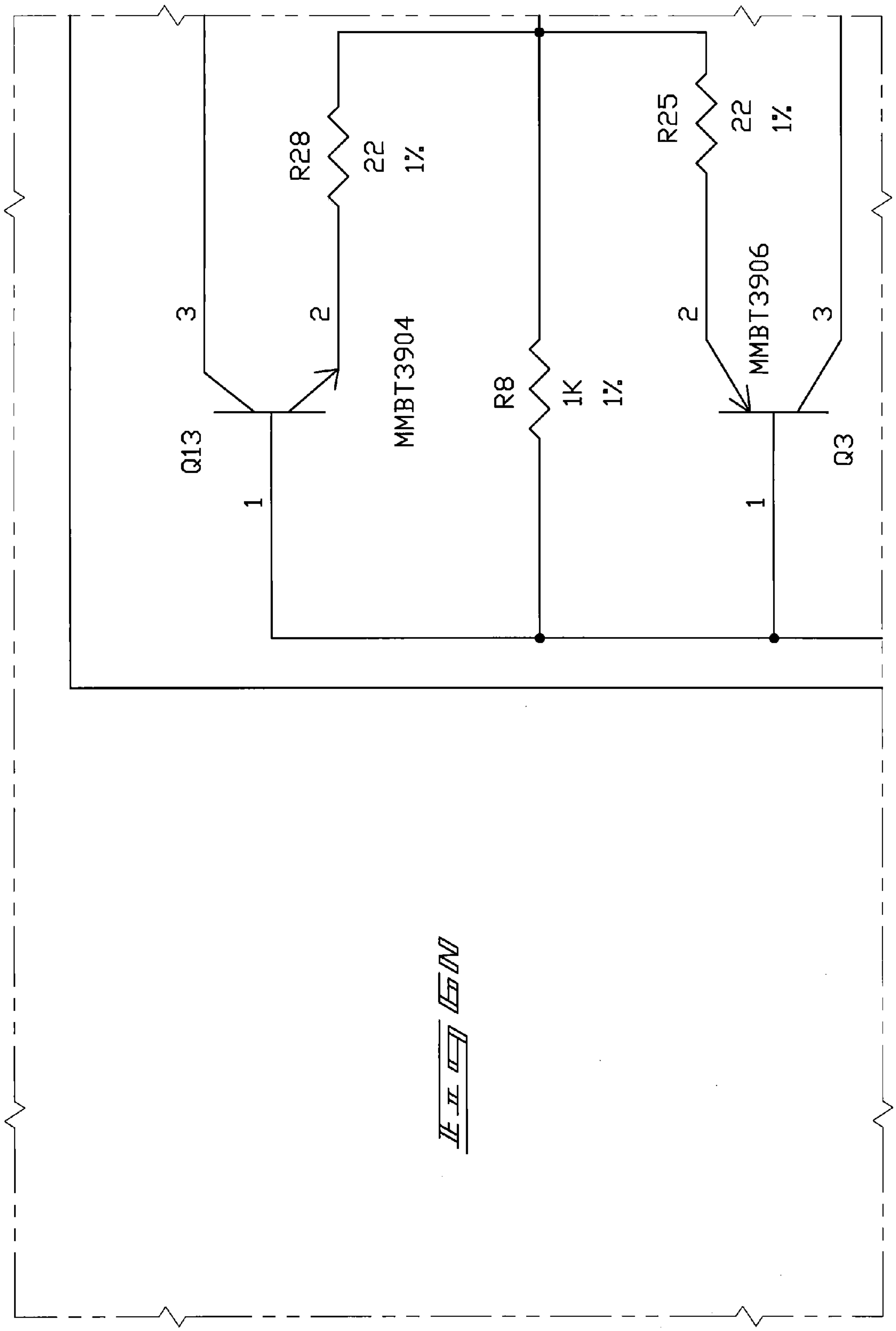
Figure 60:
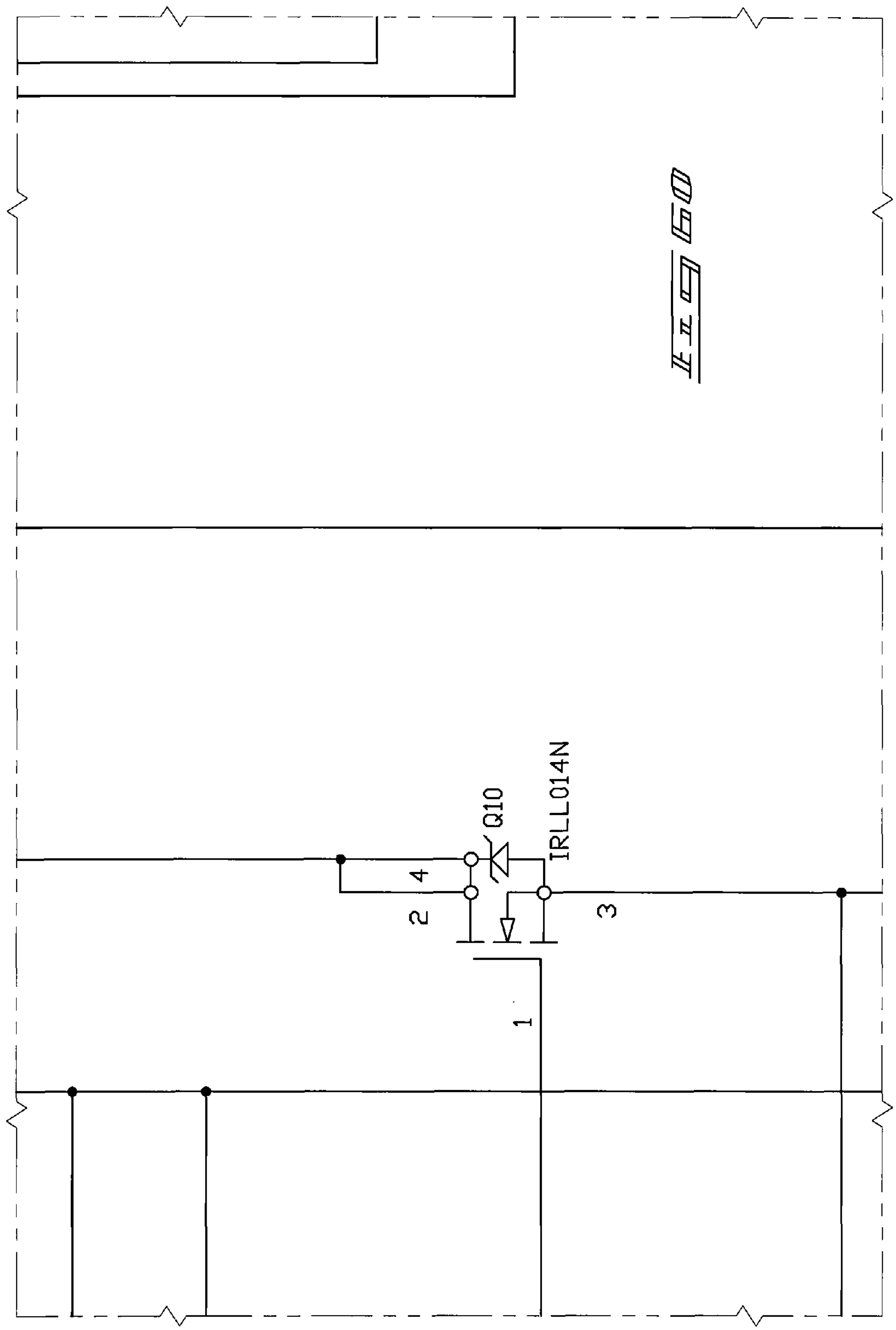
Figure 6P:
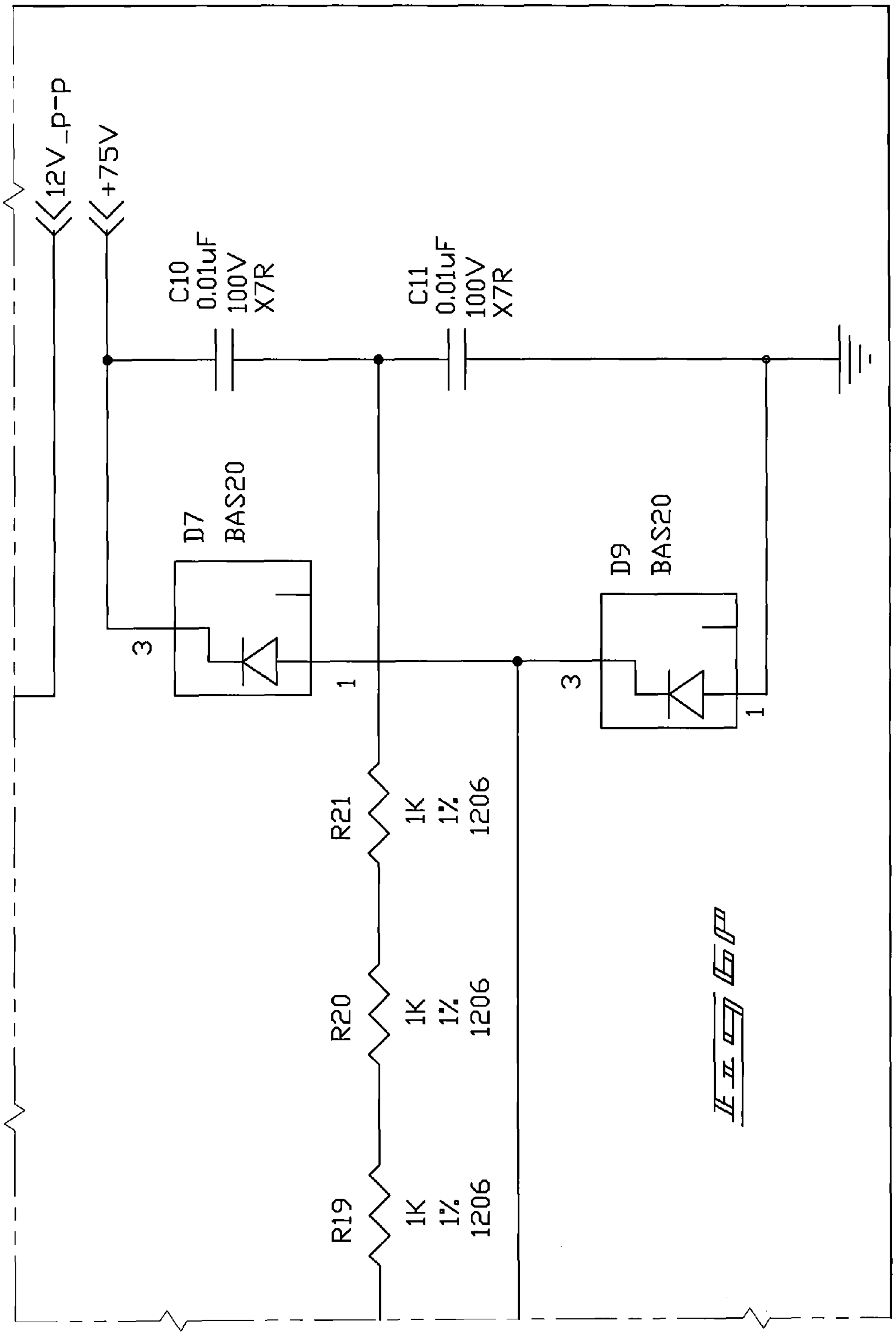
Figure 6Q:
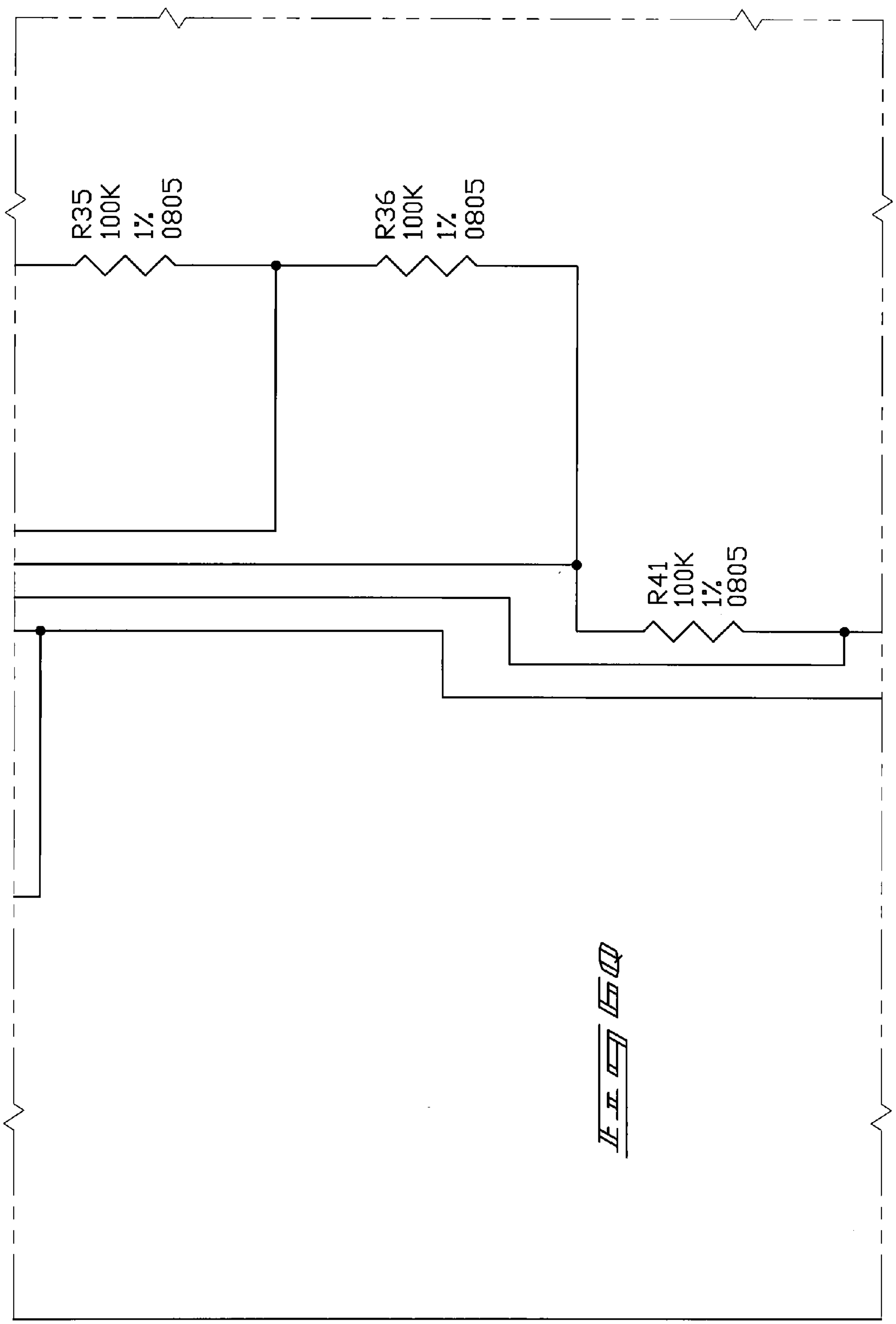
Figure 6R:
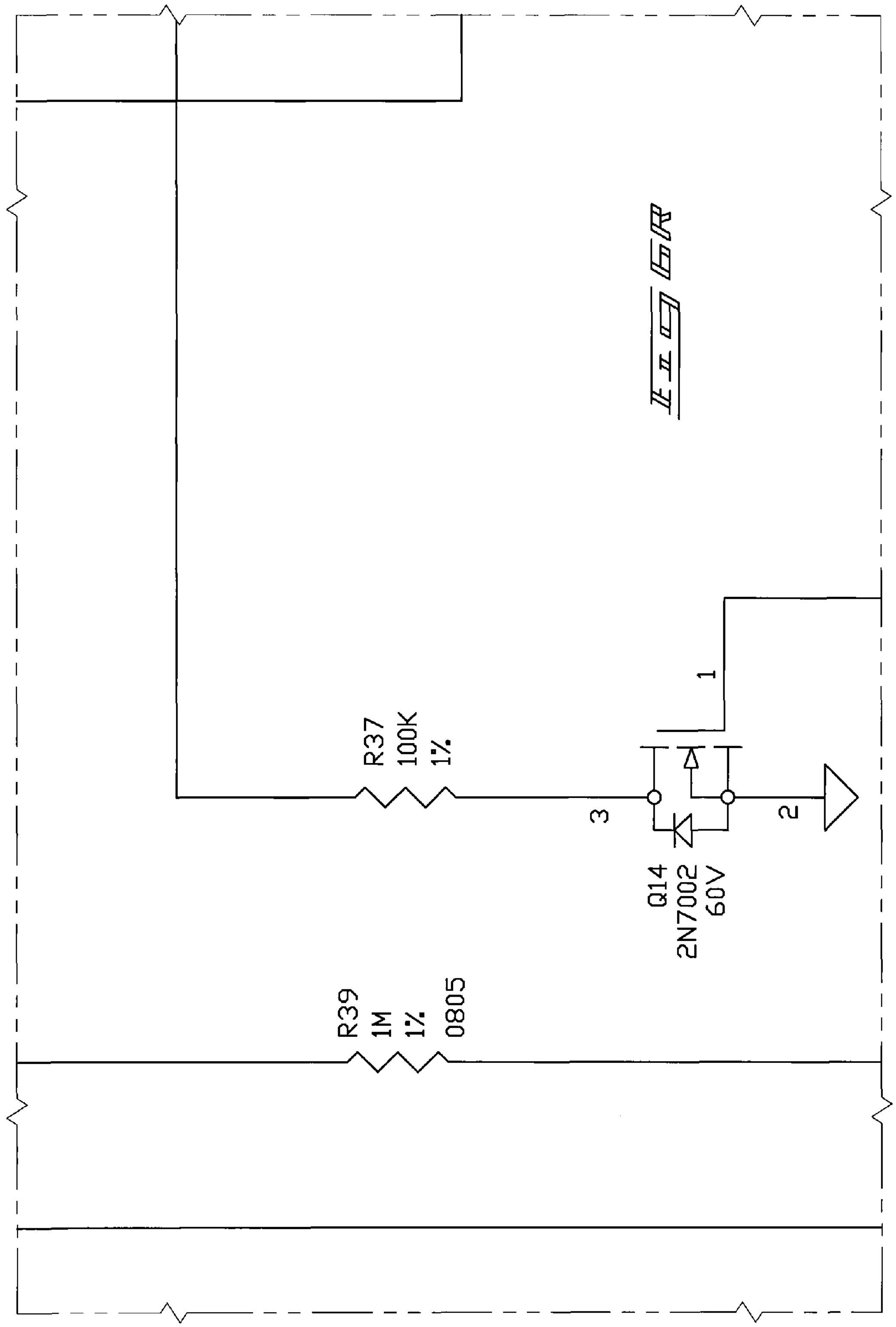
Figure 65:
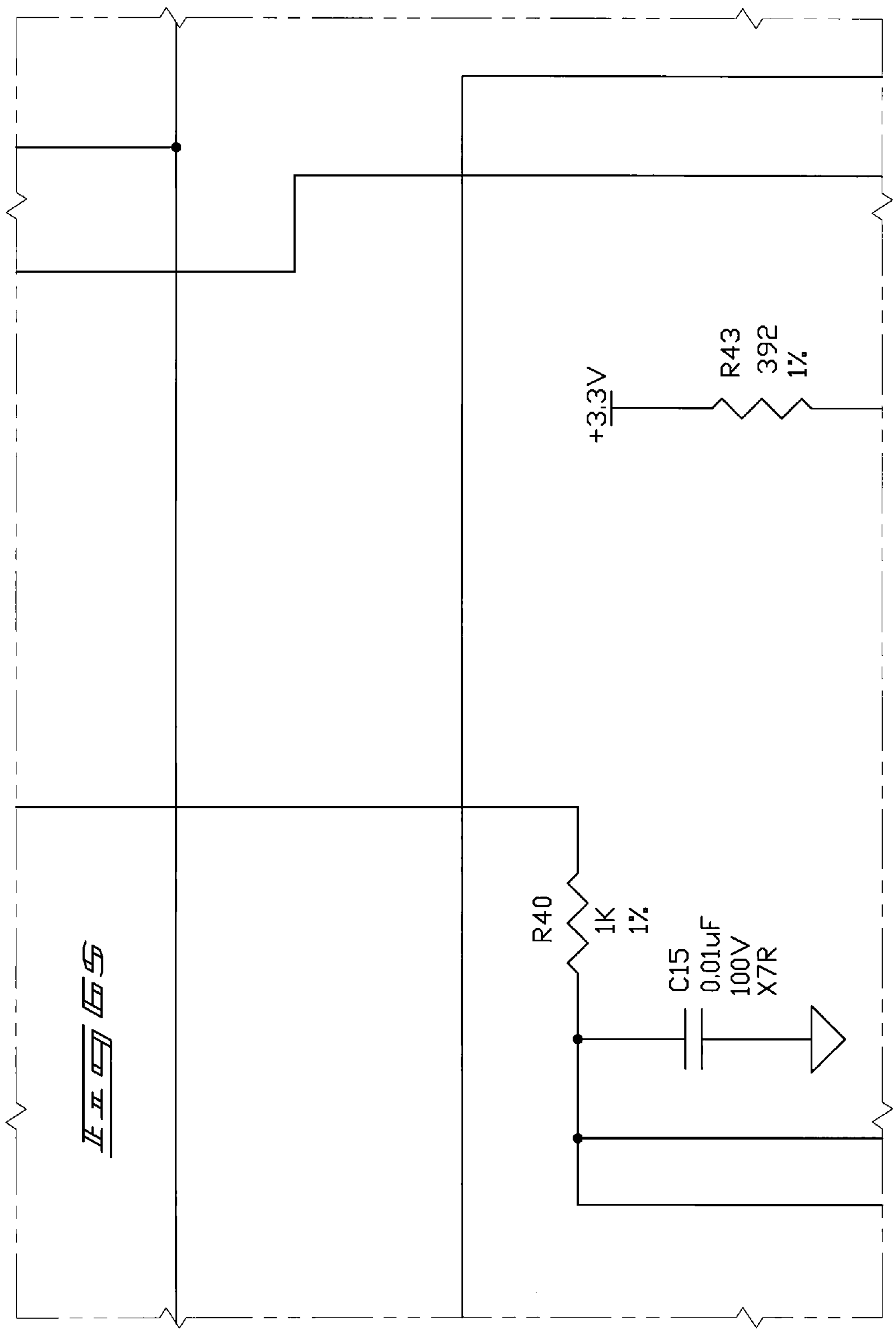
Figure 6I:
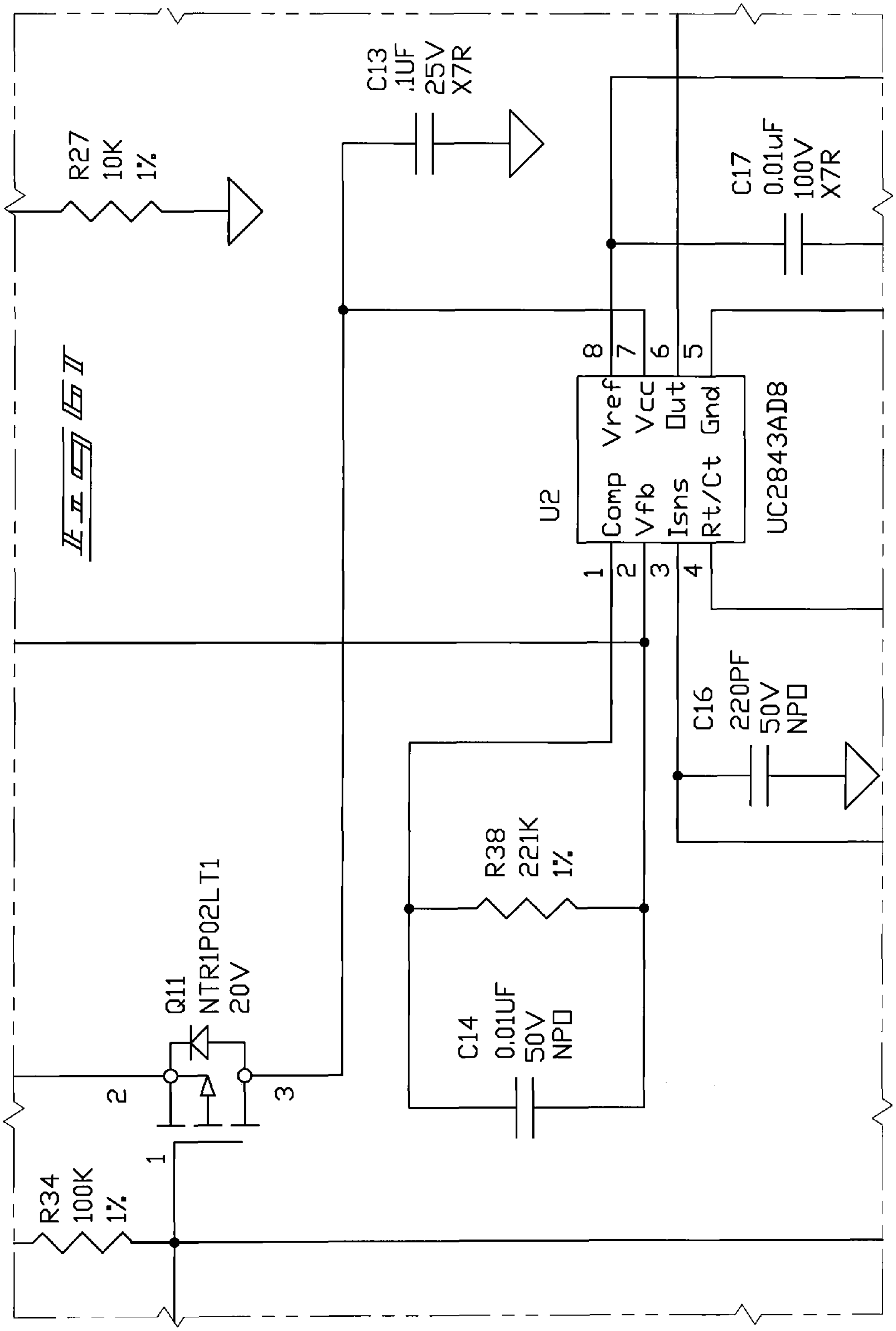
Figure 6W:
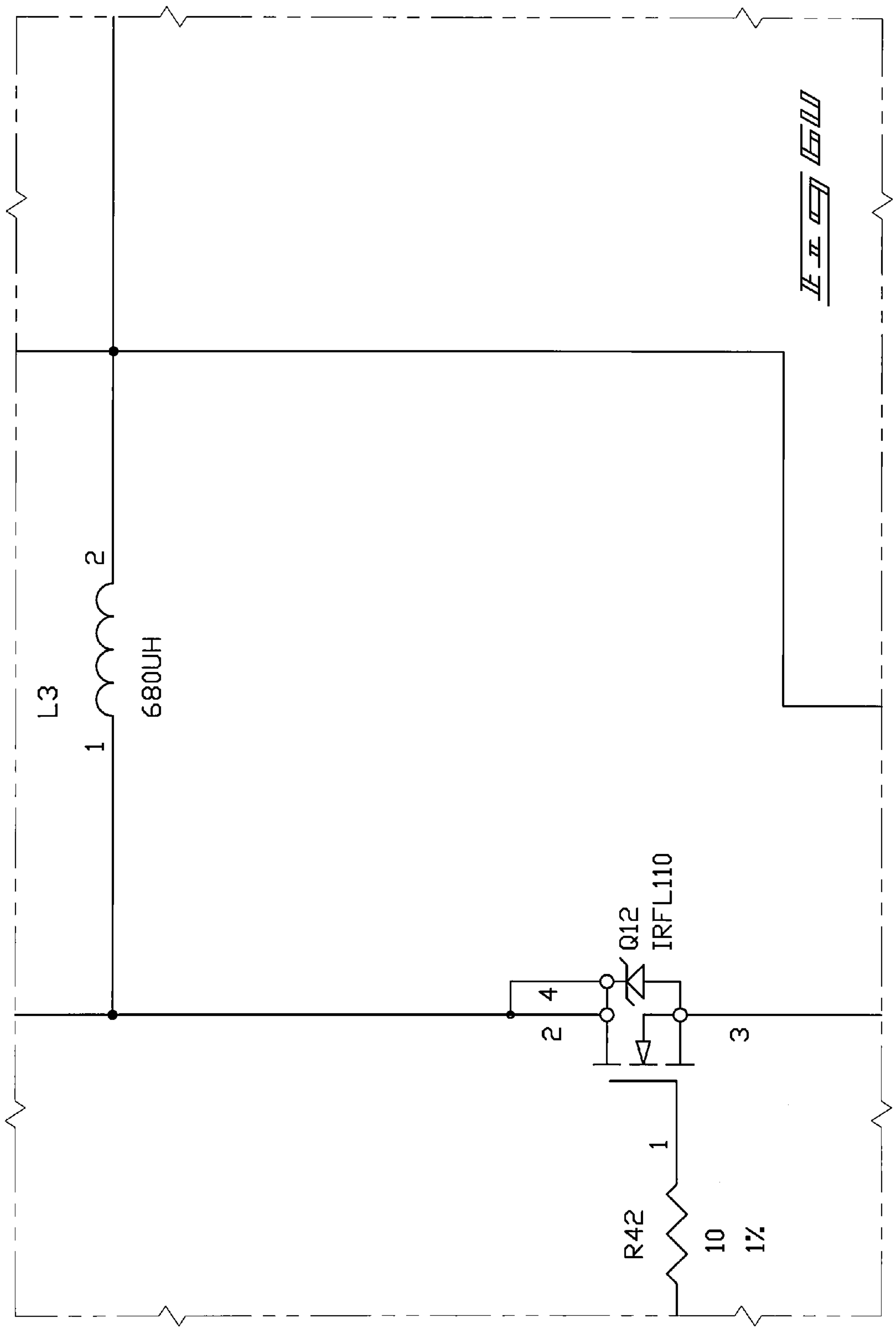
Figure 6V:
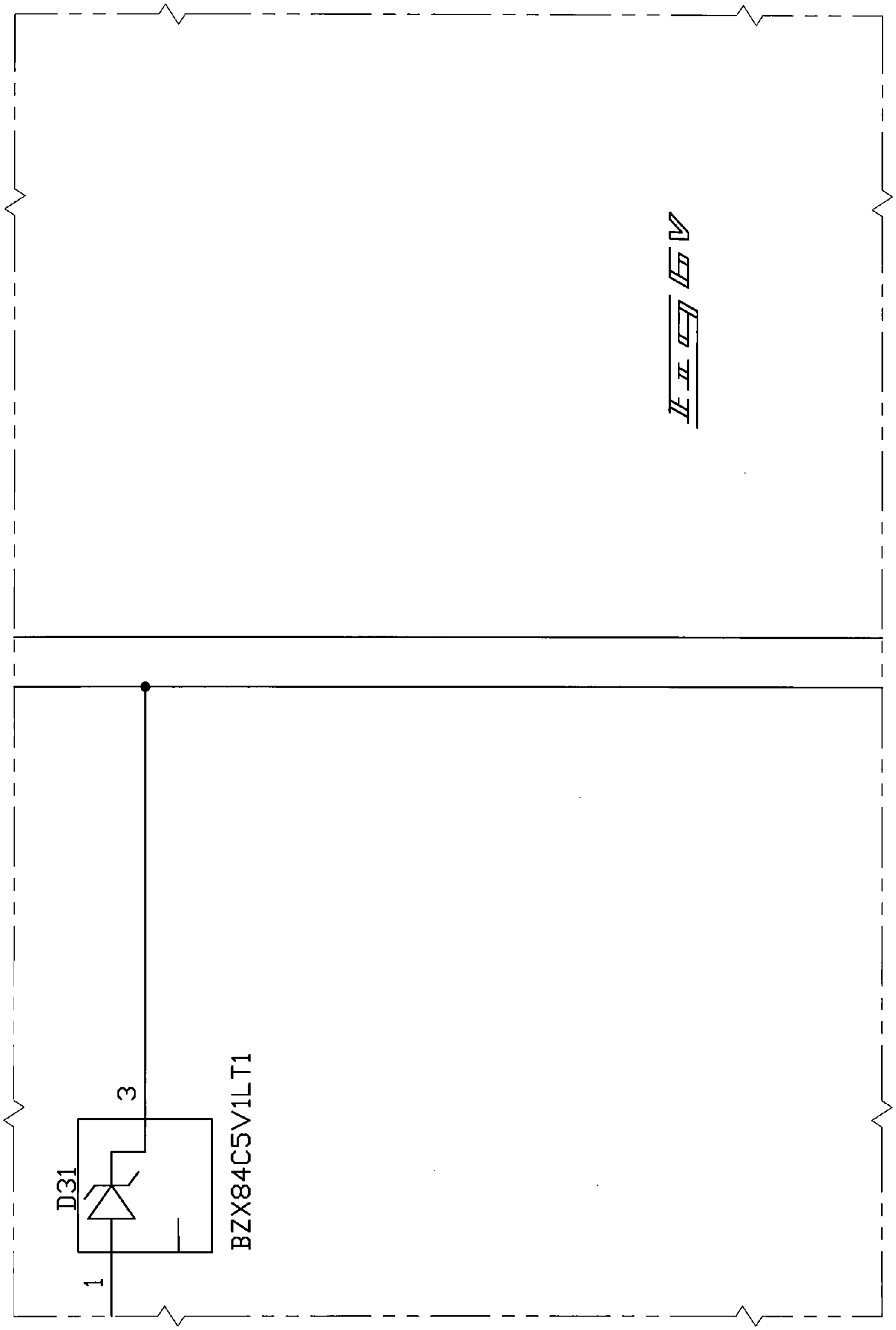
Figure 6W:
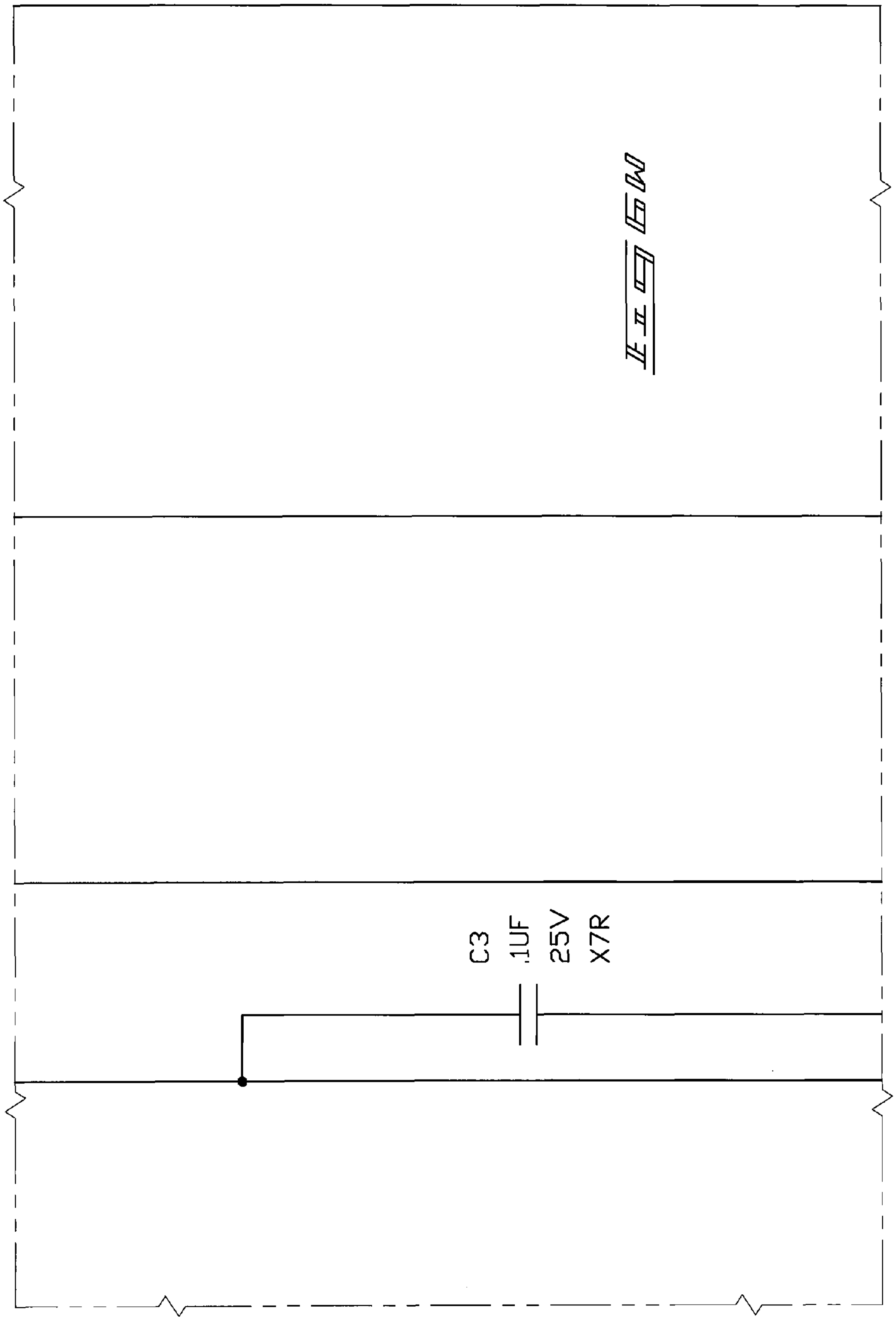
Figure 6X:
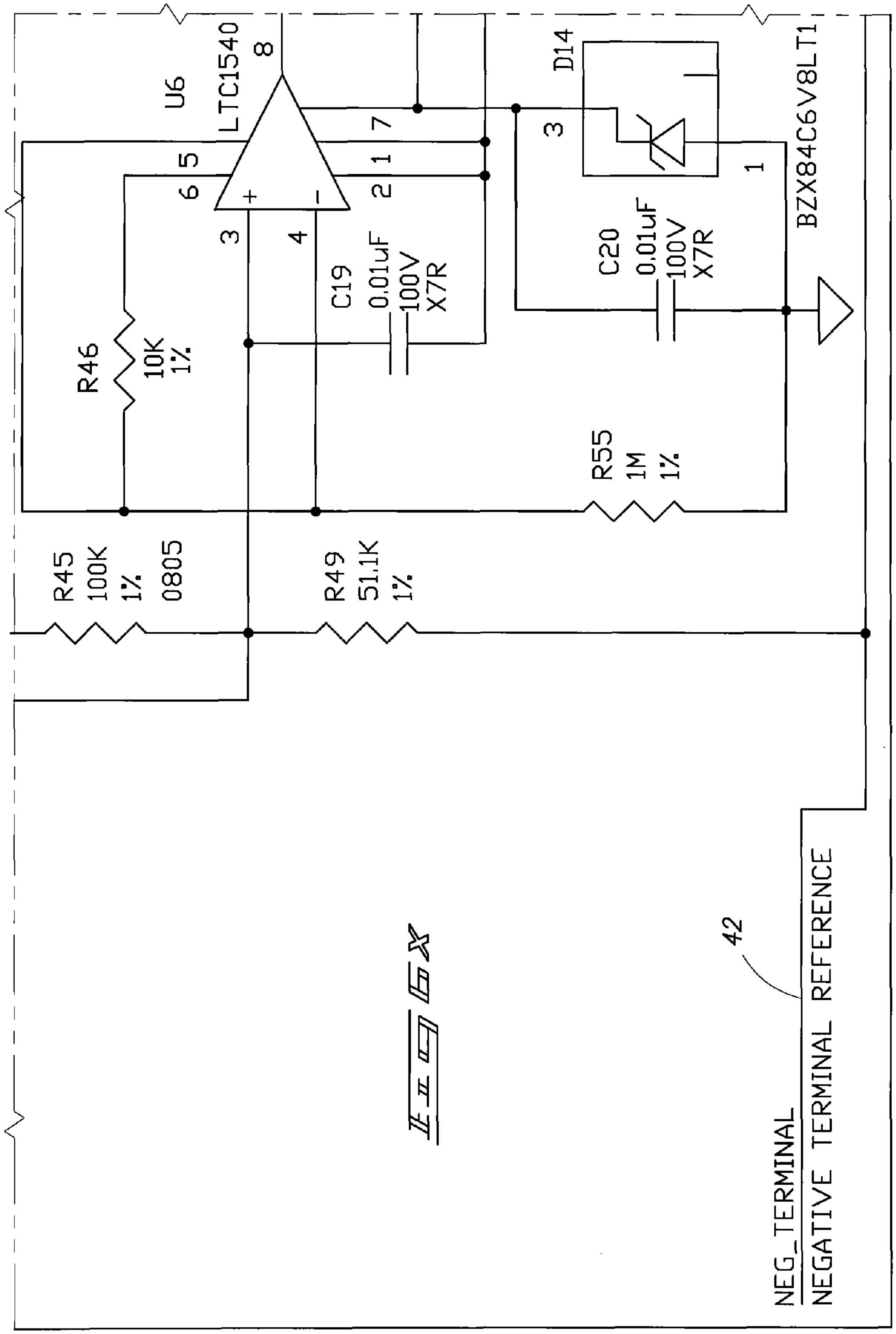
Figure 6Y:
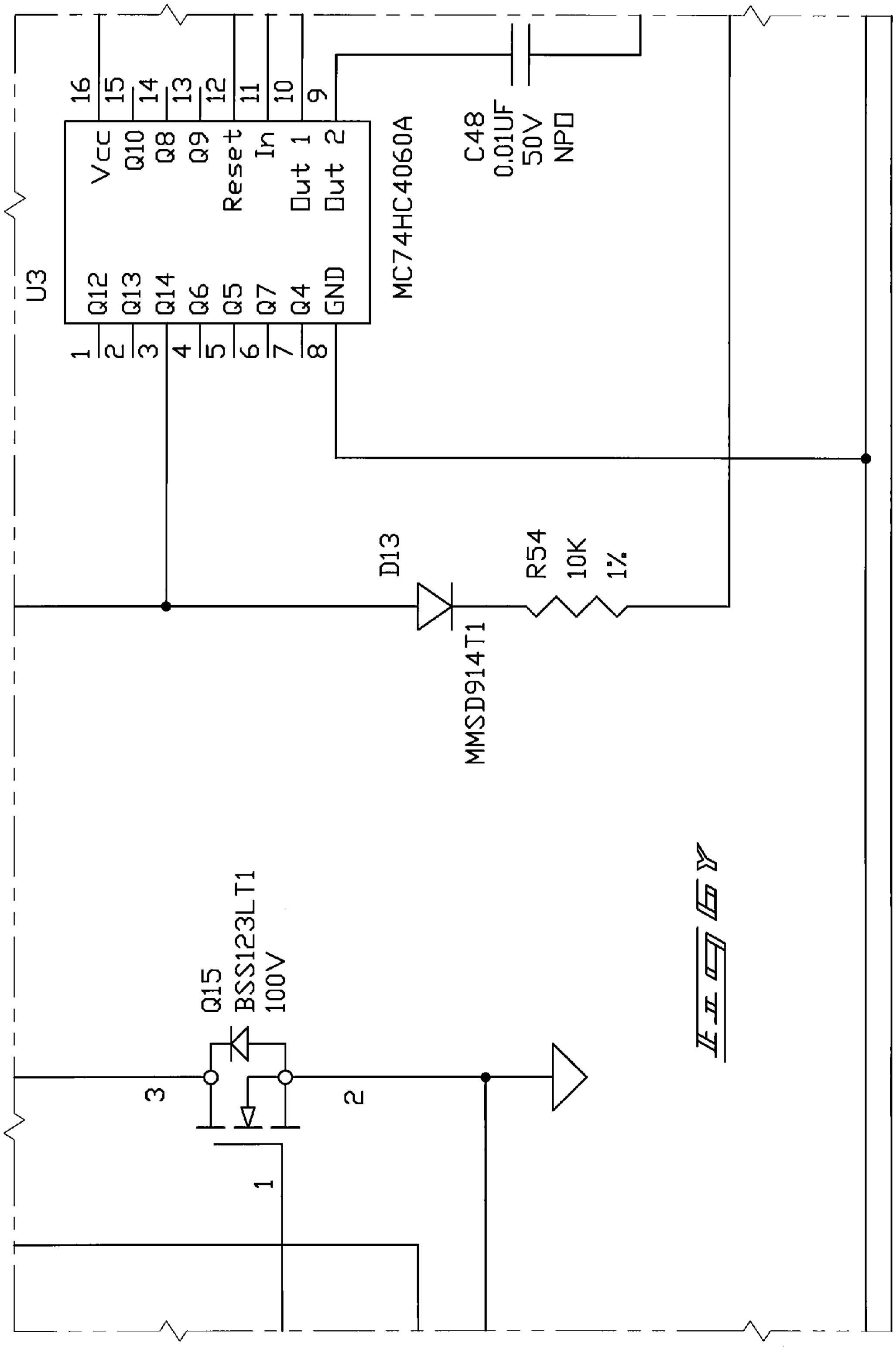
Figure 6A:
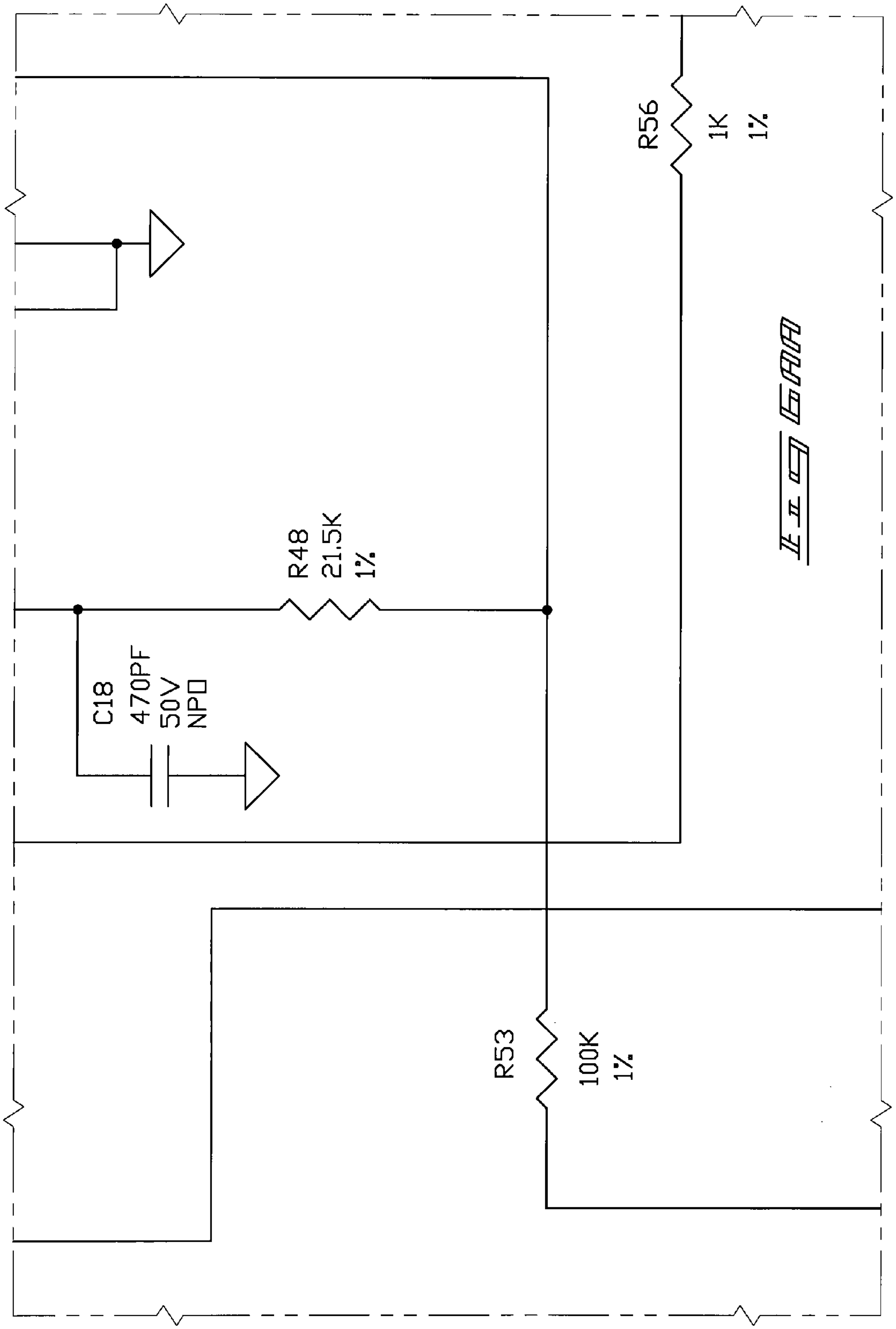
Figure 6B:
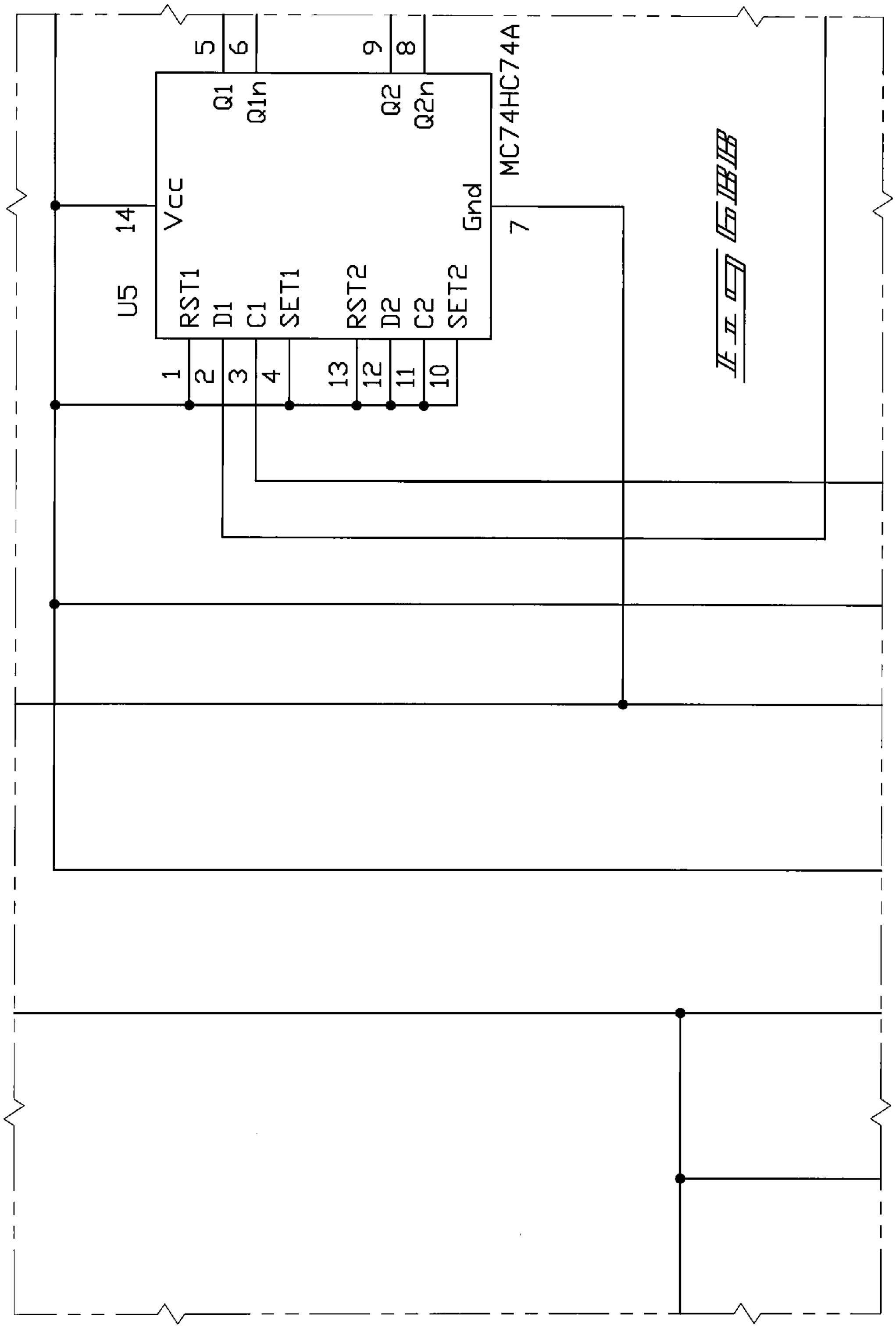
Figure 6C:
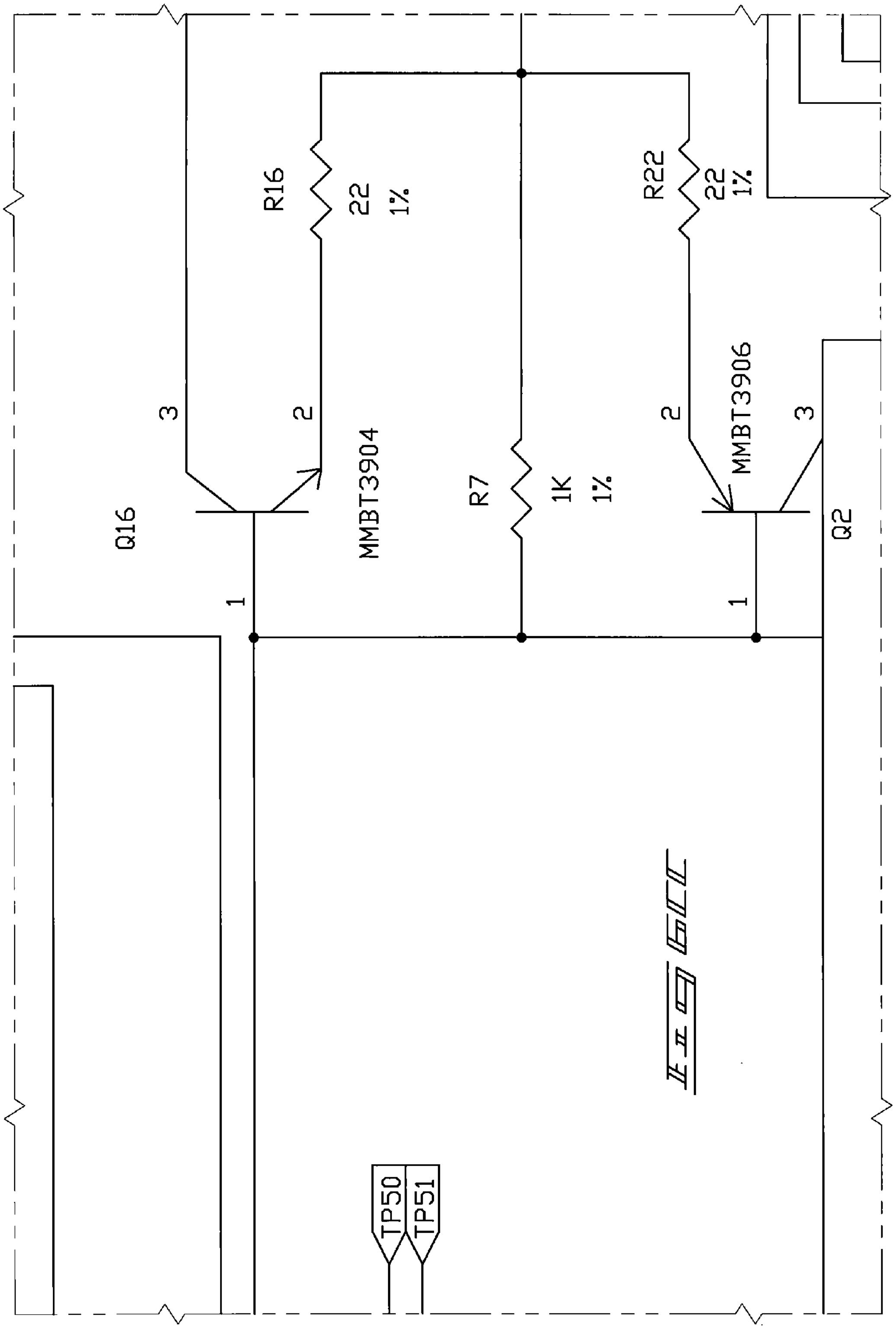
Figure 6D:
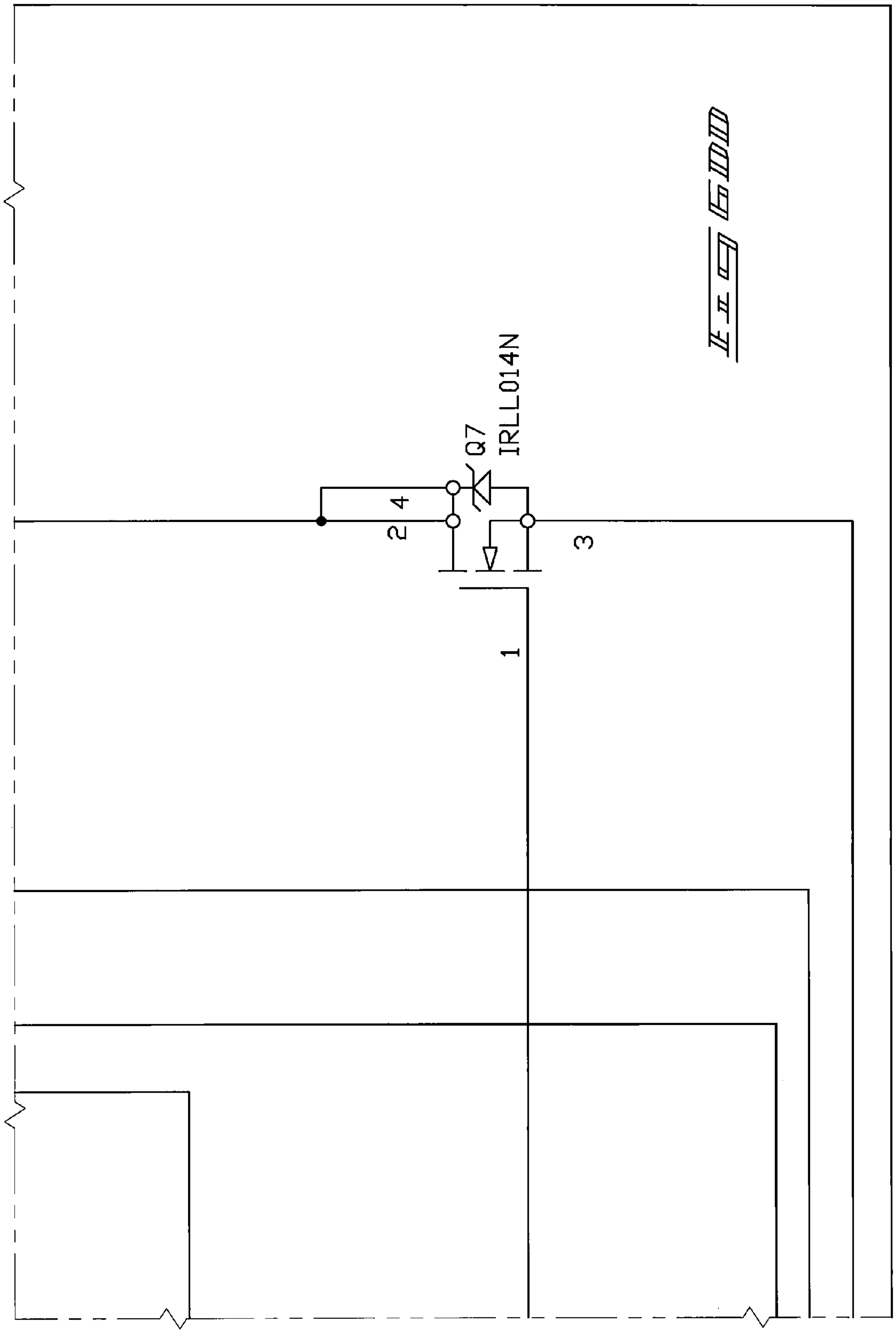
Figure 6E:
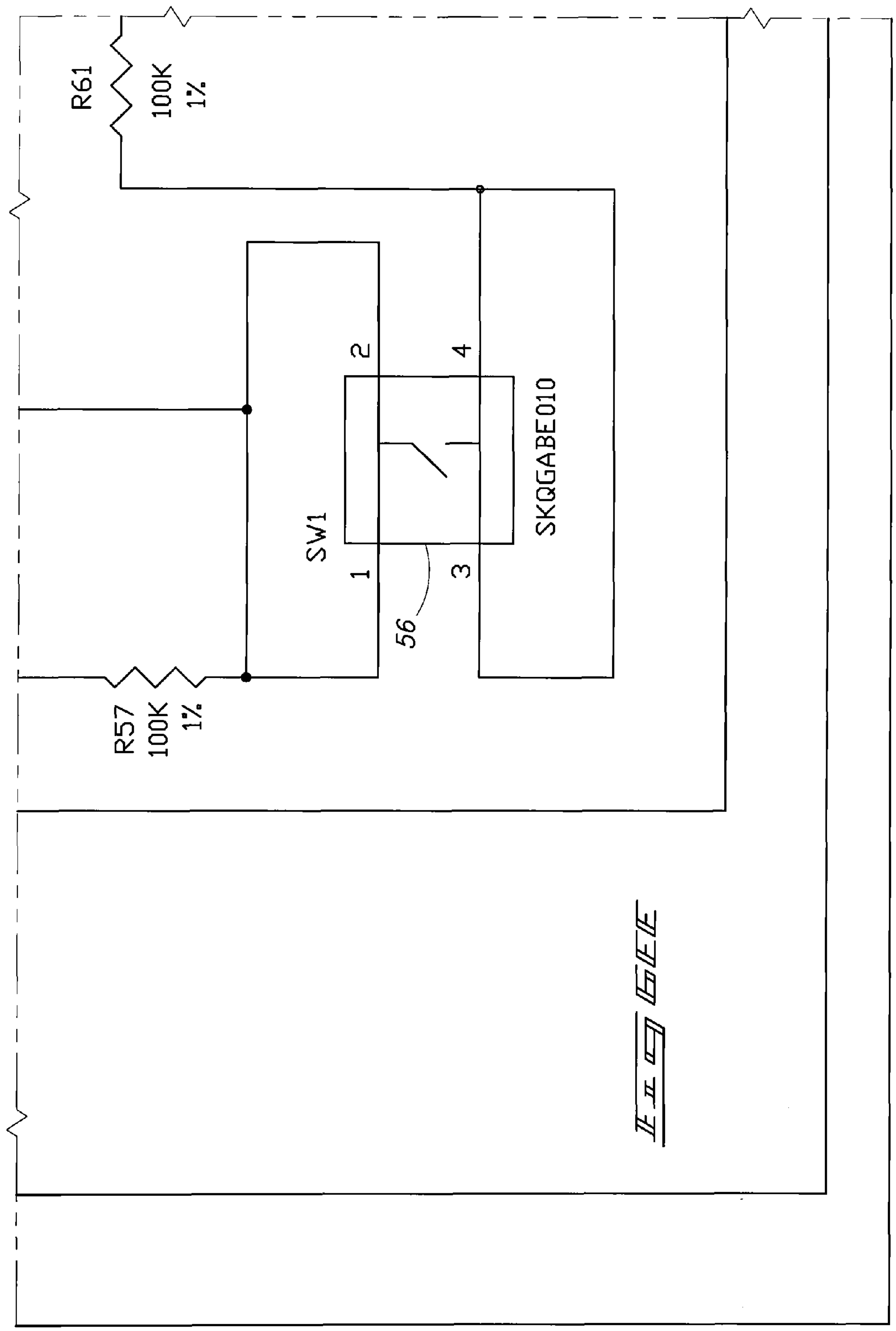
Figure 6F:
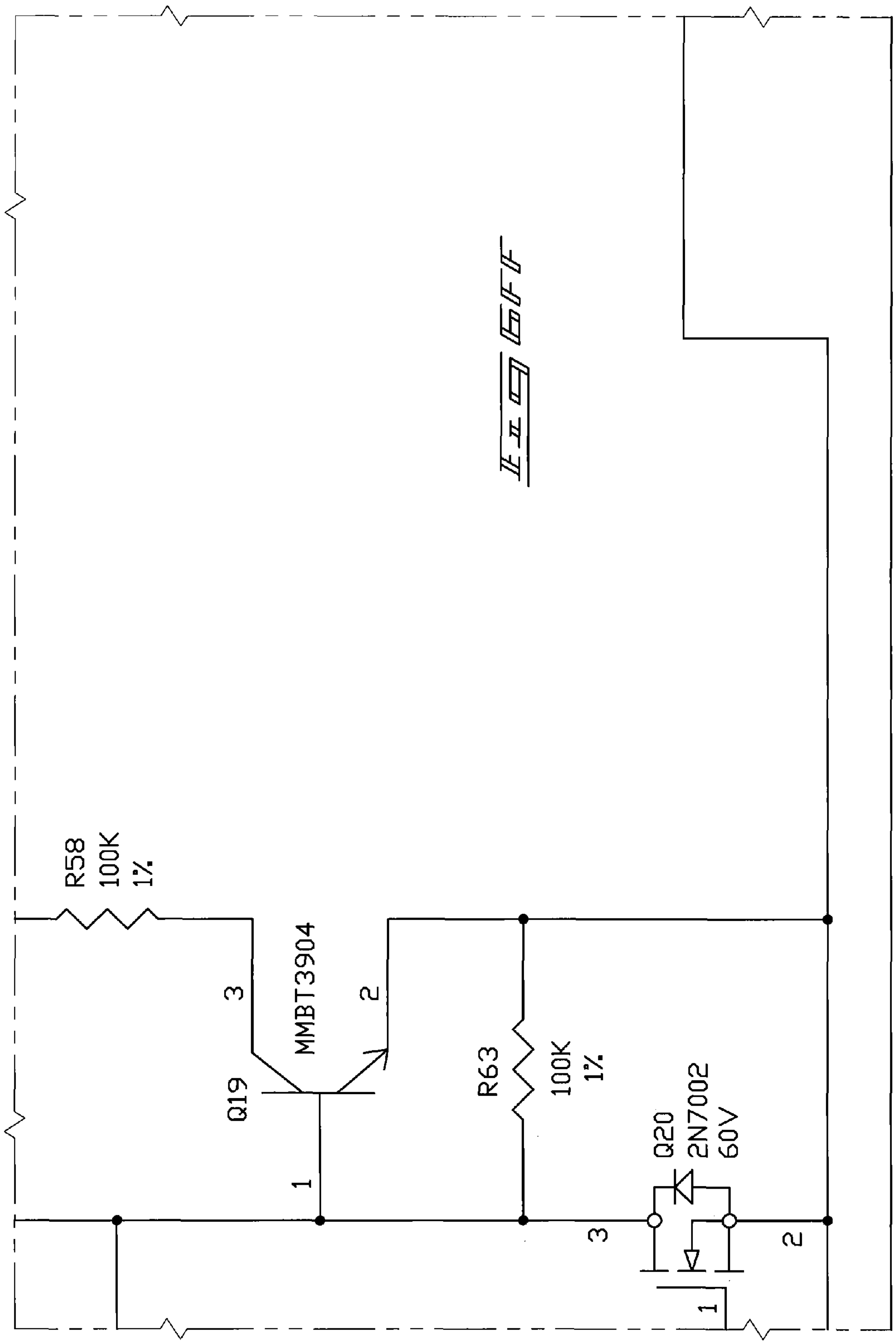
Figure 66:
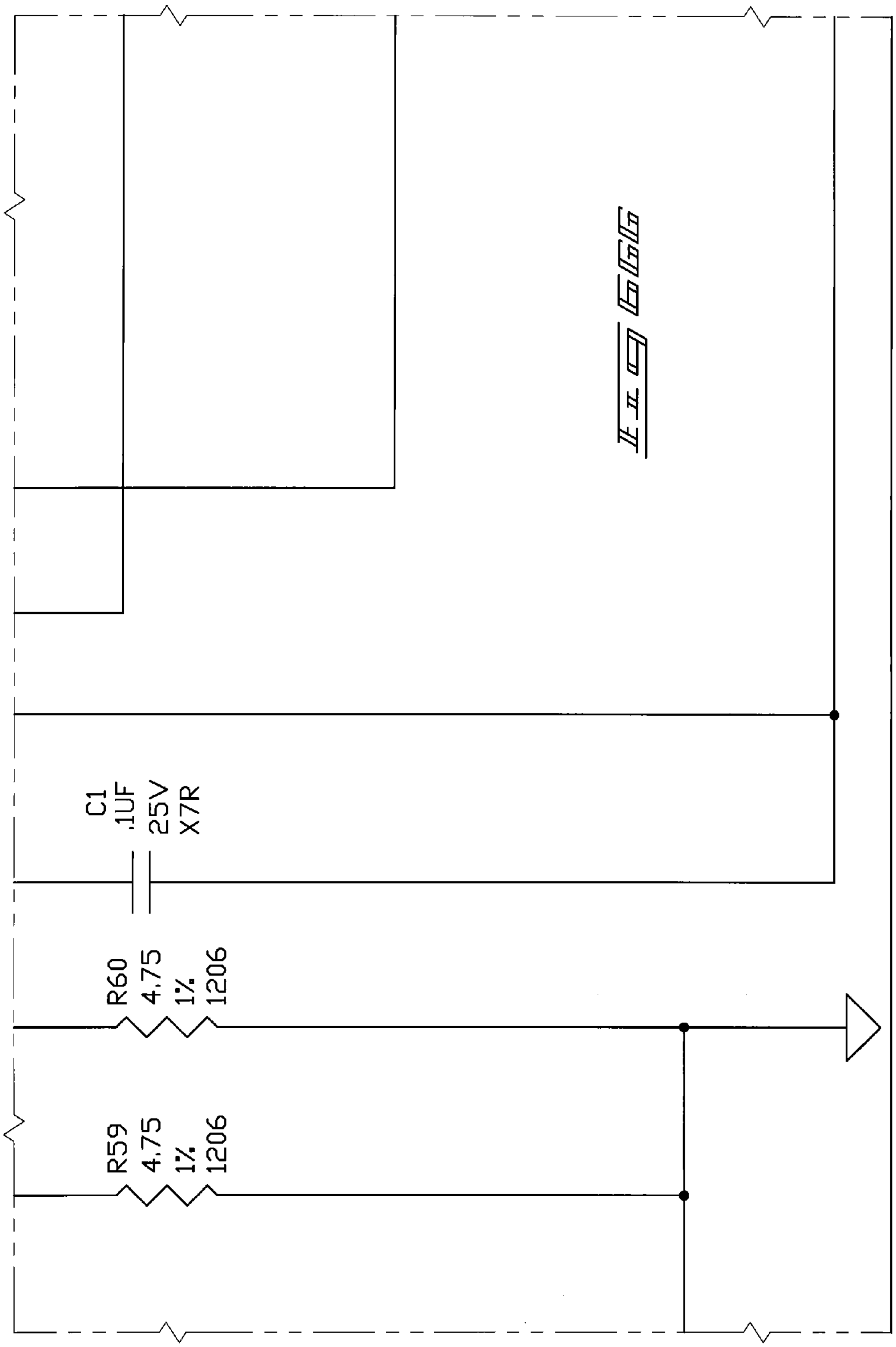
Figure 6H:
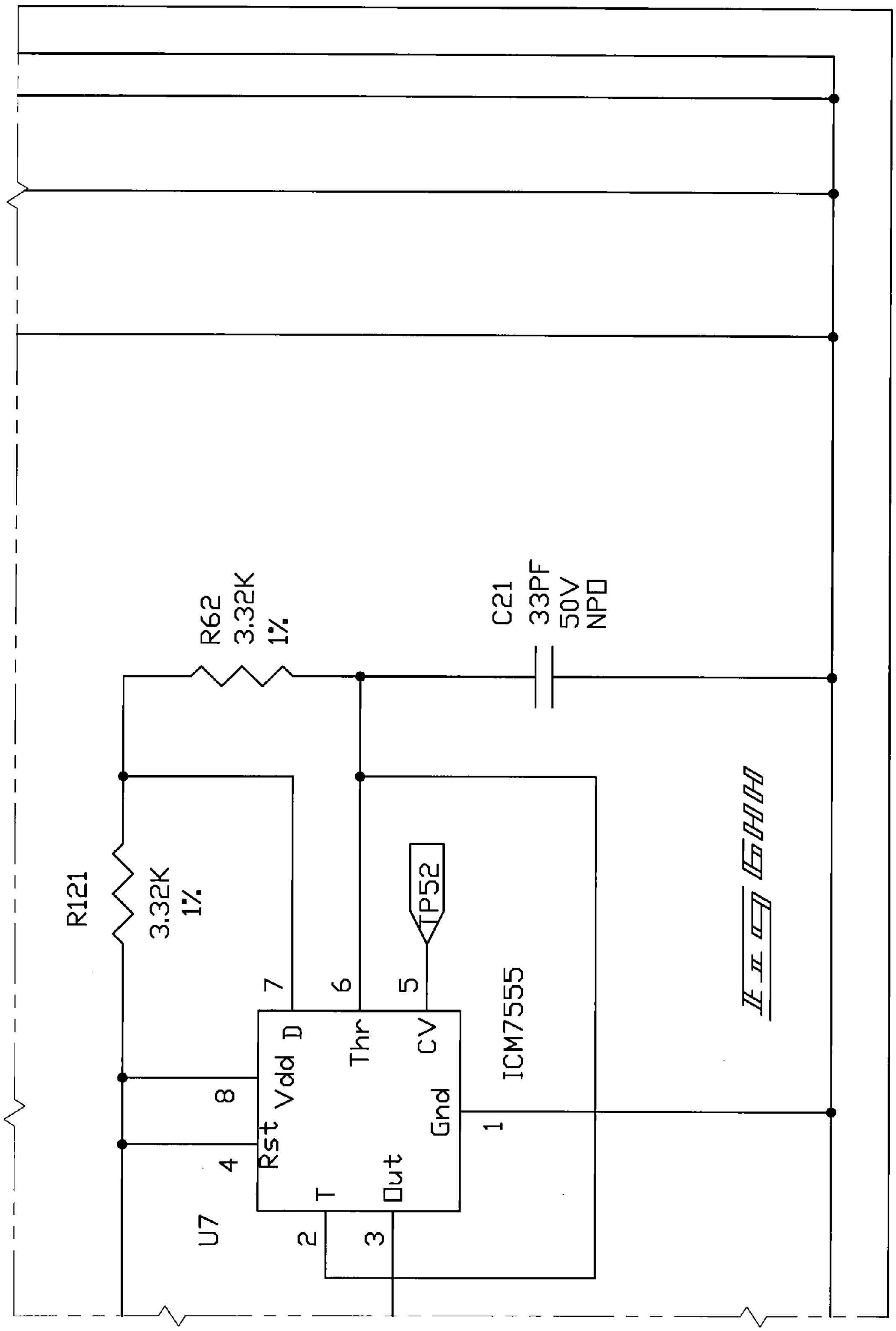

According to the presently described exemplary configuration, wakeup timer U3 of FIG. 6Y of control circuitry 46 is provided to define the above-mentioned plural moments of time. In one embodiment, the wakeup timer defines the moments in time according to a period (e.g., 1 minute). The wakeup timer may control application of the gate voltage to Q11 via Q14 to power-up power supply 54 and processors 48 and/or 50 of control circuitry 46.

Further, user switch 56 may be configured to manually start power supply 54 according to another described aspect. For example, user switch 56 (e.g., SW1 which is shown in FIG. 6EE in the presently described example) causes Q19 of FIG. 6FF to turn on and an indication signal may be sent to processor 48 through Q17, Q1, and Q26 of FIGS. 6Z, 6C, 3CC, respectively, permitting processor 48 to detect activation of user switch 56 and taking desired action.

A shutdown signal from processor 48 may shut down power supply 54 even if user switch 56 is depressed or otherwise activated by a user. However, once processor 48 loses power, the shutdown signal is released and power supply 54 starts responsive to activation of switch 56 or after the time delay of the wakeup timer U3 in the presently-described embodiment.

In one sleep embodiment described above, assembly 20 may be considered to be partially awake inasmuch as control circuitry 46 may monitor operations and wakeup assembly 20 if appropriate. In other embodiments, a third operational mode may be provided wherein the assembly 20 may be considered to be entirely off and no energy is consumed by assembly 20.

According to one embodiment, individual battery assemblies 20 may be configured to provide electrical energy having different electrical characteristics, for example, corresponding to the associated respective electrical entity 14 (e.g., different voltages for use when installed in different applications or for use with different loads utilizing electrical energy of different voltages). Individual assemblies 20 may have different numbers of electrochemical devices 62 coupled in series to provide different voltages. Accordingly, undervoltage comparator U6 may be set for different threshold levels utilizing J2 shown on FIG. 61 of the presently described embodiment. In the described embodiment, a jumper may be soldered to the desired position of J2 for use with 8-16 devices 62 coupled in series in the described exemplary embodiment. The exemplary power supply 54 also has a wide input voltage range.

An exemplary arrangement of power supply 54 includes a plurality of power stages coupled in series. For example, power supply 54 may include a buckregulator to drop voltage from storage circuitry 60 to about 8 Vdc and an unregulated pushpull converter to provide isolation and one or more different output voltages.

The buckregulator utilized in the exemplary embodiment of FIGS. 3-6 includes U2, Q12, D10 and L3 of FIGS. 6T, 6U, 6M, and 6U, respectively and may be referred to as a low side buckregulator which provides advantages over a high side buckregulator inasmuch as the gate drive signal may be direct with no isolation and current sensing is simplified.

An exemplary pushpull converter includes U7, U5, Q7, Q10 and T1 of respective FIGS. 6HH, 6BB, 6DD, 6O, and 6G. An input capacitor may be omitted from the pushpull converter and input current may be fed using L3 of FIG. 6U and the circuit may be referred to as a current fed pushpull converter. The exemplary pushpull converter is less sensitive to flux imbalance of the transformer T1, currents in the converter are well controlled, additional outputs with good cross-regulation may be added if desired, and output inductors may or may not be used.

As mentioned above, voltage regulation may be performed by the buckregulator. The feedback voltage may be sensed at the output of the buckregulator by level shifting circuitry including Q6, R15 and R27 of respective FIGS. 6L, 6D, and 6T. The voltage across resistor R15 is converted into a current by Q6 and the current is converted back to a voltage by R27 which is connected to the signal ground of control circuit U2.

During power up, the buckregulator draws bias current through Q5 of FIG. 6D which is connected as a constant current series regulator with voltage limiting provided by D8 and D11 of FIG. 6K. When the buckregulator is started, the bias current is provided through C4, D3 and D12 of FIGS. 6M, 6M and 6K, respectively, and Q5 is shut off by Q9 of FIG. 6K to limit power dissipation.

Precision series regulators of power supply 54 may be utilized to provide desired voltages for use by the respective assembly 20. The precision series regulators are shown for example in FIGS. 3A and 3B.

Processor 48 (U10 of FIG. 3J in the described example) may measure a voltage of circuitry 60 using U9C of FIG. 3N. U9A and U9B of respective FIGS. 3M and 3L provide an exemplary way of measuring smaller variations in voltage of circuitry 60 and can performed with higher gain and variable offset. Current of circuitry 60 may be sensed using sensor 68 (U14 of FIG. 3EE in the described example) which comprises a hall effect sensor which measures the magnetic field close to a busbar which carries the current of assembly 20. The output signal is proportional to the current of circuitry 60 and can be measured by processor 48 and/or processor 50.

Communications interface 44 may include an external serial communications port using U13 of FIG. 3AA which is an isolated RS485 transceiver. The transceiver uses T2 of FIG. 3AA to provide isolated voltage for the communications port. An overload on the isolated voltage supply (pins 14 and 11 on U13) causes U13 to indicate an error signal on pin 27 which may be read by processor 48 corresponding to the user initiated sleep mode control and which provides the overload in the described embodiment.

Processors U10 and U22 (corresponding to processors 48, 50 of FIGS. 3J and 4M) may be located on separate circuit boards within housing 24 of assembly 20 and internal communication may be implemented between processors 48, 50 using an $I^2C$ interface in one embodiment. In one embodiment, processor 50 uses 5 Volts and processor 48 uses 3.3 Volts, and accordingly, a level shifter of Q21 and Q22 of FIG. 3H may be used.

Two hardwired signals EMERGENCY and SECOND DEFENSE may be communicated to processor 48 from an external circuit board. The EMERGENCY signal may be used by processor 50 to quickly inform processor 48 to open switching device 52 inasmuch as the exemplary $I^2C$ communication may have delays.

Figure 4:
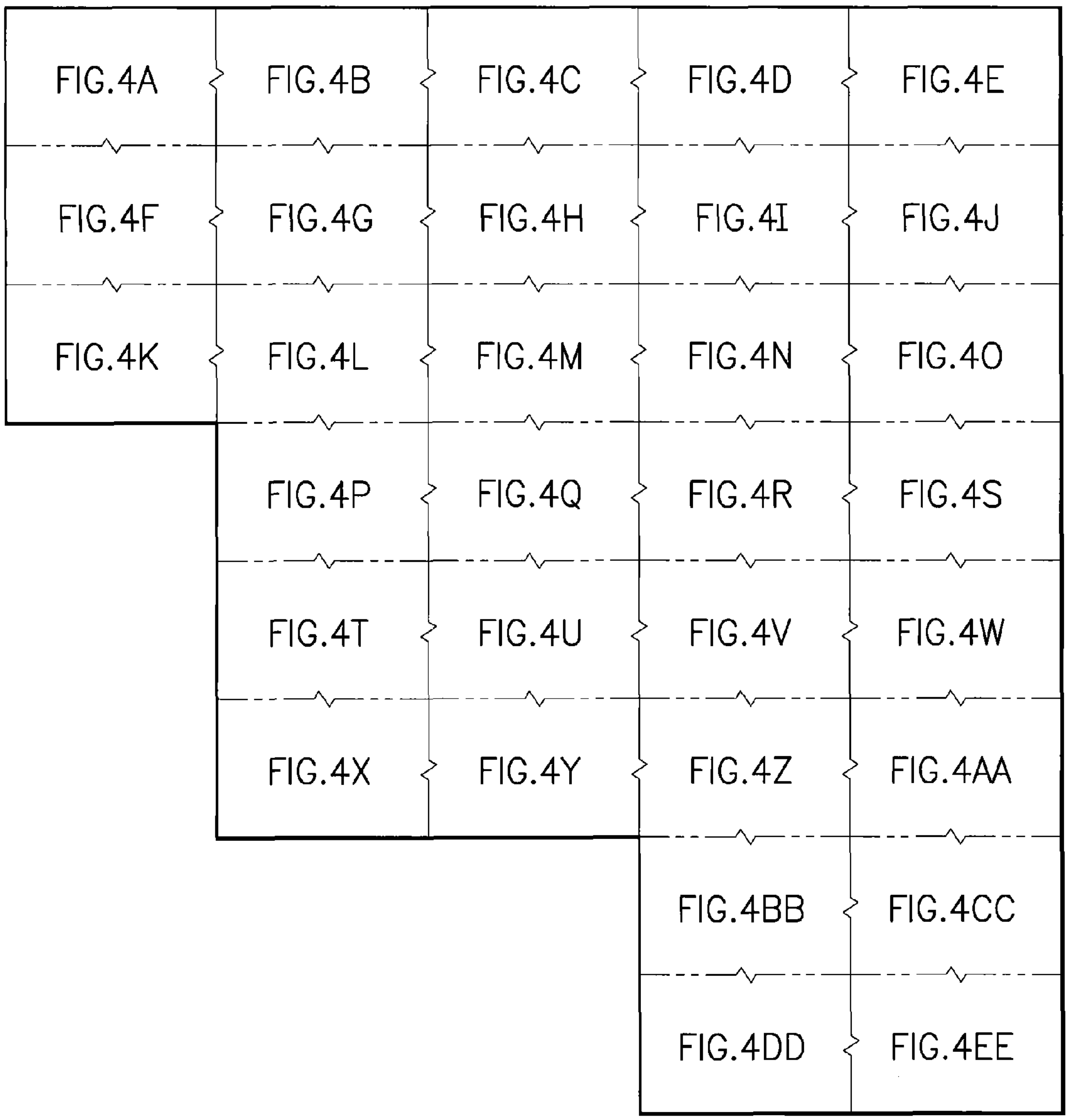
FIG. 4 is a map illustrating how FIGS. 4A-4EE are to be assembled, and once assembled, FIGS. 4A-4EE illustrate additional exemplary circuitry of the power supply apparatus according to one embodiment.
Figure 4B:
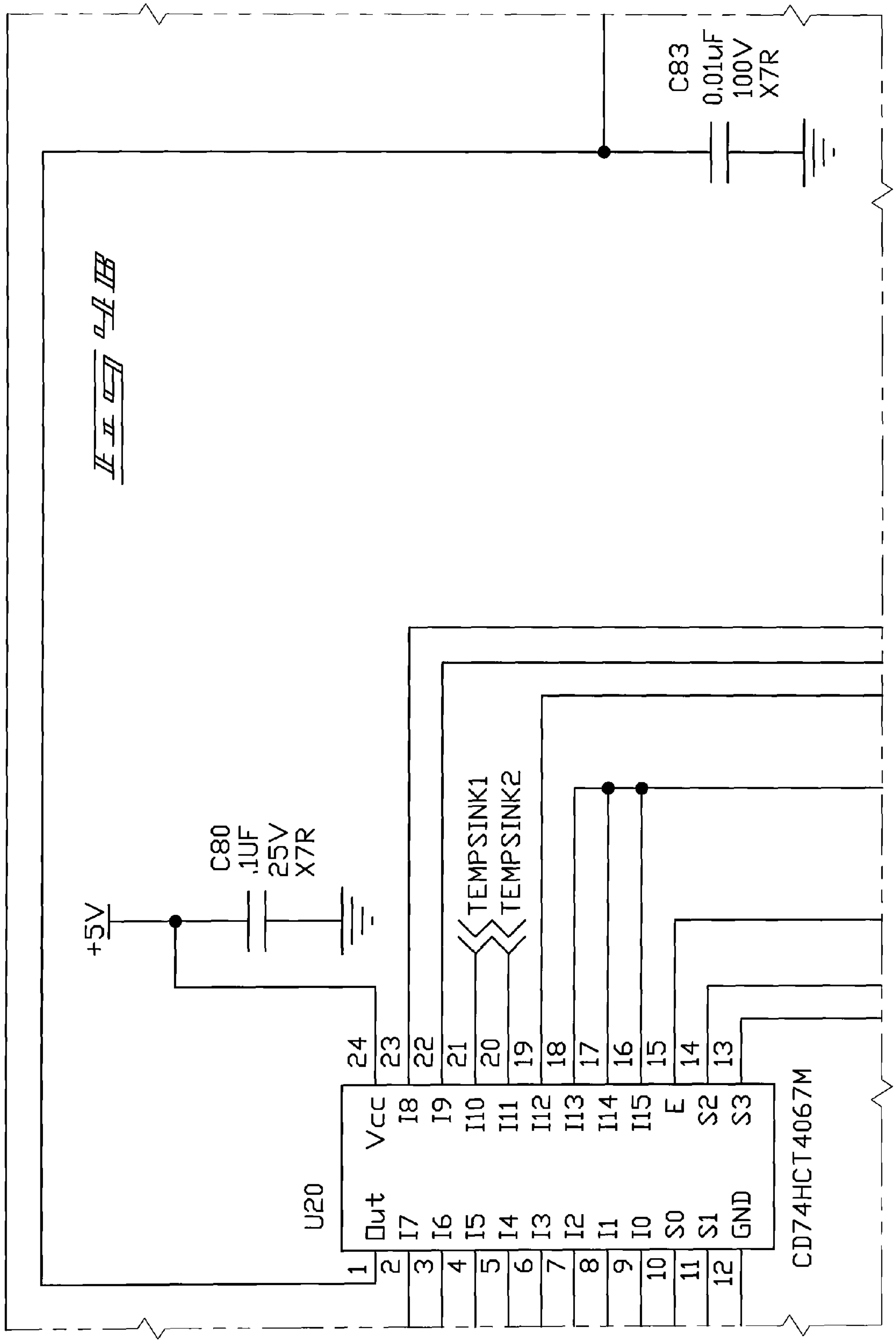
Figure 4L:
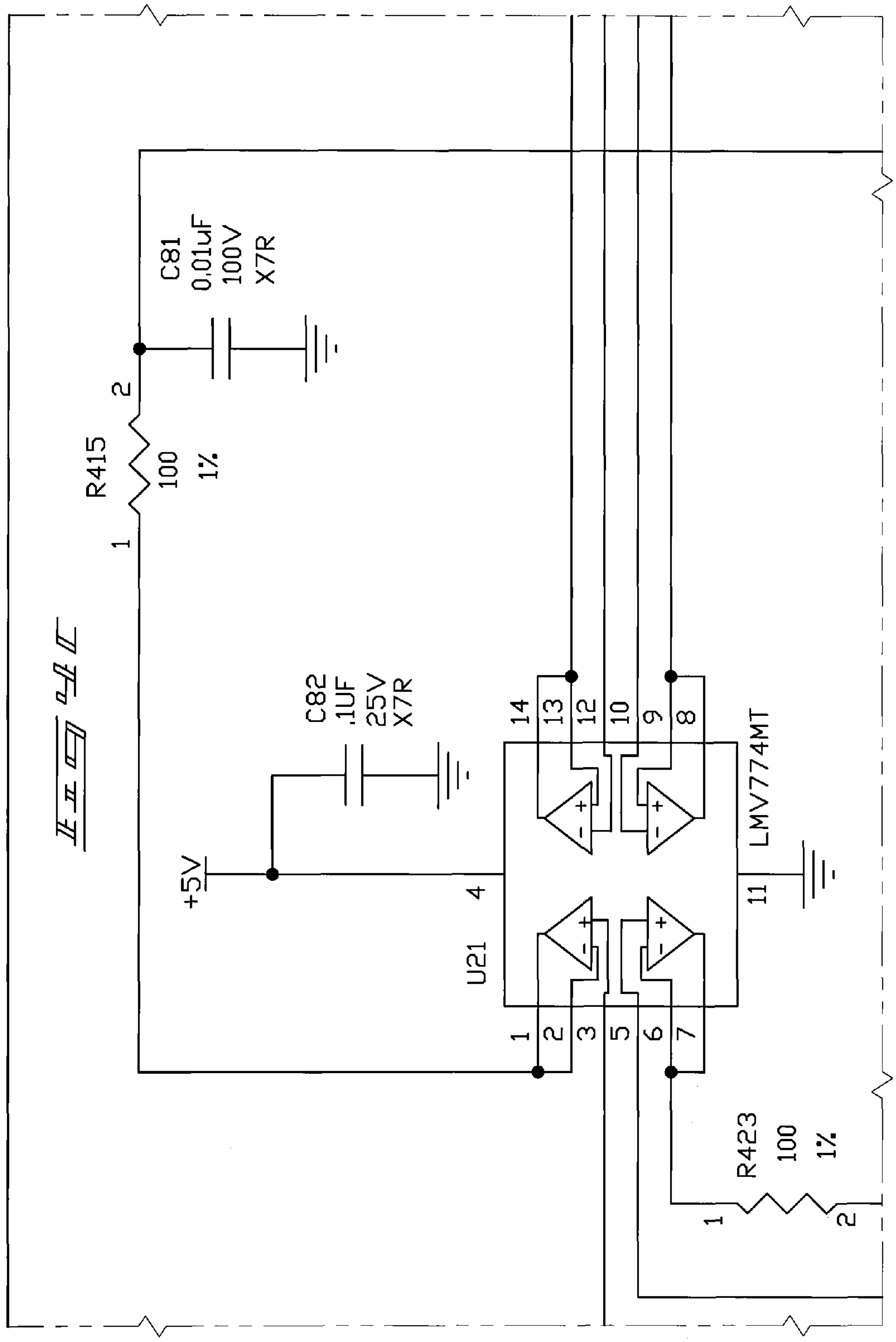
Figure 4D:
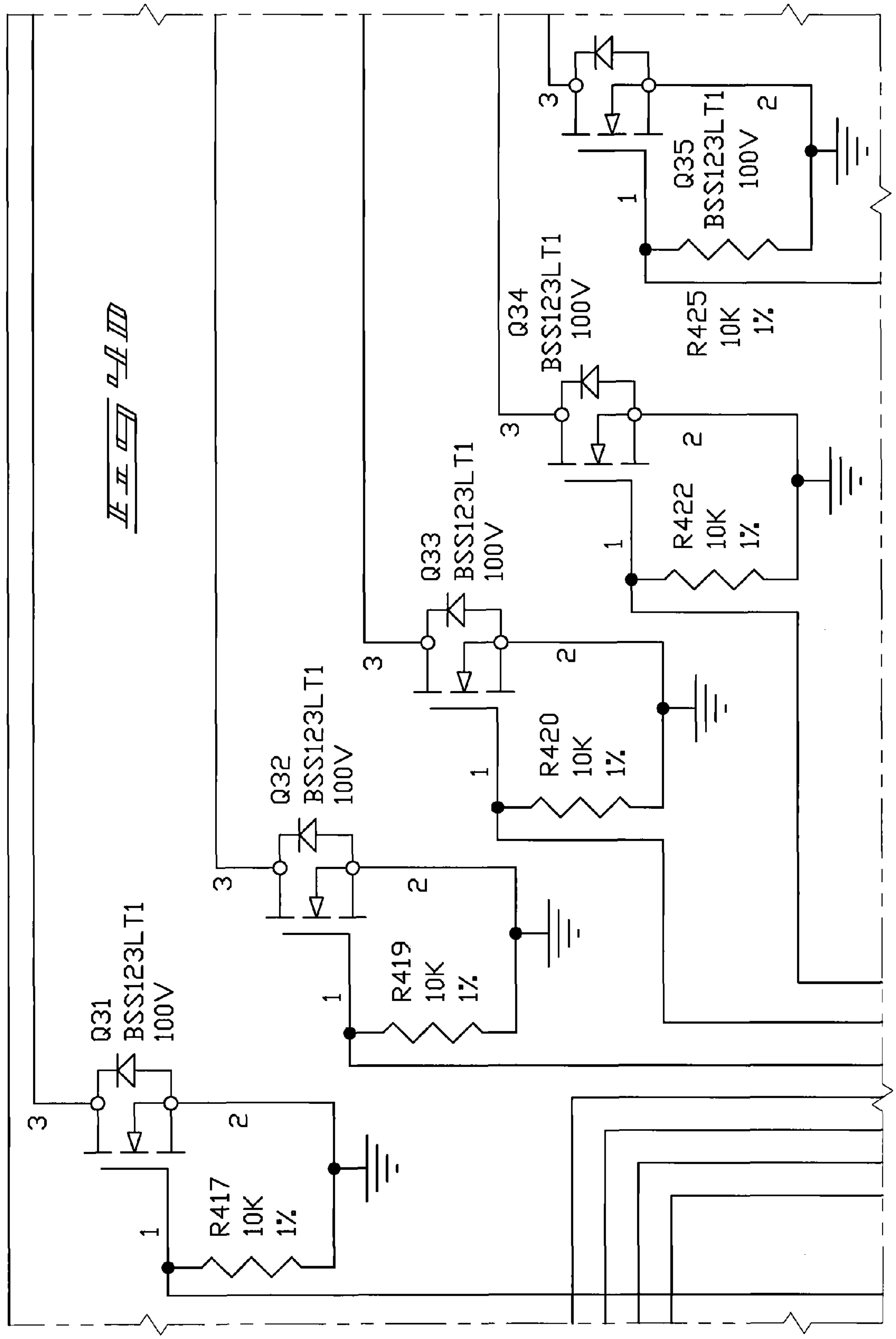
Figure 4E:
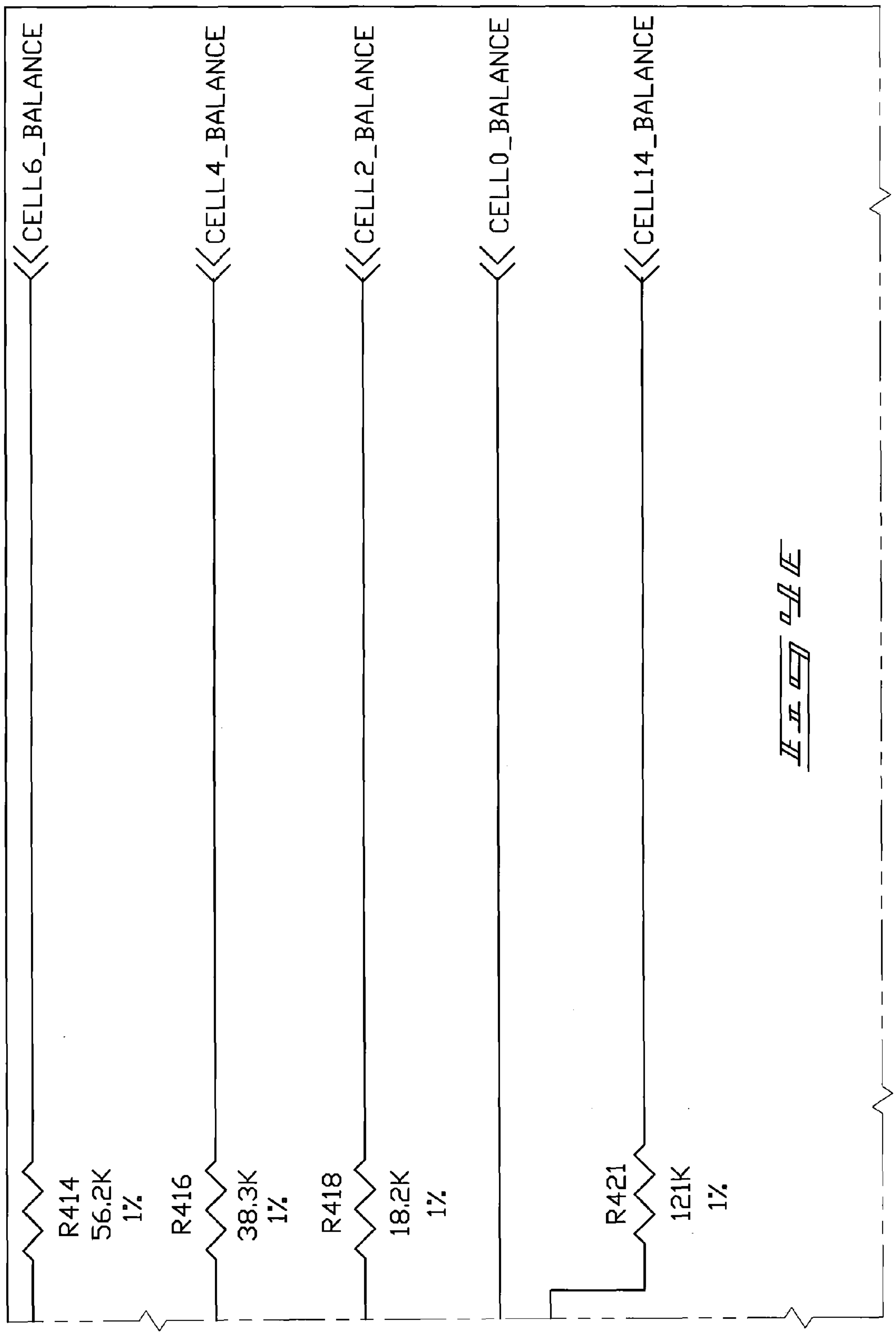
Figure 44:
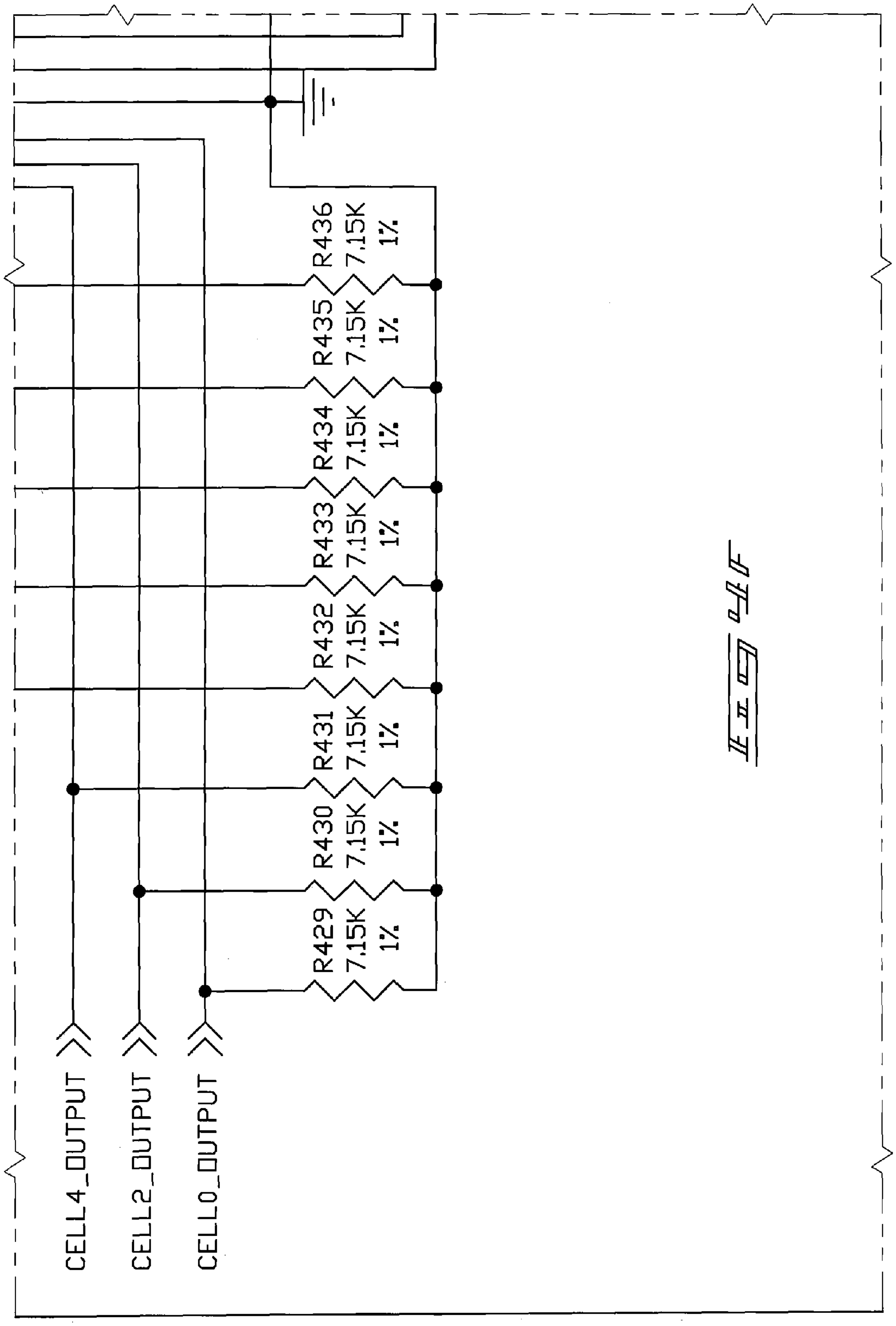
Figure 46:
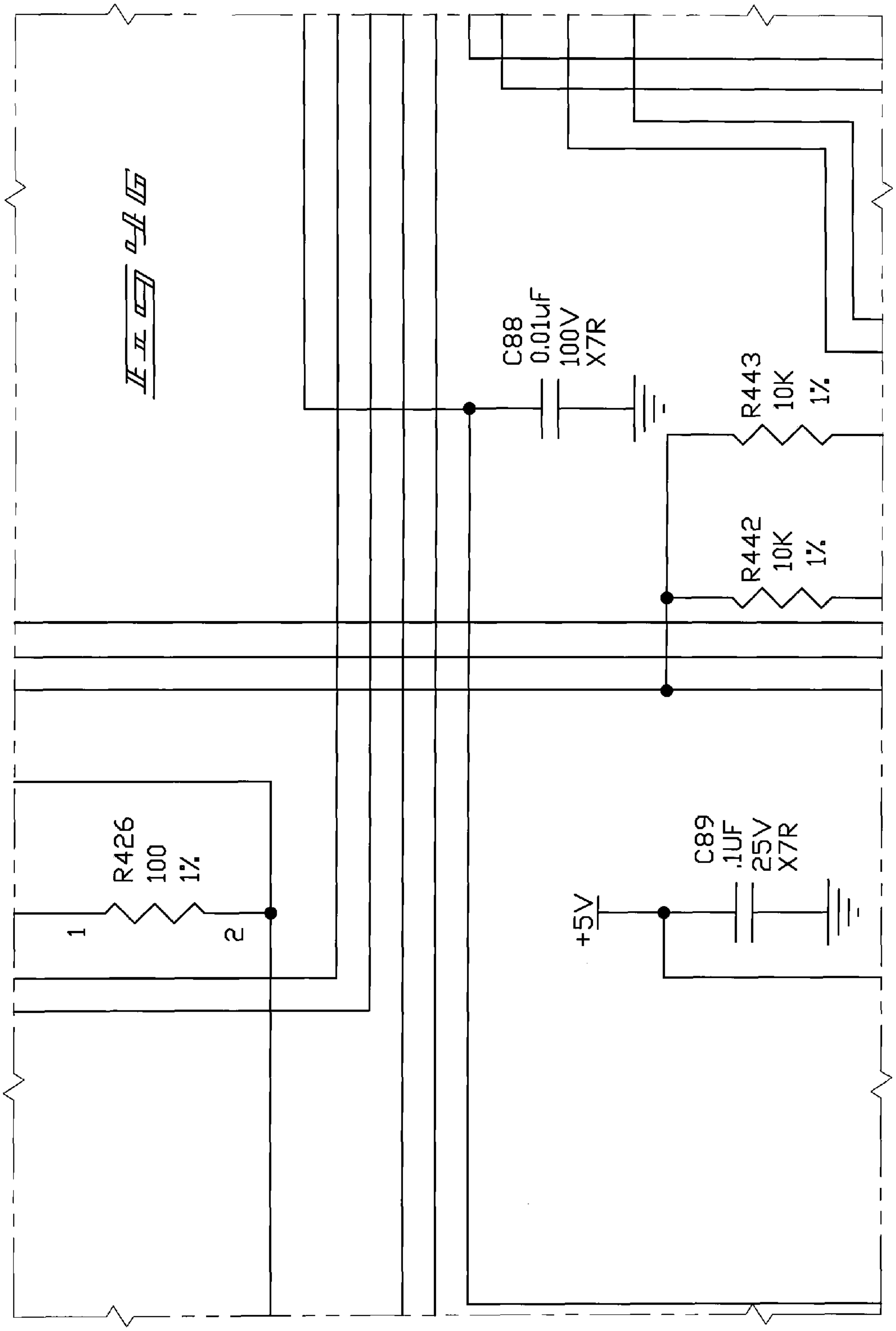
Figure 4J:
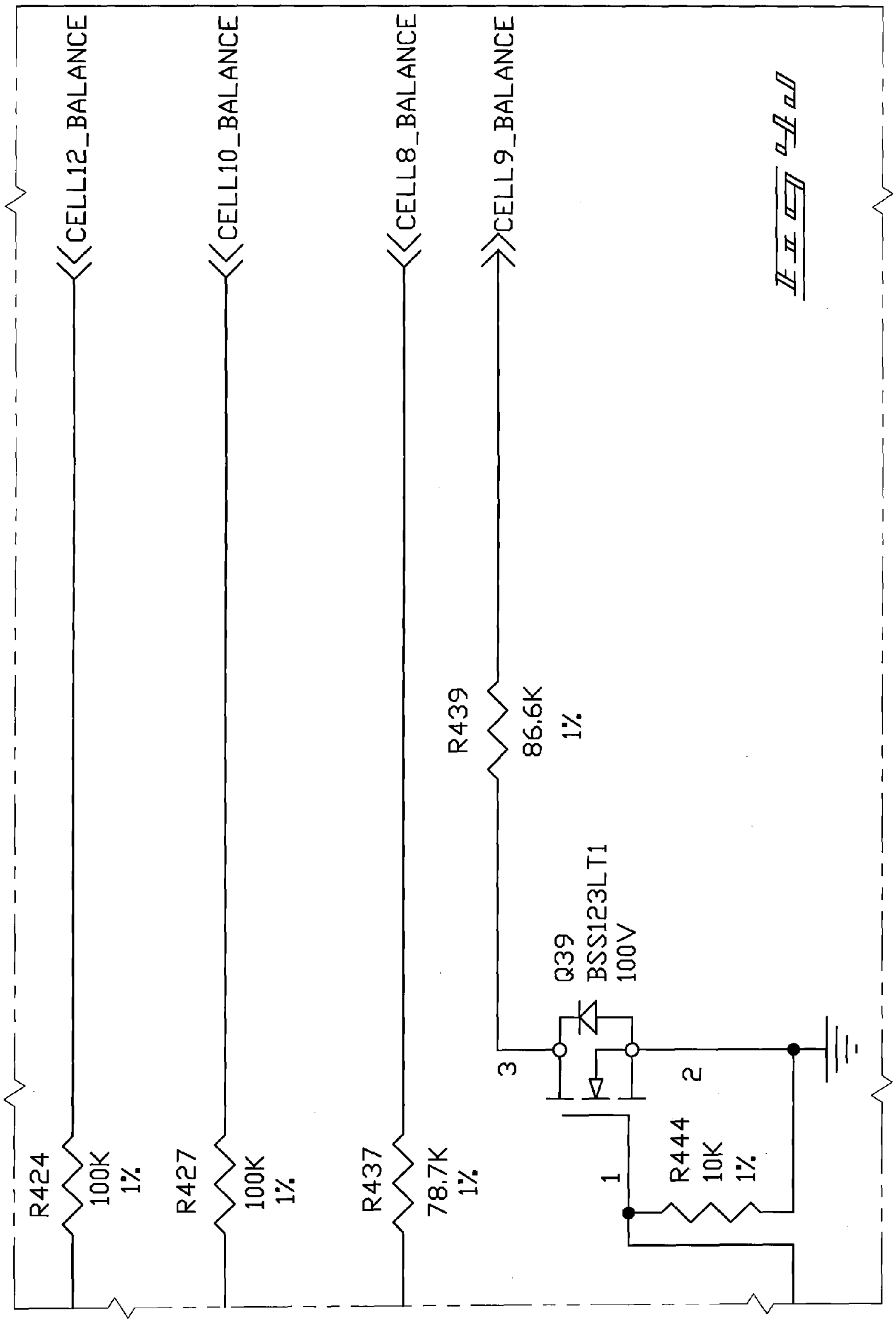
Figure 4K:
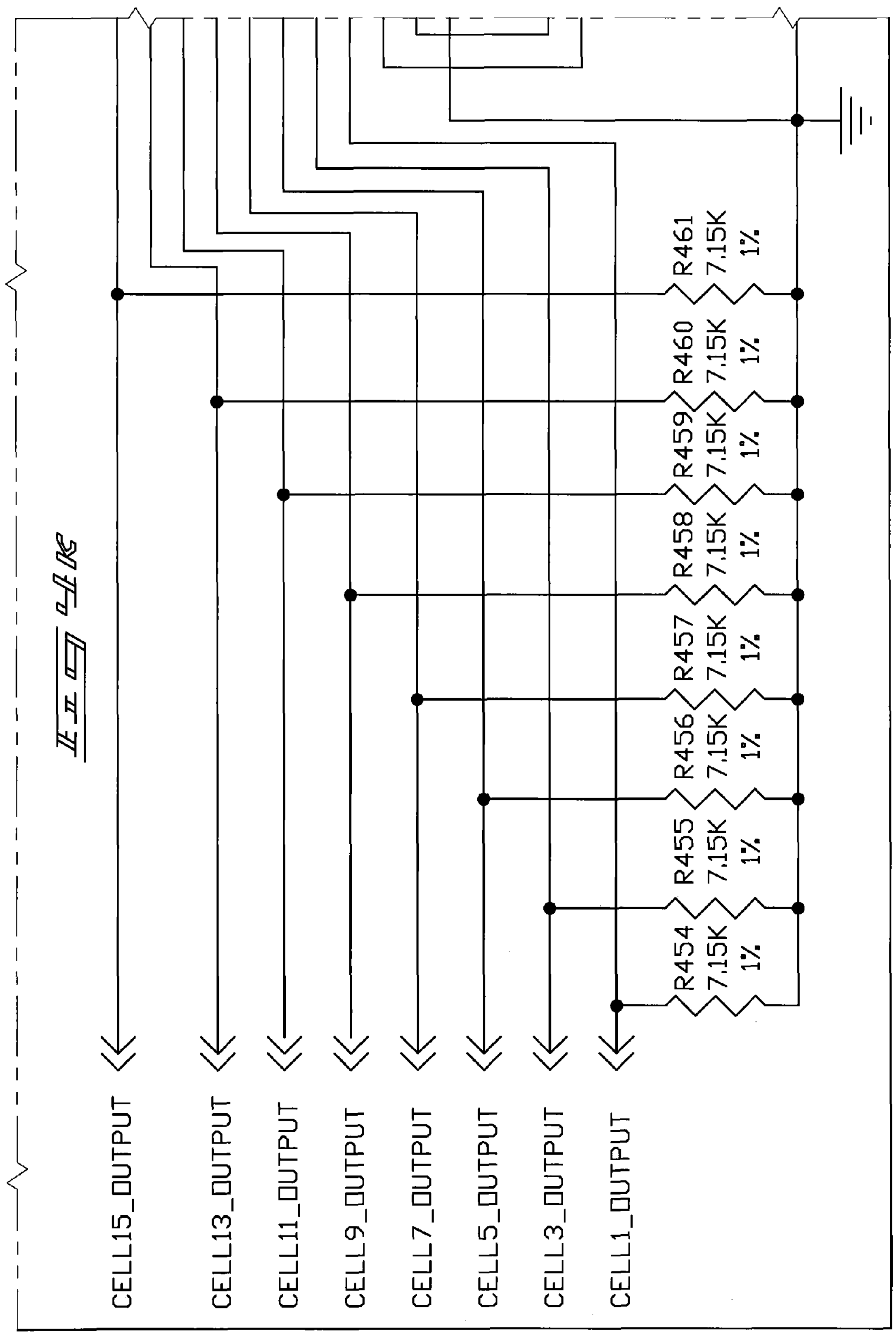
Figure 4D:
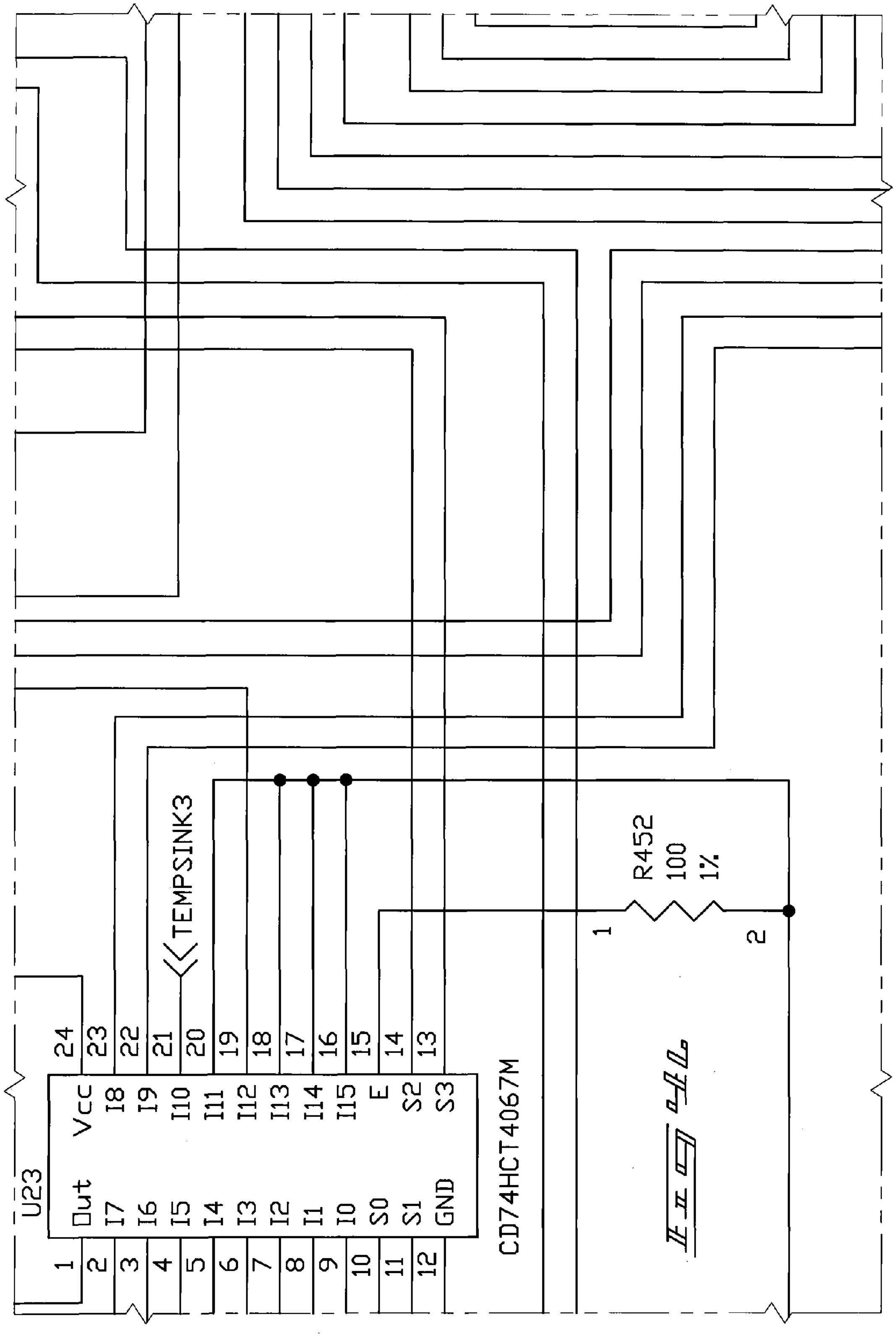
Figure 4N:
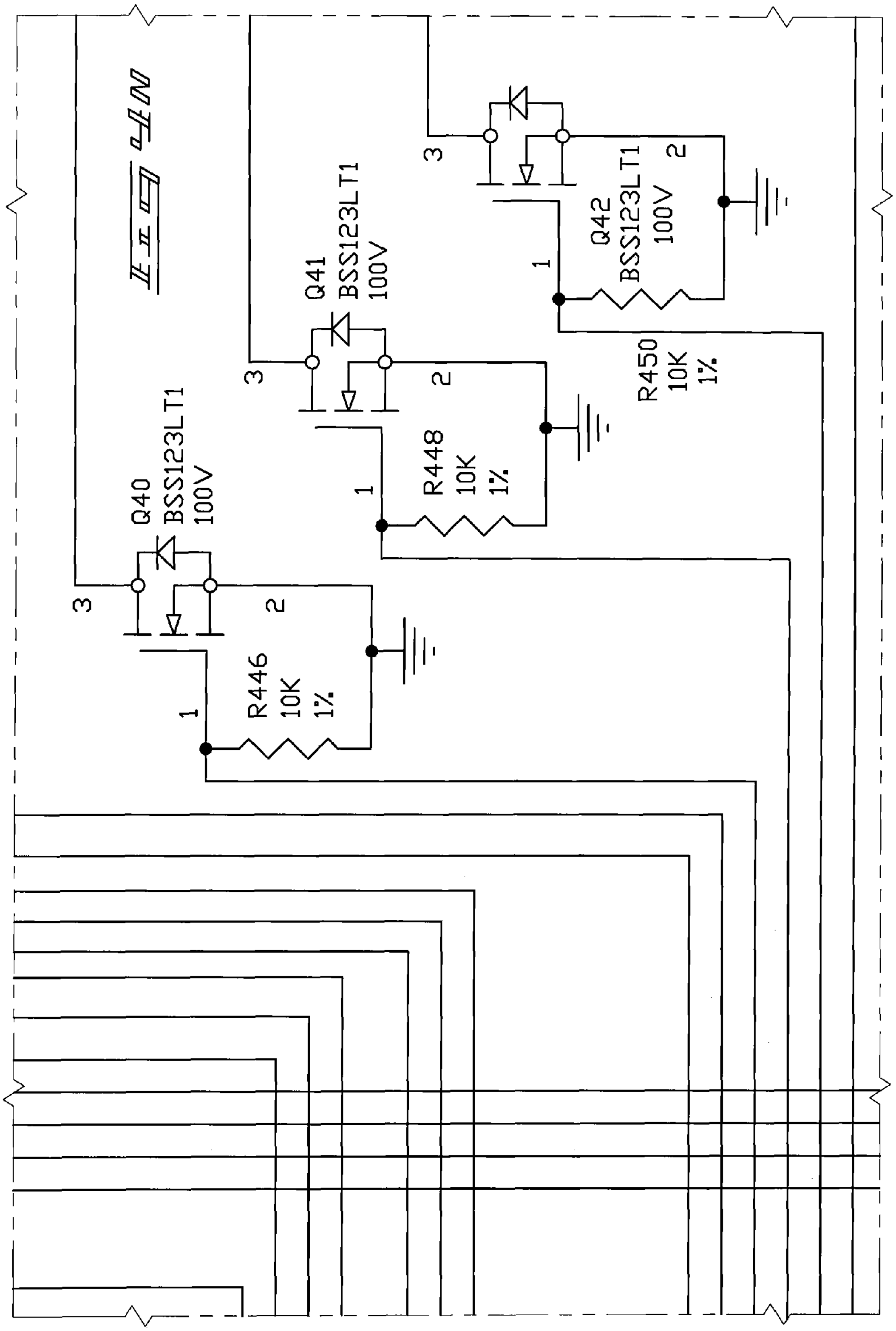
Figure 40:
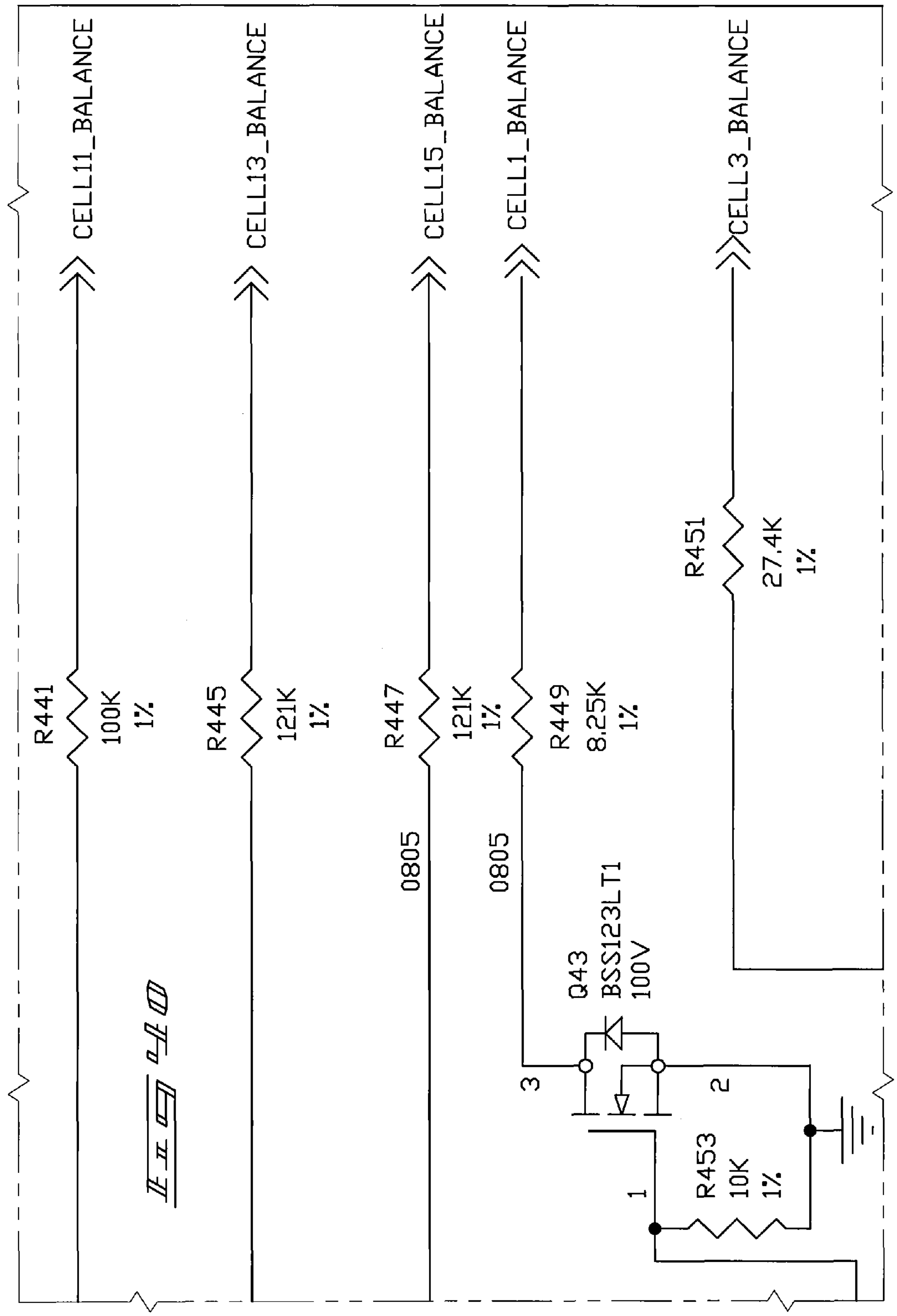
Figure 4P:
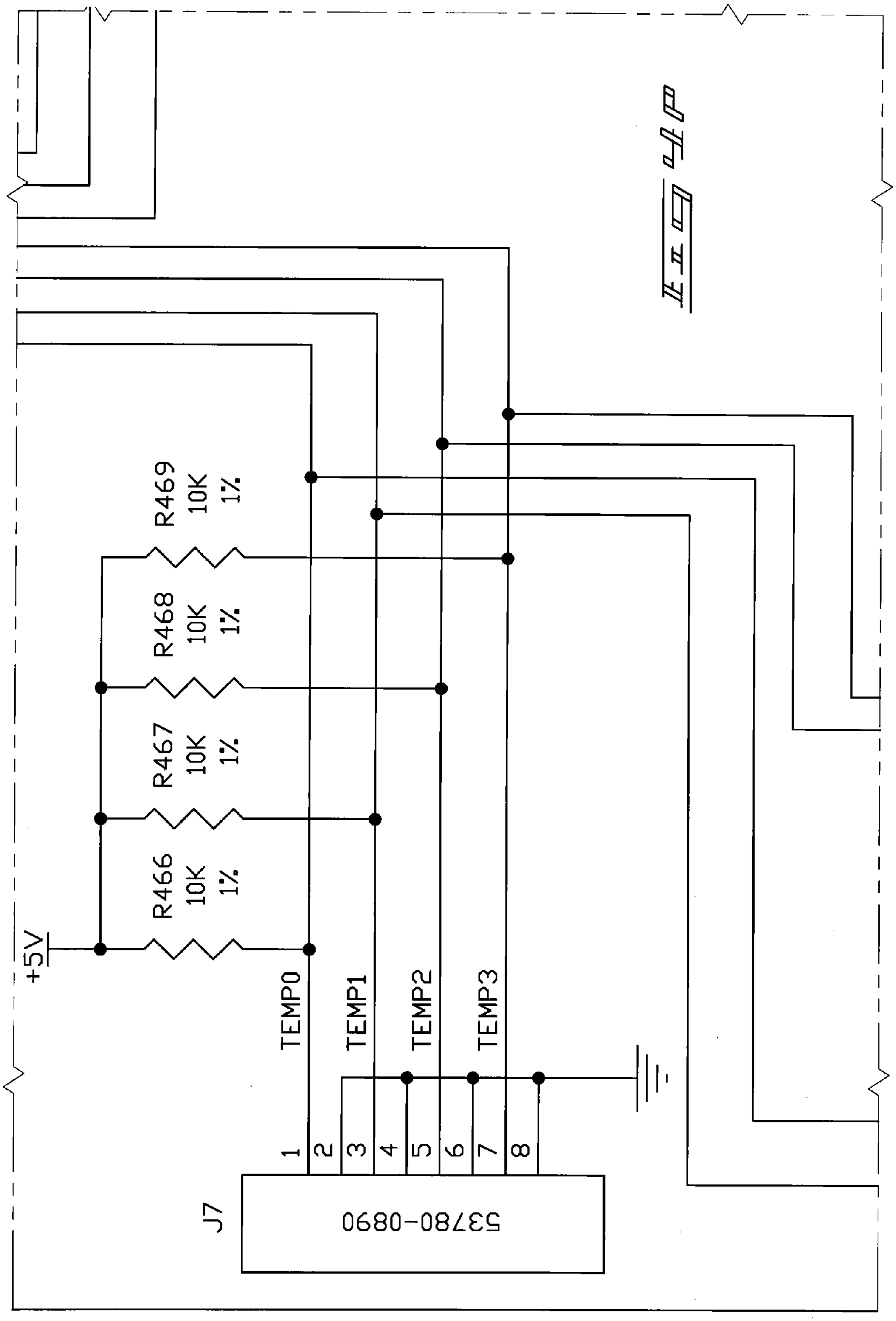
Figure 4Q:
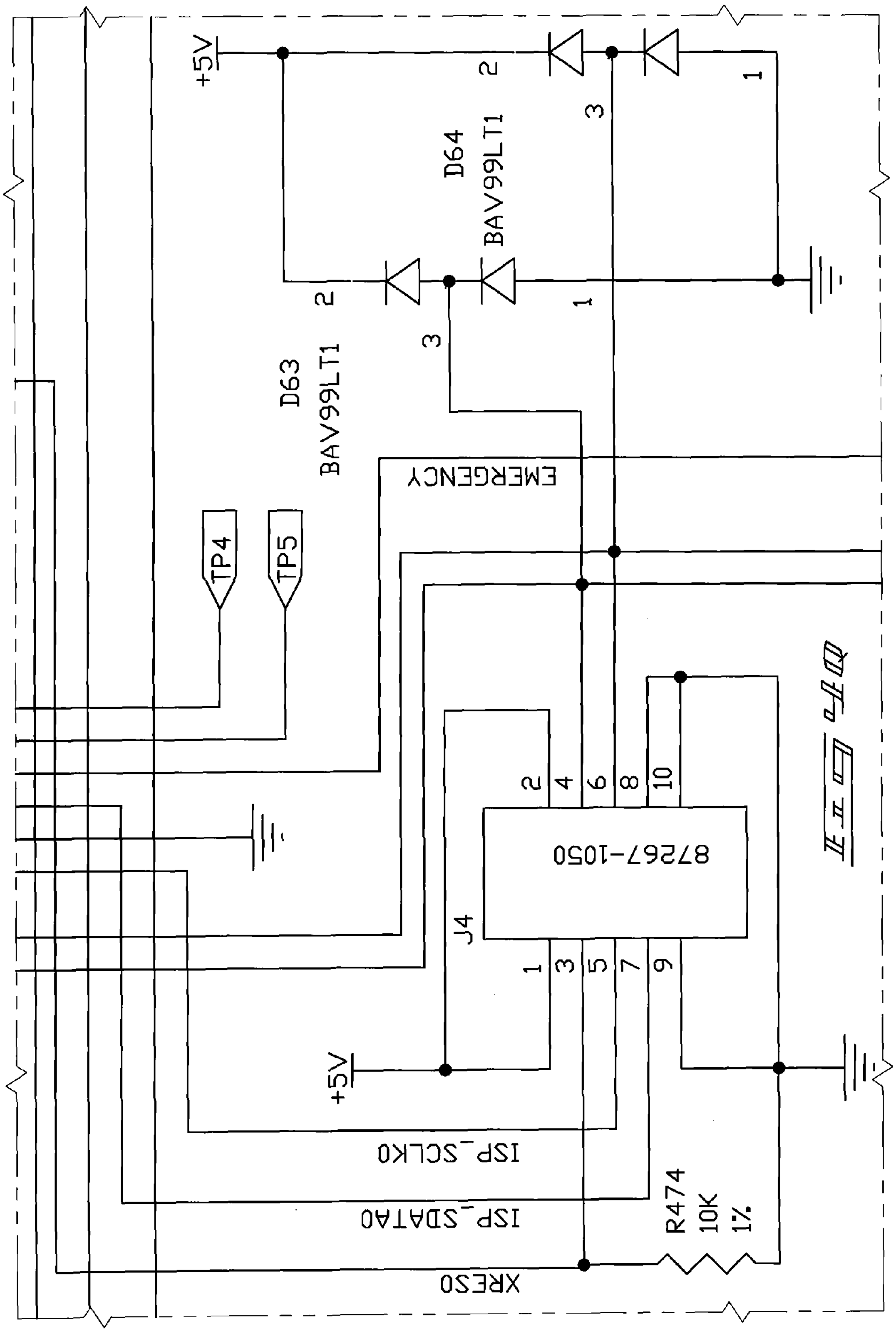
Figure 48:
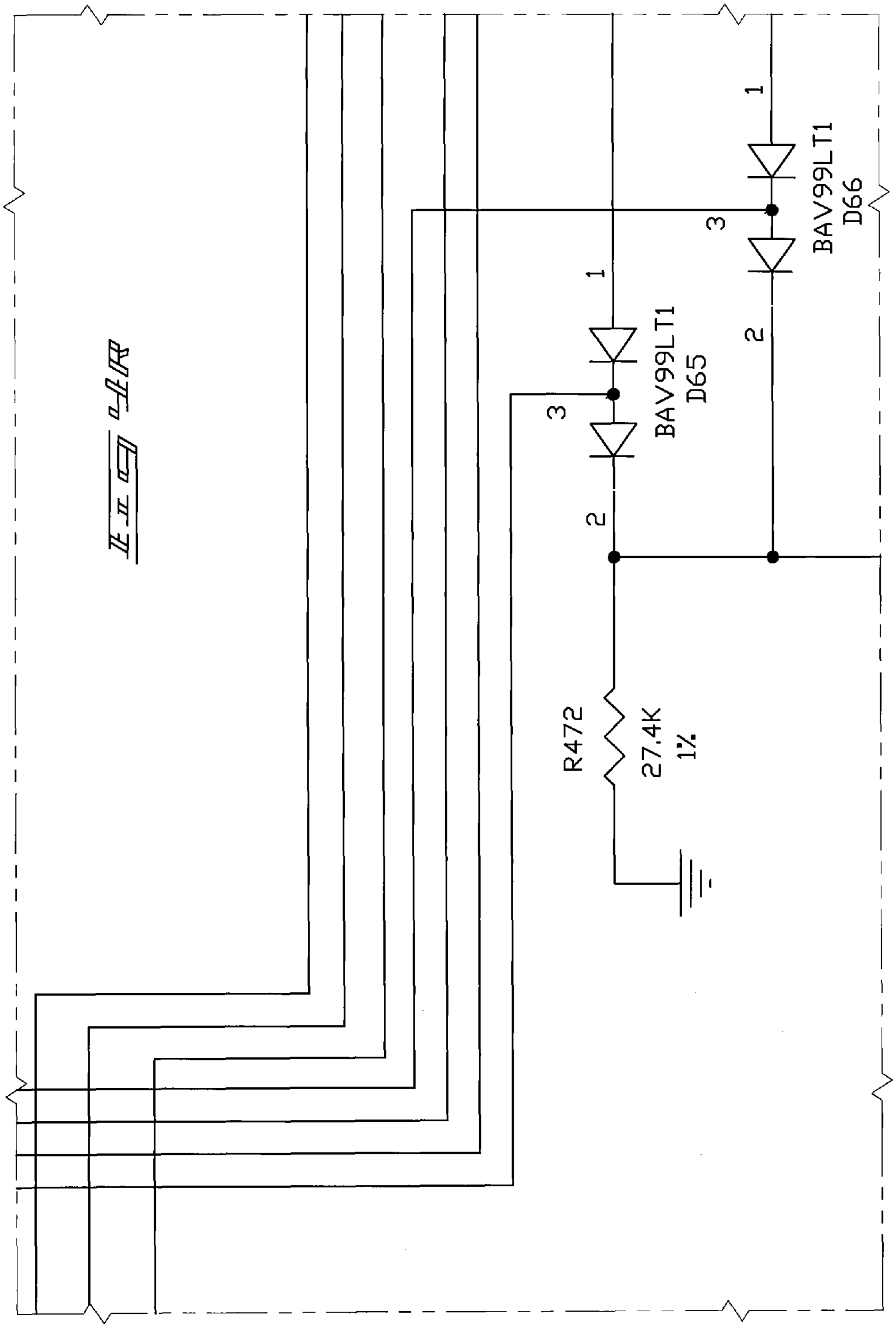
Figure 45:
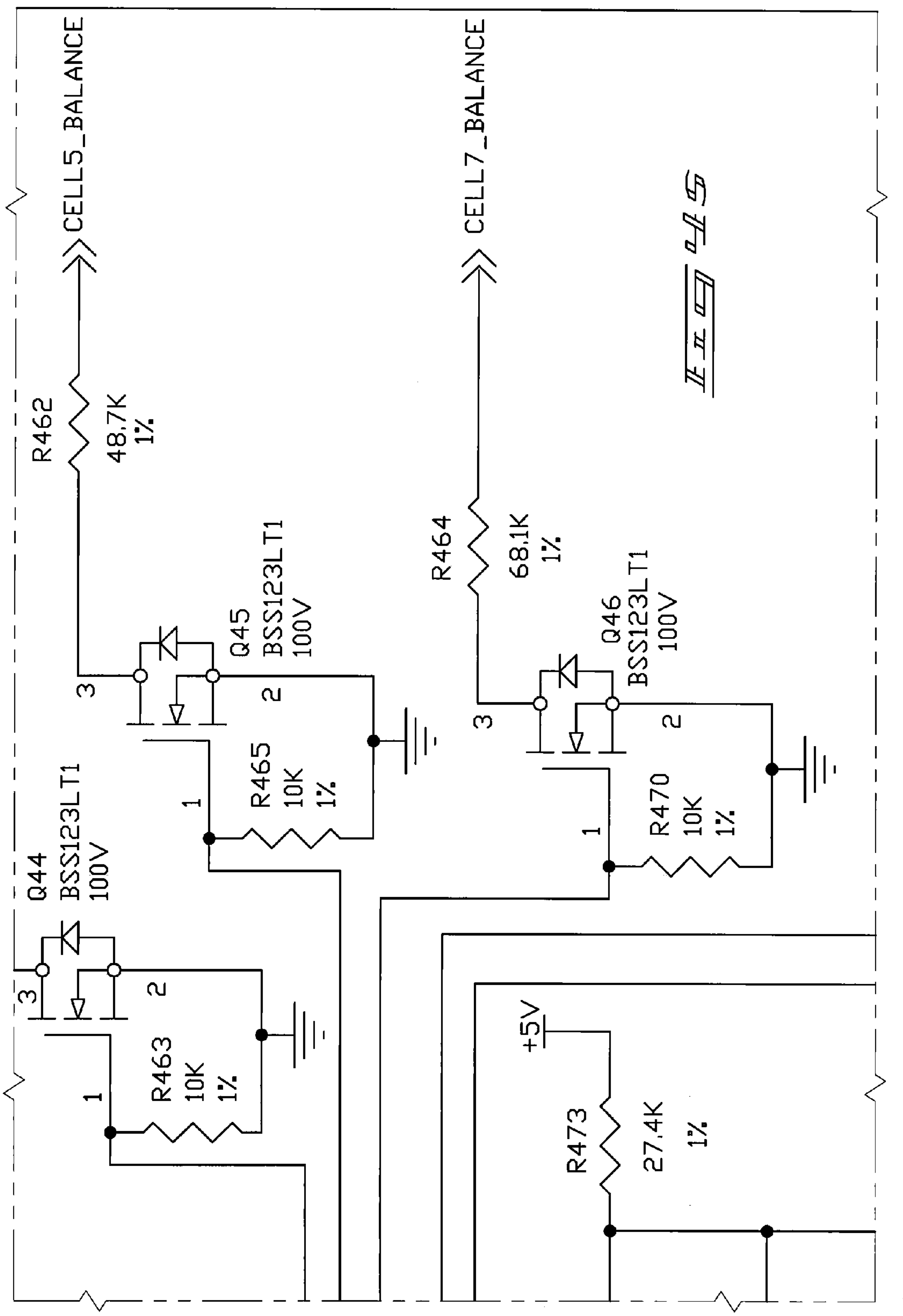
Figure 47:
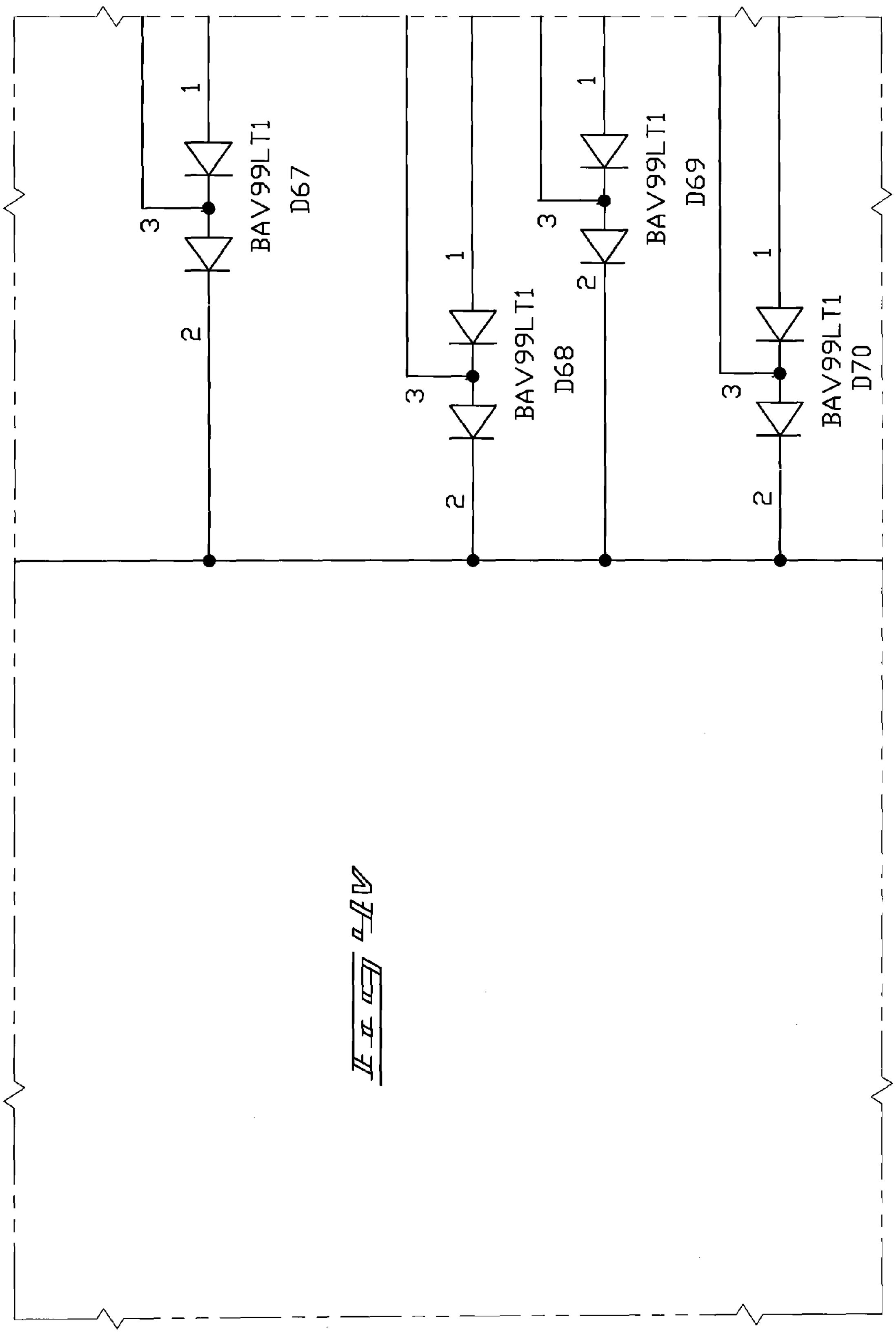
Figure 4X:
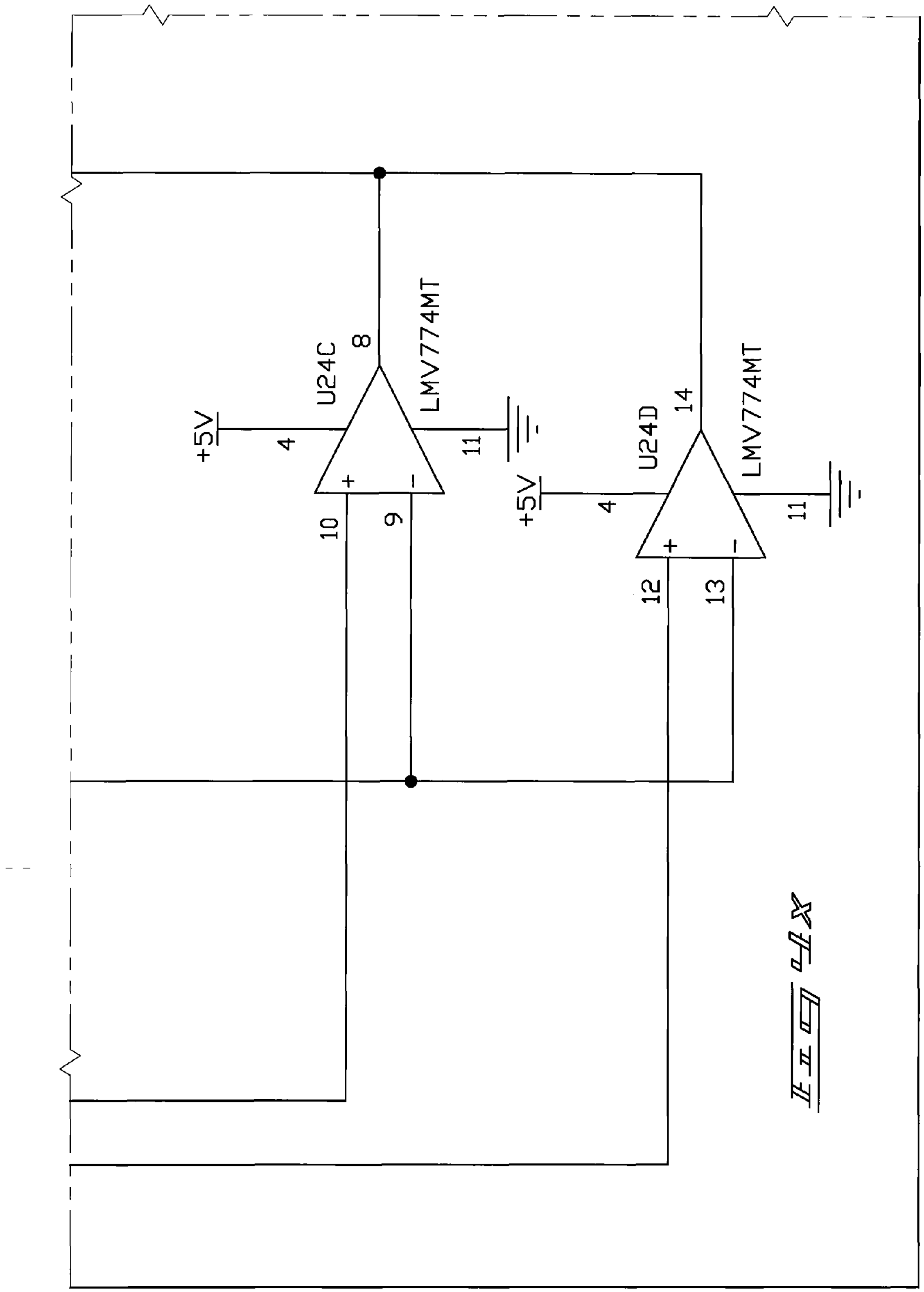
Figure 64:
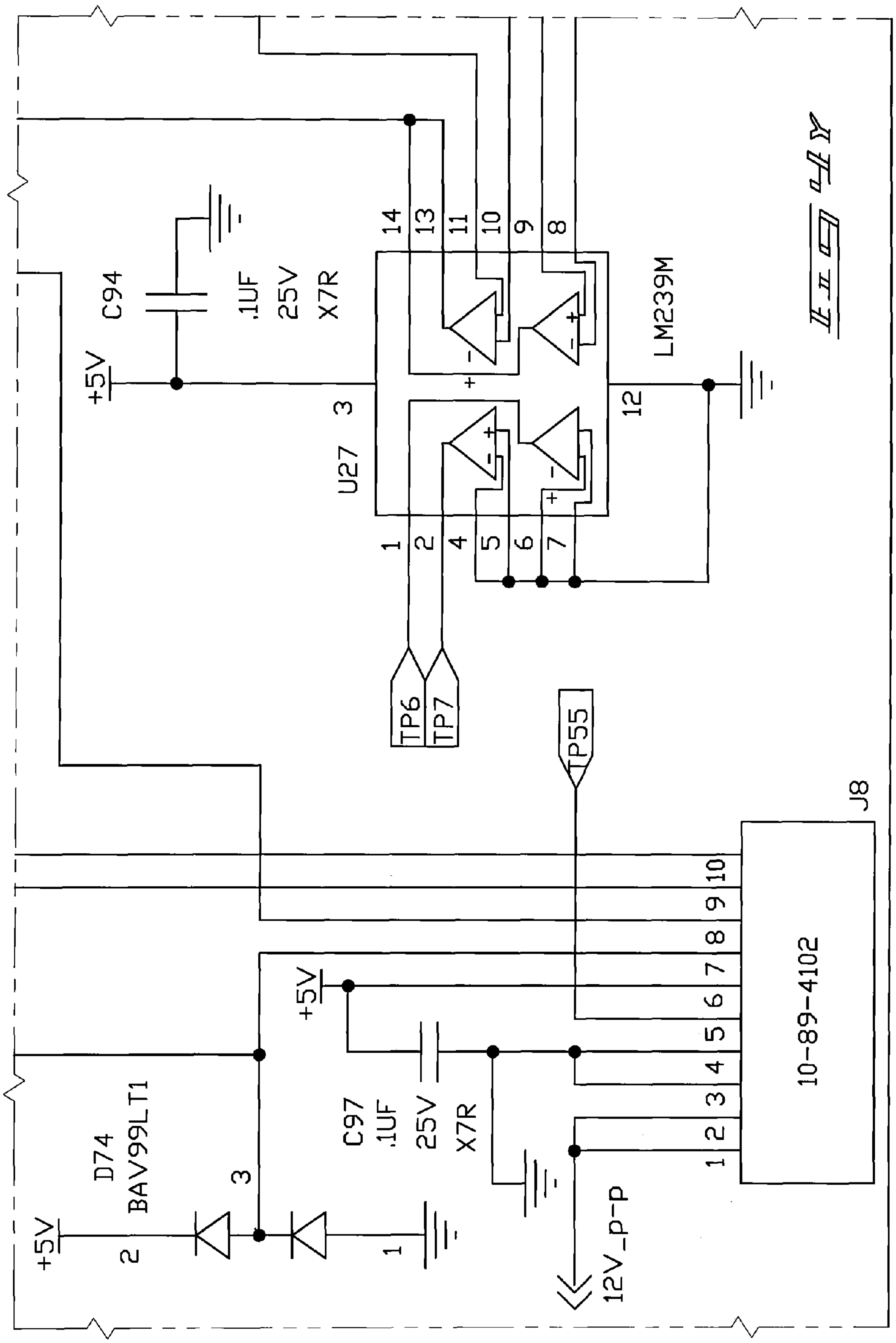
Figure 4Z:
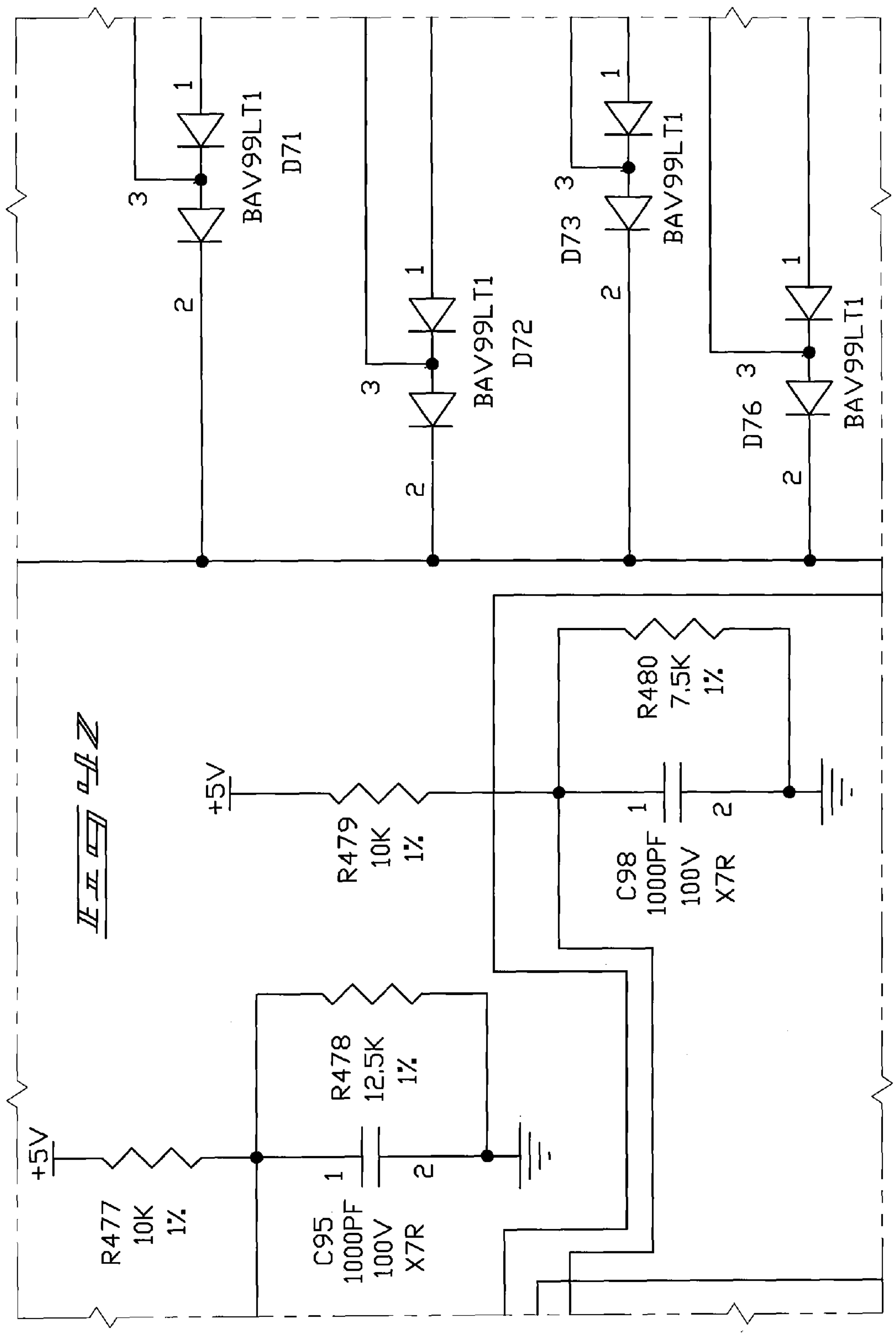
Figure 4A:
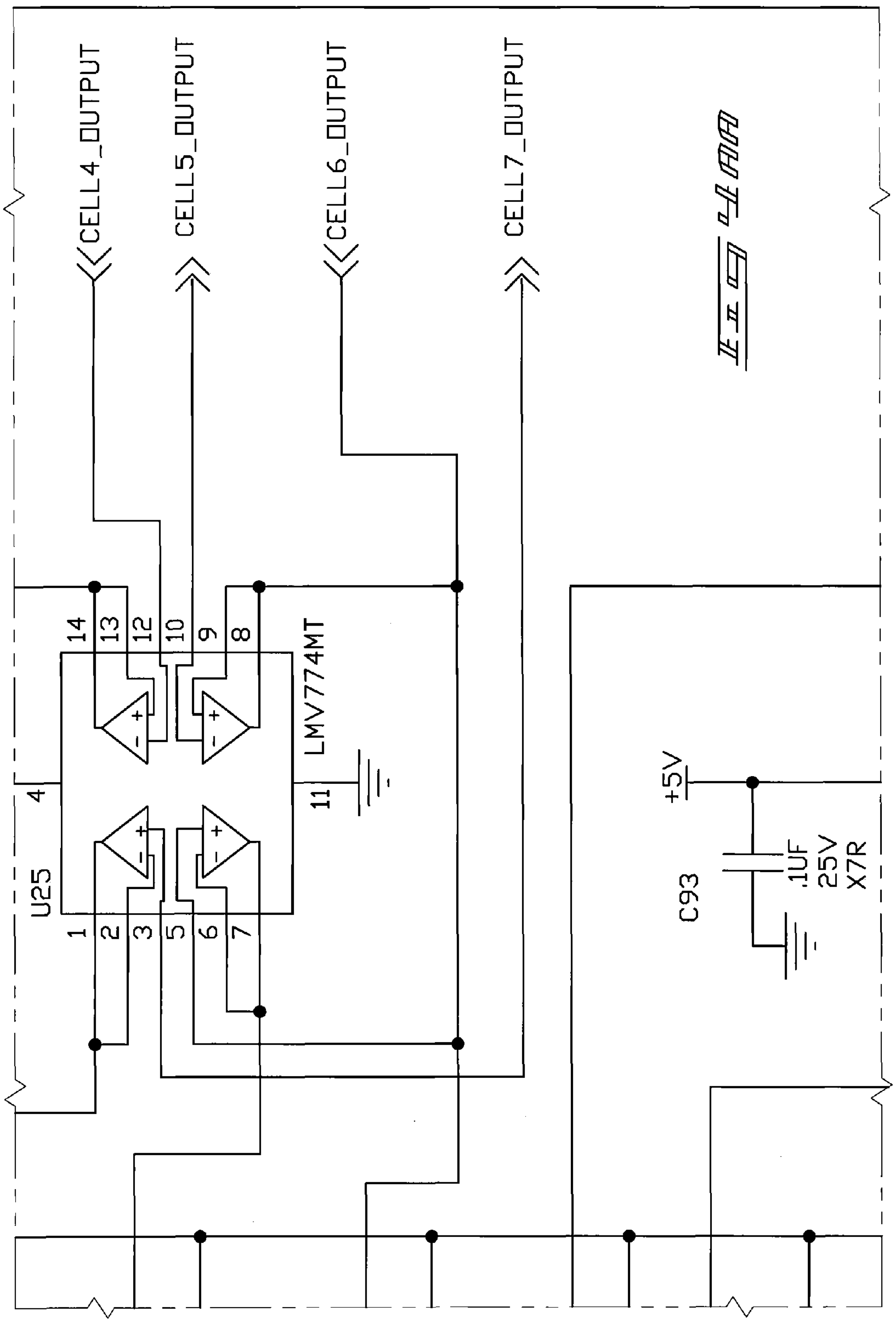
Figure 4B:
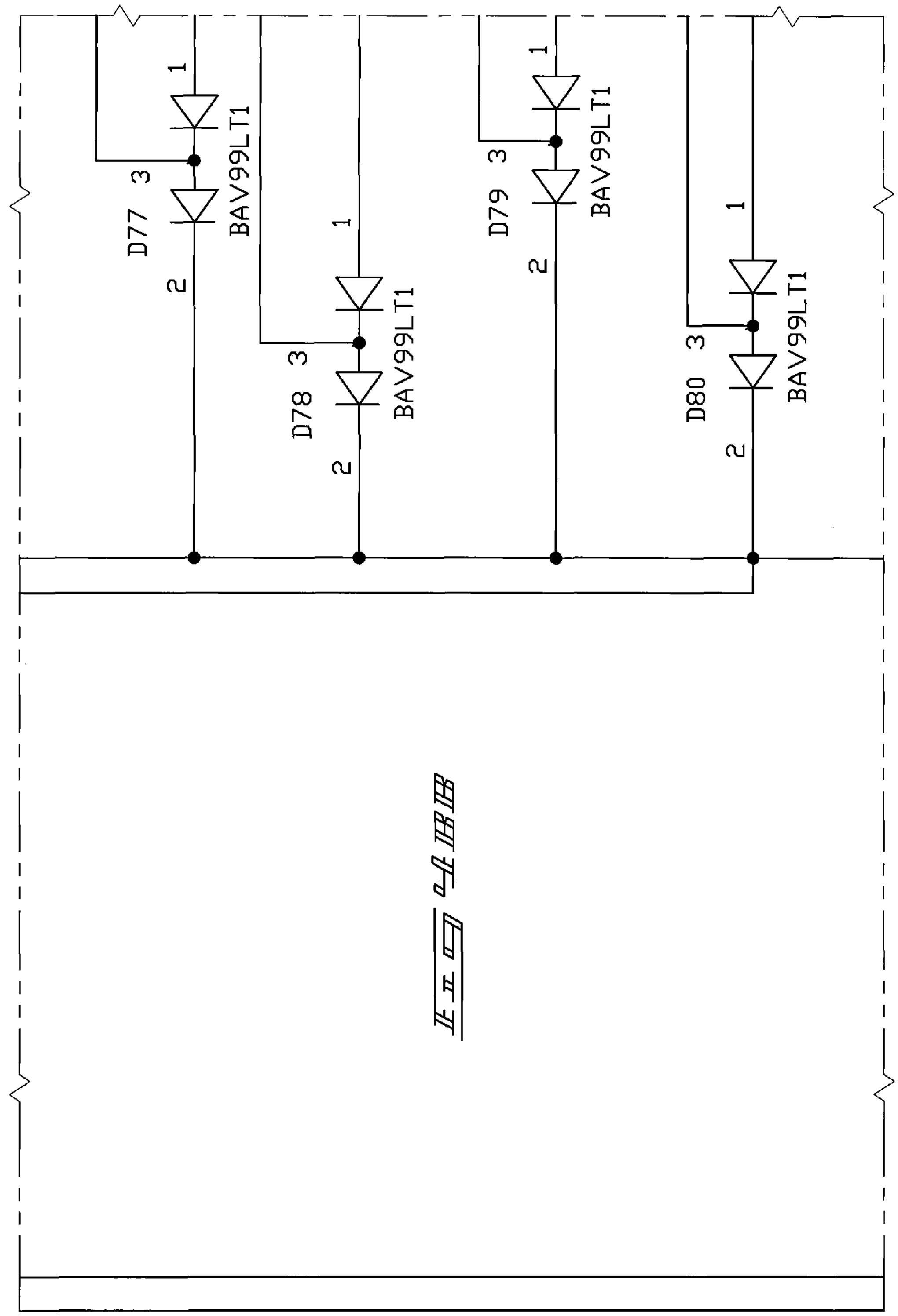
Figure 4C:
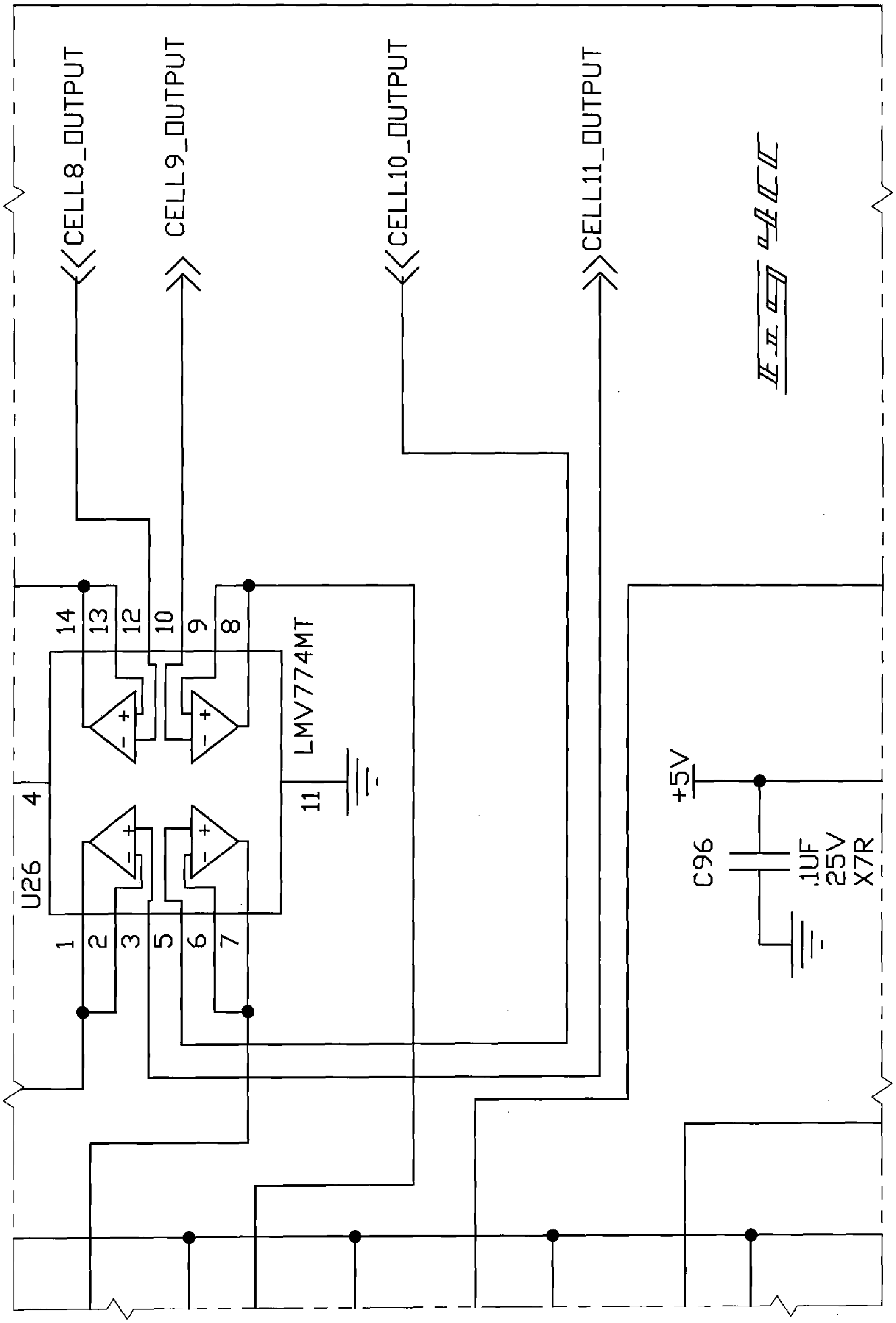
Figure 4D:
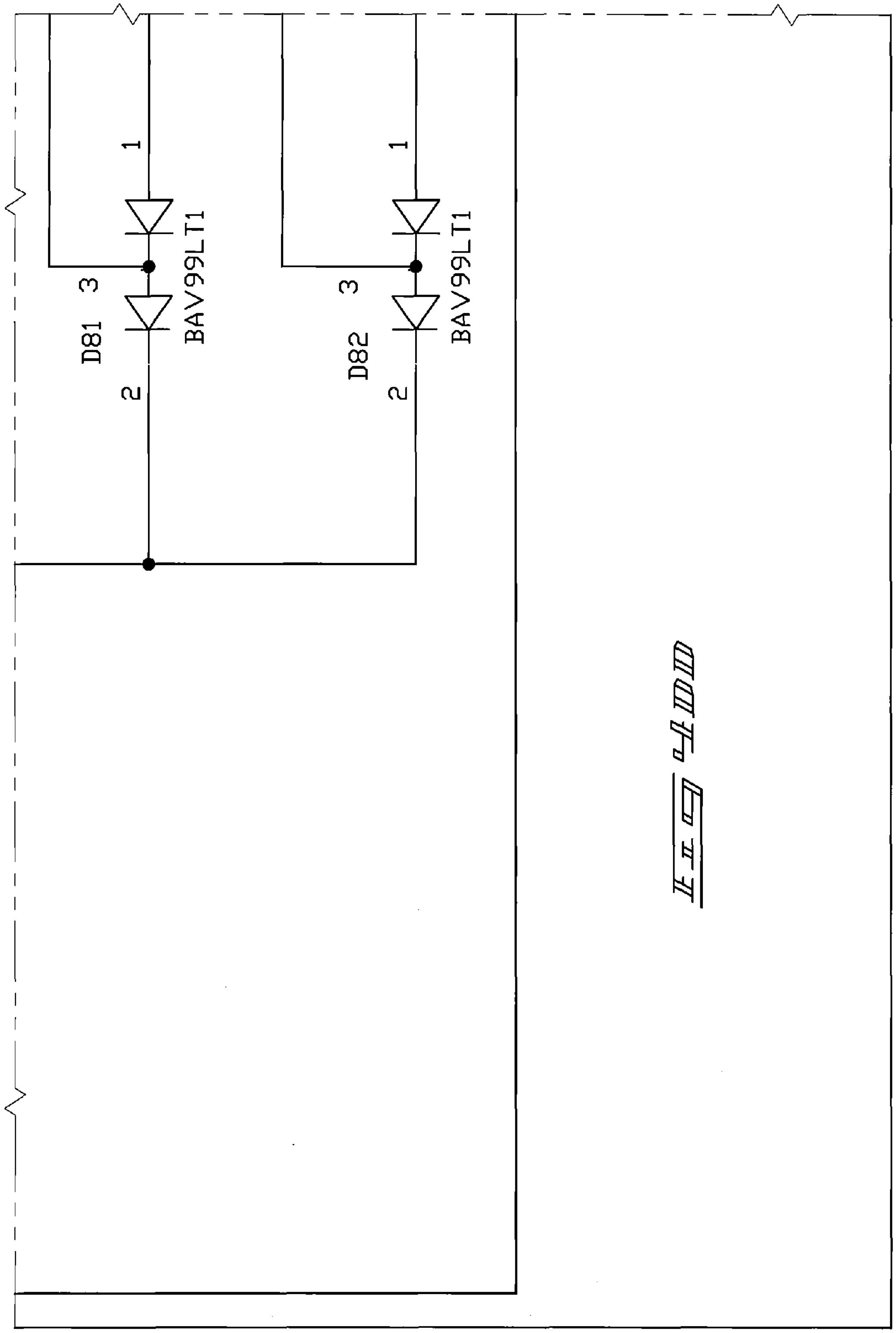
Figure 44E:
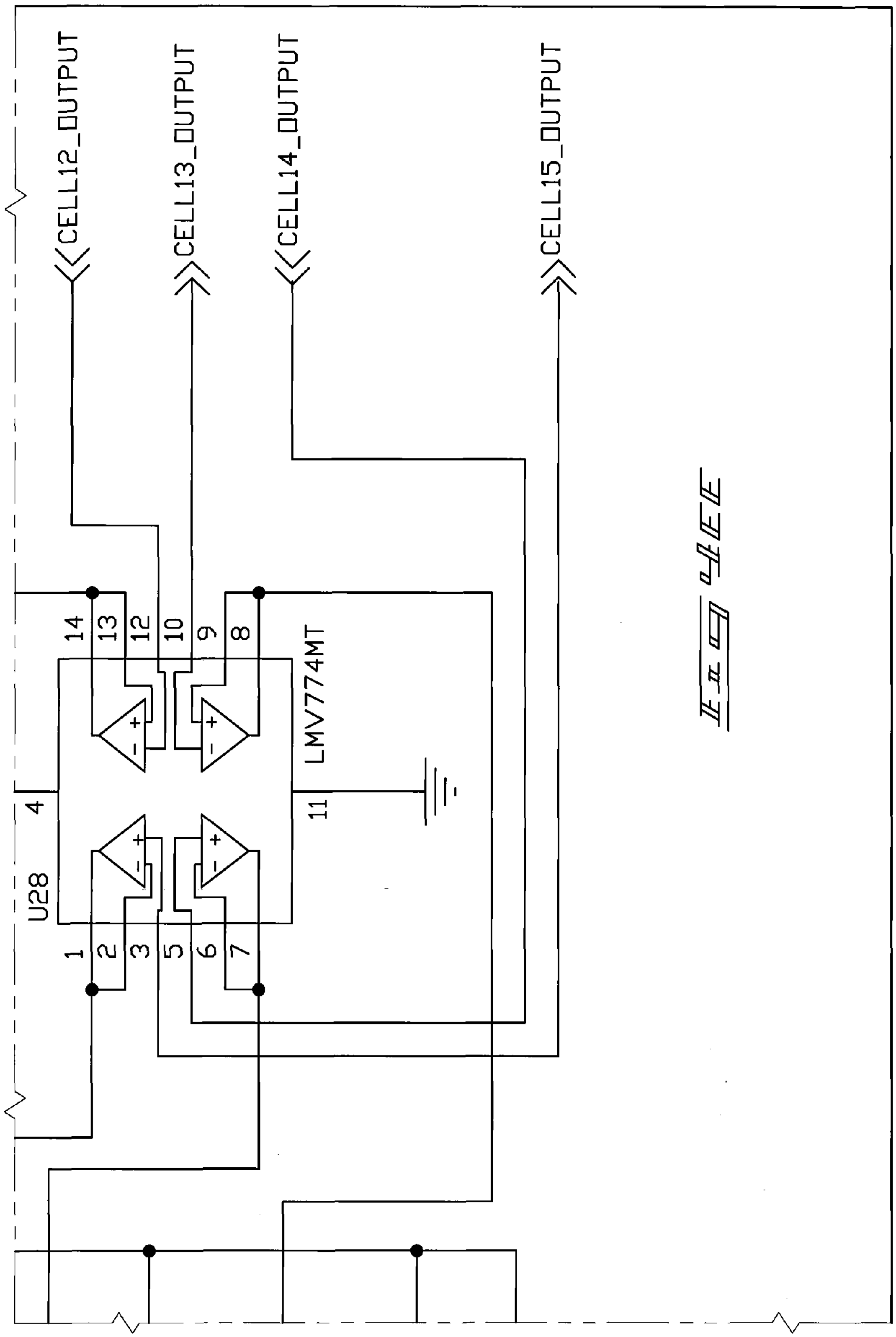

The SECOND DEFENSE signal comes from an analog portion of control circuitry 46 including U21, U25, U26, and U28 of FIGS. 4C, 4AA, 4CC, 4EE, respectively, and also measuring cell voltage signals from diodes D65-D82 of FIGS. 4R-4DD and comparators U27 of FIG. 4Y, which may also be referred to as backup circuitry. The analog circuitry provides a backup in case processor 50 is too slow in detecting or reacting to a situation wherein switching device 52 should be opened immediately (e.g., triggering events such as rapidly falling cell voltage caused by discharge current, rapidly rising cell voltage caused by overcharge or overtemperature, etc.). Accordingly, processor 50 may utilize additional time compared with the analog control signal SECOND DEFENSE to provide a proper control signal to processor 48 to open switching device 52 responsive to the same detected triggering event. The portion of control circuitry 46 providing the backup circuitry may detect undervoltage, overvoltage, and/or overtemperature in the devices 62 or other triggering events or stimulus, and activate an alarm (i.e., SECOND DEFENSE) signal if these abnormal conditions occur in one or more devices 62 or other circuitry to inform processor 48 (and independent of processor 50) to open switching device 52 in less time than if processor 50 were to formulate an appropriate alarm signal for processor 48 for the same triggering event in one embodiment.

Signals from voltage measurement circuits of devices 62 comprising operational amplifiers U1-U18 of FIGS. 5A-5P convert cell voltages into current signals which may be sent to the inputs of analog multiplexers U20 and U23 of FIGS. 4B and 4L, respectively. Input resistors at the multiplexers convert the current signals back into voltage signals referenced to the ground pin of the microcontroller analog-to-digital converter. J7 of FIG. 4P provides an additional four inputs from temperature sensors 66. Processor 50 may measure the signals from the multiplexers and control balance circuitry including transistors Q31-Q46 of FIGS. 4D-4S that will turn on balancing loads to balance voltages of devices 62. Balancing may be performed during charging operations when the battery assembly may be close to full charge.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical system comprising:
- an electrical entity configured to utilize electrical energy; and
- a power supply apparatus configured to provide the electrical energy for use by the electrical entity, and wherein the power supply apparatus comprises a battery assembly comprising:
  - a rechargeable electrochemical device configured to store the electrical energy;

a power terminal configured to electrically couple with the electrical entity and to provide the electrical energy from the rechargeable electrochemical device to the electrical entity; and storage circuitry comprising status information regarding the battery assembly stored during different operational modes of the battery assembly including a normal operational mode and a sleep operational mode wherein the electrical energy of the rechargeable electrochemical device is consumed at a reduced rate in the sleep operational mode compared with the normal operational mode.

2. The system of claim 1 wherein the battery assembly further comprises:

a communications interface configured to output the status information externally of the battery assembly and to receive a command from externally of the battery assembly; and control circuitry configured to control an operation of the battery assembly responsive to the command.

3. The system of claim 2 wherein the communications interface is configured to output the status information to a device external of the battery assembly and to receive the command from the device external of the battery assembly.

4. The system of claim 3 wherein the device external of the battery assembly comprises a system manager.

5. The system of claim 3 wherein the device external of the battery assembly comprises the electrical entity.

6. The system of claim 1 wherein the storage circuitry stores the status information comprising capacity information of the rechargeable electrochemical device.

7. The system of claim 1 wherein the battery assembly comprises a plurality of the rechargeable electrochemical devices individually configured to store the electrical energy, and wherein the storage circuitry stores the status information comprising capacity information of individual ones of the rechargeable electrochemical devices.

8. The system of claim 1 wherein the storage circuitry stores the status information comprising state of charge information of the rechargeable electrochemical device.

9. The system of claim 1 wherein the battery assembly comprises a plurality of the rechargeable electrochemical devices individually configured to store the electrical energy, and wherein the storage circuitry stores the status information comprising state of charge information of individual ones of the rechargeable electrochemical devices.

10. The system of claim 1 wherein the storage circuitry stores the status information comprising charge/discharge cycle information of the rechargeable electrochemical device.

11. The system of claim 1 wherein the battery assembly comprises a plurality of the rechargeable electrochemical devices individually configured to store the electrical energy, and wherein the storage circuitry stores the status information comprising charge/discharge cycle information of individual ones of the rechargeable electrochemical devices.

12. The system of claim 1 wherein the storage circuitry stores the status information comprising charging current information of the rechargeable electrochemical device.

13. The system of claim 1 wherein the battery assembly comprises a plurality of the rechargeable electrochemical devices individually configured to store the electrical energy, and wherein the storage circuitry stores the status information comprising charging current information of individual ones of the rechargeable electrochemical devices.

14. The system of claim 1 wherein the storage circuitry stores the status information comprising discharging current information of the rechargeable electrochemical device.

15. The system of claim 1 wherein the battery assembly comprises a plurality of the rechargeable electrochemical devices individually configured to store the electrical energy, and wherein the storage circuitry stores the status information comprising discharging current information of individual ones of the rechargeable electrochemical devices.

16. The system of claim 1 wherein the storage circuitry stores the status information comprising temperature information of the battery assembly.

17. The system of claim 1 wherein the storage circuitry stores the status information comprising a history of operations of the battery assembly including temporal information of the status information at a plurality of moments in time.

18. The system of claim 1 wherein the storage circuitry stores the status information determined at a plurality of moments in time according to a period.

19. The system of claim 1 wherein the storage circuitry stores the status information comprising a length of time of use of the battery assembly.

20. The system of claim 1 wherein the power supply apparatus further comprises a plurality of the battery assemblies.

21. The system of claim 1 wherein the battery assembly further comprises a housing configured to house the rechargeable electrochemical device and the storage circuitry, and wherein the power terminal is configured to conduct the electricity from the rechargeable electrochemical device externally of the housing.

22. The system of claim 1 wherein at least one component of the battery assembly is at least partially powered down during the sleep operational mode to consume less of the electrical energy of the rechargeable electrochemical device compared with the normal operational mode.

23. A battery assembly comprising:

a rechargeable electrochemical device configured to store electrical energy;

a power terminal electrically coupled with the rechargeable electrochemical device and configured to conduct the electrical energy from the rechargeable electrochemical to an electrical entity configured to utilize the electrical energy;

storage circuitry configured to store status information regarding the battery assembly;

control circuitry configured to determine a plurality of periodic moments in time according to a predetermined period and to control the storage of the status information regarding the battery assembly using the storage circuitry at the plurality of periodic moments in time; and a communications interface configured to communicate the status information regarding the battery assembly externally of the battery assembly after the storage of the status information using the storage circuitry.

24. The assembly of claim 23 wherein the control circuitry is configured to control an operation of the battery assembly as a result of the communications interface receiving a command from externally of the battery assembly.

25. The assembly of claim 24 wherein the power terminal provides the electrically energy to an electrical entity which is configured to utilize the electrical energy, and the communications interface receives the command from the electrical entity.

26. The assembly of claim 23 wherein the status information stored at the periodic moments in time is indicative of a status regarding the battery assembly at the periodic moments in time.

27. The assembly of claim 23 wherein the stored status information comprises capacity information of the rechargeable electrochemical device.

28. The assembly of claim 23 wherein the battery assembly comprises a plurality of rechargeable electrochemical devices individually configured to store electrical energy, and the stored status information comprises capacity information of individual ones of the rechargeable electrochemical devices.

29. The assembly of claim 23 wherein the stored status information comprises state of charge information of the rechargeable electrochemical device.

30. The assembly of claim 23 wherein the battery assembly comprises a plurality of rechargeable electrochemical devices individually configured to store electrical energy, and the stored status information comprises state of charge information of individual ones of the rechargeable electrochemical devices.

31. The assembly of claim 23 wherein the stored status information comprises charge/discharge cycle information of the rechargeable electrochemical device.

32. The assembly of claim 23 wherein the battery assembly comprises a plurality of rechargeable electrochemical devices individually configured to store electrical energy, and the stored status information comprises charge/discharge cycle information of individual ones of the rechargeable electrochemical devices.

33. The assembly of claim 23 wherein the stored status information comprises charging current information of the rechargeable electrochemical device.

34. The assembly of claim 23 wherein the battery assembly comprises a plurality of rechargeable electrochemical devices individually configured to store electrical energy, and the stored status information comprises charging current information of individual ones of the rechargeable electrochemical devices.

35. The assembly of claim 23 wherein the stored status information comprises discharging current information of the rechargeable electrochemical device.

36. The assembly of claim 23 wherein the battery assembly comprises a plurality of rechargeable electrochemical devices individually configured to store electrical energy, and the stored status information comprises discharging current information of individual ones of the rechargeable electrochemical devices.

37. The assembly of claim 23 wherein the stored status information comprises temperature information of the battery assembly.

38. The assembly of claim 23 wherein the stored status information comprises a history of operations of the battery assembly including temporal information of the status information at the plurality of moments in time.

39. The assembly of claim 23 wherein the stored status information comprises a length of time of use of the battery assembly.

40. The assembly of claim 23 wherein the stored status information comprises a characteristic of the rechargeable electrochemical device.

41. The assembly of claim 23 wherein the battery assembly comprises a plurality of rechargeable electrochemical devices individually configured to store electrical energy, and further comprising a housing configured to house the rechargeable electrochemical devices, the storage circuitry and the control circuitry.

42. The assembly of claim 23 further comprising a housing configured to house the rechargeable electrochemical device, the storage circuitry and the control circuitry, and wherein the communications interface is configured to communicate the status information externally of the housing.

* * * * *